(12) United States Patent
Maxwell et al.

(10) Patent No.: US 9,344,522 B2
(45) Date of Patent: May 17, 2016

(54) SYSTEMS AND METHODS FOR WIDGET RENDERING AND SHARING ON A PERSONAL ELECTRONIC DEVICE

(71) Applicant: BBY SOLUTIONS, INC., Richfield, MN (US)

(72) Inventors: Duane Stewart Maxwell, San Diego, CA (US); Andrew Shane Huang, Singapore (SG); Kenneth Earl Steele, San Diego, CA (US); Stephen L. Tomlin, San Diego, CA (US); Steven Michael Adler, San Diego, CA (US)

(73) Assignee: BBY SOLUTIONS, INC., Richfield, MN (US)

( * ) Notice: Subject to any disclaimer, the term of this patent is extended or adjusted under 35 U.S.C. 154(b) by 492 days.

(21) Appl. No.: 13/944,339

(22) Filed: Jul. 17, 2013

(65) Prior Publication Data

US 2014/0082506 A1 Mar. 20, 2014

Related U.S. Application Data

(63) Continuation of application No. 12/715,331, filed on Mar. 1, 2010, now Pat. No. 8,521,857, and a continuation-in-part of application No. 11/845,018, filed on Aug. 24, 2007.

(Continued)

(51) Int. Cl.
*H04L 29/08* (2006.01)
*G06F 3/147* (2006.01)

(Continued)

(52) U.S. Cl.
CPC ............... *H04L 67/32* (2013.01); *G06F 3/147* (2013.01); *G11B 27/105* (2013.01); *H04L 41/22* (2013.01);

(Continued)

(58) Field of Classification Search
CPC ......... H04L 67/02; H04L 67/04; H04L 67/06; H04L 67/26; H04L 67/32; H04L 67/42
See application file for complete search history.

(56) References Cited

U.S. PATENT DOCUMENTS 4,980,833 A 12/1990 Milligan et al.
5,465,084 A 11/1995 Cottrell (Continued)

FOREIGN PATENT DOCUMENTS

DE 10324143 A1 12/2004
EP 0571998 A1 12/1993

(Continued)

OTHER PUBLICATIONS

"U.S. Appl. No. 11/845,018, Appeal Brief filed Aug. 12, 2014", 20 pgs.

(Continued)

*Primary Examiner* — Ramy M Osman
(74) *Attorney, Agent, or Firm* — Schwegman Lundberg & Woessner, P.A.

(57) ABSTRACT

Systems and methods for providing, sharing, storing and playing widgets and associated media content on a personal audiovisual device, such as a digital photo frame, are described. In one implementation, widgets may be selected by a user for rendering based on capabilities of a user's device, with the widgets then provided to the device for playback. Digital content such as audio files, images, and/or video may be rendered in conjunction with playback of the widget. Widgets may be shared between users so as to facilitate sharing of media content.

21 Claims, 86 Drawing Sheets

Related U.S. Application Data

(60) Provisional application No. 61/156,418, filed on Feb. 27, 2009, provisional application No. 61/156,432, filed on Feb. 27, 2009, provisional application No. 61/156,436, filed on Feb. 27, 2009, provisional application No. 60/805,830, filed on Sep. 5, 2006, provisional application No. 60/823,491, filed on Aug. 24, 2006, provisional application No. 60/823,493, filed on Aug. 24, 2006, provisional application No. 60/823,496, filed on Aug. 24, 2006, provisional application No. 60/945,900, filed on Jun. 22, 2007, provisional application No. 60/869,297, filed on Dec. 8, 2006.

(51) Int. Cl.
| | |
|---|---|
| *G11B 27/10* | (2006.01) |
| *H04N 21/4788* | (2011.01) |
| *H04N 21/81* | (2011.01) |
| *H04L 12/24* | (2006.01) |
| *H04L 12/58* | (2006.01) |
| *H04N 1/00* | (2006.01) |
| *H04W 4/00* | (2009.01) |

(52) U.S. Cl.
CPC ............... *H04L 67/02* (2013.01); *H04L 67/04* (2013.01); *H04L 67/306* (2013.01); *H04N 1/00244* (2013.01); *H04N 1/00973* (2013.01); *H04N 21/4788* (2013.01); *H04N 21/8153* (2013.01); *H04N 21/8166* (2013.01); *G09G 2370/027* (2013.01); *G09G 2380/16* (2013.01); *H04L 12/58* (2013.01); *H04N 1/00204* (2013.01); *H04N 2201/0039* (2013.01); *H04N 2201/0086* (2013.01); *H04N 2201/0087* (2013.01); *H04N 2201/0089* (2013.01); *H04W 4/00* (2013.01)

(56) References Cited

U.S. PATENT DOCUMENTS

| | | | |
|---|---|---|---|
| 5,559,961 A | 9/1996 | Blonder | |
| 5,607,054 A | 3/1997 | Hollingsworth et al. | |
| 5,862,511 A | 1/1999 | Croyle et al. | |
| 6,142,846 A | 11/2000 | Ojakaar | |
| 6,167,411 A | 12/2000 | Narayanaswamy et al. | |
| 6,209,104 B1 | 3/2001 | Jalili | |
| 6,237,004 B1 | 5/2001 | Dodson et al. | |
| 6,332,192 B1 | 12/2001 | Boroditsky et al. | |
| 6,494,762 B1 | 12/2002 | Bushmitch et al. | |
| 6,499,062 B1 * | 12/2002 | Shteyn ................ G06F 9/4443 700/19 |
| 6,657,647 B1 * | 12/2003 | Bright ................ G06F 17/3089 345/157 |
| 6,658,574 B1 | 12/2003 | Anvekar | |
| 6,865,599 B2 | 3/2005 | Zhang | |
| 7,219,368 B2 | 5/2007 | Juels et al. | |
| 7,292,230 B2 | 11/2007 | Tokkonen | |
| 7,394,452 B2 * | 7/2008 | Wong ................ G06F 1/1626 345/156 |
| 7,546,543 B2 * | 6/2009 | Louch ................ G06F 8/38 715/762 |
| 7,657,849 B2 | 2/2010 | Chaudhri et al. | |
| 7,778,792 B2 | 8/2010 | Huang et al. | |
| 8,121,808 B2 | 2/2012 | Huang et al. | |
| 8,261,256 B1 | 9/2012 | Adler et al. | |
| 8,521,857 B2 * | 8/2013 | Maxwell ................ H04L 67/04 709/203 |
| RE45,636 E * | 7/2015 | Bright | |
| 2002/0013815 A1 | 1/2002 | Obradovich et al. | |
| 2002/0046899 A1 | 4/2002 | Mizuno et al. | |
| 2002/0053035 A1 | 5/2002 | Schutzer | |
| 2002/0054148 A1 | 5/2002 | Okada | |
| 2002/0128972 A1 | 9/2002 | Stefik et al. | |
| 2002/0156952 A1 | 10/2002 | Shono | |
| 2003/0051136 A1 | 3/2003 | Curtis et al. | |
| 2003/0070074 A1 | 4/2003 | Geller et al. | |
| 2003/0187731 A1 | 10/2003 | Takakura et al. | |
| 2004/0117633 A1 | 6/2004 | Rohrbach | |
| 2004/0153513 A1 | 8/2004 | Laumen et al. | |
| 2004/0225899 A1 | 11/2004 | Mizrah | |
| 2005/0039134 A1 | 2/2005 | Wiggeshoff et al. | |
| 2005/0182715 A1 | 8/2005 | Kawahara | |
| 2005/0229007 A1 | 10/2005 | Bolle et al. | |
| 2006/0005207 A1 | 1/2006 | Louch et al. | |
| 2006/0015818 A1 | 1/2006 | Chaudhri et al. | |
| 2006/0031918 A1 | 2/2006 | Sarachik et al. | |
| 2006/0230435 A1 | 10/2006 | Kokumai | |
| 2007/0022431 A1 | 1/2007 | Chang | |
| 2007/0061724 A1 | 3/2007 | Slothouber et al. | |
| 2007/0064021 A1 | 3/2007 | Silverbrook et al. | |
| 2007/0067738 A1 | 3/2007 | Flynt et al. | |
| 2007/0079019 A1 | 4/2007 | Hu et al. | |
| 2007/0080807 A1 | 4/2007 | Kang | |
| 2007/0101279 A1 | 5/2007 | Chaudhri et al. | |
| 2007/0118813 A1 | 5/2007 | Forstall et al. | |
| 2007/0130541 A1 | 6/2007 | Louch et al. | |
| 2007/0176898 A1 | 8/2007 | Suh et al. | |
| 2007/0220025 A1 | 9/2007 | Hyman | |
| 2007/0250643 A1 | 10/2007 | Pyhalammi et al. | |
| 2008/0034314 A1 | 2/2008 | Louch et al. | |
| 2008/0052348 A1 | 2/2008 | Adler et al. | |
| 2008/0126937 A1 | 5/2008 | Pachet | |
| 2009/0002333 A1 | 1/2009 | Maxwell et al. | |
| 2009/0044144 A1 | 2/2009 | Morris | |
| 2009/0049384 A1 | 2/2009 | Yau | |
| 2010/0023865 A1 | 1/2010 | Fulker et al. | |
| 2011/0060994 A1 | 3/2011 | Maxwell et al. | |
| 2014/0082506 A1 * | 3/2014 | Maxwell ................ H04L 67/02 715/738 |

FOREIGN PATENT DOCUMENTS

| | | |
|---|---|---|
| EP | 1670191 A1 | 6/2006 |
| KR | 20020012417 A | 2/2002 |
| KR | 100789738 B1 | 1/2008 |
| KR | 20080001290 A | 1/2008 |
| NO | WO-2004/040923 A1 | 5/2004 |

OTHER PUBLICATIONS

"U.S. Appl. No. 11/845,018, Final Office Action mailed Jan. 16, 2014", 18 pgs.

"U.S. Appl. No. 11/845,018, Pre-Appeal Brief Request filed Apr. 16, 2014", 5 pgs.

"U.S. Appl. No. 12/142,630, Examiner Interview Summary mailed Jan. 13, 2014", 3 pgs.

"U.S. Appl. No. 12/142,630, Final Office Action mailed Mar. 25, 2014", 38 pgs.

"U.S. Appl. No. 12/142,630, Final Office Action mailed Dec. 28, 2011", 21 pgs.

"U.S. Appl. No. 12/142,630, Non Final Office Action mailed Jun. 2, 2011", 24 pgs.

"U.S. Appl. No. 12/142,630, Non Final Office Action mailed Aug. 22, 2013", 26 pgs.

"U.S. Appl. No. 12/142,630, Response filed Jan. 20, 2014 to Non Final Office Action mailed Aug. 22, 2013", 18 pgs.

"U.S. Appl. No. 12/142,630, Response filed Sep. 26, 2012 to Final Office Action mailed Dec. 28, 2011", 14 pgs.

"U.S. Appl. No. 12/142,630, Response filed Dec. 2, 2011 to Non Final Office Action mailed Jun. 2, 2011", 11 pgs.

"European Application Serial No. 07841378.8, Office Action mailed Mar. 5, 2010", 1 pg.

"European Application Serial No. 07841378.8, Office Action mailed Apr. 15, 2009", 2 pgs.

"European Application Serial 07841378.8, Response filed May 6, 2010 to Office Action mailed Mar. 5, 2010", 15 pgs.

"European Application Serial No. 07841378.8, Response filed May 18, 2009 to Office Action Apr. 15, 2009", 6 pgs.

(56) References Cited

OTHER PUBLICATIONS

"European Application Serial No. 10746989.2, Extended European Search Report mailed Mar. 31, 2014", 11 pgs.

"U.S. Appl. No. 11/845,018, Examiner Interview Summary mailed Sep. 12, 2013", 3 pgs.

"U.S. Appl. No. 11/845,018, Final Office Action mailed Jun. 8, 2011", 35 pgs.

"U.S. Appl. No. 11/845,018, Non Final Office Action mailed Apr. 30, 2013", 23 pgs.

"U.S. Appl. No. 11/845,018, Non Final Office Action mailed Sep. 15, 2010", 22 pgs.

"U.S. Appl. No. 11/845,018, Response filed Mar. 15, 2011 to Non Final Office Action mailed Sep. 15, 2010", 18 pgs.

"U.S. Appl. No. 11/845,018, Response filed Dec. 8, 2011 to Final Office Action mailed Jun. 8, 2011", 11 pgs.

"U.S. Appl. No. 11/845,018, Response filed Sep. 26, 2013 to Non Final Office Action mailed Apr. 30, 2013", 15 pgs.

"U.S. Appl. No. 11/845,021, Non Final Office Action mailed May 27, 2011", 6 pgs.

"U.S. Appl. No. 11/845,026, Non Final Office Action mailed May 27, 2010", 16 pgs.

"U.S. Appl. No. 11/845,027, Non Final Office Action mailed Jul. 14, 2011", 11 pgs.

"U.S. Appl. No. 11/845,027, Notice of Allowance mailed May 2, 2012", 8 pgs.

"U.S. Appl. No. 11/845,027, Response filed Jan. 17, 2012 to Non Final Office Action mailed Jul. 14, 2011", 8 pgs.

"U.S. Appl. No. 11/953,756, Non Final Office Action mailed Jan. 8, 2010", 9 pgs.

"U.S. Appl. No. 11/953,756, Non Final Office Action mailed Sep. 14, 2009", 7 pgs.

"U.S. Appl. No. 11/953,756, Notice of Allowance mailed May 27, 2010", 6 pgs.

"U.S. Appl. No. 11/953,756, Response filed Mar. 29, 2010 to Non Final Office Action mailed Jan. 8, 2010", 16 pgs.

"U.S. Appl. No. 11/953,756, Response filed Nov. 16, 2009 to Non Final Office Action mailed Sep. 14, 2009", 18 pgs.

"U.S. Appl. No. 12/172,893, Non Final Office Action mailed Apr. 5, 2011", 17 pgs.

"U.S. Appl. No. 12/715,331, Non Final Office Action mailed Aug. 29, 2012", 6 pgs.

"U.S. Appl. No. 12/715,331, Notice of Allowance mailed Apr. 11, 2013", 10 pgs.

"U.S. Appl. No. 12/715,331, Response filed Aug. 13, 2012 to Restriction Requirement mailed Mar. 12, 2012", 15 pgs.

"U.S. Appl. No. 12/715,331, Response filed Dec. 21, 2012 to Non Final Office Action mailed Aug. 29, 2012", 21 pgs.

"U.S. Appl. No. 12/715,331, Restriction Requirement mailed Mar. 12, 2012", 7 pgs.

"U.S. Appl. No. 12/715,331, Supplemental Notice of Allowance mailed Apr. 23, 2013", 6 pgs.

"U.S. Appl. No. 12/857,448, Non Final Office Action mailed Mar. 21, 2011", 12 pgs.

"U.S. Appl. No. 12/857,448, Notice of Allowance mailed Oct. 17, 2011", 7 pgs.

"U.S. Appl. No. 12/857,448, Response filed Sep. 21, 2011 to Non Final Office Action mailed Mar. 21, 2011", 15 pgs.

"European Application Serial No. 07841378, Office Action mailed Jul. 22, 2009", 5 pgs.

"European Application Serial No. 10746989.2, Office Action mailed Oct. 27, 2011", 2 pgs.

"European Application Serial No. 10746989.2, Response filed May 3, 2012 to Office Action mailed Oct. 27, 2011", 17 pgs.

"International Application Serial No. PCT/U607/076827, International Preliminary Report on Patentability mailed Feb. 24, 2009", 12 pgs.

"International Application Serial No. PCT/US07/076827, International Search Report mailed Nov. 24, 2008", 6 pgs.

"International Application Serial No. PCT/US07/076827, Written Opinion mailed Nov. 24, 2008", 11 pgs.

"International Application Serial No. PCT/US08/067530, International Preliminary Report on Patentability mailed Dec. 22, 2009", 6 pgs.

"International Application Serial No. PCT/US08/067530, International Search Report mailed Jan. 22, 2009", 2 pgs.

"International Application Serial No. PCT/US08/067530, Written Opinion mailed Jan. 22, 2009", 4 pgs.

"international Application Serial No. PCT/US08/069993, International Preliminary Report on Patentability mailed Nov. 18, 2008", 9 pgs.

"International Application Serial No. PCT/US08/069993, International Search Report mailed Nov. 18, 2008", 1 pg.

"International Application Serial No. PCT/US08/069993, Written Opinion mailed Nov. 18, 2008", 8 pgs.

"International Application Serial No. PCT/US10/025817, International Search Report mailed Oct. 20, 2010", 4 pgs.

"International Application Serial No. PCT/US10/025817, Written Opinion mailed Oct. 20, 2010", 5 pgs.

"International Application Serial No. PCT/US2007/076826, International Search Report mailed Jan. 30, 2009", 8 pgs.

"New Zealand Application Serial No. 575356, Office Action mailed Aug. 18, 2010", 2 pgs.

* cited by examiner

Choose Option & GO:
- Add Widget
- Edit Widget
- Remove Widget
- GO
- BACK

FIG. 17A

Choose Category & GO:
- News
- Sports
- Media
- Weather
- Finance
- GO
- BACK

FIG. 17B

Choose Widget & GO:
- Widget 1
- Widget 2
- ...
- Widget N
- GO
- BACK

FIG. 17C

You have selected the "Name" widget:
"Widget description."
Continue?
- GO
- BACK

FIG. 17D

Configure Widget Now?
- GO

OR
Use Defaults for Widget.
- GO

Chumby Network Schema:

User:

| Field | Type | Null | Key | Default | Extra |  |
|---|---|---|---|---|---|---|
| id | char(36) | NO | PRI | NULL | | unique GUID for this user |
| parent_id | varchar(36) | YES | | NULL | | GUID of "parent" account |
| username | varchar(32) | NO | UNI | | | unique username of the user |
| password | varchar(32) | NO | | | | secret password for the user |
| account_type | varchar(20) | NO | | regular | | regular, employee, admin, etc |
| account_status | varchar(20) | NO | | normal | | normal, banned, etc |
| pin | varchar(10) | YES | | NULL | | security code used for secure transactions |
| created_at | datetime | YES | | NULL | | when the user record was created |
| updated_at | datetime | YES | | NULL | | when the user record was last modified |
| expires_at | datetime | YES | | NULL | | if subscription, when it expires |
| name_first | varchar(32) | YES | | NULL | | user's first name |
| name_last | varchar(32) | YES | | NULL | | user's surname |
| language_code | varchar(5) | NO | | en-US | | native language of the user |
| email | varchar(100) | YES | | NULL | | validated email address of the user |
| developer | tinyint(1) | YES | | 0 | | true if user has accepted the developer EULA |
| eula | tinyint(1) | YES | | 0 | | true if the user has accepted the terms of service |
| birthdate | date | YES | | NULL | | birth date of the user |
| opt_in | tinyint(1) | YES | | 0 | | whether the user has opted in to email |
| secret_question | varchar(255) | YES | | NULL | | question the user must answer to retrieve password |
| secret_answer | varchar(255) | YES | | NULL | | the answer to the question |
| address_guid | varchar(36) | YES | | NULL | | unique GUID for the user's address |
| street1 | varchar(32) | YES | | NULL | | user address street address, line 1 |
| street2 | varchar(32) | YES | | NULL | | user address street address, line 2 |
| city | varchar(32) | YES | | NULL | | user city |
| state | varchar(32) | YES | | NULL | | user state/province |
| country | varchar(32) | YES | | NULL | | user country |
| zip | varchar(32) | YES | | NULL | | user zip/postal code |
| phone | varchar(42) | YES | | NULL | | user phone number |
| unverified | varchar(255) | YES | | NULL | | code for email verification of the account |
| education_history | varchar(255) | YES | | NULL | | education level of the user |
| gender | varchar(36) | YES | | NULL | | gender of the user |
| access_id | varchar(10) | YES | | NULL | | alternative GUID for this account |
| buddy_acceptance | | YES | | NULL | | default acceptance of buddies |

FIG. 19A

Profile:

| Field | Type | Null | Key | Default | Extra | |
|---|---|---|---|---|---|---|
| id | char(36) | NO | PRI | | | unique GUID for the profile |
| user_id | varchar(36) | NO | MUL | | | GUID of the user that owns this profile |
| skin_id | varchar(36) | NO | MUL | | | GUID of the skin this profile uses |
| name | varchar(32) | NO | | | | name of the profile |
| access | varchar(10) | NO | | private | | private , protected (buddies), public |
| access_id | varchar(36) | YES | | NULL | | alternative GUID for this profile |
| email | varchar(100) | YES | | NULL | | email address for this profile |
| master | tinyint(1) | YES | | 0 | | true if the is the "Default" profile for the account |
| description | text | YES | | NULL | | a brief description of the profile |
| created_at | datetime | YES | | NULL | | when the profile was created |
| updated_at | datetime | YES | | NULL | | when the profile was last changed |

Chumby:

| Field | Type | Null | Key | Default | Extra | |
|---|---|---|---|---|---|---|
| id | char(36) | NO | PRI | | | unique GUID for this chumby |
| user_id | varchar(36) | NO | MUL | | | GUID of the user that owns this chumby |
| profile_id | varchar(36) | NO | MUL | | | GUID of the profile this chumby should display |
| name | varchar(32) | YES | | NULL | | the name of the this chumby |
| created_at | datetime | YES | | NULL | | when the chumby was registered |
| updated_at | datetime | YES | | NULL | | when the chumby was last changed |
| authorized_at | datetime | YES | | NULL | | when the chumby was last authorized |
| control_panel | varchar(200) | YES | | NULL | | the name of the Control Panel it should use |

FIG. 19B

Category:

| Field | Type | Null | Key | Default | Extra | |
|---|---|---|---|---|---|---|
| id | char(36) | NO | PRI | | | unique GUID for the category |
| name | varchar(32) | NO | UNI | | | name of the category |
| description | text | YES | | NULL | | description of the category |
| created_at | datetime | YES | | NULL | | when the category was created |
| updated_at | datetime | YES | | NULL | | when the category was last changed |
| slug | varchar(255) | YES | | NULL | | URL-friendly name of the category |

Skin:

| Field | Type | Null | Key | Default | Extra | |
|---|---|---|---|---|---|---|
| id | char(36) | NO | PRI | | | unique GUID of the skin |
| name | varchar(32) | NO | UNI | | | name of the skin |
| description | text | YES | | NULL | | description of the skin |
| created_at | datetime | YES | | NULL | | when the skin was created |
| updated_at | datetime | YES | | NULL | | when the skin was last changed |
| data | mediumblob | YES | | NULL | | the data encapsulating the skin |

FIG. 19C

Widget:

| Field | Type | Null | Key | Default | Extra | |
|---|---|---|---|---|---|---|
| id | char(36) | NO | PRI | | | unique GUID of this widget |
| category_id | varchar(36) | NO | MUL | | | GUID for the category for this widget |
| user_id | varchar(36) | NO | MUL | | | GUID for the author/owner of this widget |
| name | varchar(32) | NO | UNI | | | name of the widget |
| description | text | YES | | NULL | | description of the widget |
| version | varchar(32) | NO | | 1.0 | | version of the widget |
| protection | varchar(10) | NO | | none | | encryption used by this widget |
| access | varchar(10) | NO | | public | | private, protected (buddies), public |
| approval_status | varchar(32) | NO | | pending | | approval status of the widget for public use |
| fee_model | varchar(32) | NO | | free | | free, subscription, etc |
| fee_code | varchar(32) | YES | | none | | paramter for the fee (weekly, once, etc) |
| fee_price | varchar(32) | NO | | 0.00 | | the fee price |
| play_mode | varchar(12) | NO | | default | | default, timeout, cooperative |
| play_time | int(11) | NO | | 15 | | how long the widget should play if timeout |
| created_at | datetime | YES | | NULL | | when the widget was created |
| updated_at | datetime | YES | | NULL | | when the widget was lat changed |
| make_public | int(1) | NO | | 0 | | request by author to make widget public |
| average_rating | float | NO | | 0 | | cached rating of the widget |
| rating_count | int(11) | NO | | 0 | | how many ratings have been submitted |
| slug | varchar(255) | YES | | NULL | | URL-friendly name of the widget |
| sendable | tinyint(1) | YES | | 1 | | true if the widget be sent to another user |
| deleteable | tinyint(1) | YES | | 1 | | true if user can delete the widget from the profile |
| virtualable | tinyint(1) | YES | | 1 | | true if the widget supports virtual chumby |
| allowed_email | int(11) | YES | | 0 | | true if the widget is allowed to send email |
| request_email | int(11) | YES | | 0 | | true if the author requests email privileges |
| enabled | int(11) | YES | | 1 | | true if the widget is enabled |
| access_id | varchar(36) | YES | | NULL | | alternative GUID for the widget |

FIG. 19D

Widget Instance:

| Field | Type | Null | Key | Default | Extra | |
|---|---|---|---|---|---|---|
| id | char(36) | NO | PRI | | | the unique GUID of the widget instance |
| profile_id | varchar(36) | NO | MUL | | | the profile owning this widget instance |
| widget_id | varchar(36) | NO | MUL | | | the widget this widget instance uses |
| access | varchar(10) | NO | | private | | private, protected, public |
| created_at | datetime | YES | | NULL | | when the instance was created |
| updated_at | datetime | YES | | NULL | | when the instance was last changed |
| secure | varchar(255) | YES | | NULL | | a special "secure" parameter string |
| play_mode | varchar(12) | NO | | default | | default, timeout, cooperative |
| play_time | int(11) | NO | | 15 | | how long the widget should play |
| position | int(11) | YES | | NULL | | index of the instance within the profile |
| buddy_id | varchar(36) | YES | | NULL | | who sent the widget |
| accepted | tinyint(1) | YES | | 1 | | true if the widget was accepted by the receiver |
| forward | tinyint(1) | YES | | 1 | | true if the widget can be forwarded to another user |

Widget Parameter:

| Field | Type | Null | Key | Default | Extra | |
|---|---|---|---|---|---|---|
| id | char(36) | NO | PRI | | | unique GUID of the parameter |
| widget_instance_id | varchar(36) | NO | MUL | | | the GUID of the owning widget instance |
| name | varchar(32) | NO | | | | the name of the parameter |
| value | text | YES | | NULL | | the value of the parameter |
| created_at | datetime | YES | | NULL | | when the parameter was created |
| updated_at | datetime | YES | | NULL | | when the parameter was last changed |

FIG. 19E

Widget Rating:

| Field | Type | Null | Key | Default | Extra | |
|---|---|---|---|---|---|---|
| id | int(11) | NO | PRI | NULL | auto_increment | unique id for this rating |
| widget_id | varchar(36) | NO | MUL | | | the GUID of the widget being rated |
| user_id | varchar(36) | NO | MUL | | | the GUID of the user making the rating |
| rating | int(11) | NO | | 0 | | the value of the rating |
| version | varchar(32) | NO | | 1.0 | | the version of the widget being rated |
| created_at | datetime | YES | | NULL | | when the rating was created |
| updated_at | datetime | YES | | NULL | | when the rating was last changed |

Buddy:

| Field | Type | Null | Key | Default | Extra | |
|---|---|---|---|---|---|---|
| id | char(36) | NO | PRI | | | the unique GUID of the buddy record |
| profile_id | varchar(36) | NO | MUL | | | the GUID of profile for which this user is a buddy |
| user_id | varchar(36) | NO | MUL | | | the GUID of the buddy |
| acceptance | varchar(36) | NO | | ask | | how received widget instances shold be handled |
| created_at | datetime | YES | | NULL | | when this buddy record was created |
| updated_at | datetime | YES | | NULL | | when this buddy record was last modified |
| hide | tinyint(1) | YES | | 0 | | true to hide the relationship from the buddy |
| accepted | tinyint(1) | YES | | 1 | | true if the relationship has been accepted |

Chumby Authorization:

| Field | Type | Null | Key | Default | Extra | |
|---|---|---|---|---|---|---|
| id | int(11) | NO | PRI | NULL | auto_increment | unique id of this authorization |
| chumby_id | varchar(36) | NO | MUL | NULL | | GUID of the chumby that is authorizing |
| created_at | datetime | YES | | NULL | | when the chumby authorized |
| hw | varchar(50) | YES | | NULL | | version of the chumby hardware |
| sw | varchar(50) | YES | | NULL | | version of the chumby software |
| fw | varchar(50) | YES | | NULL | | version of the chumby firmware |

FIG. 19F

Movie:

| Field | Type | Null | Key | Default | Extra | |
|---|---|---|---|---|---|---|
| id | varchar(36) | NO | PRI | NULL | | GUID of the movie record |
| content_type | varchar(60) | YES | | NULL | | mimetype of the movie |
| name | varchar(200) | YES | | NULL | | the original filename of the movie |
| data | mediumblob | YES | | NULL | | the raw data |
| created_on | datetime | YES | | NULL | | when the record was created |
| updated_on | datetime | YES | | NULL | | when the record was last changed |
| widget_id | varchar(36) | YES | MUL | NULL | | the GUID of the widget this movie belongs to |
| flash_version | int(11) | YES | | NULL | | the version of Flash this movie uses |

Template (aka Configuration Movie):

| Field | Type | Null | Key | Default | Extra | |
|---|---|---|---|---|---|---|
| id | varchar(36) | NO | PRI | NULL | | GUID of the configuration movie record |
| content_type | varchar(60) | YES | | NULL | | mimetype of the movie |
| name | varchar(200) | YES | | NULL | | the original filename of the movie |
| data | mediumblob | YES | | NULL | | the raw data |
| created_on | datetime | YES | | NULL | | when the record was created |
| updated_on | datetime | YES | | NULL | | when the record was last changed |
| widget_id | varchar(36) | YES | MUL | NULL | | the GUID of the widget this template belongs to |
| flash_version | int(11) | YES | | 0 | | the version of Flash this movie uses |

Thumbnails:

| Field | Type | Null | Key | Default | Extra | |
|---|---|---|---|---|---|---|
| id | varchar(36) | NO | PRI | NULL | | GUID of the thumbnail record |
| content_type | varchar(60) | YES | | NULL | | mimetype of the thumbnail image |
| name | varchar(200) | YES | | NULL | | original filename of the thumbnail |
| data | mediumblob | YES | | NULL | | raw data |
| created_on | datetime | YES | | NULL | | when the record was created |
| updated_on | datetime | YES | | NULL | | when the record was last changed |
| widget_id | varchar(36) | YES | MUL | NULL | | the GUID of the widget this thumbnail belongs to |

FIG. 19G

Chumby Registration:

| Field | Type | Null | Key | Default | Extra | |
|---|---|---|---|---|---|---|
| id | int(11) | NO | PRI | NULL | auto_increment | the unique ID for this registration record |
| token | int(11) | YES | UNI | NULL | | the integer token for this registration |
| user_id | varchar(36) | YES | | NULL | | the user this chumby is trying to register to |
| chumby_id | varchar(36) | YES | | NULL | | the chumby being registered |
| created_at | datetime | YES | | NULL | | when the registration record was created |

FIG. 19H

Example Chumby Picture Frame Device

Mini dock front view

Rear view of radio dock

Front view showing dock action

*Example Control Bar Implementation*

- Buttons in control bar
  - Volume slider
  - Mute
  - Night mode
  - Help
- Philosophy
  - The music nav bar will contain access to all functions but we will typically not provide full interactive audio control on the control bar level at the top level.
  - Music menu will contain complete shuttle functionality and will be defined in the Music menu
- Help button will be on control bar
  - Help will be contextual with respect to where user is in menu tree
  - Help will be gray'ed out if there is no contextual help for a specific screen
  - Help will only be text in first release. There will be no interactive, guided capabilities when "help" is selected.

3900

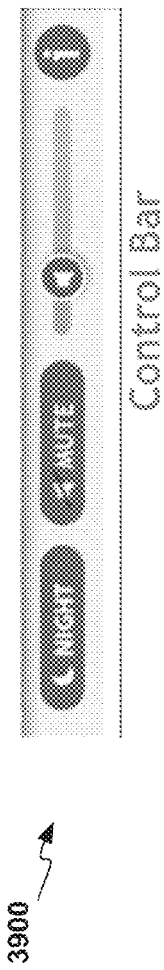

Control Bar

FIG. 39

*Example Photo Slideshow Effects Dialogue*

| Effect | Option | Notes |
|---|---|---|
| Transitions | Random | |
| | Horizontal Blinds | |
| | Vertical Blinds | |
| | Fade | |
| | Fly | Random across 8 quadrants |
| | Circle Iris | Random across 8 quadrants |
| | Square Iris | Random across 8 quadrants |
| | Dissolve | |
| | Rotate | Random clockwise, counterclockwise |
| | Squeeze | Random horizontal, vertical |
| | Wipe | Random across 8 quadrants |
| | zoom | |
| | pageflip | |
| | Zoomrotate | |
| Pan and Zoom | On/Off | Pan and zoom occurs after transition completes |
| interval | # sec, min, hrs | User enters number, toggle units |
| View | Single | |
| | Mosaic | Requested by Best Buy? |
| Clock overlay | On/Off | Turn clock overlay on/off |
| Play order | thumbnail order | |
| | time taken earliest first | |
| | time taken most recent first | |
| | sroted by title | |
| Scaling | Fit to screen | |
| | Crop to fill | |

6320

Effects:

- Play transitions — Random
- Play interval — 5 sec.
- Display View — Mosaic
- Clock Display — Clock On
- Play Order — Time Sorted
- Image format — Fit to Screen
- Pan and zoom — Enabled ( Apply )   ( Cancel )

*Example Photos Networked Device Browse Network View*

*Example Photos Networked Device UPnP TAGs (1) View*

*Example Photos Networked Device UPnP TAGs (2) View*

*Example Photos Networked Device Folders View*

*Example Photos Networked Device Favorite Thumbnail View*

*Example Photos Photobucket View*

*Example Photos Photobucket Search View Album*

Example Music Networked Device Browse Network View

*Example Music Networked Device Folders/Thumbnail View*

If music is playing when Night Mode is selected user will get a toggle that asks how long to wait to shut off music

*Example Sleep Dialogue*

SYSTEMS AND METHODS FOR WIDGET RENDERING AND SHARING ON A PERSONAL ELECTRONIC DEVICE

CROSS-REFERENCE TO RELATED APPLICATIONS

This application is a continuation of U.S. patent application Ser. No. 12/715,331, filed Mar. 1, 2010, which is related to and claims priority under 35 U.S.C. §119(e) to U.S. Provisional Patent Application Ser. No. 61/156,418, entitled SYSTEM AND METHOD FOR WIDGET SHARING AMONG NETWORKED ELECTRONIC DEVICES, filed on Feb. 27, 2009, to U.S. Provisional Patent Application Ser. No. 61/156,432, entitled SYSTEM AND METHOD FOR RENDERING CONTENT ON A NETWORKED ELECTRONIC DEVICE THROUGH EXECUTION OF USER-DEFINED WIDGETS, filed on Feb. 27, 2009, and to U.S. Provisional Patent Application Ser. No. 61/156,436, entitled NETWORKED ELECTRONIC DEVICE FOR EXECUTING USER-DEFINED WIDGET SEQUENCES, filed on Feb. 27, 2009. In addition, this application is a continuation-in-part of and claims priority to co-pending U.S. Utility patent application Ser. No. 11/845,018, entitled CONFIGURABLE PERSONAL AUDIOVISUAL DEVICE FOR USE IN NETWORKED APPLICATION SHARING SYSTEM, which claims priority under 35 U.S.C. §119(e) to U.S. Provisional Application Ser. No. 60/805,830, entitled CONFIGURABLE PERSONAL AUDIOVISUAL DEVICE FOR USE IN NETWORKED APPLICATION SHARING SYSTEM, to U.S. Provisional Application Ser. No. 60/823,491, entitled SYSTEM AND METHOD FOR TRANSFERRING ELECTRONIC CONTENT TO NETWORKED PERSONAL AUDIOVISUAL DEVICES, to U.S. Provisional Application Ser. No. 60/823,493, entitled NETWORKED PERSONAL AUDIOVISUAL DEVICE HAVING FLEXIBLE HOUSING, to U.S. Provisional Application Ser. No. 60/823,496, entitled SYSTEM AND METHOD FOR AUTOMATICALLY UPDATING THE SOFTWARE OF A NETWORKED PERSONAL AUDIOVISUAL DEVICE, to U.S. Provisional Application Ser. No. 60/945,900, entitled REGISTRATION SYSTEMS AND METHODS FOR PERSONALIZED PORTABLE DEVICES, and to U.S. Provisional Application Ser. No. 60/869,297, entitled SYSTEM AND METHODS FOR LOCATION, MOTION, AND CONTACT DETECTION AND TRACKING IN A NETWORKED AUDIOVISUAL DEVICE. The content of each of these applications is hereby incorporated by reference herein in its entirety for all purposes.

FIELD OF THE INVENTION

The present invention is directed generally to the field of personal electronic devices and downloadable applications for rendering and sharing thereon. More specifically, but not exclusively, the invention relates to systems and methods for selecting, downloading, rendering and sharing widgets on personal electronic devices such as digital photo frames.

BACKGROUND

It is well known that broadband Internet connectivity is becoming substantially more pervasive among consumers as a result of competition among service providers utilizing various different technologies, such as cable, digital subscriber line (DSL), wireless networks, and satellite. In many households personal computers (PCs) constitute the primary users of bandwidth furnished by these broadband connections. In order to facilitate sharing of the Internet connection among PCs in a given household, a variety of "wired" and "wireless" home networking technologies have been utilized.

As a result of the impracticality of installing Ethernet cable throughout a residence, RF-based wireless networking technology is becoming increasingly commonplace among consumers. Although systems based upon the 802.11b, or "Wi-Fi", wireless networking standard may currently be the most pervasive, versions of the 802.11 standard offering increased bandwidth have been introduced and yet higher-bandwidth approaches have been proposed. In addition, future wireless networks based on technologies such as Wi-Max, LTE and others will likely substantially increase available bandwidth.

Increased bandwidth available to the home has increased the usage of a number of different services, such as Internet-based delivery of digital audio, video and graphic content. However, since many of these services are facilitated by a desktop or notebook PC capable of communication over a broadband Internet connection, users are forced to remain physically close to their respective computers in order to utilize these services. Although other strategies to leverage the availability of broadband Internet connectivity within the home are currently being developed, many of these approaches involve creation of a relatively powerful, costly centralized communications "hub" (e.g., a PC with enhanced media capabilities, or a multi-purpose cable set-top box). Unfortunately, this typically requires either the purchase of an expensive hardware device or extended subscription plan, and constrains the extent to which Internet-enabled entertainment or other services are enjoyed outside of the immediate vicinity of the centralized hub device.

Accordingly, there is a need in the art for new technologies for delivering content to user devices such as personal electronic devices.

SUMMARY

The present invention is directed generally towards systems and methods for providing, sharing, sending, receiving and playing widgets in a personal electronics device. I one exemplary embodiment, a digital photo frame and associated service provider system may be provided to allow a user to render digital content in conjunction with one or more widgets, as well as send digital content, in conjunction with widgets, to other associated users of the system.

Various additional aspects of the present invention are further described below in conjunction with the appended drawings.

BRIEF DESCRIPTION OF THE DRAWINGS

For a better understanding of the nature of the features of the invention, reference should be made to the following detailed description taken in conjunction with the accompanying drawings, in which:

FIGS. 17A-17E are screen shots of exemplary user interfaces presented by a Web browser used to facilitate certain of the processes described by FIGS. 22-25.

FIGS. 19A-19H provide a more comprehensive tabular representation of an exemplary object-oriented database schema capable of being utilized by the system database.

FIG. 39 illustrates and describes the functionality of an exemplary control bar displayed through the touch-sensitive user interface screen of a ChumbyFrame™ device.

FIG. 63 depicts a screen shot and accompanying description of an exemplary photo slide show effects dialog box which is capable of being rendered through the touch-sensitive screen of a ChumbyFrame™ device.

DETAILED DESCRIPTION OF EMBODIMENTS

Figure 1:
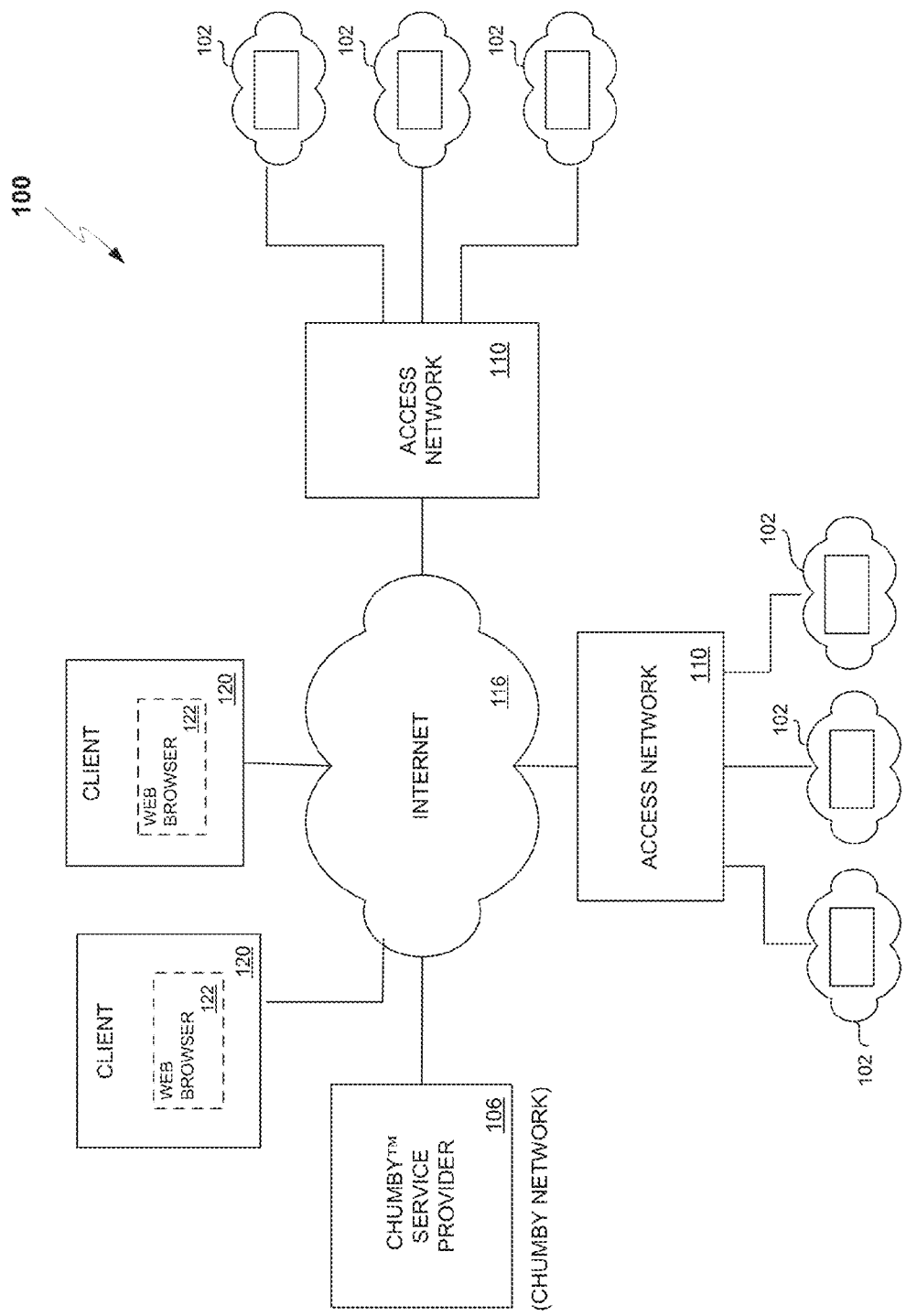
FIG. 1 is a block diagram illustrating a set of networked components comprising an embodiment of a system consistent with the invention.

Overview of System of Personalized CHUMBY™ Devices

Certain of the above-referenced copending applications describe a system comprised of a set of personalized audiovisual devices in Internet-based communication with a service provider. Such personalized audiovisual devices are commercially distributed under the trademark CHUMBY™, and may also be referred to herein as "CHUMBY™ devices". During communication with the service provider, each CHUMBY™ device periodically receives a set of application programs, or "widgets", which are sequentially executed by the CHUMBY™ device after being received from the service provider or locally from a personal computer (e.g., via a USB connection). Since each CHUMBY™ device is typically Internet-enabled, each may also be remotely configured and otherwise personalized via the CHUMBY™ service provider through a Web browser executed by a remote terminal (e.g., a PC or wireless handset). Such personalization may include, for example, specifying the set of widgets provided to a given CHUMBY™ device as well as their sequence and priority of execution.

As is described hereinafter, users may configure a CHUMBY™ device via an interface provided by the CHUMBY™ service provider may "drag and drop" icons representative of various widgets onto a rectangular or other portion of the interface representative of the screen of the CHUMBY™ device being configured. Alternatively, a user may select textual and/or graphical representations of widgets and select a button or other graphical representation of a user interface (UI) control to "add" the widget to the CHUMBY™ device being configured. In these ways the "layout" of the screen of the CHUMBY™ device may be remotely configured by the owner of the device. Although each CHUMBY™ device will preferably be capable of being configured in this manner, in certain embodiments each may also come "loaded" with a default set of widgets (e.g., an "alarm clock" widget) disposed to be executed by the CHUMBY™ device upon its registration with the CHUMBY™ service provider. Once a CHUMBY™ device has been configured (i.e., with either a "default" or user-specified configuration), it may execute the widgets defined by the configuration without user intervention. Alternatively, users may opt to "stay" on a given widget by explicitly instantiating the system interface on the device and selecting a "stay" UI control. If a user has explicitly selected a widget to "stay", the sequential execution of widgets can be continued by terminating the "stay" command via the system interface. If a user interacts with a widget which presents user interface controls to the user through one of a number of alternative input methods, such as via a touchscreen or accelerometer, the currently active widget will continue to execute on the device until some timeout period expires following the cessation of user interaction with the widget.

The configuration of a CHUMBY™ device may also specify the events or conditions under which the sequence of execution of widgets is to be altered or interrupted, and allows certain widgets to be accorded the highest available priority with respect to execution. For example, an "alarm clock" widget could be granted such priority in order to ensure that its alarm function would not be prevented from being actuated at the scheduled time due to contemporaneous execution of another widget. In one embodiment the Web interface provided by the CHUMBY™ service provider is in the form of a "timeline" enabling the sequence of execution of the widgets associated with a given CHUMBY™ device to be controlled in an intuitive manner. In an exemplary implementation the timeline defines the order in which the widgets are to be played in a constantly repeating sequence; that is, the timeline is representative of the complete set of widgets played by a given CHUMBY™ device as well as their relative order and duration of execution. However, certain widgets (e.g., the "alarm clock" widget) can be specified to be actuated at a given time by appropriately setting the applicable configuration element of such widgets.

Although in exemplary embodiments it is not contemplated that more than a single "content-related" widget be operative at any given time, a system configuration widget may be utilized to run concurrently with each such content-related widget in order to, for example, control the relative priority of execution of such content-related widgets and system settings such as loudness, brightness, navigation, and the like.

In one embodiment CHUMBY™ devices are each capable of wireless communication in accordance with an accepted wireless networking standard, such as the 802.11b or 802.11g standard. Accordingly, in homes or other environments containing one or more wireless access points, multiple CHUMBY™ devices may be distributed throughout the coverage area of the access points. Alternatively, a CHUMBY™ device may use a wired connection as a backup to, or in lieu of, a wireless connection to the extent convenient or necessary.

The interface presented by each CHUMBY™ device may be changed in accordance with the nature of the widget currently being executed by the device. For example, a "clock radio" widget could be employed to produce audio and visual imagery consistent with a conventional alarm clock at an appointed time in the morning. In exemplary embodiments the clock radio widget would allow for the selection of a standard "wake up" chime or choice of several different audio programs. Later in the day the device interface could be devoted to a rotating selection of several standard information screens such as news headlines, local weather, sports scores, stock market updates, horoscope and the like.

Users of CHUMBY™ devices may also optionally participate in a "CHUMBY™ Network" along with other users by logging on to a Web site (e.g., www.chumby.com) hosted by the CHUMBY™ service provider. At this site (also referred to hereinafter as the "CHUMBY™ site") a user will be able to register with the CHUMBY™ Network and access services enabling the basic capabilities of the user's CHUMBY™ device. Basic capabilities may comprise, for example, the opportunity to send/receive widgets and other content to/from other CHUMBY™ users, for improved personalization of the device's generic information features, more detailed alarm-setting capabilities, and better selection and configuration of audio capabilities.

Registration with the CHUMBY™ Network may enable members of the Network to access a wide array of widgets. It is contemplated that certain of such widgets would be developed by the entity operating the CHUMBY™ Network while other widgets would be developed by independent developers. In addition, members of the "CHUMBY™ Network would also be able to communicate with the CHUMBY™ devices of other members, provided that permission for such communication has been authorized by the other members. Such communication could entail, for example, the sending of a widget and corresponding data from the CHUMBY™ service provider to a member of the CHUMBY™ Network (the "receiving member") in response to a request sent to the CHUMBY™ service provider by another member (the "sending member"). For example, a sending member could, after receiving permission from a receiving member, request the CHUMBY™ service provider to send a "photo-viewer" widget to the receiving member. In addition, the sending member could specify that a link be established between the photo-viewer widget and pictures uploaded by the sending member to the CHUMBY™ service provider. In this way the receiving member could, without any effort other than providing authorization to the sending member, enable their CHUMBY™ device to essentially automatically receive and display a sequence of photos provided by the sending member. Similarly, while traveling a sending member could send a personalized "wake up" message to the CHUMBY™ device of a consenting receiving member. Finally, a sending member could send widgets to a group of receiving members included on a "buddy list" of the sending member, which could be established after the receipt of suitable permissions from those proposed to be included on the list.

In an exemplary embodiment members of the CHUMBY™ Network are enabled to completely configure, through any Web browser, their respective CHUMBY™ devices by specifying a set of "premium" widget programs or content to play or be shown rotationally (or in some other user-defined sequence) on their respective CHUMBY™ devices. Such premium widgets and content may include, for example, webcam shots, RSS readers, filtered news reports, personalized stock performance data, short animations or movies, podcasts or audio files to function as the audio sources for alarms or reminders scheduled to be triggered at different times throughout the day.

It is noted that the word "exemplary" is used herein to mean "serving as an example, instance, or illustration." Any embodiment described herein as "exemplary" is not necessarily to be construed as preferred or advantageous over other embodiments.

Example System Components

FIG. 1 is a block diagram illustrating a set of networked components comprising an embodiment of the system 100 of the invention. As shown, the system 100 comprises one or more CHUMBY™ personal audiovisual devices 102 in communication with a central service provider 106 via one or more access networks 110 and the Internet 116. These personal audiovisual devices may also be referred to herein for brevity as a personal device, personal electronic device, or CHUMBY™ device. As those skilled in the art will appreciate, the access networks 110 are representative of various intermediary network routing and other elements between the Internet 116 and the CHUMBY™ personal audiovisual devices 102. Such intermediary elements may include, for example, gateways or other server devices, and other network infrastructure provided by Internet service providers (ISPs). As is discussed below, the CHUMBY™ personal audiovisual devices 102 obtain application programs ("widgets") for execution from the central service provider 106 or locally from a mass storage device, personal computer or other computing device. The central service provider 106 may also be referred to herein as a widget server, content and widget provision system, provision system or by other readily identifiable terminology. In this regard the service provider 106 typically contains a repository of widgets and has access to other content capable of being communicated to a given CHUMBY™ device 102 upon the request of its authorized user or another user to which appropriate permission has been granted.

Referring again to FIG. 1, the system 100 also includes a plurality of user computers 120 disposed for communication with the service provider 106 via an access network (not shown) and the Internet 116. Each user computer 120 executes a Web browser 122 capable of displaying Web pages generated by the service provider 106 through which a user may configure one or more CHUMBY™ personal audiovisual devices 102. As mentioned above, such configuration may include, for example, specifying a set of widgets to be sent to a particular device 102 and their sequence of execution, adjusting audio or visual parameters relating to such execution, defining and managing a user's CHUMBY™ network (including, for example, defining a "buddy list" comprised of other CHUMBY™ users with respect to which the device 102 is permitted to communicate), and defining the layout or other aspects of the user interface presented through the screen of the device 102. To this end a given Web browser 122 may, when in communication with the service provider 106, present a rectangular configuration window which displays the widgets currently configured to "play" within the named "channel". By "dragging and dropping" iconic representations of widgets or content files into such a configuration window, a user may personalize the behavior and user interface presented by the corresponding CHUMBY™ device 102. Alternatively, a user may select textual and/or graphical representations of widgets and select a button or other graphical representation of a user interface control to "add" the widget to the CHUMBY™ device being configured. Moreover, users may access the service provider 106 via a Web browser 122 for the purpose of sending widgets or other information to other users for execution or display by their respective CHUMBY™ devices 102. In one embodiment the service provider 106 maintains a record of the permissions granted among users of CHUMBY™ devices in order to determine which users are authorized to provide, via the service provider 106, a given user with widgets, messages or other information, and vice-versa. Such permissions may be granted or withdrawn by a given user via appropriate pages presented by a Web browser 122 in communication with the service provider 106.

In the exemplary embodiment a configuration window may be utilized to configure one or more CHUMBY™ devices 102 consistent with the permissions granted by the users of such devices 102. In addition, a user of a given CHUMBY™ device 102 may elect to have the interface of the device 102 "mirror" or otherwise replicate that of another device 102 subject to the requisite permissions being granted. Similarly, one or more CHUMBY™ devices 102 may be configured to mirror the interface for a "virtual" CHUMBY™ device (or vice-versa) defined via a configuration window.

Different users of a given CHUMBY™ device 102 may be accorded different roles or privileges in configuring the device 102. For example, user-granted supervisory privileges could be given the authority to filter or monitor the widgets or content sent to the CHUMBY™ device 102. This would enable, for example, parents to manage and/or monitor the widgets and content executed and displayed by the one or more CHUMBY™ devices 102 used by their children. Moreover, administrators of the system 100 would typically possess an elevated level of privilege relative to users of CHUMBY™ devices 102 within the system 100. Also, if a specific widget performs functions requiring communication with a web site controlled by a third party in order to access content, the developer of the widget may create a hierarchical user model to regulate such access (and perhaps the functions of the widget).

Figure 2:
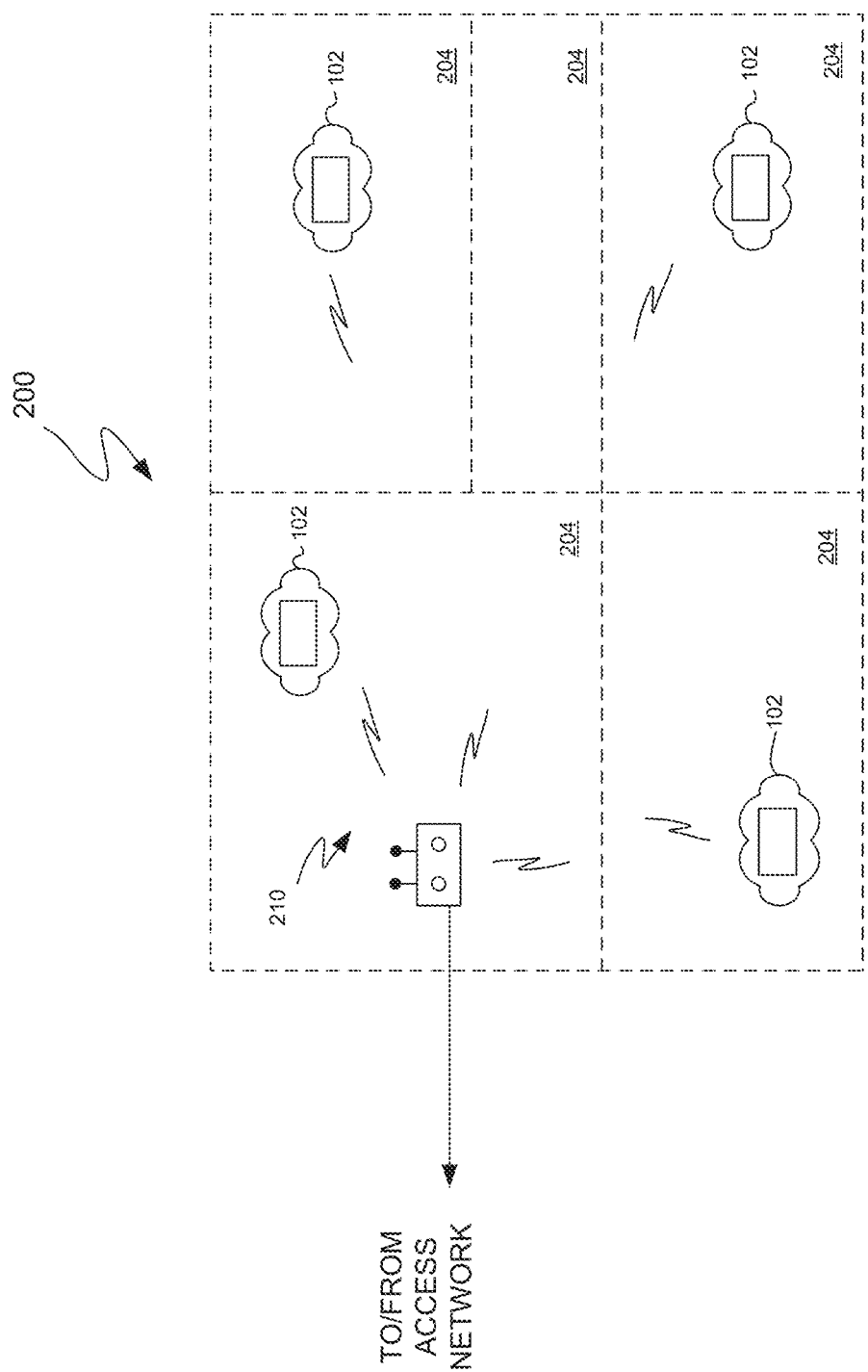
FIG. 2 illustrates an exemplary distribution of CHUMBY™ personal electronic devices throughout a residence or other building having a number of rooms or areas.

Attention is now directed to FIG. 2, which illustrates an exemplary distribution of CHUMBY™ devices 102 throughout a residence 200 or other building having a number of rooms 204. In the embodiment of FIG. 2, each CHUMBY™ device 102 is equipped with wireless transceiver (e.g., a Wi-Fi transceiver) to facilitate communication with one or more access points 210. Each access point is interconnected with an access network 110 by way of, for example, a local area network, thereby enabling Internet-based communication to be established between the service provider 106 and the devices within the residence 200.

Figure 3:
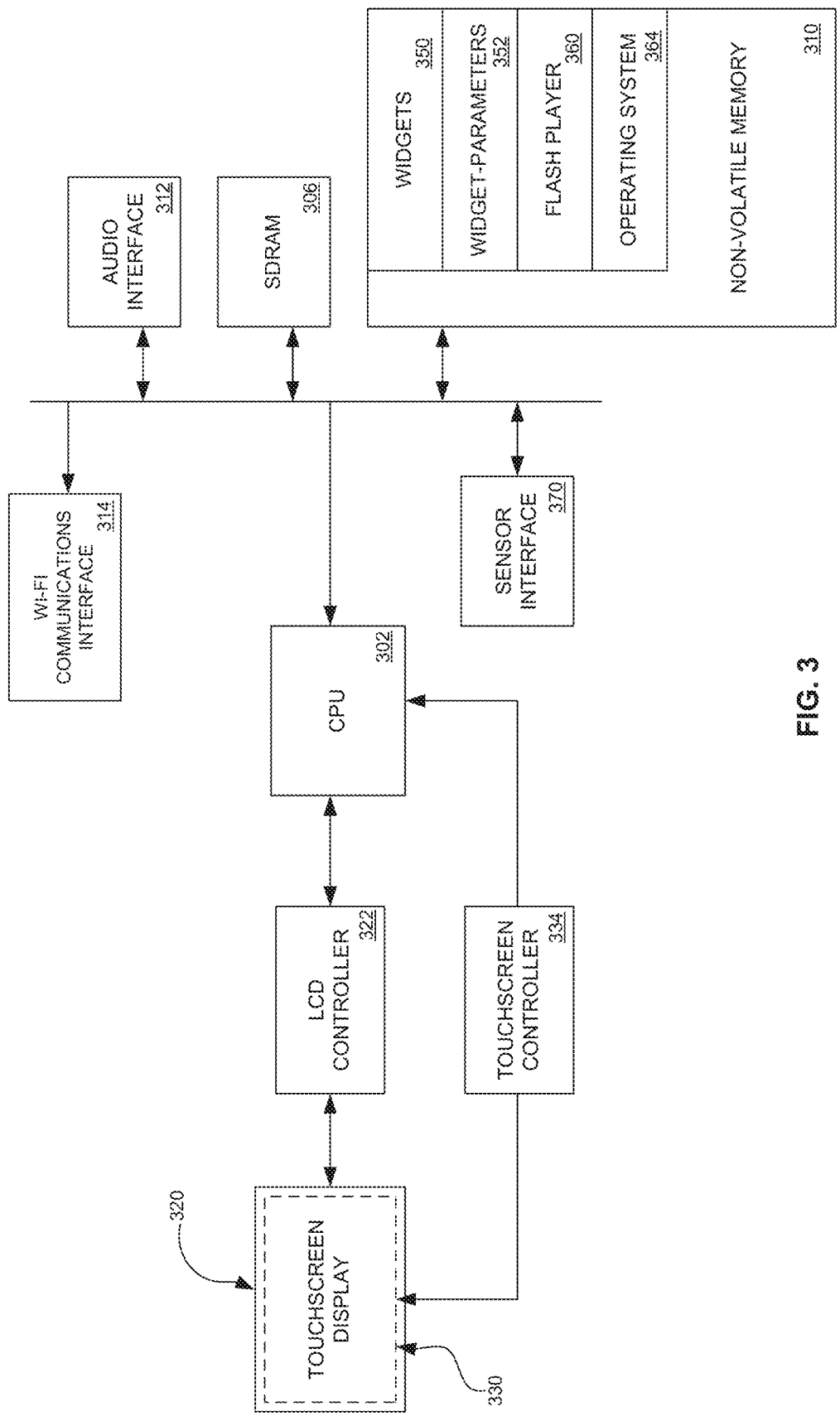
FIG. 3 provides a block diagrammatic representation of the principal components of an embodiment of a CHUMBY™ personal electronic device.

Turning now to FIG. 3, a block diagrammatic representation is provided of the principal components of an embodiment of a CHUMBY™ device of the present invention. As shown, the device includes a central processing unit (CPU) 302, memory including volatile (e.g., SDRAM) 306 and non-volatile memory 310 (e.g., flash memory), an audio interface 312, a wireless communications interface 314, and a sensor interface 370. In an exemplary implementation the CPU 302 comprises a microprocessor (e.g., based upon an ARM core) configured to run a Linux kernel and having attendant capabilities for graphics rendering. The device may or may not include a battery backup unit, which serves to preserve real-time information in the event of a power outage, and may also serve as a primary power source if the user desires untethered operation. The battery may or may not be rechargeable. The operating system is made aware of the power status and actively configures the CHUMBY™ device and the running widget to either save power or modify the user interface consistent with untethered operation.

The device may or may not include a Security Module (not shown) If included, the Security Module serves to store secrets and compute authentication algorithms in a fashion that fully isolates core security routines from otherwise unsecured code running on CPU 302. The secret storage and authentication capability may or may not be used by the client-server communication protocol to enable authenticated and encrypted communication capabilities for, among other things, financial transactions. The Security Module is initialized in such a way that there is no default mapping of the secrets contained within the module versus the identity of the hardware of the user. Furthermore, the secrets are revocable and a routine may exist for generating new secrets based upon a master secret that is never associated with a specific user's profile. This enables opt-in policies for privacy and a limited ability to revoke identity information, barring forensic network analysis, thereby enabling anonymity as well. The anonymous trust network can be extended with a variety of client-server protocols to enable a wide range of anonymous transactions, including but not limited to cash and content transactions.

As shown, software comprising widgets 350 or other applications received from the service provider 106 are stored in memory 310 and loaded into SDRAM 306 or non-volatile memory 310 for execution by the CPU 302. In one embodiment widgets are downloaded from the service provider 106 to CHUMBY™ devices in the format of a "Adobe Flash" file, also referred to as a "Flash movie". As is known by those skilled in the art, Flash movies are usually accorded a ".swf" file extension and may be played by a Flash Player developed and distributed by Adobe Systems. Accordingly, the memory 310 also includes a Flash Player 360 as well as a copy of the operating system 364 executed by the CPU 302. In other embodiments widgets may be developed in accordance with other formats and played by players compatible with such other formats.

In the exemplary embodiment widgets are not "permanently" stored in memory 310 of CHUMBY™ devices. Rather, widgets are executed by the CPU and then either discarded or cached in temporary memory for future use. This enables widgets to be "pushed" from the service provider 106 as necessary to support the sequence of widget execution specified for each CHUMBY™ device. That is, the service provider 106 may operate to provide a "stream" of widgets to each CHUMBY™ device, where the widgets within each such stream are temporarily cached within the memory of the applicable CHUMBY™ device until their execution. This enables the service provider 106 and/or the creator of each widget program to maintain a degree of control over the content and behavior of each widget program, since each such program is typically not permanently downloaded (thereby facilitating modification) but is rather temporarily cached and erased after some predetermined time has passed or a memory use threshold has been reached.

The CHUMBY™ device also includes a liquid crystal display (LCD) 320 controlled by an LCD controller 322, which may or may not be integrated into the CPU 302. The display 320 visually renders iconic representations of the widget programs stored within the CHUMBY™ device and images generated in connection with the execution of such widgets by the CPU 302. In an exemplary implementation a touchscreen 330 overlays the LCD 320 and is responsive to a touchscreen controller 334. In one embodiment a user may induce the CHUMBY™ device to enter a "control panel mode" by touching the a sensor such as the squeeze sensor (not shown in FIG. 3), touchscreen 330 or other sensor device. In an exemplary embodiment, widgets and the system control panel may present the user with different "user interface", or "UI", elements to enable the user to interact with the widget/system control panel. These UI elements may include, but are not limited to, buttons, scroll bars, drop down combo boxes and menus. When a user touches the screen to interact with one of these UI elements, the touchscreen controller 334 informs the CPU 302 that the touchscreen has been touched at a specific location and that location is converted by the CPU 302 to a UI control actuation event based on the configuration of the currently displayed widget 350 or system control panel screen (not shown in FIG. 3). In alternate implementations the LCD 320 and touchscreen 330 may comprise an integral device controlled by an integrated controller.

Figure 4:
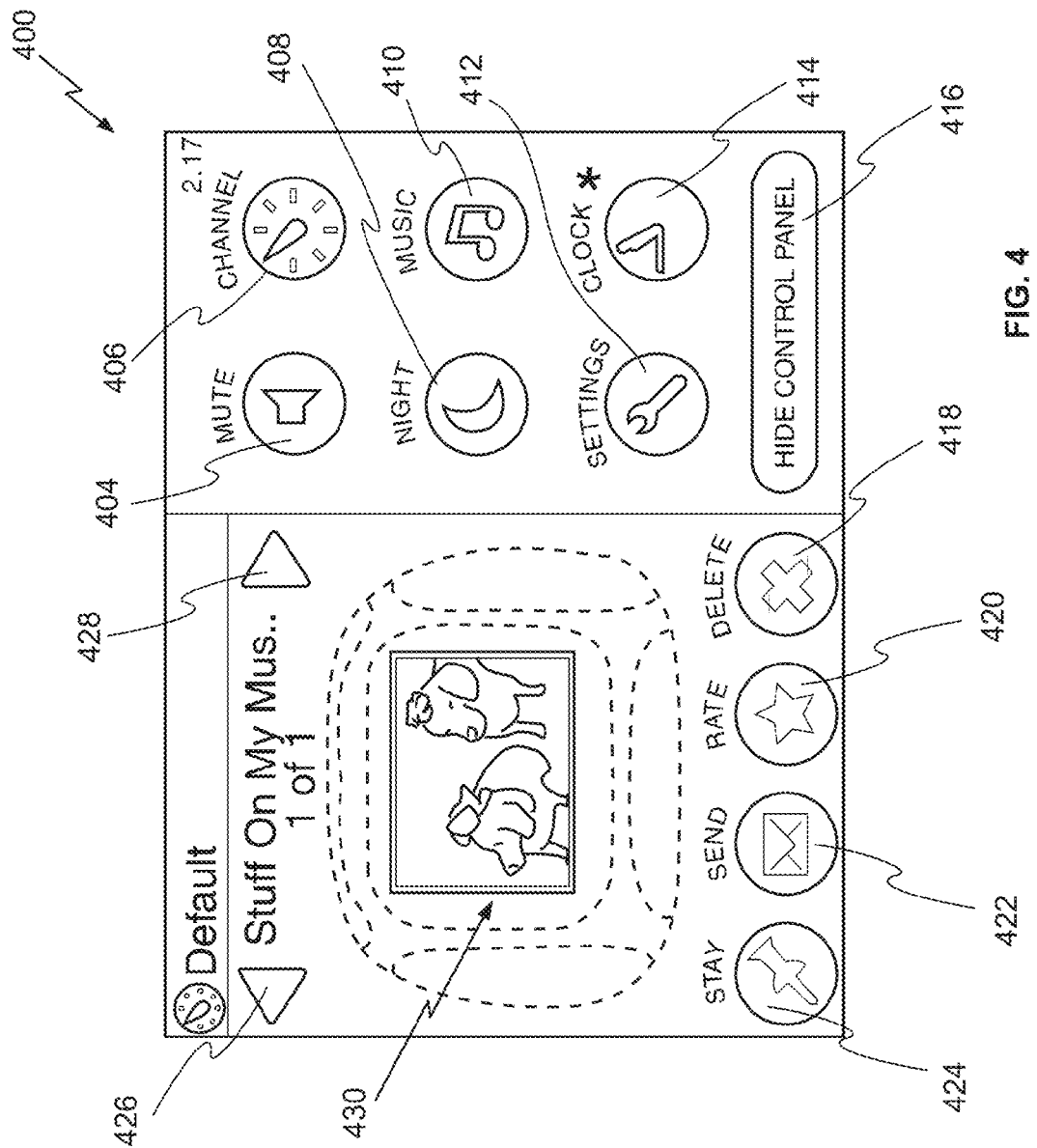
FIG. 4 shows an exemplary user interface generated through a screen of a CHUMBY™ device during operation of the CHUMBY™ device in a control panel mode.

Turning to FIG. 4, there is shown an exemplary user interface 400 generated by the LCD 320 during operation of the CHUMBY™ device in control panel mode. As shown, the interface 400 defines an mute button 404, a channel button 406, a night button 408, a music button 410, a settings button 412, a clock button 414, a delete button 418, a rate button 420, a send button 422, a stay button 424, a right arrow button 428, a left arrow button 426, and a hide control panel mode button 416. Selection of the mute button 404 toggles the mute state of the CHUMBY™ device. Selection of the channel button 406 instantiates another control panel screen which enables users to view the content of all of their CHUMBY™ "channels" and/or select a new "channel" to be loaded and run on the CHUMBY™ device. A "channel" is a collection of widgets configured by a user in a named grouping via an interaction between a page rendered on a web browser 122 and the CHUMBY™ service provider, such collection of widgets generally running on the CHUMBY™ device in a sequential, repetitive fashion.

Selection of the night button 408 places the CHUMBY™ device into a "night mode" in which the screen is dimmed and a low intensity clock is displayed. Selection of the music button 410 instantiates another control panel screen which enables the user to interact with and control various continuous music sources, such as, for example, MP3 players, storage devices, and music services. Such sources may reside on either the local network or on the Internet. Selection of the settings button 412 instantiates another control panel screen which enables the user to configure various CHUMBY™ device settings, such as, for example, wireless network setup, speaker volume and touchscreen calibration. Selection of the clock button 414 instantiates another control panel screen which enables the user to configure the time, date and alarm functions of CHUMBY™ device. Selection of the delete button 418 deletes the currently displayed widget to be deleted, with user confirmation, from the current "channel". Selection of the rate button 420 instantiates another control panel screen which enables the user to provide a rating on a fixed scale for the currently displayed widget. Selection of the send button icon 422 instantiates another control panel screen which displays a personalized list of other users of CHUMBY™ users to which it may be desired to send widgets or otherwise communicate. Selection of the stay button 424 toggles the "stay" state of the currently selected widget. When the "stay" state of a widget is selected, the widget plays continuously on the CHUMBY™ device. Selection of the right arrow button 426 or left arrow button 428 causes the CHUMBY™ device to display the previous or next widget in the channel, respectively. A user may, from any Web browser 122, access a Web page generated by the service provider 106 and designate a "favorite" widget. Alternatively, a user may press a virtual, touchscreen-based button on his or her CHUMBY™ device 102 to designate the current widget as the new "favorite" widget. When the user then selects the heart-shaped icon (not shown in FIG. 4) on his or her CHUMBY™ device, an iconic representation of this favorite widget (e.g., a clock widget) replaces the heart-shaped icon and enables the user to immediately activate (i.e., cause the CPU 302 to execute) the program instructions corresponding to such favorite widget. Alternatively, selection of the heart-shaped icon (or other predefined icon) results in the CHUMBY™ device becoming configured in accordance with a "favorite" or other profile rather than executing a favorite widget. Of course, certain profiles may be specified to include only a single widget such as, for example, an "alarm clock" or "photo viewer widget.

Referring again to FIG. 4, selection of the right arrow button 426 advances one widget in a user-defined (or default) widget sequence ("channel"), or just skips ahead in implementations in which widgets are chosen to be displayed randomly. Similarly, selection of the left arrow button 428 results in "going back" one widget in the user-defined (or default) widget sequence ("channel"). As the buttons 426 and 428 are selected, an iconic representation or avatar corresponding to the currently active widget is displayed in a display box 430. If it is desired to return to the currently active widget, the hide control panel mode button 416 is selected and the control panel mode interface 400 changes to a screen through which the user views the sequence of widgets currently configured to be executing on the CHUMBY™ device.

In certain embodiments a physical button element (not shown) may be provided proximate the LCD screen 320 to enable navigation through menus and the like presented by the LCD screen 320. In one implementation this button element is cross-shaped in order to facilitate two-dimensional navigation, and may further include a smaller, dedicated button (e.g., in the center of the cross) associated with a specific widget (e.g., clock widget). Pressing this dedicated widget would interrupt the operation of all other widgets.

In implementations in which two-dimensional navigation through the user interface of the CHUMBY™ device is supported, users may be provided with the ability to navigate forward and back in the configured widget timeline. Similarly, users may navigate up and down a stack of related widgets. This function depends on the implementation of the concept of widget categories—i.e., associating widgets into logical categories that can be displayed sequentially, if configured to be displayed. An example of a category could be "News". Widgets included within this category could include, for example, a local news widget, a sports news widget, an entertainment news widget, a business news widget, and the like. For each category, there would be a default widget, which is designated by the user on the CHUMBY™ web site for each category selected to be displayed by the user's CHUMBY™ device.

If more than one widget in a category is selected, then the widgets are conceptually "stacked" with the default widget being:

- on the top of the stack; and
- the widget that is displayed as the CHUMBY™ device automatically cycles through configured widgets.

If a widget for a given category (e.g., "News") is displayed and there exist additional widgets in the category which are also configured for display, then in the exemplary embodiment these additional widgets are "stacked" below the displayed widget. In this case the user may take some predefined action with respect to the user's CHUMBY™ device (e.g., perhaps selecting a control on the touchscreen or accessing a function via the control panel, which is instantiated via actuating the squeeze sensor) in order to cause the next widget in the "stack" for that category to be displayed. The CHUMBY™ device may be configured such that taking further predefined actions of the same type will cause the widgets either above or below in the stack to be displayed, as designated by the user. The last widget that is displayed in the stack for the applicable category when the CHUMBY™ device cycles to the next widget category will be the widget displayed in the next cycle for the just exited category (e.g, News).

The tabular illustration below provides a conceptual layout of exemplary widget stacks in various categories:

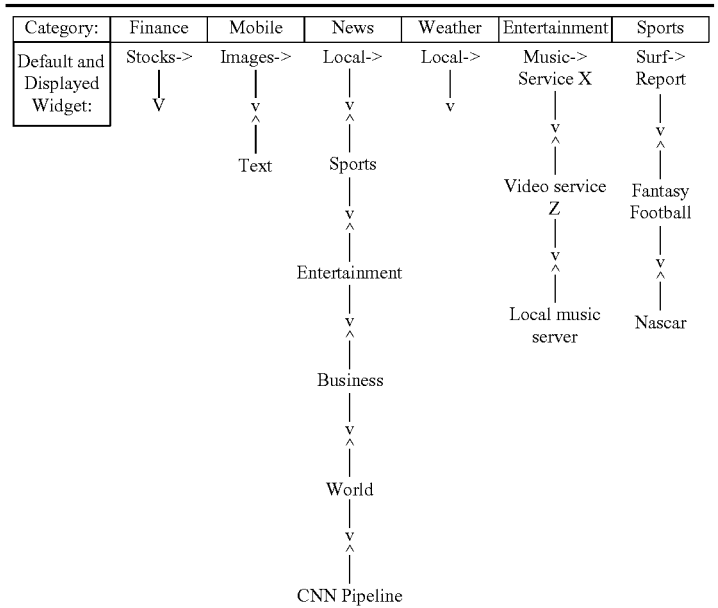

The following provides a conceptual representation of the case in which the user has navigated into widget stacks for News, Entertainment and Sports:

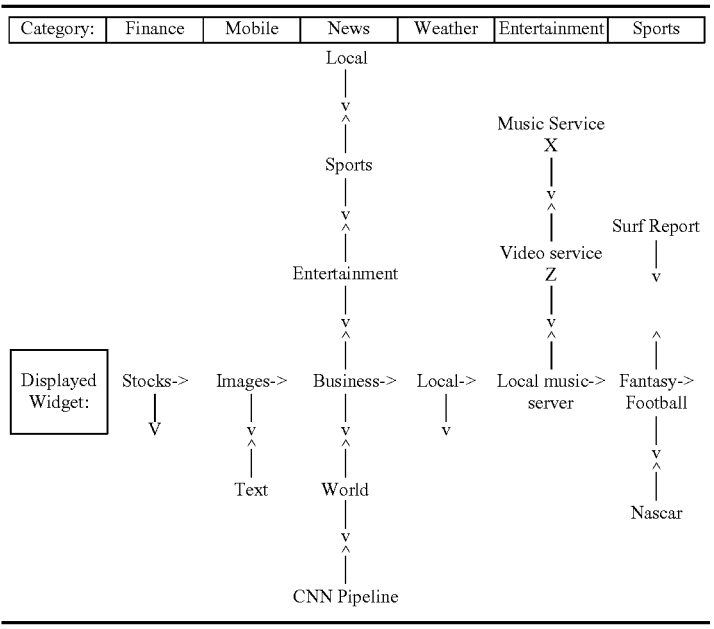

Example CHUMBY™ Service Provider

Figure 5:
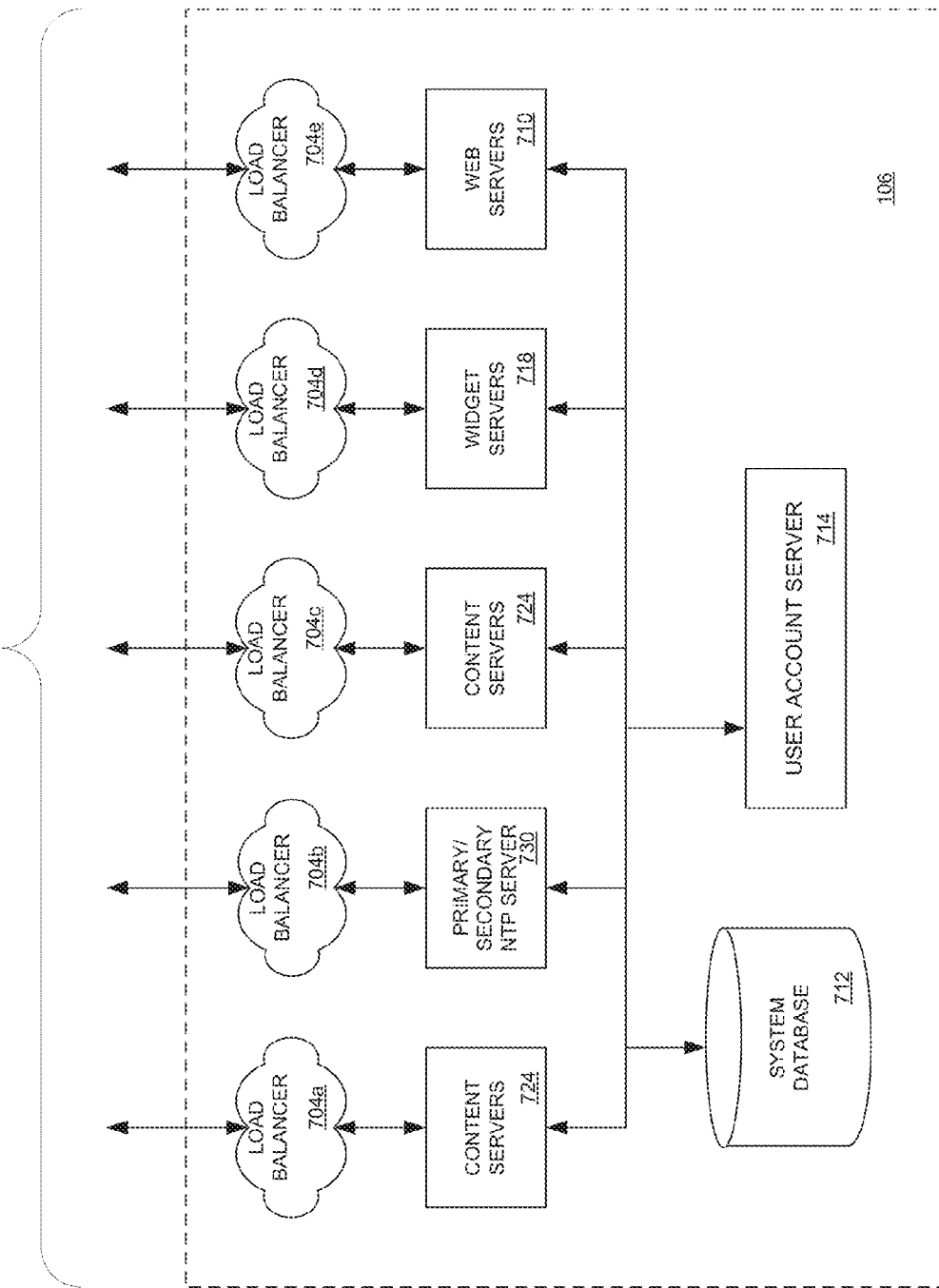
FIG. 5 provides a block diagrammatic representation of server components and other infrastructure which may be utilized to facilitate the operations of a CHUMBY™ service provider for provision of content in conjunction with a personal electronic device.

Referring now to FIG. 5, a block diagrammatic representation is provided of the server components and other infrastructure which may be utilized to facilitate the operations of the CHUMBY™ service provider 106. It is understood that the representation of FIG. 5 is functional in nature, and single or multiple computers may be adapted to execute software designed to perform one or more than one of the functions described below. For example, the functionality provided by the load balancers 704 may be provided by a single load balancing device or multiple load balancing devices. Similarly, each of the servers represented in FIG. 5 may be realized using either a single server computer or using a cluster comprised of primary, secondary and backup server computers interconnected in configurations familiar to those skilled in the art.

As shown in FIG. 5, one or more Web servers 710 are used to define the Web interface presented by the CHUMBY™ service provider 106 to users or other interested parties. A system database 712 may include, among other things, CHUMBY™ user account information, CHUMBY™ device configuration information, CHUMBY™ widget configuration and instance information, marketing materials, press information, and contact information relating to the CHUMBY™ service that is served by the Web servers 710. Also included may be information relating to registration and first-level support.

A user account server 714 maintains user account data in the system database 712 and provides authentication services to the other servers depicted in FIG. 5.

One or more widget servers 718 are used to serve widgets to CHUMBY™ devices 102. Each widget server 718 will typically be sufficiently powerful to encrypt and sign widgets on demand. In addition, each server 718 will be configured to "store-and-forward" widgets being sent from one user to another.

The service provider 106 may also utilize a number of content servers 724 to provide information (e.g., new, weather, stock market information) to CHUMBY™ devices 102. In an exemplary embodiment all content servers function in a "pull" mode of operation; that is, CHUMBY™ device 102 polls the applicable content server 724 for new data on some periodic basis. Each response from a content server 724 preferably contains the schedule and frequency for subsequent polls. For example, a content server 724 disposed to provide stock market information can change the polling frequency to reflect whether or not the stock market is open. In other implementations a CHUMBY™ device 102 may be provided with the capability to change polling frequencies on the basis of, for example, environmental conditions (e.g., ambient room brightness) or other factors. One or more of the content servers 724 may be used for serving certain types of content uploaded by users for use on their own or other CHUMBY™ devices 102 and stored within the system database 712.

The CHUMBY™ service provider 106 will typically maintain a small number of load-balanced Network Time Protocol (NTP) servers 730 to provide time to CHUMBY™ devices 102. Each such server 730 will be configured to fetch their time from a "primary" NTP server, which fetches time from an upstream external public NTP server. If the primary NTP server 730 is inoperative, secondary NTP servers 730 will synchronize with a random selection of upstream servers. If all servers 730 are unavailable, a CHUMBY™ device 102 will either fetch time information from random public NTP servers or simply have its time adjusted via user input. In one embodiment each CHUMBY™ device 102 requests time upon connecting to the Internet and at jittered intervals thereafter, no more frequently than once a day.

Figure 6:
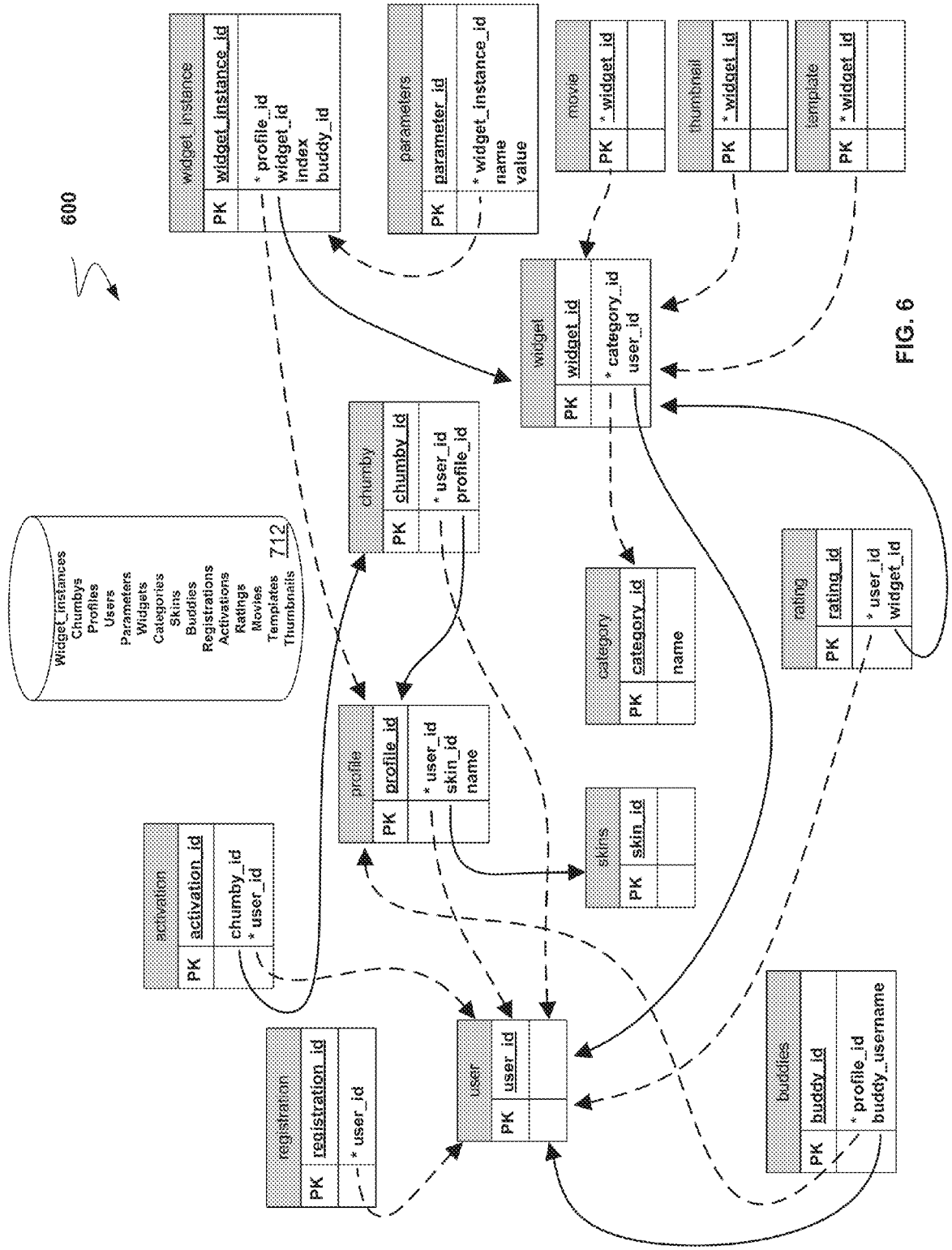
FIG. 6 provides a database model diagram of an exemplary object-oriented database schema utilized by a system database as may be used with embodiments of the invention.

Turning now to FIG. 6, a database model diagram is provided of an exemplary object-oriented database schema 800 utilized by the system database 712. As shown, the schema 800 includes the following tables: buddies, categories, CHUMBY™ devices, parameters, profiles, skins, users, widget instance, widgets, ratings, registrations, activations, movies, templates, thumbnails. Each rectangular object in FIG. 6 is an entity object representation of a table in the database 712, with the primary key denoted with the acronym "PK"; ownership relationships indicated by dashed arrows which originate at the owned entity and terminate at the owning entity, and which are keyed by the asterisked column in the owned object; and solid arrows indicating a relationship between entities. Although the type of information contained within a number of these tables will be readily apparent to those skilled in the art in view of the discussion herein, a simplified example of various steps performed during user registration and the adding of a widget to a "profile" is provided in order to further illuminate the structure of the database schema 800.

In one embodiment the user registration and account creation process is initiated by a user through submission, via a Web browser 122, of a CHUMBY™ ID so as to identify a particular CHUMBY™ device 102. The act of creating a user account results in the construction of a default profile and one or more widget instances, each of which is automatically assigned to the CHUMBY™ device 102 (as identified by its CHUMBY™ ID) currently being registered. When a user adds a widget to the user's profile, the user is presented with a list of potential categories based upon information within the categories table. The user then selects a category from the categories table, and the user is presented with a list of widgets belonging to the chosen category. After the user chooses a widget, a widget instance is constructed and information is entered into the appropriate fields (e.g., profile id, widget id, index). The user is then presented a user interface via the Web browser 122 for editing the widget-specific parameters associated with the selected widget. In response to the user's parameter selections, records are appropriately updated in the parameters table.

FIGS. 19A-19H provide a more comprehensive tabular representation of an exemplary object-oriented database schema capable of being utilized by the system database 712.

System Operation

Client-Server Communication Protocol

In general, it is contemplated that embodiments of the invention will be implemented such that each CHUMBY™ device 102 will function as a client relative to various servers existing within the CHUMBY™ service provider 106. In these embodiments the CHUMBY™ devices 102 do not engage in direct communication with each other, but may do so via independent client-sever relationships established with the service provider 106. In this way the service provider 106 may facilitate the communication of a variety of different types of executable files (e.g., widgets or other computer programs, audio clips, short "Flash" movies, etc.) among CHUMBY™ devices 102, subject to the permission of the content owner and potential recipient. A user may designate that a widget or other content be sent to another user, or to the members of a user's "buddy list" or the like. This designation may be made via a Web browser 122 in communication with the service provider 106, or directly through the interface of the user's CHUMBY™ device 102.

In one embodiment executable files may be created by users of CHUMBY™ devices 102 or other third parties and loaded within the system database 712 after being approved by the entity operating the service provider 106. Once a widget or other executable file has been created and stored within the system database 712, it is made available for use by all those users of CHUMBY™ devices 102 that have been granted the requisite permission. Various schemes for granting permissions among and between users are possible. For example, one such type of permission could entail that any user X that is given permission by a user Y to send widgets to user Y's CHUMBY™ device may select any widget for which user X has usage rights and "send" such widget to user Y's CHUMBY™ device. Other restrictions could be placed on the transferability of widgets or other files from the service provider 106 to a CHUMBY™ device at the request of another user. For example, a user could be provided with the capability to "lock" certain widgets on only the user's CHUMBY™ device, or a CHUMBY™ device could reach a "full" state and advertise itself as being incapable of receiving any additional widgets.

Although widgets and other executable files could be transferred between the service provider 106 and CHUMBY™ devices 102 in a number of different formats, in one embodiment such transfers will occur in the Flash movie format (i.e., as .swf files, when not signed or encrypted). In this case the process for downloading widgets from the service provider 106 includes receiving a notification at a CHUMBY™ device 102 that a "new" widget is ready for downloading. Since in the exemplary embodiment each CHUMBY™ device 102 acts in a "pull" mode, each device 102 periodically polls the service provider and inquires as to whether any configuration changes are available to load. In the case in which a new widget is available for downloading, the CHUMBY™ device 102 will generally use standard HTTP (or HTTPS) protocols in downloading the applicable widget file.

Attention is now directed to FIGS. 9-13, which are a series of signal flow diagrams representative of the client-server communication protocol established between a CHUMBY™ device 102 and the CHUMBY™ service provider 106. As mentioned above, each CHUMBY™ device 102 functions as a client relative to the CHUMBY™ service provider 106. In one embodiment the basic protocol established between each CHUMBY™ device and the corresponding server entity of the CHUMBY™ service provider 106 may be characterized as XML using a Representational State Transfer (REST) architecture transmitted using HTTP. In general, the CHUMBY™ device 102 issues periodic HTTP GET or POST requests and the service provider 106 responds with a block of XML. The CHUMBY™ device 102 will use HTTP GET for relatively simple requests, and POST for more complex requests, which will be in encapsulated in XML. Individual data elements are uniquely identified by Global Unique Identifiers (GUID). In one embodiment, there will be some form of cryptographic key exchange and transactions will be encrypted using those keys. Furthermore, XML may be compressed in order to facilitate transfer between the CHUMBY™ device 102 and the CHUMBY™ service provider 106.

Each CHUMBY™ device 102 will have a unique GUID. In some embodiments, time codes will be represented in ISO-8061 format.

Requesting a CHUMBY™ Configuration

Figure 7:
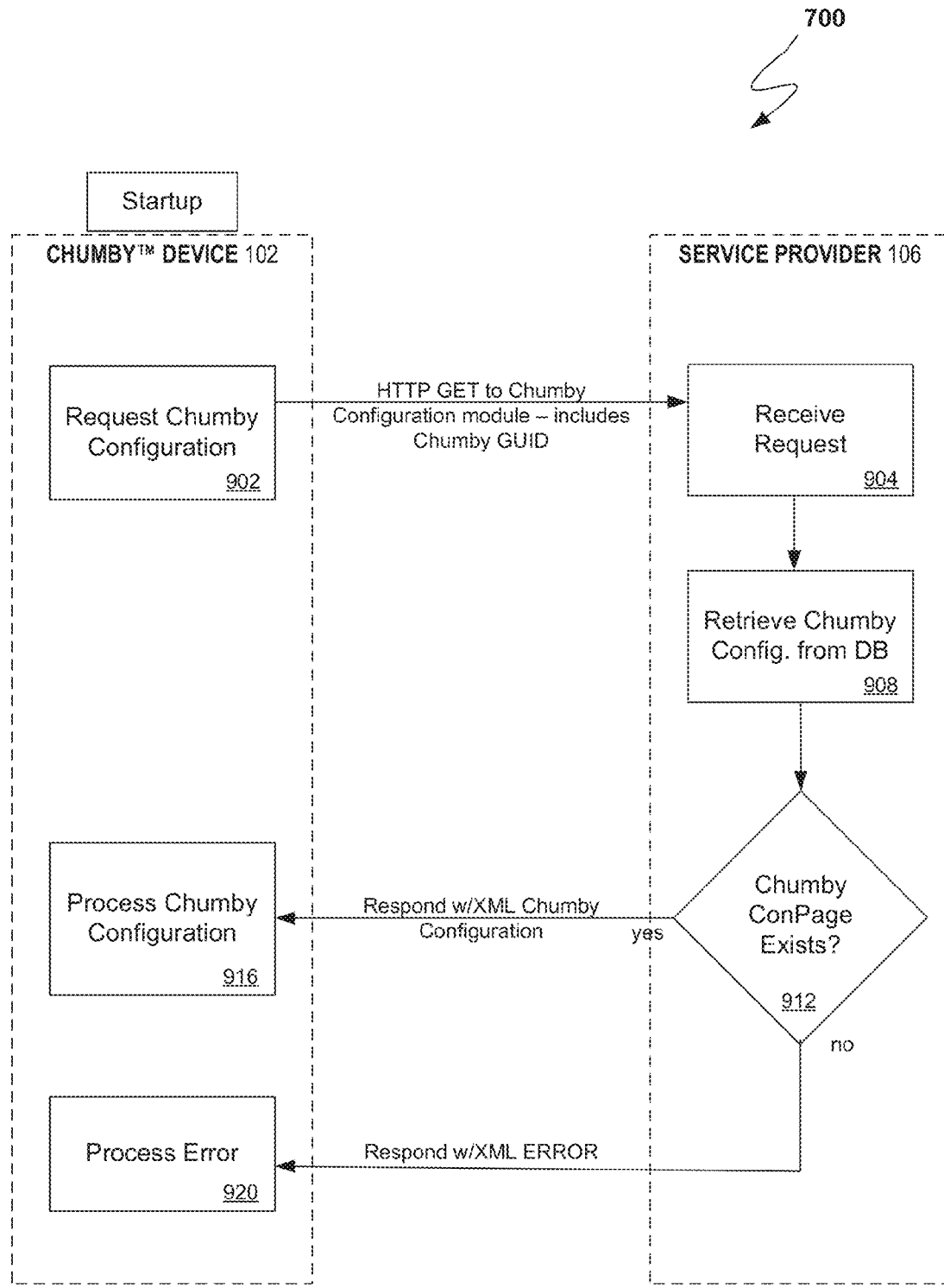
FIG. 7 is a signal flow diagram representative of one manner in which a configuration is provided to a CHUMBY™ device by a service provider.

Referring to FIG. 7, a signal flow diagram 900 illustratively represents one manner in which a "CHUMBY™ configuration" is provided to a CHUMBY™ device 102 by the service provider 106. In one embodiment each CHUMBY™ device 102 operates in accordance with a configuration, which specifies the profile to be loaded by the CHUMBY™ device 102 under various conditions. The user specifies the profile for the CHUMBY™ device 102 via a web interface at the CHUMBY™ web site. The profile contains several operational parameters for the CHUMBY™ device 102.

As shown in FIG. 7, the requesting of a configuration is initiated when the CHUMBY™ device 102 sends an HTTP GET request containing the GUID of the requested configuration to a CHUMBY™ configuration object within the system database 712 maintained by the service provider 106 (stage 902). An example of such a request is provided below:
http://server.chumby.com/xml/chumbies/CB6A8A20-DFB8-11DA-98FA-00306555C864

The service provider 106 receives the request (stage 904), and retrieves the requested configuration from the system database 712 (stage 908). If the requested configuration exists, the service provider responds with an XML-based configuration; if not, the service provider 106 responds with an XML-based error message (stage 912). An exemplary XML-based response generated by the service provider 106 is given below:

```
<?xml version="1.0" encoding="UTF-8"?>
<chumby id="CB6A8A20-DFB8-11DA-98FA-00306555C864">
    <name>Bathroom</name>
    <profile href="/xml/profiles/00000000-0000-0000-0000-000000000001" name="Default"
        id="00000000-0000-0000-0000-000000000001"/>
    <user username="Frank" href="/xml/users/00000000-0000-0000-0000-000000000001"
        id="00000000-0000-0000-0000-000000000001"/>
</chumby>
```

Once the response is received by the CHUMBY™ device 102, it is processed by the Master Controller (stage 916). If an error is instead received, it is processed by the Master Controller as well (stage 920).

Requesting a Profile

Figure 8:
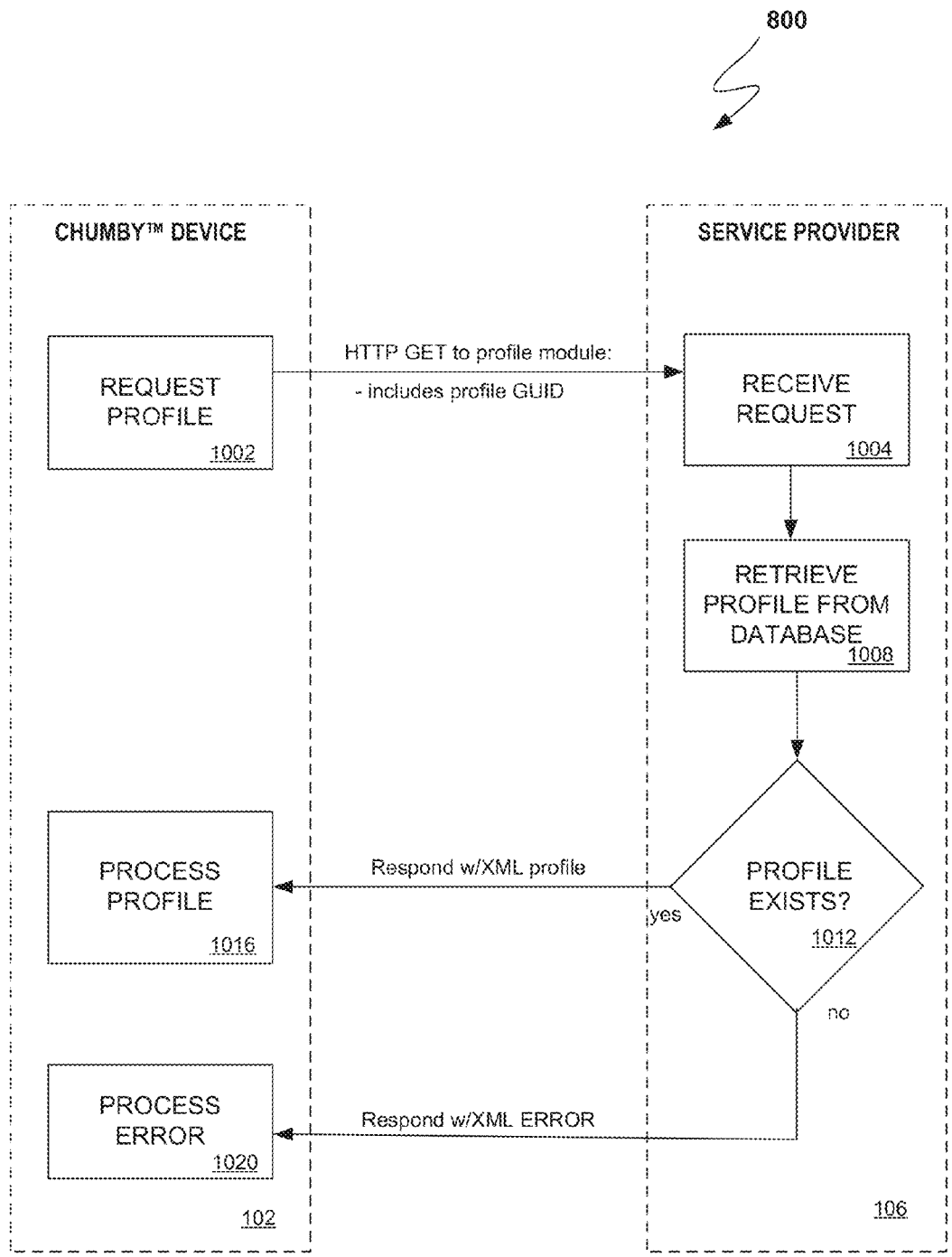
FIG. 8 is a signal flow diagram which represents one manner in which a profile is provided to a CHUMBY™ device by a service provider.

Referring to FIG. 8, a signal flow diagram 1000 illustratively represents one manner in which a "profile" is provided to a CHUMBY™ device 102 by the service provider 106. In one embodiment each CHUMBY™ device 102 operates in accordance with a profile, which specifies the set of widgets to be executed by the CHUMBY™ device 102 under various conditions. This enables a user to specify that a certain subset of the available set of widgets is to be instantiated and utilized during a particular time frame, based upon the location of the user's CHUMBY™ device 102 or the skin (or housing) within which the CHUMBY™ device 102 is currently seated. For instance, the user may desire that local weather and traffic information be provided while the user is located at home, but would prefer that airline flight information be available from the CHUMBY™ device 102 when the user is traveling.

As shown in FIG. 8, the requesting of a profile is initiated when the CHUMBY™ device 102 sends an HTTP GET request containing the GUID of the requested profile to a profile object within the system database 712 maintained by the service provider 106 (stage 1002). An example of such a request is provided below:

http://server.chumby.com/xml/profiles/00000000-0000-0000-0000-000000000001

The service provider 106 receives the request (stage 1004), and retrieves the requested profile from the system database 712 (stage 1008). If the requested profile exists, the service provider responds with an XML-based profile; if not, the service provider 106 responds with an XML-based error message (stage 1012). An exemplary XML-based response generated by the service provider 106 is given below:

```
<?xml version="1.0" encoding="UTF-8"?>
<profile id="00000000-0000-0000-0000-000000000001">
    <name>Default</name>
    <description>Default profile for your Chumby</description>
    <user username="chumby" href="/xml/users/00000000-0000-0000-0000-000000000001"
        id="00000000-0000-0000-0000-000000000001"/>
    <skin href="/xml/skins/00000000-0000-0000-0000-000000000001" name="Standard"
        id="00000000-0000-0000-0000-000000000001"/>
    <access access="private" id="EC667B90-EC41-11DA-8774-00306555C864"/>
    <widget_instances>
        <widget_instance href="/xml/widgetinstances/B2BE8552-E7F2-11DA-B4BD-00306555C864"
            id="B2BE8552-E7F2-11DA-B4BD-00306555C864"/>
        <widget_instance href="/xml/widgetinstances/033BFBC2-E794-11DA-B4BD-00306555C864"
            id="033BFBC2-E794-11DA-B4BD-00306555C864"/>
        <widget_instance href="/xml/widgetinstances/94177E18-E777-11DA-B4BD-00306555C864"
            id="94177E18-E777-11DA-B4BD-00306555C864"/>
        <widget_instance href="/xml/widgetinstances/9AA50336-E777-11DA-B4BD-00306555C864"
            id="9AA50336-E777-11DA-B4BD-00306555C864"/>
        <widget_instance href="/xml/widgetinstances/9E4647F2-E777-11DA-B4BD-00306555C864"
            id="9E4647F2-E777-11DA-B4BD-00306555C864"/>
        <widget_instance href="/xml/widgetinstances/7AC67832-E77D-11DA-B4BD-00306555C864"
            id="7AC67832-E77D-11DA-B4BD-00306555C864"/>
        <widget_instance href="/xml/widgetinstances/B4C35F06-E777-11DA-B4BD-00306555C864"
            id="B4C35F06-E777-11DA-B4BD-00306555C864"/>
        <widget_instance href="/xml/widgetinstances/5D81823A-E77D-11DA-B4BD-00306555C864"
            id="5D81823A-E77D-11DA-B4BD-00306555C864"/>
    </widget_instances>
    <buddies_of>
        <buddy profile="A9BF0AC6-07DB-11DC-A700-0017F2D98B02" name="fredgarvin"
            profilename="Default" id="9790F788-07DB-11DC-A700-0017F2D98B02"/>
    </buddies_of>
</profile>
```

Once the response is received by the CHUMBY™ device 102, it is processed by the Master Controller (stage 916). If an error is instead received, it is processed by the Master Controller as well (stage 920).

Each Profile has a name, a description, a skin, and a list of "Widget Instances". The Profile will be periodically refetched in order to reflect changes made by the owner, for instance, adding and removing Widget Instances. The Profile may also contain a "buddies_of" node, which contains information about users and profiles that have indicated the owner of the Profile to be a "buddy" in order to facilitate the sending of widget instances.

The CHUMBY™ device 102 processes each Widget Instance in turn, fetching the settings for each widget, and the Widget itself, and displays the Widget with the settings encapsulated by the Widget Instance.

A process similar to that described with reference to FIG. 7 may be used to change a profile. An example of an HTTP POST containing an the GUID of the profile to modify and an XML-based request to change a profile generated by the CHUMBY™ device 102 is given below:

```
http://server.chumby.com/xml/profiles/00000000-0000-0000-0000-000000000001
<?xml version="1.0" encoding="UTF-8"?>
<profile id="00000000-0000-0000-0000-000000000001">
    <name>Default</name>
    <description>Default profile for your Chumby</description>
    <user username="chumby" href="/xml/users/00000000-0000-0000-0000-000000000001"
        id="00000000-0000-0000-0000-000000000001"/>
    <skin href="/xml/skins/00000000-0000-0000-0000-000000000001" name="Standard"
        id="00000000-0000-0000-0000-000000000001"/>
    <access access="private" id="EC667B90-EC41-11DA-8774-00306555C864"/>
    <widget_instances>
        <widget_instance href="/xml/widgetinstances/B2BE8552-E7F2-11DA-B4BD-00306555C864"
            id="B2BE8552-E7F2-11DA-B4BD-00306555C864"/>
        <widget_instance href="/xml/widgetinstances/033BFBC2-E794-11DA-B4BD-00306555C864"
            id="033BFBC2-E794-11DA-B4BD-00306555C864"/>
        <widget_instance href="/xml/widgetinstances/94177E18-E777-11DA-B4BD-00306555C864"
            id="94177E18-E777-11DA-B4BD-00306555C864"/>
        <widget_instance href="/xml/widgetinstances/9AA50336-E777-11DA-B4BD-00306555C864"
            id="9AA50336-E777-11DA-B4BD-00306555C864"/>
        <widget_instance href="/xml/widgetinstances/9E4647F2-E777-11DA-B4BD-00306555C864"
            id="9E4647F2-E777-11DA-B4BD-00306555C864"/>
        <widget_instance href="/xml/widgetinstances/7AC67832-E77D-11DA-B4BD-00306555C864"
            id="7AC67832-E77D-11DA-B4BD-00306555C864"/>
        <widget_instance href="/xml/widgetinstances/B4C35F06-E777-11DA-B4BD-00306555C864"
            id="B4C35F06-E777-11DA-B4BD-00306555C864"/>
        <widget_instance href="/xml/widgetinstances/10A66395-8500-215E-81F0-003256F98257"
            id="10A66395-8500-215E-81F0-003256F98257"/>
    </widget_instances>
</profile>
```

An exemplary XML-based response corresponding to such a request which contains the updated profile could be provided by the service provider 106 as follows:

```
<?xml version="1.0" encoding="UTF-8"?>
<profile id="00000000-0000-0000-0000-000000000001">
    <name>Default</name>
    <description>Default profile for your Chumby</description>
    <user username="chumby" href="/xml/users/00000000-0000-0000-0000-000000000001"
        id="00000000-0000-0000-0000-000000000001"/>
    <skin href="/xml/skins/00000000-0000-0000-0000-000000000001" name="Standard"
        id="00000000-0000-0000-0000-000000000001"/>
    <access access="private" id="EC667B90-EC41-11DA-8774-00306555C864"/>
    <widget_instances>
        <widget_instance href="/xml/widgetinstances/B2BE8552-E7F2-11DA-B4BD-00306555C864"
            id="B2BE8552-E7F2-11DA-B4BD-00306555C864"/>
        <widget_instance href="/xml/widgetinstances/033BFBC2-E794-11DA-B4BD-00306555C864"
            id="033BFBC2-E794-11DA-B4BD-00306555C864"/>
        <widget_instance href="/xml/widgetinstances/94177E18-E777-11DA-B4BD-00306555C864"
            id="94177E18-E777-11DA-B4BD-00306555C864"/>
        <widget_instance href="/xml/widgetinstances/9AA50336-E777-11DA-B4BD-00306555C864"
            id="9AA50336-E777-11DA-B4BD-00306555C864"/>
        <widget_instance href="/xml/widgetinstances/9E4647F2-E777-11DA-B4BD-00306555C864"
            id="9E4647F2-E777-11DA-B4BD-00306555C864"/>
        <widget_instance href="/xml/widgetinstances/7AC67832-E77D-11DA-B4BD-00306555C864"
            id="7AC67832-E77D-11DA-B4BD-00306555C864"/>
        <widget_instance href="/xml/widgetinstances/B4C35F06-E777-11DA-B4BD-00306555C864"
            id="B4C35F06-E777-11DA-B4BD-00306555C864"/>
        <widget_instance href="/xml/widgetinstances/10A66395-8500-215E-81F0-003256F98257"
            id="10A66395-8500-215E-81F0-003256F98257"/>
    </widget_instances>
</profile>
```

Widget Instance Upload/Download

Figure 11:
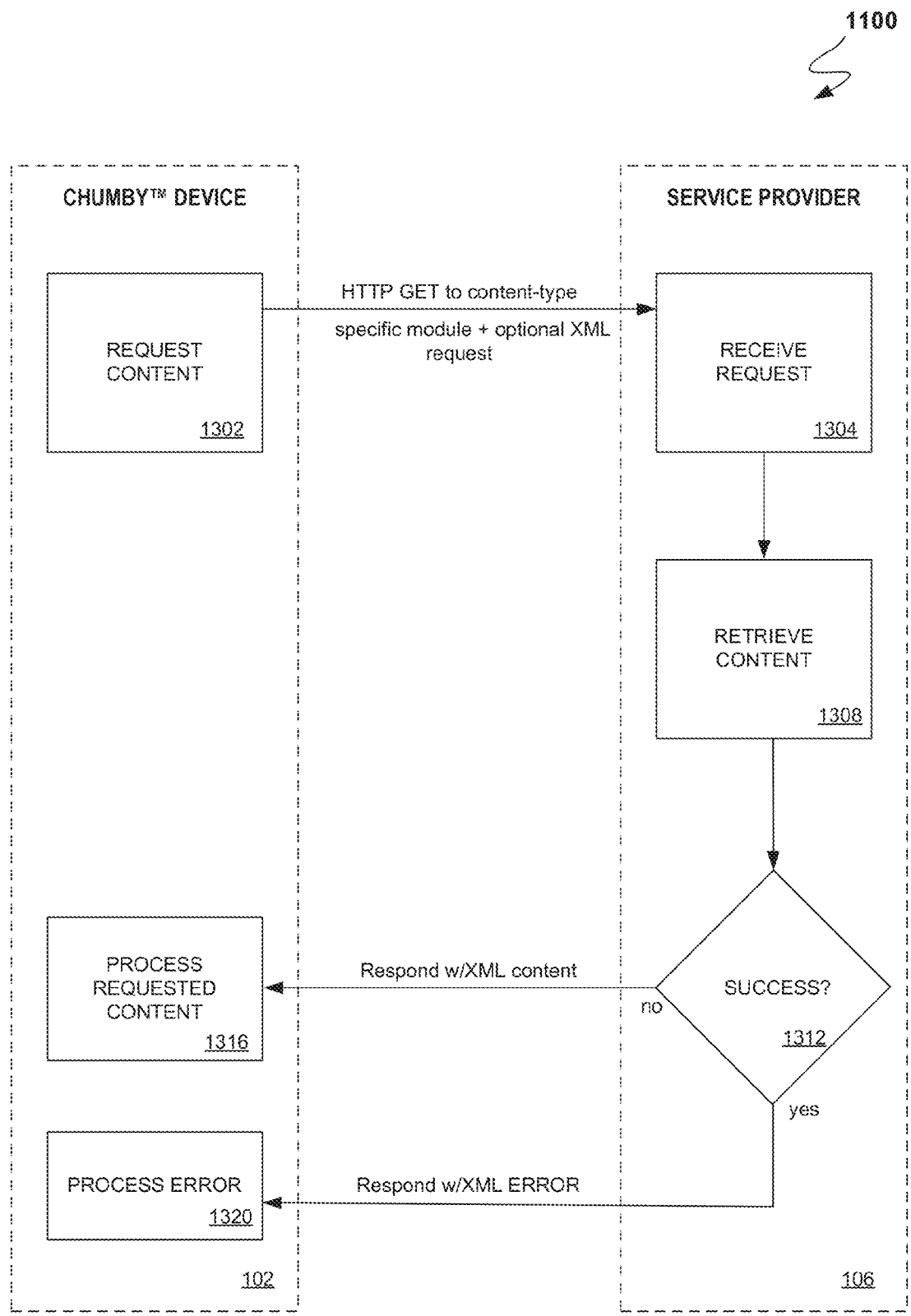
FIG. 11 is a signal flow diagram which illustratively represents the process of obtaining content from the service provider for a widget of a CHUMBY™ device.
Figure 12:
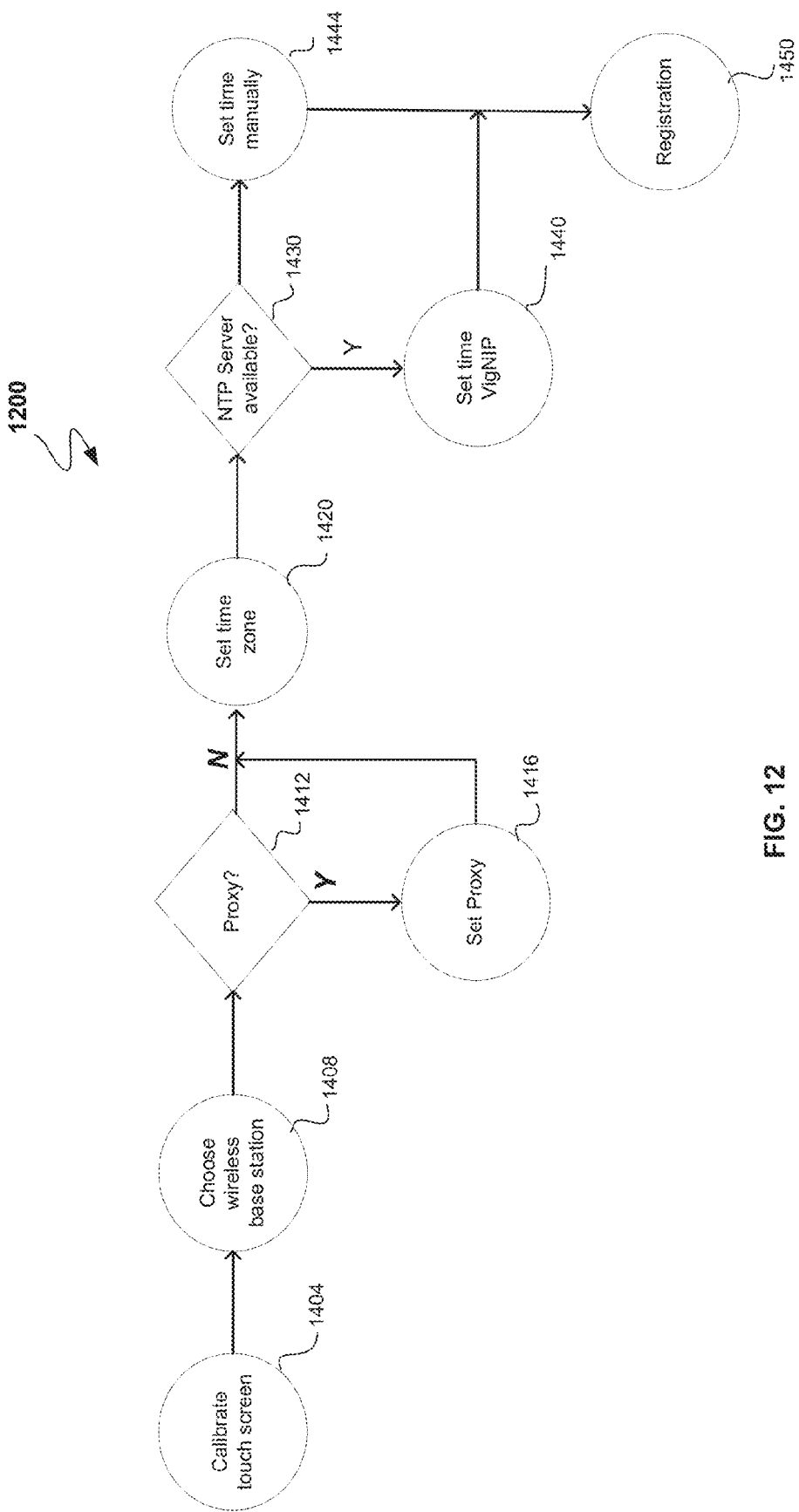
FIG. 12 is a flowchart which depicts an exemplary sequence of operations performed by a CHUMBY™ device upon initial power-up.

Turning now to FIGS. 11-12, there are shown signal flow diagrams representative of the communication of widget instance information from the CHUMBY™ device 102 to the service provider 106, and vice-versa. In one embodiment the set of parameters associated with a widget instance determine the user-specified manner in which the behavior of the widget is modified when executed by a CHUMBY™ device 102. That is, the parameters fetched by the CHUMBY™ device 102 from the service provider 106 for a given widget constitute the user's "customized" settings, rather than dynamic content. For example, in the case of a "stock ticker" widget the applicable parameters could comprise the names and symbols of the stocks within the user's portfolios, but would not define or relate to the current prices of the stocks (which would be furnished by another service supplied by the service provider 106).

Figure 9:
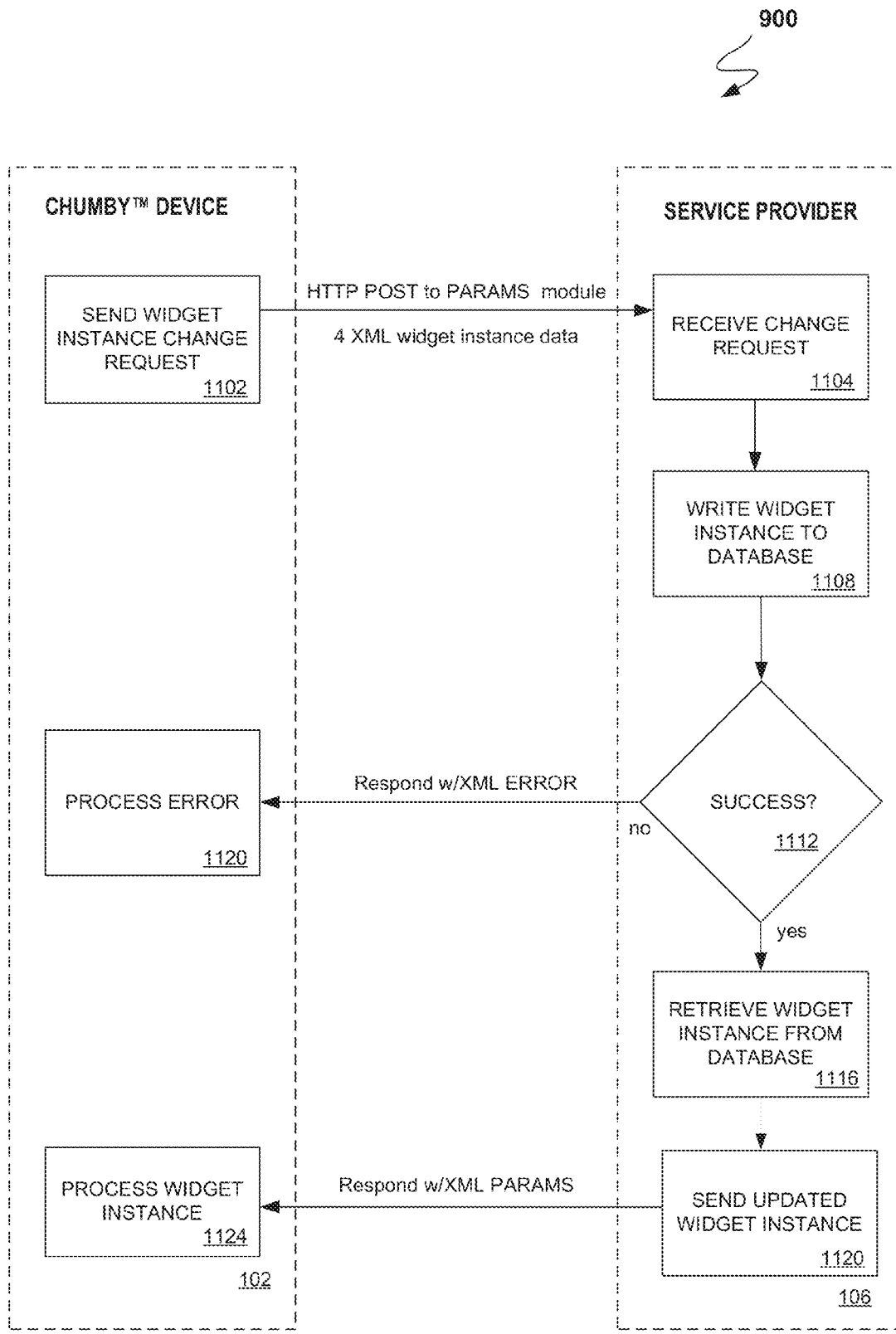
FIG. 9 is a signal flow diagram which depicts processing of changes made to the parameters of a widget instance through the interface of a CHUMBY™ device in which the widget is instantiated.

FIG. 9 is a signal flow diagram which depicts processing of changes made to the parameters of a widget instance through the interface of the CHUMBY™ device 102 in which the widget is instantiated. Examples of parameter changes could include changing a location of interest in the case of a "weather" widget, or adding/removing stock ticker symbols in the case of a "stock market" widget. In the exemplary embodiment it is not necessary for the user to set or otherwise modify all parameters of a given widget, and the service provider 106 will effectively "expand" the parameter change data into a full parameter record once received. For instance, a zip code could be sufficient to uniquely identify a location in the case of a weather widget, and the associated city, state, etc. could be supplied to the applicable record during processing of the parameter change request by the service provider 106.

As shown, the widget instance change operation is initiated when the CHUMBY™ device 102 sends an HTTP POST and an XML request to a widget instance object within the system database 712 maintained by the service provider 106 (stage 1102). This type of "UPLOAD" operation informs the service 106 that the parameters of a specific widget instance have been updated by the applicable user. As shown, the updated parameters are received by the service provider (stage 1104), and are attempted to be written to a corresponding widget instance object within the system database 712 (stage 1108). If this attempted write operation is unsuccessful (stage 1112), the service provider 106 responds with an error message that is processed by the requesting CHUMBY™ device 102 (stage 1120). If the write operation is successful, the newly updated widget instance are retrieved from the system database 712 (stage 1116) and sent to the applicable CHUMBY™ device 102 (stage 1120).

Once received, the widget instance is processed by the CHUMBY™ device 102 (stage 1124). In general, the processing of the parameters contained in a widget instance are dependent upon the characteristics of the particular widget. In certain cases the parameters may be sufficient to enable the widget to display information, while other widgets may use the parameters to fetch content from another service. As an example of the former, consider a "clock" widget capable of displaying information following receipt of a parameter indicating a time zone. In contrast, a "stock widget" may have stock symbols as parameters and use such symbols to fetch quote information.

Figure 10:
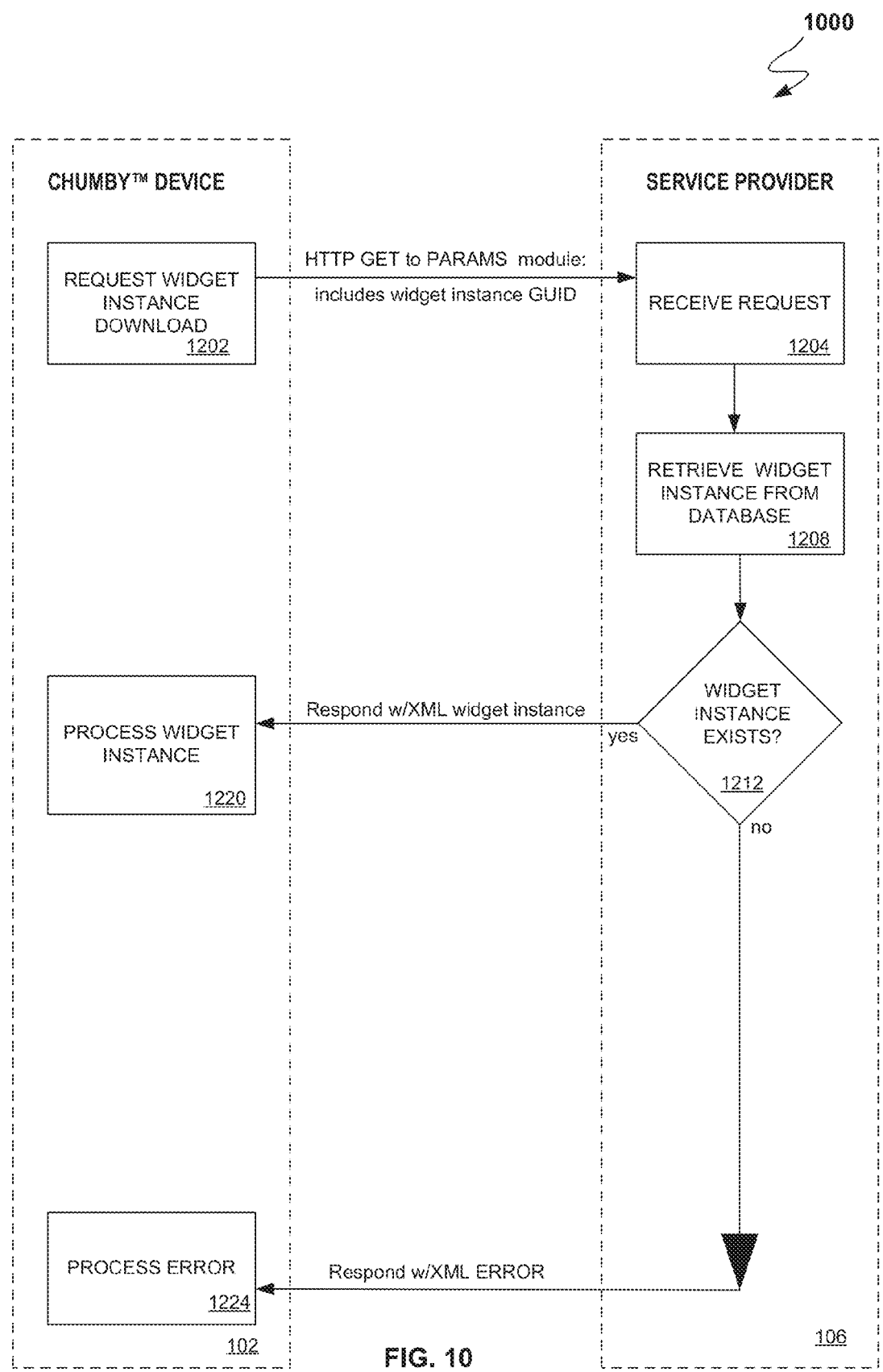
FIG. 10 shows a signal flow diagram illustrating an exemplary widget instance download operation in which a service provider is requested to push values of widget-specific parameters to a requesting CHUMBY™ device.

Referring now to FIG. 10, there is shown a signal flow diagram illustrating an exemplary widget instance download operation in which the service provider 106 is requested to push values of widget-specific parameters to a requesting CHUMBY™ device 102. The requesting of a parameter download is initiated when the CHUMBY™ device 102 sends an HTTP GET containing the GUID of the requested widget instance request to a parameter object within the system database 712 maintained by the service provider 106 (stage 1202). An example of such a request in the case of a "weather" widget is provided below:

http://server.chumby.com/xml/widgetinstances/ 5D81823A-E77D-11DA-B4BD-00306555C864

The service provider 106 receives the request (stage 1204), and retrieves the requested parameters from the system database 712 (stage 1208). If the requested parameters exist, the service provider 106 responds with an XML-based widget instance message (stage 1212). Using the example of a weather widget, which utilizes a zip code to identify the location for which weather is to be retrieved, such a message could comprise:

```
<?xml version="1.0" encoding="UTF-8"?>
<widget_instance id="5D81823A-E77D-11DA-B4BD-00306555C864">
    <widget href="/xml/widgets/BF4CE814-DFB8-11DA-9C82-00306555C864" id="BF4CE814-
    DFB8-11DA-9C82-00306555C864"/>
    <profile href="/xml/profiles/00000000-0000-0000-0000-000000000001" id="00000000-0000-0000-
    0000-000000000001"/>
    <access access="private"/>
    <mode time="10" mode="timeout"/>
    <received buddy="9790F788-07DB-11DC-A700-0017F2D98B02" forward="true"
    accepted="false"/>
    <widget_parameters>
        <widget_parameter id="BF4CE814-DFB8-11DA-9C82-00306643C864">
            <name>ZipCode</name>
            <value>92037</name>
        </widget_parameter>
    </widget_parameters>
</widget_instance>
```

The CHUMBY™ device 102 uses the GUID in the "widget" tag to fetch the information about the Widget to be displayed. Once the widget has been started, it is passed the name/value pairs in the "widget parameters" section, in order to customize the behavior of the widget. The "mode" tag indicates how long the widget is to be played. A value of "default" in the mode attribute indicates that the timing will be specified by the widget description, an attribute value of "timeout" will use the duration specified in the "time" attribute (in seconds), and the value of "cooperative" will display the widget until the user explicitly commands it to stop through a UI element, or the widget itself indicates that it wishes to discontinue operation. The presence of a "received" node indicates that the widget instance has been "sent" by a buddy. The value of the "accepted" attribute indicates whether or not the widget instance has been accepted by the recipient, which is done either through the web interface or through the UI of the device. The "forward" attribute indicates whether this widget instance can be sent on to another user.

If the requested parameters do not exist, a default widget instance is attempted to be retrieved from the system database 712 (stage 1224). If such a widget instance exists (stage 1228), the service provider 106 responds with an XML-based parameters message that is processed by the CHUMBY™ device 102 upon receipt (stage 1220). If such a default widget instance does not exist, an error message is returned to the CHUMBY™ device 102 (stage 1232).

Examples of Widget Download

Figure 18:
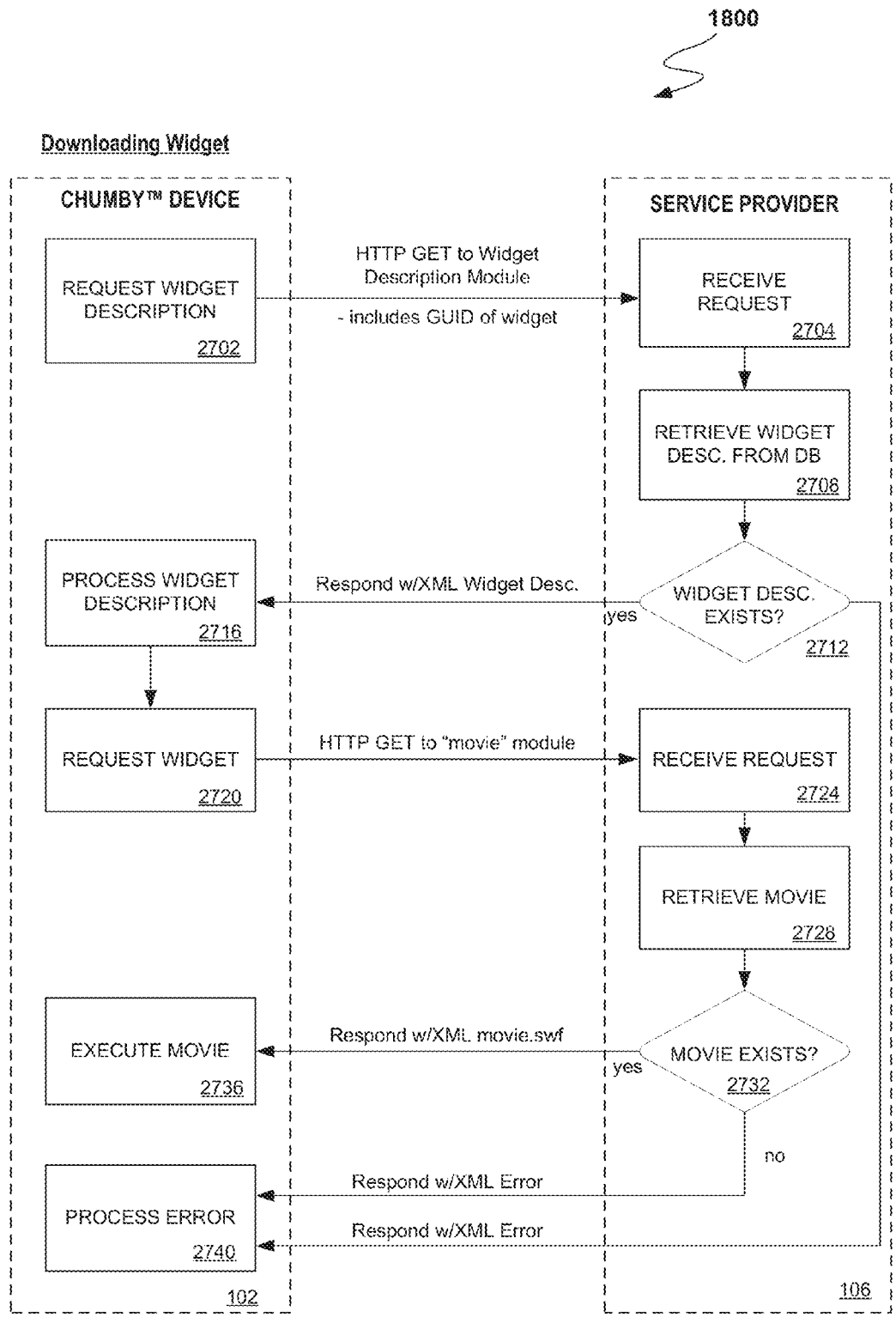
FIG. 18 is a signal flow diagram which illustratively represents the process of downloading the code for a widget from a service provider.

Referring now to FIG. 18, a signal flow diagram 2700 is provided which illustratively represents the process of downloading the code for a widget (e.g., a .swf file) from the service provider 106 for execution on a CHUMBY™ device 102. The process is initiated when the CHUMBY™ device 102 sends an HTTP GET request containing the GUID of the requested widget to a specific widget description object within the system database 712 maintained by the service provider 106 (stage 1302). An example of such a request is provided below:

http://server.chumby.com/xml/widgets/BF4CE814-DFB8-11DA-9C82-00306555C864

The service provider 106 receives the request (stage 2704), and attempts to retrieve the requested widget description from the system database 712 or other data source available to the service provider 106 (stage 2708). If the requested widget description is able to be retrieved, the service provider 106 responds with an XML-based widget description message; if not, the service provider 106 responds with an XML-based error message (stage 2712). An exemplary XML-based response generated by the service provider 106 is given below:

tained by the service provider 106 (stage 1320). An example of such a request is provided below:

http://server.chumby.com/xml/movies/BF4CE814-DFB8-11DA-9C82-00306555C864

The service provider 106 receives the request (stage 2724), and attempts to retrieve the requested movie from the system database 712 or other data source available to the service provider 106 (stage 2728). If the requested movie is able to be retrieved, the service provider 106 responds with the .swf file which implements the movie; if not, the service provider 106 responds with an XML-based error message (stage 2732). Once the requested movie is received by the CHUMBY™ device 102, it is loaded by the Master Controller and queued for subsequent execution (stage 2736). If an error is instead received, it is processed accordingly (stage 2740).

Requesting Content

Referring now to FIG. 11, a signal flow diagram 1300 is provided which illustratively represents the process of obtaining content from the service provider 106 for a widget of a CHUMBY™ device 102. The process is initiated when the CHUMBY™ device 102 sends an HTTP GET and an optional XML request to a specific content object within the system database 712 maintained by the service provider 106 (stage 1302). An example of such a request for content for a "tide" widget is provided below:

http://content.chumby.com/tides/United%20States/
National%20City%2C%20San%20Diego
%20Bay%2C%20California The service provider 106 receives the request (stage 1304), and attempts to retrieve the requested content from the system database 712, internal content service, external content service or other data source available to the service provider 106 (stage 1308). If the requested content is able to be retrieved, the service provider 106 responds with an XML-based content message; if not, the service provider 106 responds with

```
<?xml version="1.0" encoding="UTF-8"?>
<widget id="BF4CE814-DFB8-11DA-9C82-00306555C864">
    <name>Time Zones</name>
    <description>A time zone selector</description>
    <version>1.0</version>
    <protection protection="none"/>
    <mode time="15" mode="default"/>
    <access sendable="true" deleteable="true" access="public" virtualable="true"/>
    <user username="chumby" href="/xml/users/00000000-0000-0000-0000-000000000001"
       id="00000000-0000-0000-0000-000000000001"/>
    <category href="/xml/categories/00000000-0000-0000-0000-000000000001" name="Chumby"
       id="00000000-0000-0000-0000-000000000001"/>
    <thumbnail contenttype="image/jpeg" href="/xml/thumbnails/BF4CE814-DFB8-11DA-9C82-
       00306555C864"/>
    <template contenttype="text/xml" href="/xml/templates/BF4CE814-DFB8-11DA-9C82-
       00306555C864"/>
    <movie contenttype="application/x-shockwave-flash" href="/xml/movies/BF4CE814-DFB8-11DA-
       9C82-00306555C864"/>
    <rating count="0" rating="0.0"/>
</widget>
```

Once the requested widget description is received by the CHUMBY™ device 102, the CHUMBY™ device 102 uses the URL referencing the "movie" for the requested widget to download the movie (e.g., .swf) file from the service provider 106. The CHUMBY™ device 102 sends an HTTP GET request containing the GUID of the requested movie to a specific movie object within the system database 712 mainan XML-based error message (stage 1312). Once the requested content is received by the CHUMBY™ device 102, corresponding audiovisual output is generated by the device 102 for the benefit of its user (stage 1316). If an error is instead received, it is processed accordingly (stage 1320). An exemplary XML-based response generated by the service provider 106 is given below:

```xml
<tideitems>
    <tideitem timestamp="2006-05-31T00:39:11Z">
        <location>
            <locationstring string="National City, San Diego Bay, California"/>
            <station id="National City, San Diego Bay"/>
            <state name="California"/>
            <country name="United States"/>
            <coordinates lat="32.6667Â° N", lon="117.1167Â° W"/>
        </location>
        <tides>
            <tide dateTime='2006-05-31T12:44:00Z', tidedescription="Low Tide", tidelevel="0.85 meters"/>
            <tide dateTime='2006-05-31T02:50:00Z', tidedescription="Sunset"/>
            <tide dateTime='2006-05-31T06:30:00Z', tidedescription="Moonset"/>
            <tide dateTime='2006-05-31T06:56:00Z', tidedescription="High Tide", tidelevel="1.80 meters"/>
            <tide dateTime='2006-05-31T24:41:00Z', tidedescription="Sunrise"/>
            <tide dateTime='2006-05-31T14:46:00Z', tidedescription="Low Tide", tidelevel="-0.13 meters"/>
            <tide dateTime='2006-05-31T16:38:00Z', tidedescription="Moonrise"/>
            <tide dateTime='2006-05-31T21:55:00Z', tidedescription="High Tide", tidelevel="1.14 meters"/>
            <tide dateTime='2006-06-01T01:38:00Z', tidedescription="Low Tide", tidelevel="0.92 meters"/>
            <tide dateTime='2006-06-01T02:50:00Z', tidedescription="Sunset"/>
            <tide dateTime='2006-06-01T07:06:00Z', tidedescription="Moonset"/>
            <tide dateTime='2006-06-01T07:41:007', tidedescription="High Tide", tidelevel="1.64 meters"/>
            <tide dateTime='2006-06-01T24:41:00Z', tidedescription="Sunrise"/>
            <tide dateTime='2006-06-01T15:37:00Z', tidedescription="Low Tide", tidelevel="-0.01 meters"/>
            <tide dateTime='2006-06-01T17:38:00Z', tidedescription="Moonrise"/>
            <tide dateTime='2006-06-01T22:59:00Z', tidedescription="High Tide", tidelevel="1.18 meters"/>
            <tide dateTime='2006-06-02T02:51:00Z', tidedescription="Sunset"/>
            <tide dateTime='2006-06-02T02:58:00Z', tidedescription="Low Tide", tidelevel="0.96 meters"/>
            <tide dateTime='2006-06-02T07:37:00Z', tidedescription="Moonset"/>
            <tide dateTime='2006-06-02T08:35:00Z', tidedescription="High Tide", tidelevel="1.47 meters"/>
            <tide dateTime='2006-06-02T24:41:00Z', tidedescription="Sunrise"/>
            <tide dateTime='2006-06-02T16:28:00Z', tidedescription="Low Tide", tidelevel="0.09 meters"/>
            <tide dateTime='2006-06-02T18:35:00Z', tidedescription="Moonrise"/>
            <tide dateTime='2006-06-02T23:51:00Z', tidedescription="High Tide", tidelevel="1.26 meters"/>
            <tide dateTime='2006-06-03T02:51:00Z', tidedescription="Sunset"/>
            <tide dateTime='2006-06-03T04:44:00Z', tidedescription="Low Tide", tidelevel="0.93 meters"/>
            <tide dateTime='2006-06-03T08:04:00Z', tidedescription="Moonset"/>
            <tide dateTime='2006-06-03T09:46:00Z', tidedescription="High Tide", tidelevel="1.31 meters"/>
            <tide dateTime='2006-06-03T24:41:00Z', tidedescription="Sunrise"/>
            <tide dateTime='2006-06-03T17:17:00Z', tidedescription="Low Tide", tidelevel="0.19 meters"/>
            <tide dateTime='2006-06-03T19:31:00Z', tidedescription="Moonrise"/>
            <tide dateTime='2006-06-03T23:06:00Z', tidedescription="First Quarter"/>
            <tide dateTime='2006-06-04T12:30:00Z', tidedescription="High Tide", tidelevel="1.35 meters"/>
        </tides>
    </tideitem>
</tideitems>
```

In the case where content is retrieved directly from an external content service provider (i.e., from other than the service provider 106), a series of web-based transactions (most likely HTTP and/or XML-based) defined by such content service provider will take place between the CHUMBY™ device 102 and such provider.

CHUMBY™ Security Protocol

CHUMBY™ devices 102 may optionally include a hardware security module, which in one implementation is accessed via a character driver interface in the operating system ("OS") of the device 102. The module may or may not be installed. When the module is not installed, the OS preferably virtualizes the hardware security module by emulating it in software. While losing all the tamper-resistance benefits of a hardware module, this feature enables cost reduction savings while maintaining protocol interoperability with a secured system.

The hardware security module of a CHUMBY™ device 102 may be implemented in a number of ways. As an example, the hardware security module may be implemented using a monolithic security processor or a cryptographic Smart Card module. This module, or its emulated counterpart, is capable of at a minimum, the following operations: (1) storage of secret numbers in hardware; (2) the ability to compute public-key signatures; (3) the ability to compute one-way cryptographic hashes; and (4) the ability to generate trusted random numbers.

During the manufacturing process the hardware security module, or its emulated counterpart, is initialized with a set of secret numbers that are only known to the module and to the CHUMBY™ service provider 106. These secret numbers may or may not consist of public and private keys. If the numbers consist of public and private keys, then a mutual key-pair is stored by both the CHUMBY™ service provider 106 and the hardware module, along with a putative, insecure identifier number for the pair. Furthermore, these numbers are preferably not recorded by the CHUMBY™ service provider 106 in association with any other identifying information, such as the MAC address for the WLAN interface, or any other serial numbers that are stored in insecure memory for customer service purposes.

When the user or service wishes to initiate a strong authenticated transaction, the CHUMBY™ device 102 sends the putative insecure key-pair identifier to the service provider 106. The service provider 106 looks up the putative insecure key-pair identifier and issues a challenge to the hardware module, consisting of a random number In particular, the challenge is packetized and sent through the Internet to the CHUMBY™ device 102. The device 102 unpacks the challenge and passes it directly to the hardware module. The hardware module adds another random number to the packet and signs the pair of numbers, along with other transaction information (such as the version number of the protocol) with a private key that is only known to the CHUMBY cryptoprocessor. In addition, an "owner key" may optionally be encrypted to the server public key. Again, this message is packetized and transmitted by the device 102 to the service provider 106 over the Internet. Upon receipt, the service provider 106 verifies the signature of the packet using the device's public key, which was generated and recorded at the time of manufacture and indexed by the hash of the putative insecure key-pair identifier. The CHUMBY device is deemed authentic if the signature is correct and the signed packet contains the exact random number that was generated by the service provider in the first step of the challenge. The service provide 106 also decrypts the owner key, whose purpose is discussed in the next paragraph. At the conclusion of this transaction, the service provider 106 has authenticated the device 102, and can fall back to any number of session keys that can be either dynamically generated or statically stored for further secured transactions. Advantageously, this authentication transaction does not involve uniquely associating the hardware module with user information. Rather, the service provider 106 is simply aware of the existence of the approved hardware module and upon completion of the authentication transaction may safely trust the integrity of the secrets stored therein.

The owner key comprises a random number (or one of a set of random numbers) generated at the time of manufacture and stored only within the cryptographic processor. The owner key is transmitted to the server, encrypted using the server public key, and used as a shared secret to protect any other secrets (user passwords, credit card information, etc.) that may be stored on the server. Once a user decides they no longer wish to continue with the service, or desire to sell or transfer their CHUMBY™ device, or otherwise wish to revoke any secrets entrusted to the server, the user can instruct the cryptographic processor to delete the key from memory, thereby abolishing the server's ability to decrypt the secrets entrusted to it.

A user of the device 102 may opt-out of privacy mode and provide identifying information, as required by some billing services such as credit cards and banks. Optionally, an anonymous cash-based transaction network can be established where accounts are opened and managed only by secrets contained within the hardware module.

To enable limited revocation of user-identifying information, the specific embodiment of the master authentication protocol should operate on a set of clean-room servers with a multiplicity of connections that are trusted by the CHUMBY™ service provider 106, and authenticated session keys are then passed on laterally to the content servers. Thus, the anonymity of the master authentication key is nominally preserved, although it is possible to recreate and correlate transactions from forensic logs and transaction timings. The use of multiple servers and multiple connections, along with network routing randomization techniques, can be used to increase the anonymization resistance to forensic logging (cf. Tor network), but this configuration is in no way essential to the network's operation.

Example CHUMBY™ Device Calibration, Registration and Account Management

Attention is now directed to FIGS. 14-21, which are a set of flowcharts representative of the calibration, registration and initial operation of a CHUMBY™ device and associated account management functions.

Initial Power-Up

FIG. 12 is a flowchart 1400 which depicts an exemplary sequence of operations performed by a CHUMBY™ device 102 upon initial power-up. When a user initially connects a CHUMBY™ device 102 to a power source, the device 102 undergoes a touchscreen calibration process described below with reference to FIGS. 15-16 (stage 1404). The device 102 then selects a wireless base station in the manner described below with reference to FIG. 17 (stage 1408). If a proxy server is identified (stage 1412), then information relating to the proxy server is configured into the CHUMBY™ device 102 to enable it to with the Web site maintained by the service provider 106 (as well as with the Web sites of content providers) (stage 1416). At this point the user of the CHUMBY™ device 102 is prompted to set the time zone in which the device 102 is located (stage 1420). If an NTP server is determined to be available (stage 1430), then time is set automatically based upon information acquired from such a server (stage 1440). If not, the CHUMBY™ device 102 is referenced to a time set manually (stage 1444). After the time of the CHUMBY™ device 102 has been set, the registration process described below with reference to FIG. 18 is initiated (stage 1450).

In one embodiment a CHUMBY™ device downloads configuration information from the service provider 106 each time it is powered on or otherwise re-establishes communication with the service provider 106. However, a minimal amount of widget and configuration information may be locally stored on a CHUMBY™ device so that it may continue to function in the absence of network connectivity. For example, a clock widget may be permanently stored on a CHUMBY™ device so that its clock function could remain operational at all times. A CHUMBY™ device will typically include sufficient memory capacity to hold configuration information received from the service provider 106 for all of the widgets to be executed by the device, up to some reasonable number of widgets. If a user changes the configuration for a CHUMBY™ device through the Web site maintained by the service provider 106, a polling function implemented on the corresponding CHUMBY™ device will typically be used to "pull" the modified configuration information from the service provider 106. Alternatively, an operation may be manually initiated via the interface of the corresponding CHUMBY™ device in order to obtain this information (e.g., an "Update My CHUMBY™ Device Now" operation).

Example Widget Selection, Removal and Configuration

Attention is now directed to FIGS. 13-16, 20 and 21, which are a set of flowcharts representative of Web-based widget selection, removal and configuration processes contemplated by embodiments of the present invention. Screen shots of exemplary user interfaces presented by the Web browser 122 or, alternatively, the screen 320 of the applicable CHUMBY™ personal audiovisual device 102, which are used to facilitate certain of these processes are illustrated in FIG. 17.

Overview of Widget Management Process

Figure 13:
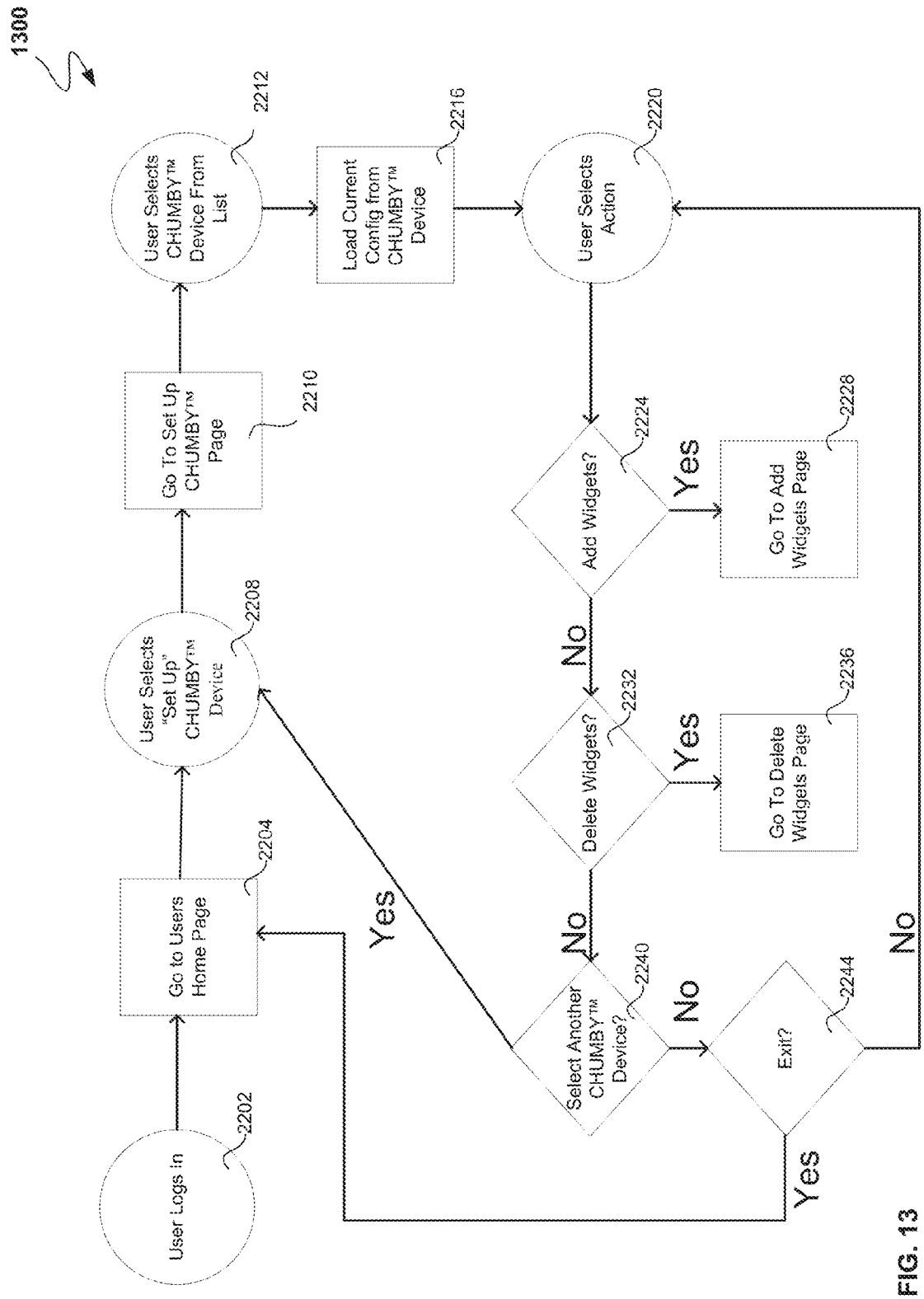
FIG. 13 is a top-level flowchart of exemplary Web-based or CHUMBY™ device-based interaction between a device user and the service provider with regard to adding, removing and configuring widget profiles relative to the user's CHUMBY™ personal electronic device.

Turning now to FIG. 13, a top-level flowchart 2200 is provided of exemplary Web-based interaction occurring between a device user and the service provider 106 with regard to adding, removing and configuring widget profiles relative to the user's CHUMBY™ device. Alternatively, this interaction between a device user and the service provider 106 may be effected through user interface screens presented by the user's CHUMBY™ device in lieu of the Web browser 122. Although a user may have the impression that a CHUMBY™ device itself is being configured through the process of FIG. 13, in the exemplary embodiment a profile currently assigned to the user's CHUMBY™ device is instead configured.

As shown in FIG. 13, the user logs in to the user's account maintained with the service provider 106 via a Web browser 122 (stage 2202) and proceeds to the user's "home page" or the equivalent (stage 2204). From this home page the user selects a "Set Up" device tab or the like (stage 2208) and the Web browser 122 presents a corresponding "Set Up" page (stage 2210). The user then selects the CHUMBY™ device profile to be configured from a list based upon either the device's serial number or description (stage 2212). The current configuration for the selected device profile is then retrieved from the system database 712 and loaded into the device (stage 2216). Once this has occurred the user selects an action to be performed, as is illustrated by FIG. 17A (stage 2220). Such actions may include, for example, adding, deleting or editing widget profiles. If the user opts to add widget profiles (stage 2224), then the Web browser 122 displays an "Add Widgets Page" through which widget profiles may be added to the current configuration of the applicable CHUMBY™ device in the manner described below with reference to FIG. 14 (stage 2228). If the user instead chooses to delete widget profiles from such current configuration (stage 2232), then a "Delete Widgets Page" is presented through which the deletion operation may be completed consistent with the approach described below with reference to FIG. 15 (stage 2236). Alternatively, the user may select another CHUMBY™ device profile to configure (stage 2240), or simply exit and return to the user's home page (stage 2244).

Figure 20:
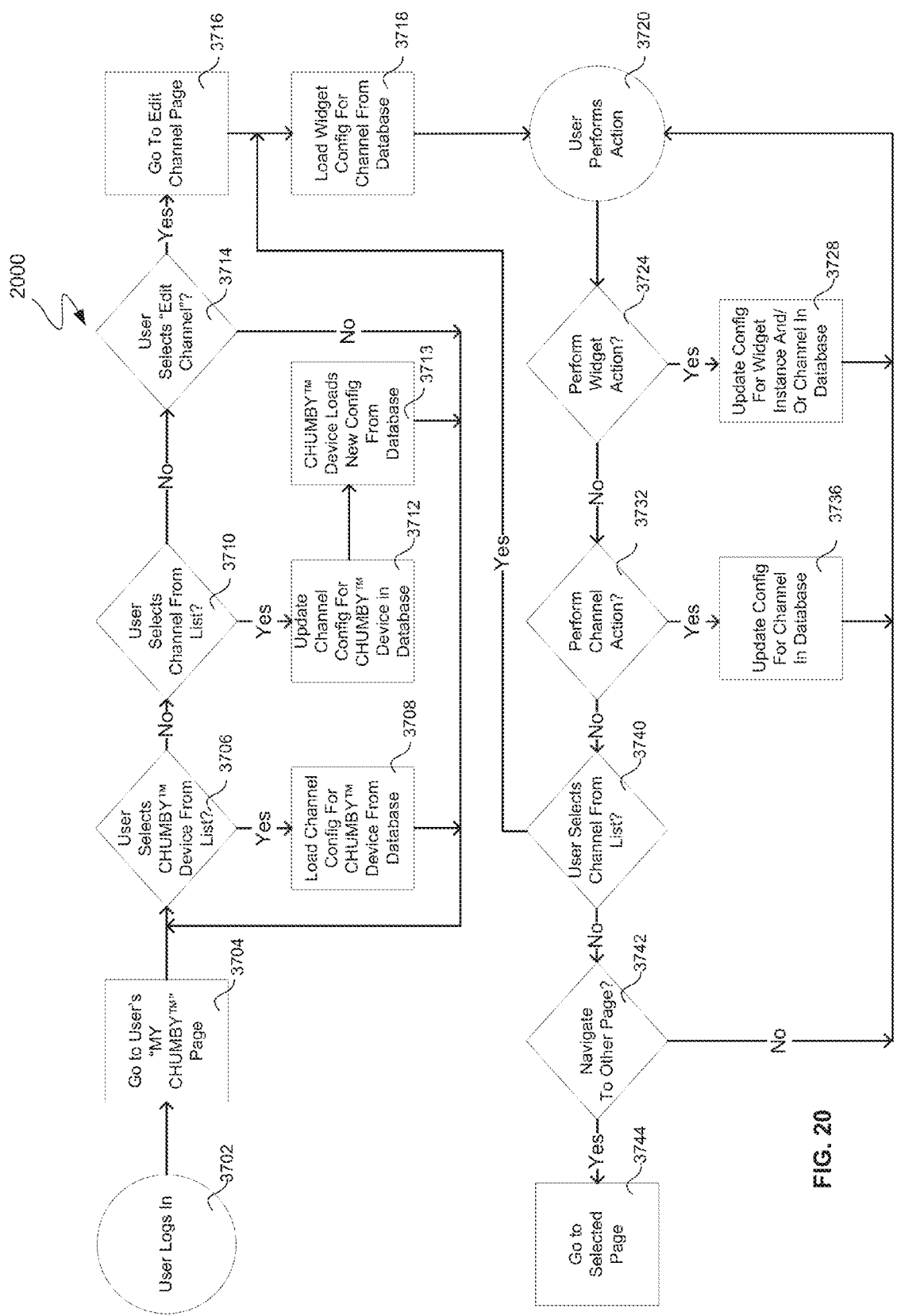
FIG. 20 is a top-level flowchart of exemplary Web-based interaction between a device user and the service provider with regard to adding, removing and configuring widget profiles relative to the user's CHUMBY™ device.

Turning now to FIG. 20, an alternate top-level flowchart 3700 is provided of exemplary Web-based interaction occurring between a device user and the service provider 106 with regard to adding, removing and configuring widget profiles relative to the user's CHUMBY™ device. Although a user may have the impression that a CHUMBY™ device itself is being configured through the process of FIG. 20, in the exemplary embodiment a profile currently assigned to the user's CHUMBY™ device is instead configured.

Figure 22A:
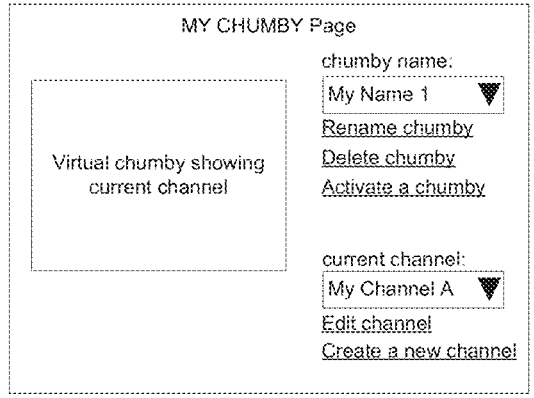
FIGS. 22A-22H are screen shots of exemplary user interfaces presented by a Web browser used to facilitate certain of the processes described by FIGS. 16 and 20-21.
Figure 22B:
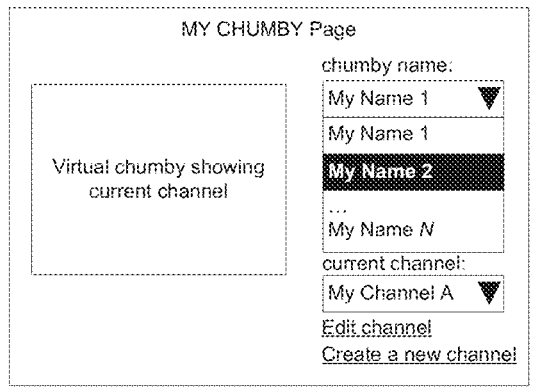
Figure 22C:
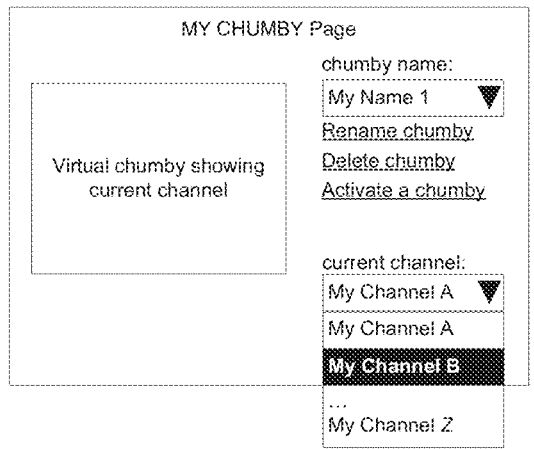
Figure 22D:
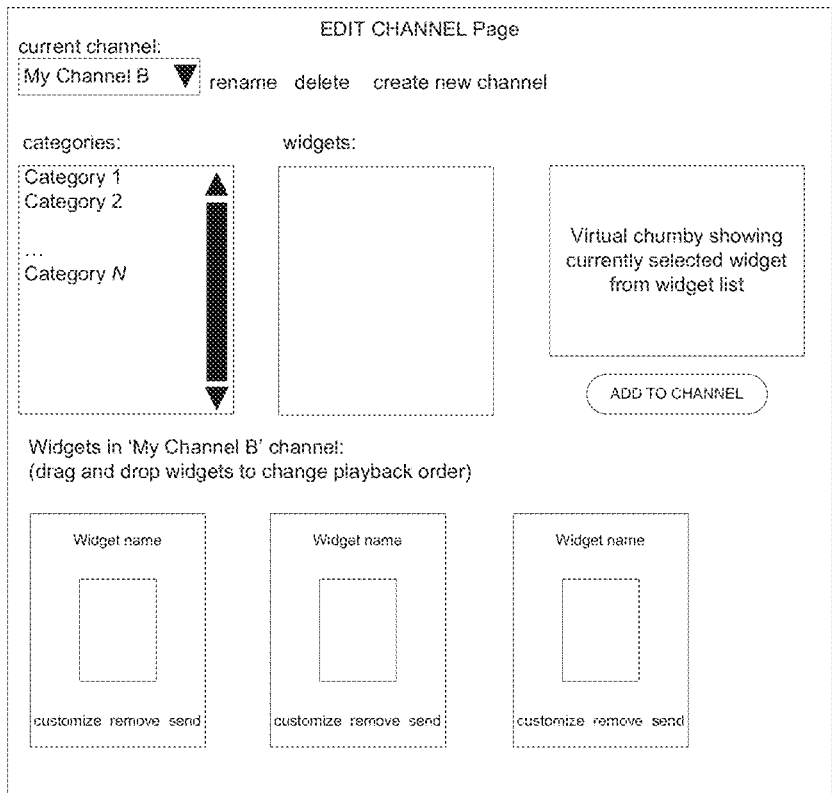

As shown in FIG. 20, the user logs in to the user's account maintained with the service provider 106 via a Web browser 122 (stage 3702) and proceeds to the user's "MY CHUMBY™ page" or the equivalent, as is illustrated by FIG. 22A (stage 3704). From this MY CHUMBY™ page the user optionally selects the CHUMBY™ device to be configured from a list or the like, as is illustrated by FIG. 22B (stage 3706) and the Web browser 122 loads the currently configured widget channel into the current page (stage 3708). The user then optionally selects the CHUMBY™ widget channel to be configured from a list or the like, as is illustrated by FIG. 22C (stage 3710). The current channel configuration for the selected CHUMBY™ device is then updated in the system database 712, loaded into the current page (stage 3712) and loaded by the currently selected CHUMBY™ device (stage 3713). At any point the user may select the "Edit Channel" option (stage 3714), following which a "Edit Channel Page" is presented, as is illustrated by FIG. 22D (stage 3716), with the widget configuration for the selected channel is loaded into the page (stage 3718). Once this has occurred, the user may select an action to be performed (stage 3720). Such actions may include, for example, changing, renaming, deleting or creating new widget channels; adding widgets to, removing widgets from, changing playback order of widgets within or configuring widgets within the selected channel. If the user opts to perform a widget action (stage 3724), then the widget instance for the affected widget and/or the configuration for the selected channel within the system database 712 are updated, which subsequently effects a corresponding update to the local copy of the channel configuration of all CHUMBY™ devices currently "playing" the selected channel (stage 3728). If the user opts to perform a channel action (stage 3732), then the configuration for the selected channel within the system database 712 is updated which subsequently effects a corresponding update to the local copy of the channel configuration of all CHUMBY™ devices currently "playing" the selected channel (stage 3734). Alternatively, the user may select another channel to configure (stage 3740), or navigate to another page (stages 3742, 3744).

Adding Widgets

Figure 14:
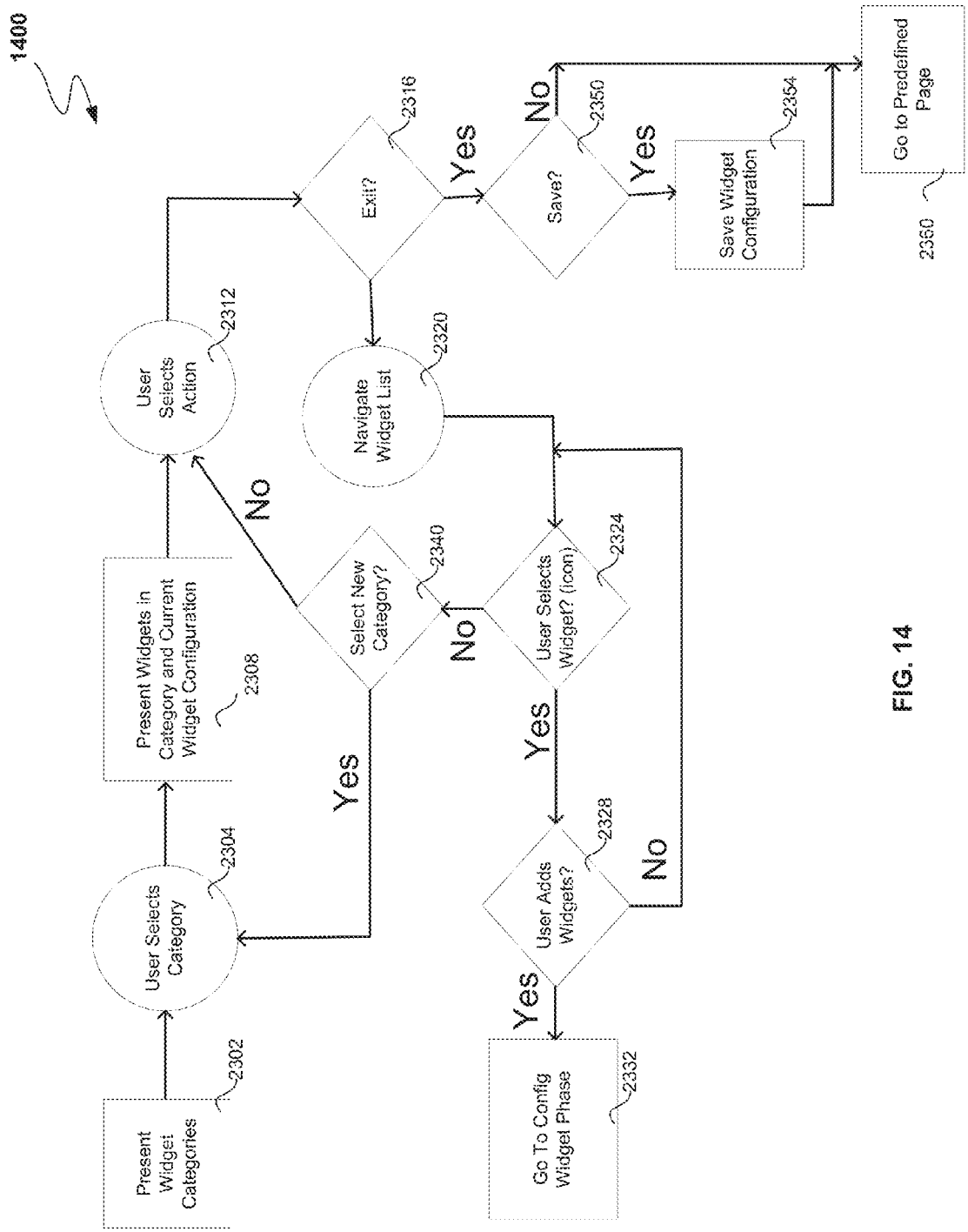
FIG. 14 is a flowchart representative of exemplary Web-based or CHUMBY™ device-based interaction between a device user and the service provider with respect to the addition of widgets to the current configuration of the user's CHUMBY™ device.

FIG. 14 is a flowchart 2300 representative of exemplary Web-based interaction occurring between a device user and the service provider 106 with respect to the addition of widgets to the current configuration of the user's CHUMBY™ device. Alternatively, this interaction between a device user and the service provider 106 may be effected through user interface screens presented by the user's CHUMBY™ device in lieu of the Web browser 122. In one embodiment the user is provided with the opportunity to choose, through an appropriate category selection page (see, e.g., FIG. 17B) presented by a Web browser 122, among various widget categories retrieved from the categories table of the system database 712 (stage 2302). After selecting a widget category (stage 2304), both the widgets included within the selected category and the current widget configuration of the applicable CHUMBY™ device are presented to the user (stage 2308). The user then selects an action to perform (stage 2312) including, for example, exiting the widget addition process (stage 2316) or navigating the list of widgets presented for the selected category (stage 2320). If the latter action is selected (see, e.g., FIGS. 17C-17D), the user then selects a widget to be added to the current configuration (e.g., by selecting a corresponding icon) and the service provider 106 constructs an instance of the selected widget (stage 2324). At this point the user may also opt to add yet more widgets to the current configuration (stage 2328). Once the user has indicated that no additional widgets are to be added, a widget configuration phase (stage 2332) may be entered (see, e.g., FIG. 17E). If the user declines to select a widget while navigating the list of widgets presented for a selected category during stage 2320, a new category of widgets may be selected (stage 2340).

If the user decides to exit the process of adding widgets to the current configuration, the user may perform one of several actions, including, but not limited to: select another CHUMBY™ device to configure; navigate to another page on the CHUMBY™ site; log out from the CHUMBY™ site; or close the applicable browser window (stage 2316). If the user instead chooses to save the current widget configuration for the applicable CHUMBY™ device (stage 2350), the user selects a "Submit", "Commit", "Ok" or similar button to cause any changes made to be recorded in the system database 712 (stage 2354). After either saving the current widget configuration or electing to exit the process, the user may be directed to a predefined page (stage 2360).

Figure 21:
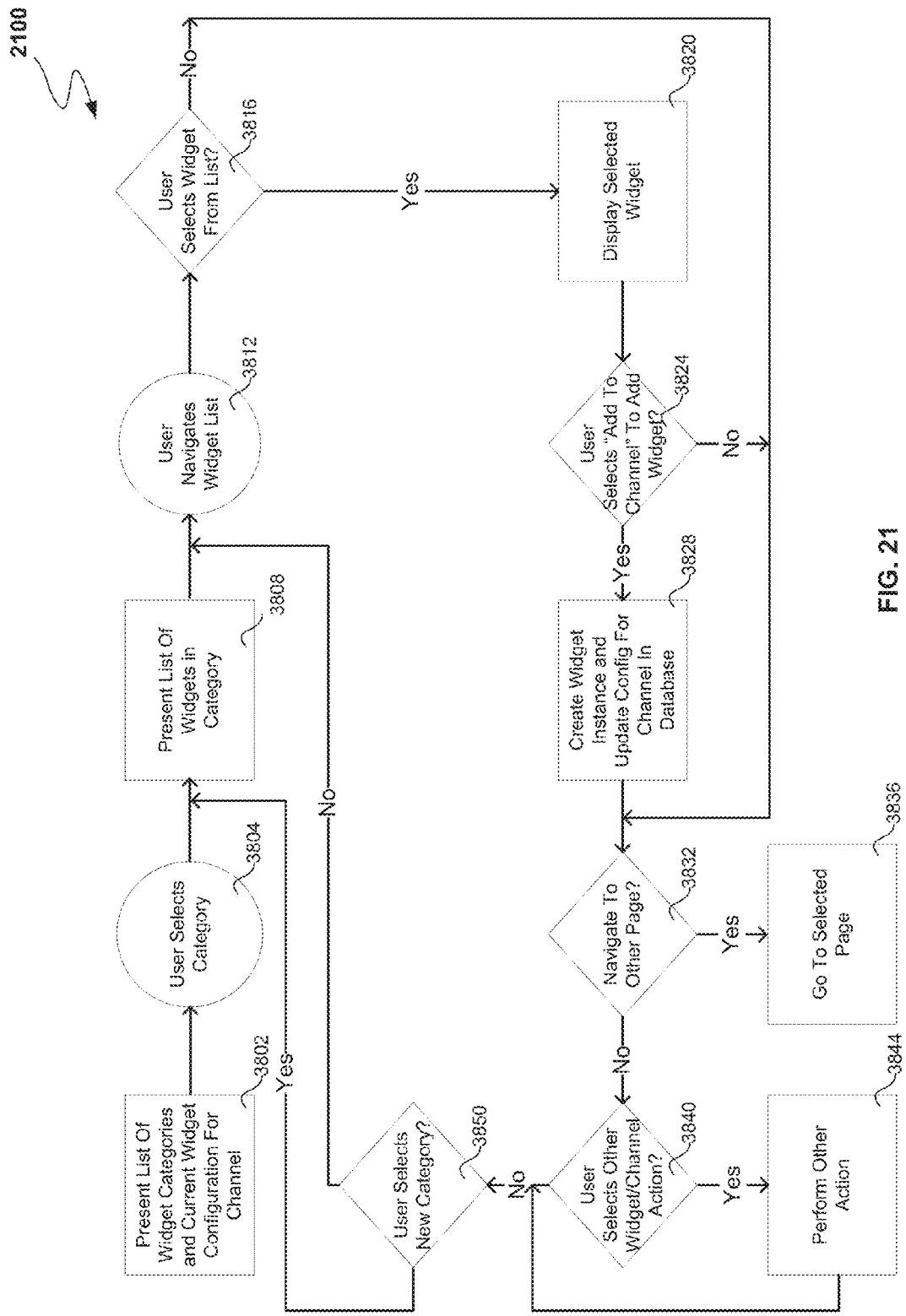
FIG. 21 is a flowchart representative of exemplary Web-based interaction between a device user and the service provider with respect to the addition of widgets to the current configuration of the user's CHUMBY™ device.

FIG. 21 is an alternate flowchart 3800 representative of exemplary Web-based interaction occurring between a device user and the service provider 106 with respect to the addition of widgets to a channel configuration. In one embodiment the user is provided with the opportunity to choose, through an appropriate category selection list on the EDIT CHANNEL Page (see, e.g., FIG. 22D) presented by a Web browser 122, among various widget categories retrieved from the categories table of the system database 712 (stage 3802). After selecting a widget category (stage 3804), the widgets included within the selected category are presented to the user, as is illustrated by FIG. 22F (stage 3808). The user then selects an action to perform including, for example, navigating to another page (stage 3832) or navigating the list of widgets presented for the selected category (stage 3812). If the latter action is selected (see, e.g., FIG. 22G), the user then selects a widget to be added to the current configuration by selecting a widget from the "widgets" list (stage 3816), which causes the selected widget to be displayed (stage 3820), and then selecting the ADD TO CHANNEL button (stage 3824), which causes the service provider 106 to construct an instance of the selected widget and update the configuration for the current channel in the system database 712 (stage 3828). At this point the user may also opt to iteratively navigate the widget list (stage 3812), select widgets (stage 3816) and add more widgets to the current configuration (stage 3824). At any time in this process, other widget and/or channel operations may be selected and/or executed by the user (stage 3840), including, but not limited to: configuring a widget instance (see, e.g., FIG. 22H), a widget deletion, altering widget playback ordering within the channel, renaming the current channel, deleting the current channel, creating a new channel and/or selecting a new category of widgets may be selected (stage 3850).

Figure 22E:
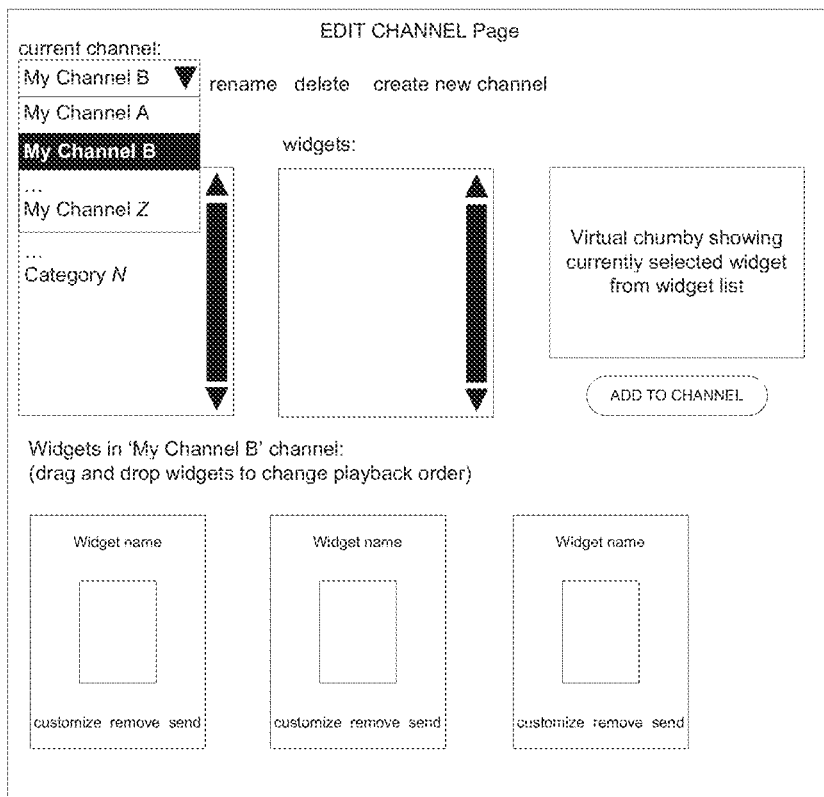
Figure 22F:
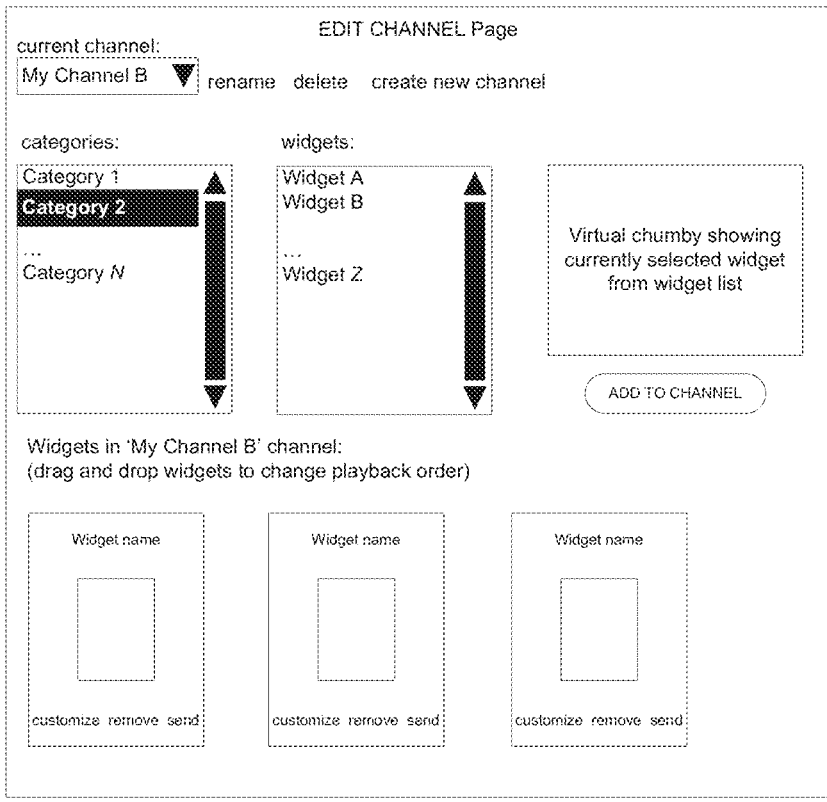
Figure 22G:
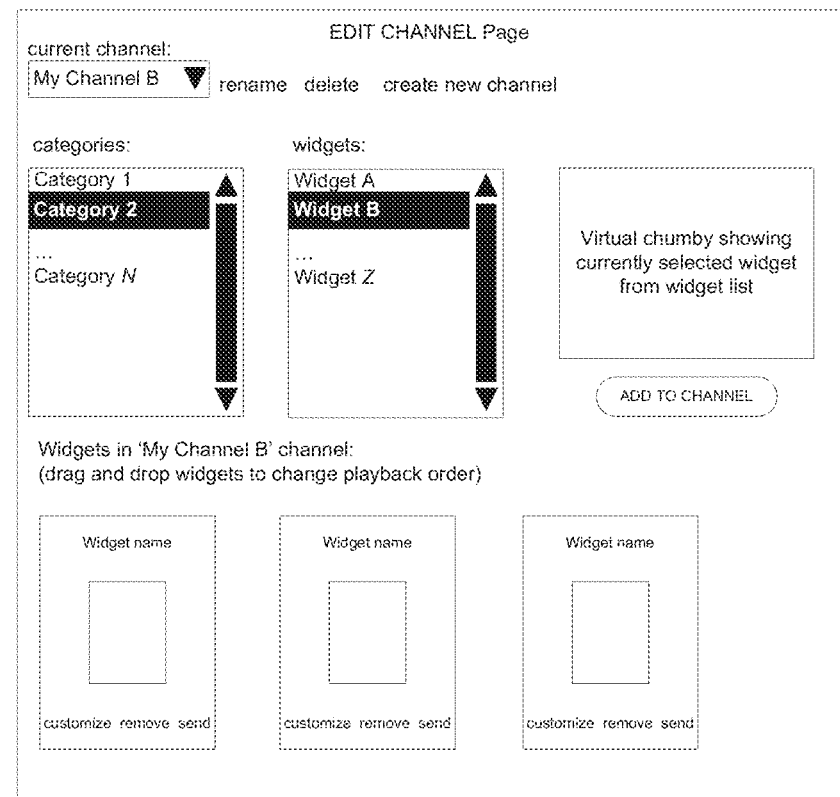

If the user decides to exit the process of adding widgets to the current configuration, the user may perform one of several actions, including, but not limited to: select another channel to configure, as is illustrated by FIG. 22E; navigate to another page on the CHUMBY™ site (stage 3832); log out from the CHUMBY™ site; or close the applicable browser window.

Widget Removal

Figure 15:
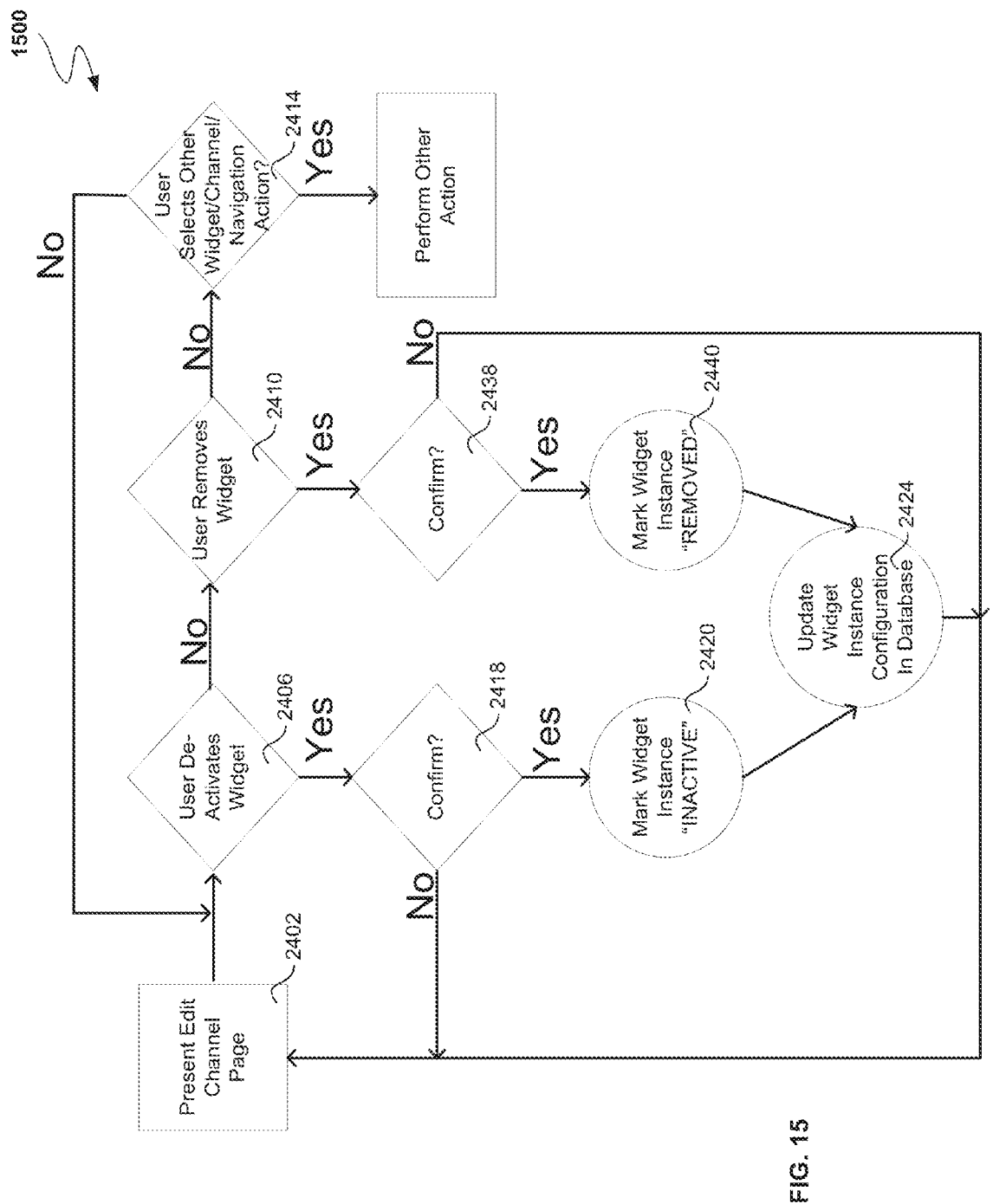
FIG. 15 is a flowchart representative of exemplary Web-based or CHUMBY™ device-based interaction between a device user and a service provider in connection with the removal of widgets from a channel, which may also be active on the user's CHUMBY™ device.

Referring now to FIG. 15, a flowchart 2400 is provided which is representative of exemplary Web-based interaction occurring between a device user and the service provider 106 in connection with the removal of widgets from the current configuration of the user's CHUMBY™ device. Alternatively, this interaction between a device user and the service provider 106 may be effected through user interface screens presented by the user's CHUMBY™ device in lieu of the Web browser 122. Upon being presented with the "EDIT CHANNEL Page", as is illustrated by FIG. 22D (stage 2402), the user may elect to either de-activate a selected widget (stage 2406), delete (or remove) a selected widget (stage 2410), or select some other widget, channel and/or page navigation operation (stage 2414). If widget de-activation is chosen, the user is prompted to confirm the choice (stage 2418). Once such confirmation has been provided the widget is marked as "inactive" on the page currently being rendered by the Web browser 122 (stage 2420). In addition, the widget instance configuration for the selected channel is updated within the system database 712 (stage 2424) and any CHUMBY™ devices currently displaying the selected channel are updated. Similarly, if it is instead chosen to delete the selected widget, the user is optionally prompted to confirm the choice (stage 2438). Once the widget is deleted or after optionally required confirmation has been provided, the widget is removed from the page currently being rendered by the Web browser 122 (stage 2440), the widget instance is "deleted" from the channel configuration in the system database 712 (stage 2424) and any CHUMBY™ devices currently displaying the selected channel are updated. If confirmation to de-activate or delete the selected widget is required, but not provided (stages 2418 and 2438), the operation is aborted.

Figure 23A:
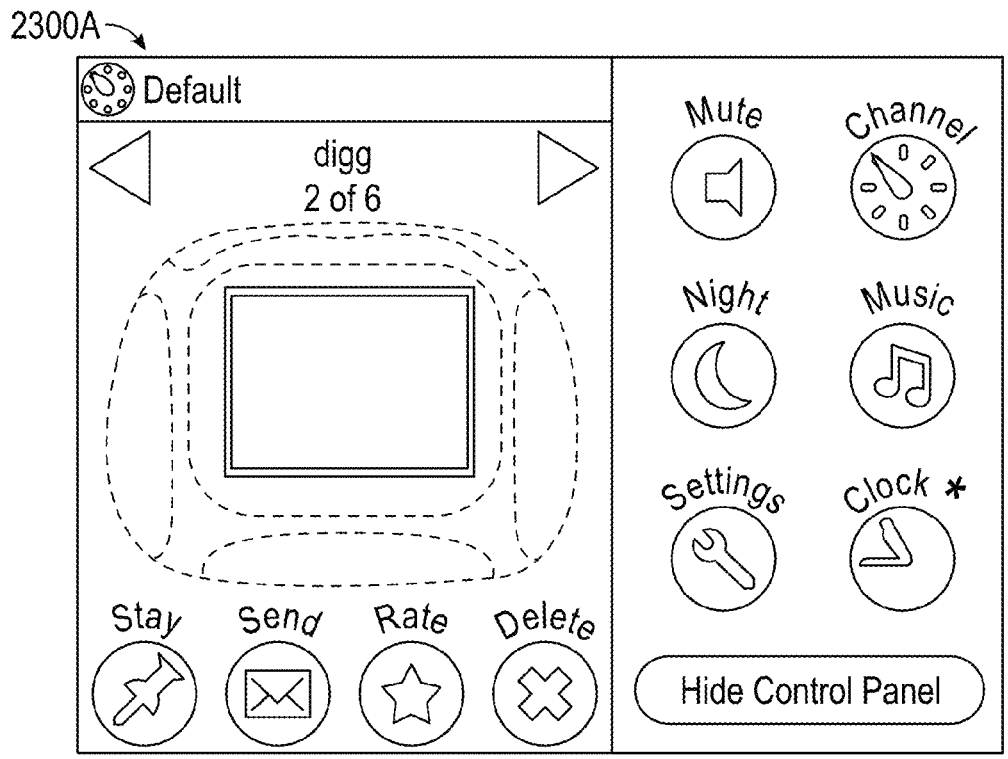
FIGS. 23A-23B are screen shots of exemplary user interfaces presented by a CHUMBY™ personal electronic device used to facilitate certain of the processes described by FIG. 15.
Figure 23B:
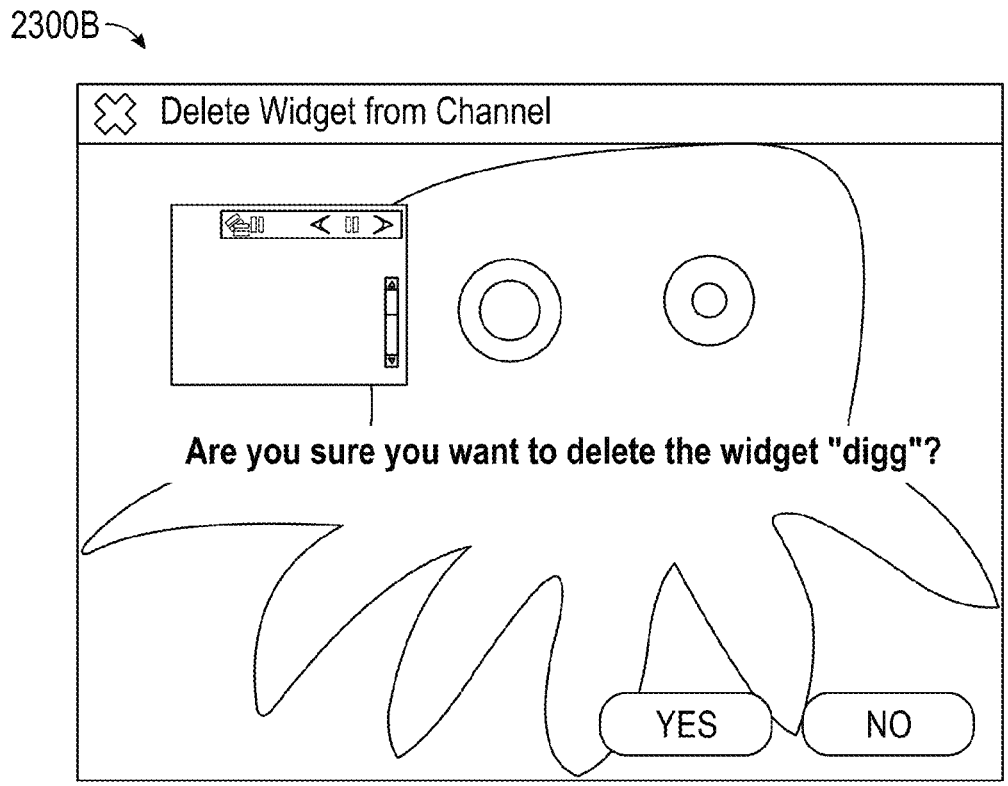
Figure 24:
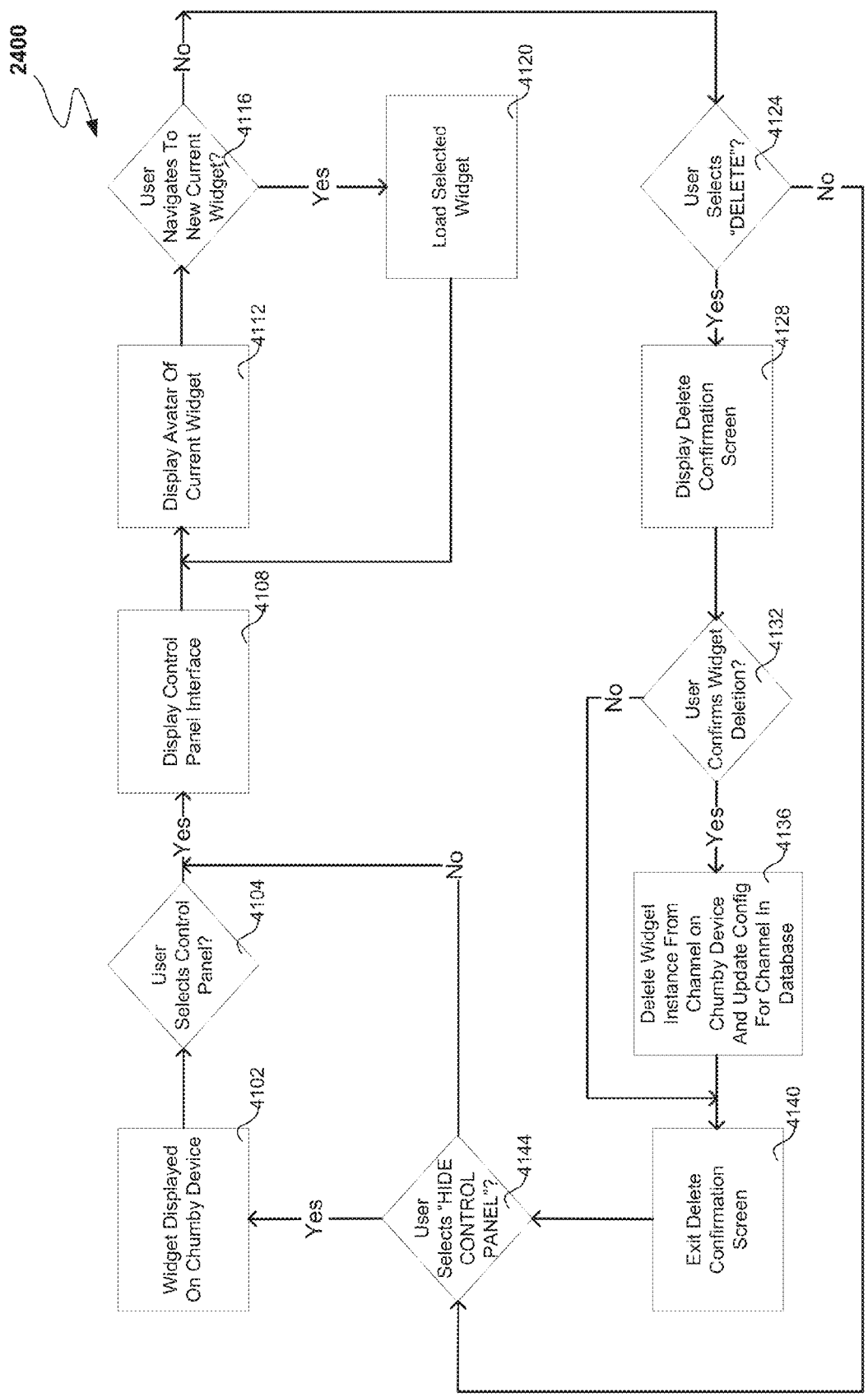
FIG. 24 is a flowchart representative of exemplary CHUMBY™ device-based interaction between a device user and a service provider in connection with the removal of widgets from the current channel of the user's CHUMBY™ device.
Figure 25:
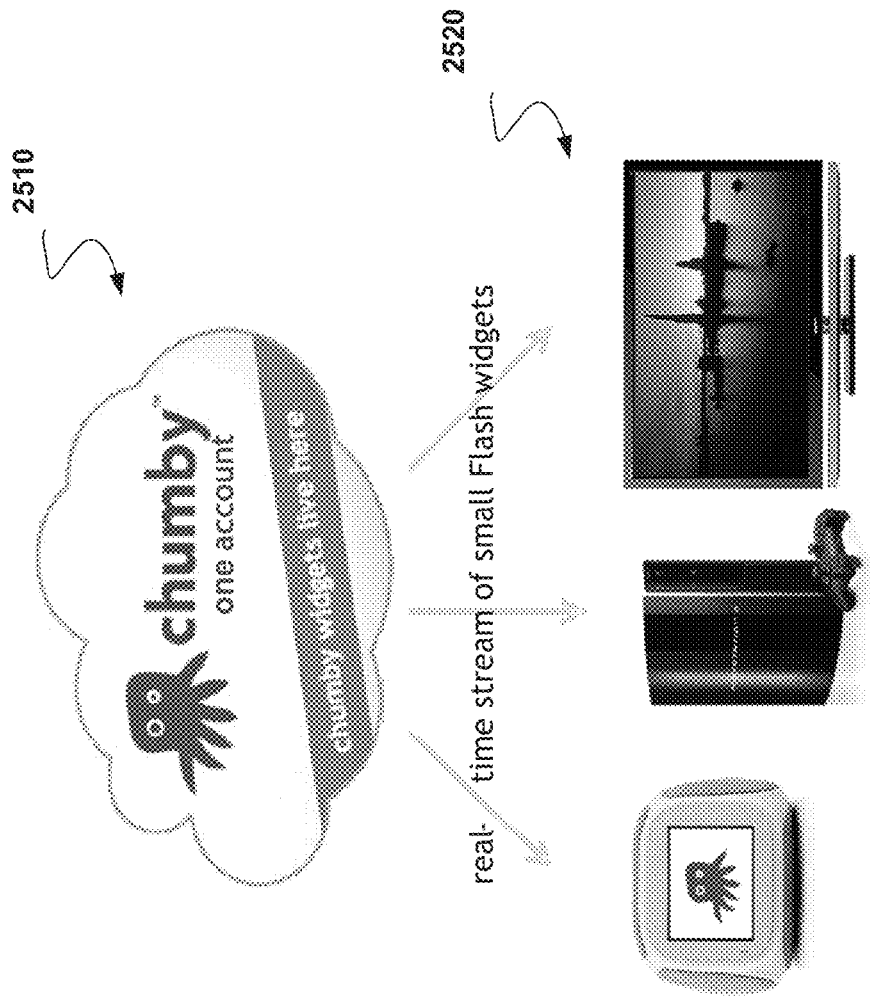
FIGS. 25-28 illustrate an exemplary manner in which Internet-based cloud services and content may be delivered to a variety of Internet-connected, CHUMBY™-enabled client devices.
Figure 26:
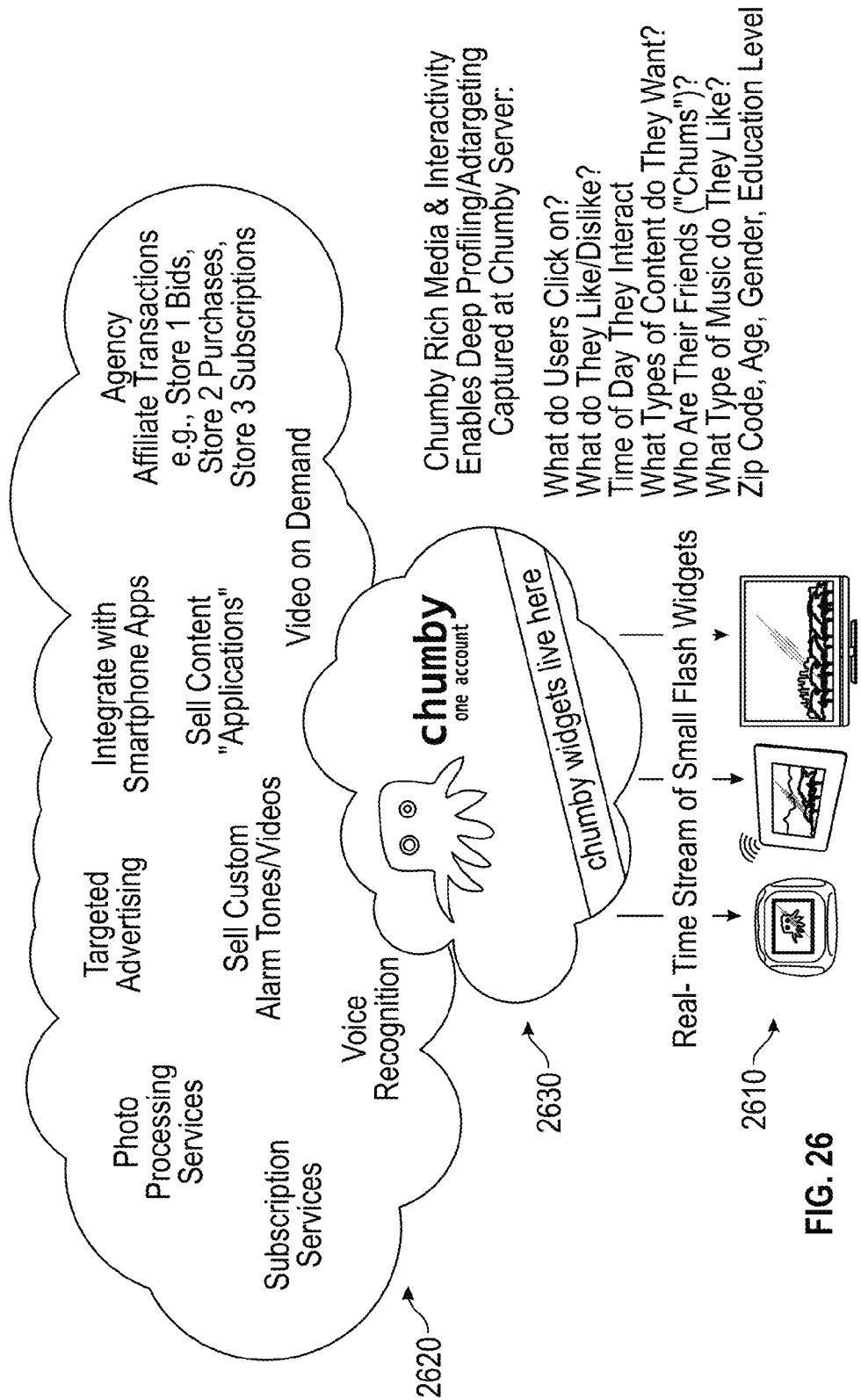
Figure 27:
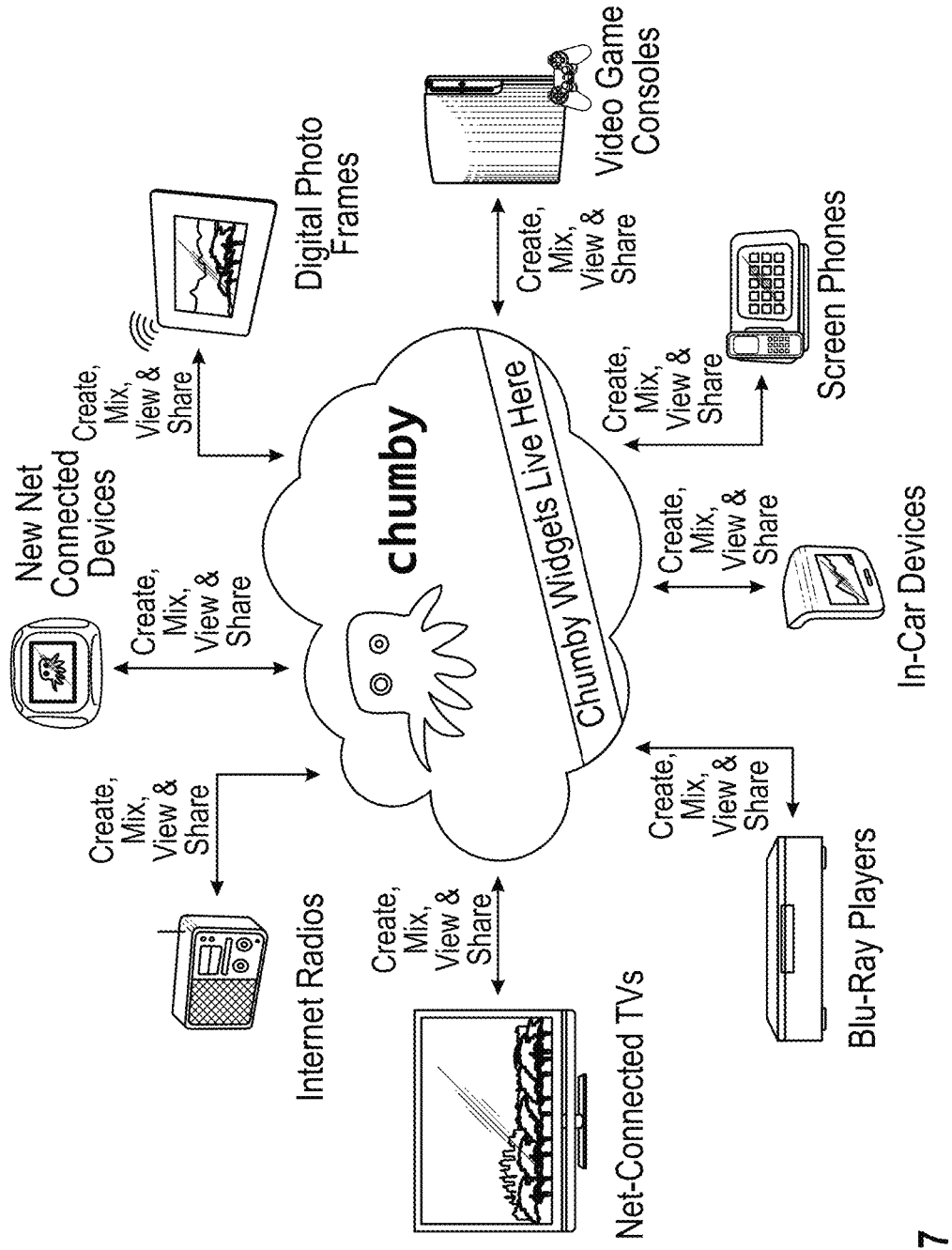

Referring now to FIG. 24, an alternate flowchart 4100 is provided which is representative of exemplary interaction occurring, via the CHUMBY™ device of a user, between such user and the service provider 106 in connection with the removal of widgets from the current configuration of the user's CHUMBY™ device. With a widget displayed on the screen 320 of the CHUMBY™ device (stage 4102), the user performs the gesture which selects the Control Panel (stage 4104). Upon being presented with the Control Panel, as is illustrated by FIG. 23A (stage 4108), which displays the avatar for the current widget (stage 4112), the user may optionally use the widget navigation controls to singly or iteratively select a new current widget (stage 4116), in which case the new current widget is loaded (stage 4120) and its avatar displayed (stage 4112). The user may then elect to delete (or remove) the current widget by selecting DELETE (stage 4124). If widget deletion is chosen, the user is prompted to confirm the choice, as is illustrated by FIG. 23B (stage 4128). If the user confirms the deletion (stage 4132), the widget instance is deleted from the channel on the CHUMBY™ device and the widget instance is "deleted" from the channel configuration in the system database 712 (stage 4136). If confirmation is not provided, the operation is aborted. At this point, the delete confirmation screen is exited (stage 4140) and the Control Panel is displayed. The user has the option to select HIDE CONTROL PANEL (stage 4144), which exits the control panel and resumes normal widget play.

Widget Configuration

Figure 16:
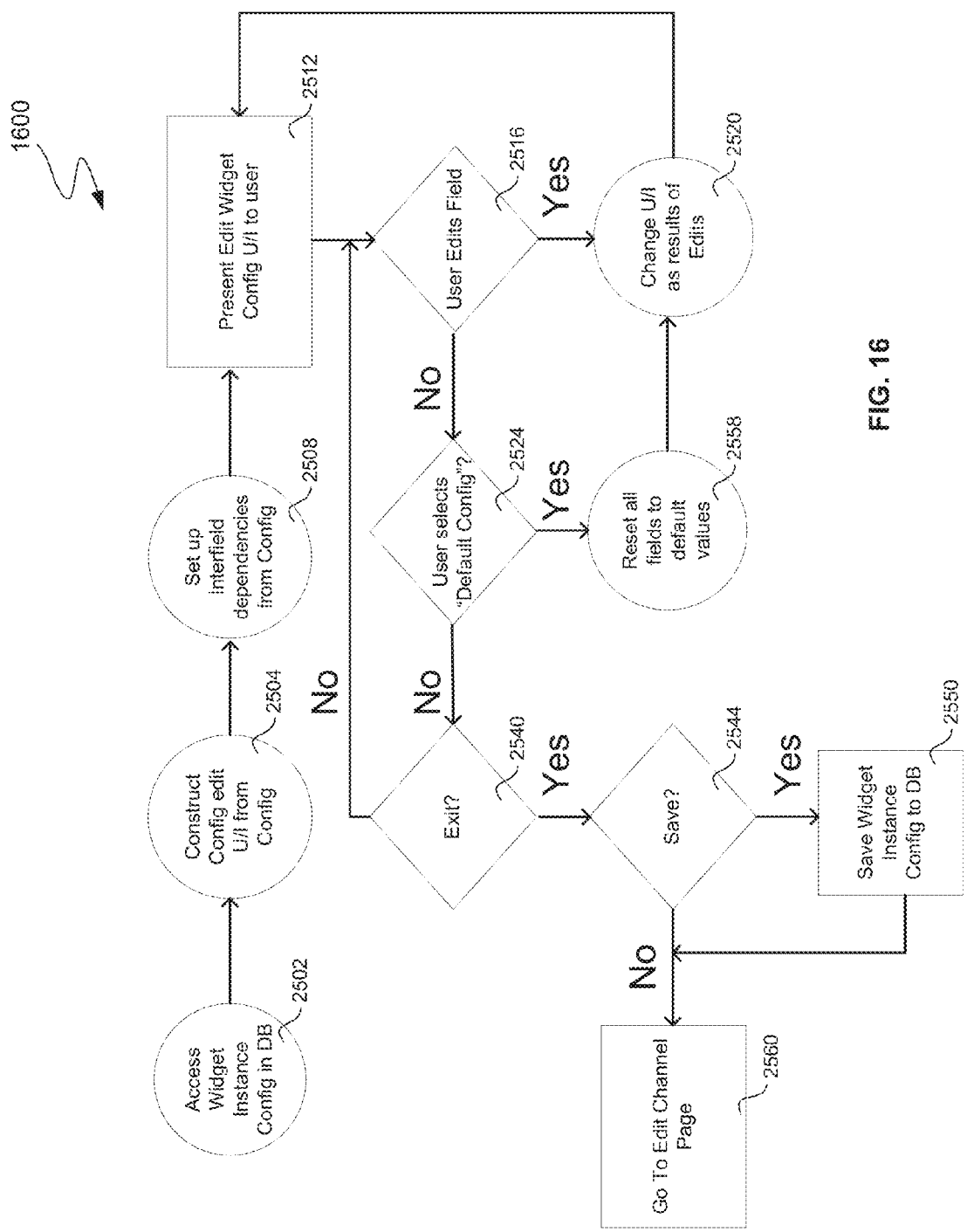
FIG. 16 is a flowchart depicting an exemplary set of operations involved in configuring parameters specific to one or more widgets currently associated with a given CHUMBY™ device.
Figure 22H:
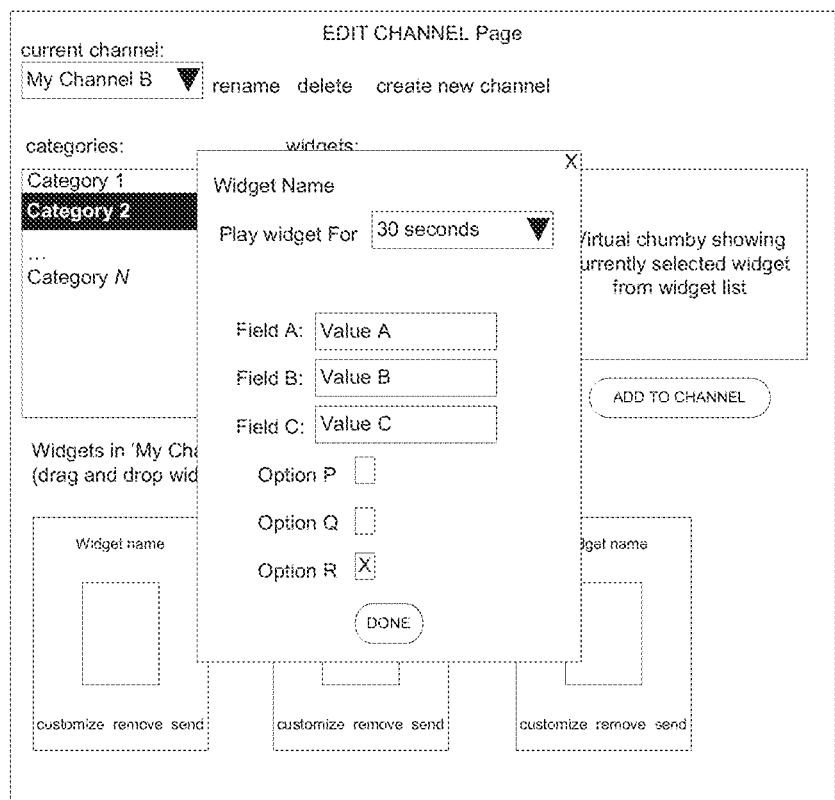

FIG. 16 is a flowchart 2500 depicting an exemplary set of operations involved in configuring parameters specific to of one or more widgets currently associated with a given CHUMBY™ device. The process is initiated by accessing the configuration of a selected widget instance maintained within the system database (stage 2502). An appropriate user interface through which the existing configuration of the selected widget may be edited is then generated based upon such existing configuration (stage 2504). This may involve, for example, establishing various inter-field dependencies based upon the existing configuration (stage 2508). Once the user interface has been generated it is presented to the user via a Web browser 122 in order to enable desired changes to the configuration to be made, as is illustrated by FIG. 22H (stage 2512). If a user elects to edit one or more fields presented by the interface (2516), the user interface defining the widget configuration is correspondingly changed (stage 2520). If a user elects to not edit any of these fields, the user is given the option of selecting a "default configuration" (stage 2524). To the extent this option is selected, all fields are reset to default values (stage 2528); otherwise, the user is given the option to exit the process or return to stage 2516 (stage 2540). When the process is exited, the user is given the option of saving the edited version of the configuration in the system database 712 (stage 2544). If this option is selected, the current widget configuration is saved to the database 712 (stage 2550). The "Edit Channel Page" is then presented to the user, irrespective of whether or not the user elected to save the widget configuration (stage 2560).

In an exemplary embodiment the service provider 106 populates a corresponding widget and parameters tables within the system database in accordance with the user's parameter selections. In this regard the widget table may include an XML-based "param_desc_xml" field containing instructions enabling the construction of associated records in parameters table. For example, for a "clock" widget the XML-based instructions could indicate that a time zone should be a valid parameter, and could also be utilized to create appropriate records in the parameters table.

Distribution of Electronic Greetings Among CHUMBY™ Devices

Users of CHUMBY™ devices may be provided with an interface to allow to facilitate sending electronic greeting cards in the form of rich Flash animations. Upon visiting a predefined web site (e.g., http://greetings.chumby.com) and optionally being authenticated by presenting appropriate credentials, a user will be presented with a catalog of "CHUMBY™ Greetings". In one embodiment access to certain "CHUMBY™ Greetings" may be dependent on membership status. Any authenticated user, irrespective of the number of registered CHUMBY™ devices, will have the permission to send CHUMBY™ Greetings to one or more arbitrary email addresses or, alternatively, one or more users registered with the CHUMBY™ network. If a visitor to the web site is aware of the globally and temporally unique email address of an existing CHUMBY™ device, the account name in which the CHUMBY™ device is registered, or other means of identifying individual CHUMBY™ devices, they may specify CHUMBY™ Greetings to be forwarded directly to such a device using the existing widget transfer infrastructure of the service provider 106. Upon receipt at the CHUMBY™ device, the transferred CHUMBY™ Greetings will be added to the channel or profile in which the recipient has designated for receipt of widgets or other delivered content. Once the widget has been delivered to a channel or profile, the recipient will have the option of accepting or rejecting the delivered content. In the event that a user accepts the CHUMBY™, the CHUMBY™ Greeting will be added to the recipient's widget slideshow rotation in accordance with the applicable profile of the device. In one example, a visitor to the web site may choose to assign a certain level of priority to a CHUMBY™ Greeting such that it may be displayed by the recipient CHUMBY™ device immediately following actuation of the device's alarm function. Alternatively, a priority assigned to a CHUMBY™ Greeting may define the placement of the CHUMBY™ Greeting in the recipient's widget rotation.

CHUMBY™ Greetings sent to email addresses that are not bound to physical CHUMBY™ devices will be forwarded as an SMTP email message. This message will originate from, for example, "greetings@chumby.com" (or a user supplied email address), and will contain a URL or hyperlink pointing to a temporary web page hosting the Flash movie comprising the CHUMBY™ Greeting in addition to an optional user-defined message. Authenticated users will have the ability to select one or more peers from their CHUMBY™ "Buddy List" as recipients of a preconfigured CHUMBY™ Greeting. In one embodiment of CHUMBY™ Greetings, a subscription may be required for access to certain features such as CHUMBY™ Greetings. In such an embodiment, users subscribing to the CHUMBY™ Network will have access to "premium" CHUMBY™ Greetings. In one embodiment, CHUMBY™ may wish to elect a "pay-per-view" model where the use of a "premium" CHUMBY™ Greetings may be charged as a micro-transaction. In one embodiment, CHUMBY™ Greeting recipients that are not bound to physical CHUMBY™ devices will be presented with an option to forward the CHUMBY™ Greeting to alternate email addresses or physical CHUMBY™ devices.

CHUMBY™ Channels

In certain embodiments profiles pertinent to various specialty interests or activities (e.g., sports, cooking) may be developed and maintained by the service provider 106 or other users of CHUMBY™ devices. Each such profile, or "channel", could be subscribed to by interested users of CHUMBY™ devices. This may be considered a special case of mirroring to a "virtual" CHUMBY™ device as described above, but would further involve effort on the part of the "owners" of each channel to keep its widget set and other content updated. Channels could somewhat broadly focus upon a particular subject (e.g., recipes, football), or could be more specific in nature (e.g., vegetarian recipes, NFL football).

Overview of CHUMBY™ Cloud Services for CHUMBY™-Enabled Clients

FIGS. 25-28 illustrate an exemplary manner in which Internet-based cloud services and content may be delivered to a variety of Internet-connected, CHUMBY™-enabled client devices. As is discussed below, each CHUMBY™-enabled client device may be configured with CHUMBY™ client software capable of executing widgets provided via an Internet-based central service provider. The service provider typically stores a repository of widgets and has access to other content capable of being communicated to a given CHUMBY™-enabled client device. A wide range of consumer electronics devices may potentially be configured as CHUMBY™-enabled client devices including, for example, digital photo frames, Internet-connected televisions, CHUMBY™ devices (see, e.g., FIGS. 1-4), Internet radios, Internet tablets, Blu-Ray players, VOIP phones and videogame consoles. It is a feature of embodiments of the invention that all of these devices can be registered against a single user account and share the same widgets, content and configuration; thereby providing a consistent, easy-to-use, rich media Internet user experience.

The CHUMBY™-enabled client devices may typically be configured either through a user computer (not shown) disposed for communication with the service provider or directly through the user interfaces of such client devices. When a user computer is utilized, a user may configured one or more CHUMBY™-enabled client devices through interaction with a Web browser displaying pages generated by the central service provider. As mentioned above, such configuration may include, for example, specifying a set of widgets (i.e., small, Flash-based applications which present content, media, services and the like to the user via a CHUMBY™-enabled client device) to be sent to a particular CHUMBY™-enabled client device and their sequence of execution. Such configuration may further include adjusting audio or visual parameters relating to such execution, defining and managing a user's CHUMBY™ network, and defining the layout or other aspects of the user interface presented through the screen of the CHUMBY™-enabled client device.

In one embodiment each CHUMBY™-enabled client device includes an Open Source software stack built on a Linux core. Services and utilities such as btplay, httpd, zeroconf and DLNA plug into the Linux core. Adobe Flash Lite 3.x is used as the presentation and content/media rendering layer enabling the chumby network and CHUMBY™ widgets to provide a flexible, adaptable rich media experience to users or CHUMBY™-enabled client devices. With the exception of the Adobe Flash component, in one embodiment the entire CHUMBY™-enabled client software stack is Open Source. In one embodiment user interface and widget player of each CHUMBY™-enabled client device are written entirely in Adobe Flash. This enables the appearance of the user interface elements to be easily adapted to various screen sizes, orientations and device types.

Due to the open nature of the CHUMBY™ client software, it is easily ported to a broad variety of architectures and devices. In one embodiment a client device requires only a compatible version of Flash and an IP-based connection to the Internet to be capable of being configured to operate as a CHUMBY™-enabled client device. Although in certain implementations it is preferred that a CHUMBY™-enabled client device include a Linux operating system, this is not requirement and it is possible to port the CHUMBY™ client software to any number of device operating systems including, for example, variants of Microsoft Windows.

During operation of a CHUMBY™-enabled client device, software comprising widgets or other applications is received from the central service provider is stored within memory for execution by the processor of the device. In one embodiment widgets are downloaded from the service provider 106 to CHUMBY™ devices in the format of a Flash Lite file, also referred to as a "Flash movie". The memory of the device also includes a Flash Player for playing the widgets received by the device.

Figure 28:
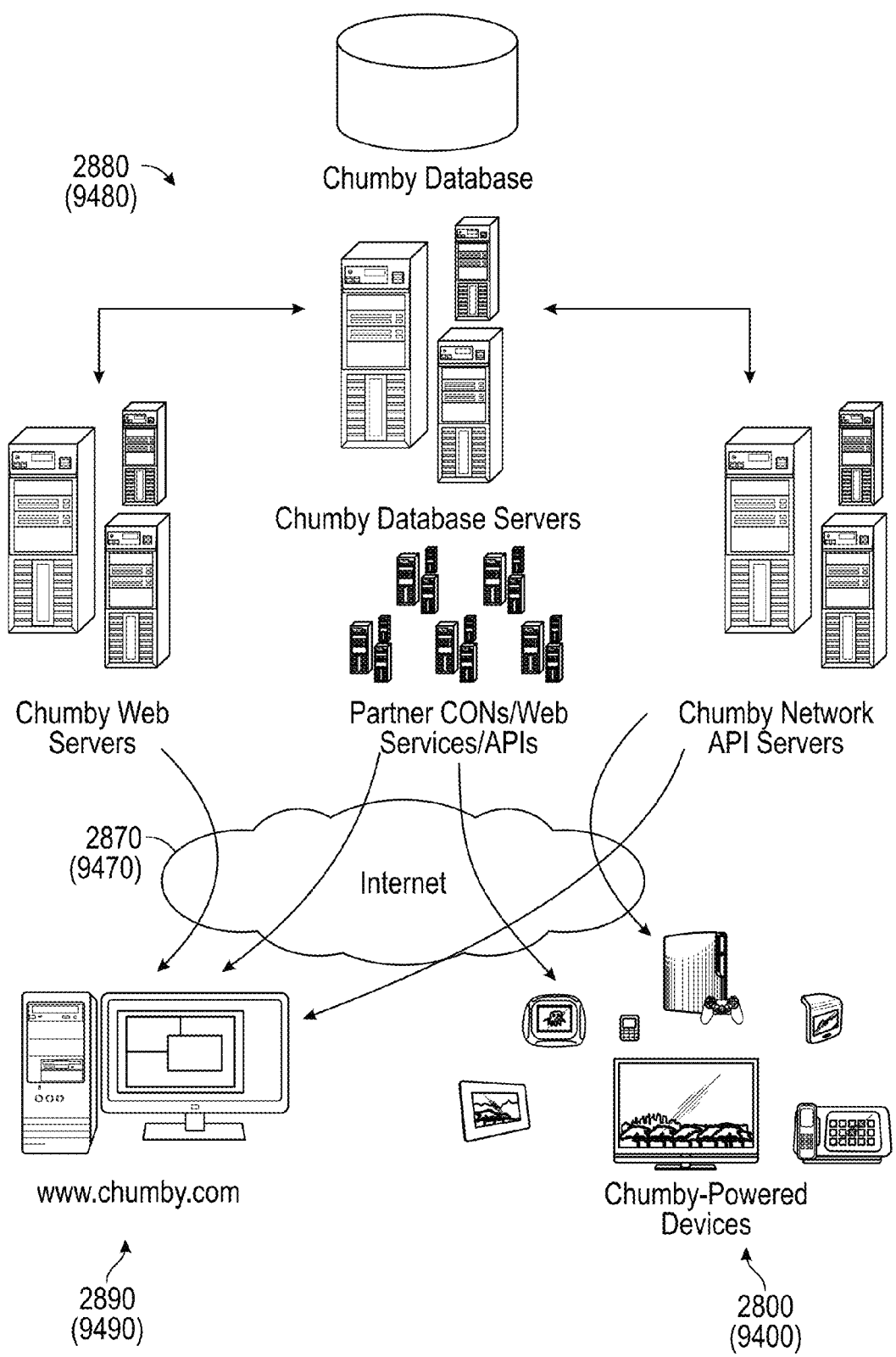

Referring to FIG. 28, in one embodiment the CHUMBY™ cloud services are delivered through a web-based application (the "CHUMBY™ network application") that runs on redundant, load balanced, Linux-based Sun servers. The data layer may be implemented on a MySQL cluster and the application, presentation and services layers may be implemented in Ruby on Rails.

As is described hereinafter, the CHUMBY™ network may be configured to provide at least the following services.

1. A user-facing web site at, for example, www.chumby.com, which provides an intuitive, easy to use interface for CHUMBY™ users to activate, manage and configure all of their CHUMBY™-enabled client devices; manage and configure their CHUMBY™ widgets and channels ("playlists" of widgets); and manage their CHUMBY™ social network of friends and family ("chums"). The CHUMBY™ web site may also supports the open platform developer community through developer mini-sites for widget, software and hardware development.

2. An XML-based web services API which the supports the activation, management, configuration, operation of and widget delivery to all CHUMBY™-enabled client devices. All CHUMBY™-enabled client devices activated on the CHUMBY™ network preferably retrieve their configurations and widgets via the CHUMBY™ network. Software updates for CHUMBY™-enabled client devices are also managed via the CHUMBY™ network. When a new update is available for a user's CHUMBY™-enabled client device, the user is notified and given the option to install the update automatically.

The CHUMBY™ network provides a one-stop service for users to activate and manage all of their CHUMBY™-enabled client devices. Each device is preferably uniquely identified and bound to a single user's CHUMBY™ account. A user can activate and manage any number of CHUMBY™-enabled client devices against a single account or across multiple accounts (but a device can generally only be active in one account at a given time). This advantageously permits a user to easily get a newly-acquired CHUMBY™-enabled client devices up on the CHUMBY™ network running the same widgets as are being executed by the user's existing CHUMBY™-enabled client devices. No new account creation, widget configuration or learning curve is required.

Because in exemplary embodiments CHUMBY™-enabled client devices are connected to the Internet and widgets are written in Flash, users of CHUMBY™-enabled client devices may have access to virtually every type of content available on the Internet. Below are various examples of the type of media, content and services potentially available to CHUMBY™-enabled client devices via the CHUMBY™ network:

Audio—streaming Internet music and podcasts from SHOUTcast, Radio Free Chumby, CBS, Clearchannel, MediaFly, the NY Times and Pandora; music/audio from an iPod; music/audio from USB connected storage; music from your SlimServer; and audio from devices on a LAN via DLNA.

Video—streaming video from content providers such as major TV networks, YouTube, VideoJug, Avot and JustinTV; video aggregators such as Avot; animation sites such as Anime Network; webcam operators such as Earthcam Networks; and Internet TV providers such as Orb Network. Video-on-demand, subscription and other pay for use video services could also be quickly and easily deployed via widgets on the CHUMBY™ network.

News—a broad variety of text, picture, podcast and mixed media news offerings from entities such as, for example, The NY Times, CBS, MTV Networks, Washington Post, Reuters and other news/media providers.

Weather—live weather updates from The Weather Channel Interactive, NOAA, Accuweather, BBC, Weather Underground and other weather data providers.

Social Networks—widgets from Facebook, Twitter, Rabble, Friendfeed and other social media service providers could further enable social interaction through CHUMBY™-enabled client devices.

Games—a broad spectrum of interactive games, some of which support game lobbies to recruit opponents and high score servers.

Photos—users can see their and their friends' photos on Photobucket, Flickr, Picasa, Facebook and other photo hosting sites. In the digital photo frame implementation of the CHUMBY™ interface (described below), users can easily share photos from their camera, PC or internet with other chumby users in their "chums" network via simple UI gestures like drag and drop, making photo sharing drop-dead-simple Miscellaneous—sports, recipes, auctions, email notification, calendars, dating, finance, RSS feeds, horoscopes, humor, travel, virtual worlds.

Widgets for desired content or services can be quickly developed and deployed via the open CHUMBY™ network. CHUMBY™-enabled client devices support interactivity, so users can not only watch or listen to content but engage in a variety of other activities. Such activities of a user could include, for example (i) interacting with the widgets executed by the user's CHUMBY™-enabled client device and related content services delivered therethrough, (ii) sending widgets via the CHUMBY™ network to their "chums", (iii) replying to their friend requests, (iv) bidding on their auctions, (v) changing the widget "channel" they are watching, (v) engaging in a game with another CHUMBY™ user.

The CHUMBY™ network also advantageously facilitates various forms of advertising. As is known, many advertisements delivered via the Internet today have already been developed in Flash. Since CHUMBY™ widgets may also be implemented in Flash, it is apparent that CHUMBY™ widgets may easily interface with new or existing ad servers and services to deliver advertisements in widgets (or advertisements that are widgets) via the CHUMBY™ network. These advertisements may include images, video, audio or mixed media, and/or requests for interaction such as "touch here for more information", "send me email with details or a coupon/offer code," or "buy now!" Advertisements could take the form of interactive games delivered through CHUMBY™ widgets.

Advertisements may also be targeted to CHUMBY™ users/devices based on anonymized demographic information (age, gender, zip code, education level) and psychographic data (widgets played, content viewed, music listened to, day part usage, etc) to create a highly effective campaign.

Figure 29:
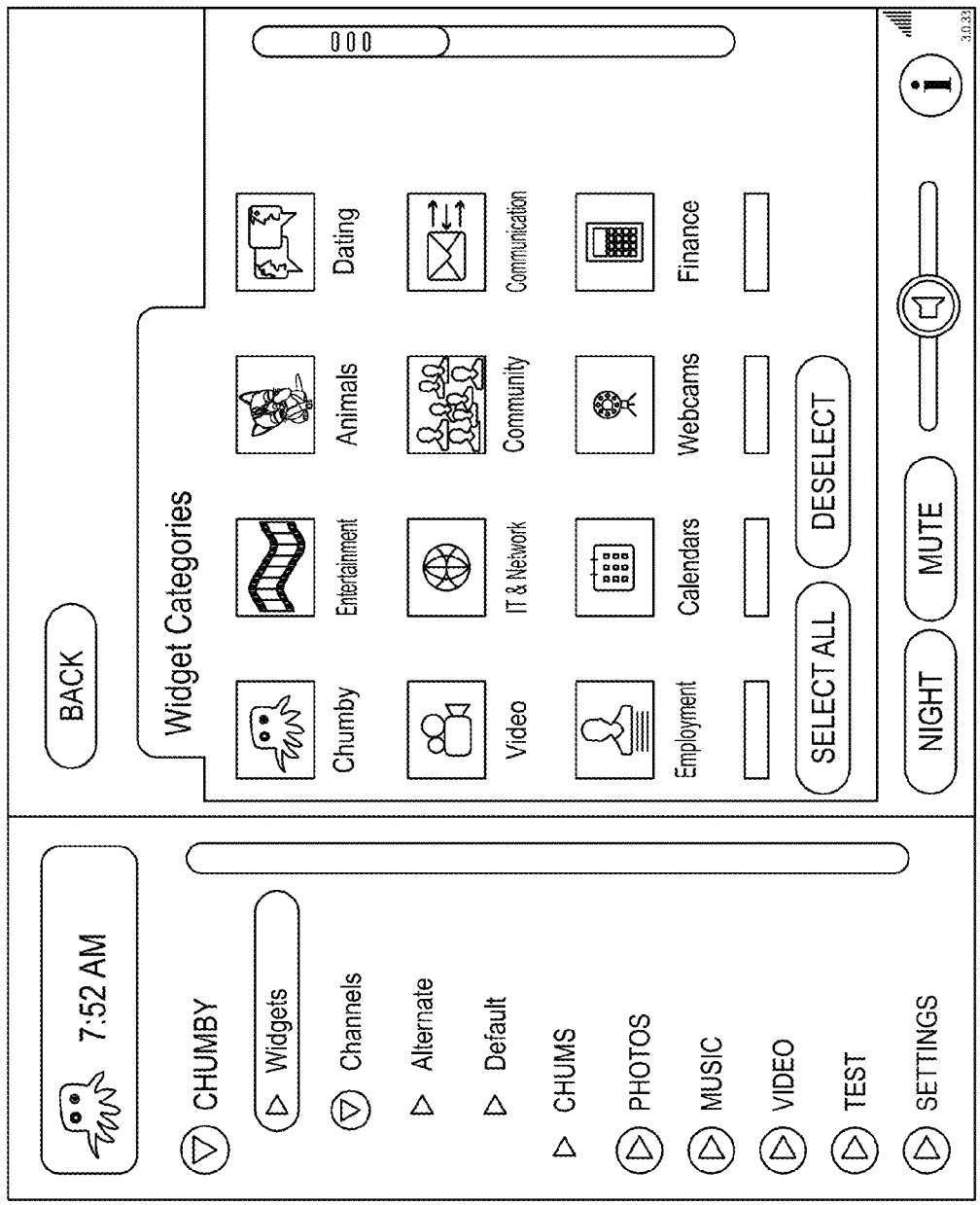
FIG. 29 shows a screen shot of an exemplary user interface presented by a CHUMBY™-enabled client (such a CHUMBY™ personal electronic device).

Turning now to FIG. 29, there is shown a screen shot of an exemplary user interface presented by a CHUMBY™-enabled client device. As is indicated by FIG. 29, user selection of a "Widgets" screen button in a left pane of the user interface results in display of a "Widget Categories" view in a right pane of the user interface. Similar forms of user interface screens may be presented by CHUMBY™-enabled client devices to support settings and configurations options for widgets, streaming audio, and other configurable selections. Alternatively, hard or soft key buttons on CHUMBY™-enabled client devices may be utilized to select such setting and configuration options.

A CHUMBY™ widget is generally configurable in a manner specified by the widget author(s). Certain widgets will require a user to enter configuration information such as postal code, news type (sports, business, world, etc), account information or stock ticker symbols before displaying meaningful information. Other widgets may display default information in the absence of configuration or may not require any configuration whatsoever.

In one embodiment CHUMBY™ widgets are characterized with respect to a range of hardware characteristics supported or required in connection with the execution of such widgets. Such characteristics will typically be made visible in the various widget catalogs which a user may access via the CHUMBY™ web site in connection with selecting widgets for playing on the user's CHUMBY™-enabled client device. A more complete discussion of an exemplary process for characterization, selection and deployment of widgets suitable for various types of CHUMBY™-enabled client devices is set forth in Appendix A.

If a CHUMBY™ widget allows to user to select from one or more information feeds, then the user will have the option to do so. Numerous widgets may be developed which enable access to feeds for weather, news, sports, comedy, entertainment, video and audio content. The user may select to play any or all of these feeds at any time and in any order.

It is a feature of typical embodiments of the invention that CHUMBY™-enabled client devices are not required to display a "home page" or similar operational or start-up page. The author of a CHUMBY™ widget determines the way in which the content is to be presented to the user upon being rendered by a CHUMBY™-enabled client device. Such content can be text and simple images, video, audio or some other combination of the above. In various embodiments the user interface of a CHUMBY™-enabled client device can simultaneously display any number of active widgets, subject only to screen size and resolution constraints.

CHUMBY™ widgets can be configured to update from feeds or any other data source, API or web services interface at any desired interval. In one embodiment a user may nonetheless select to play one or more widgets at any time and the selected widget(s) will play immediately.

In general, CHUMBY™-enabled client devices are typically configured to deliver content and media through the use of widgets. However, this is not a requirement and, for example, services such as streaming audio may be delivered via a discrete audio subsystem (enabling a user to play music and other audio while widgets are also playing). In exemplary embodiments widgets comprise individual Flash-based applications capable of retrieving content and media from services and interfaces on the CHUMBY™ network. Such content and media may in the form of text (e.g., RSS feeds), images/photos, animations, streaming video, information from commercial Web sites (e.g., eBay auctions), or information from social networks. In exemplary embodiments widgets can be built to serve up essentially any type of media or content or service desired. New widgets are immediately available to users on the CHUMBY™ network when published and updates to existing widgets propagate to the users who are using them within a matter of minutes. This framework provides a network operator with the ability to provide a constantly evolving and improving set of applications and services to users CHUMBY™-enabled client devices.

CHUMBY™-Enabled Digital Photo Frame Device

Figure 30:
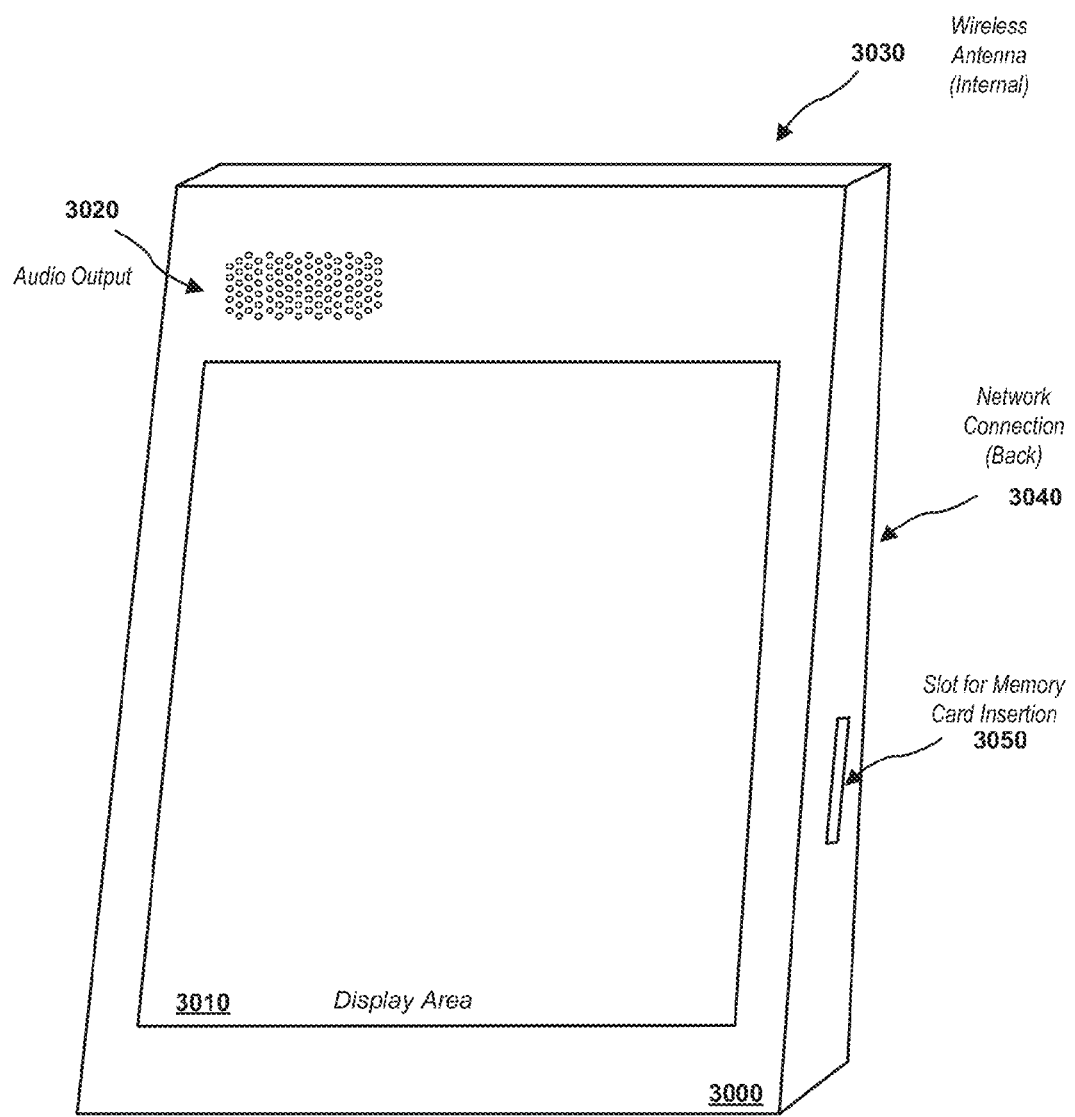
FIG. 30 shows a front view of a CHUMBY™-enabled client device in the form of a digital photo frame (hereinafter, a "ChumbyFrame™, Photo Frame, Picture Frame or Digital Photo or Picture Frame") configured for insertion within a companion docking device.
Figure 31A:
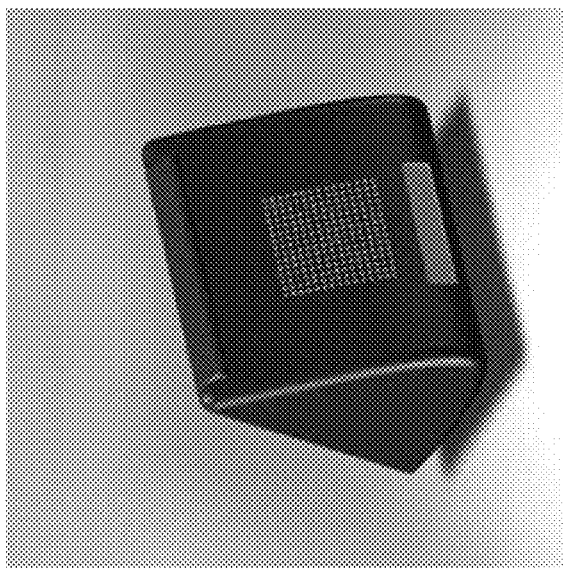
FIG. 31A provides an additional views of such a docking device for use with the frame of FIG. 30.
Figure 31B:
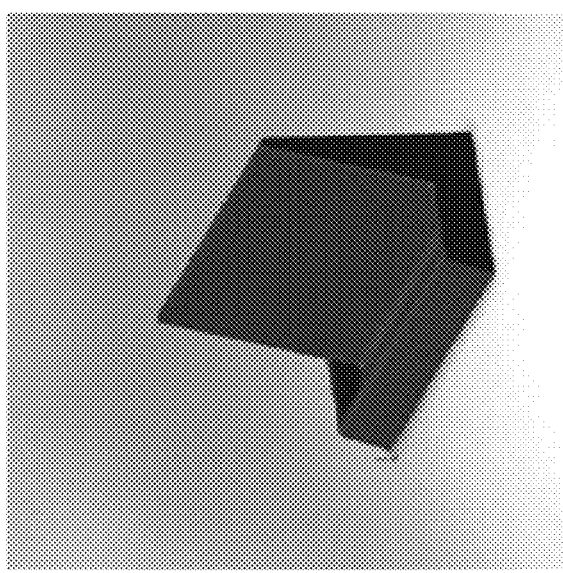
FIG. 31B provides a rear view of a radio docking device for use with the frame of FIG. 30.
Figure 31C:
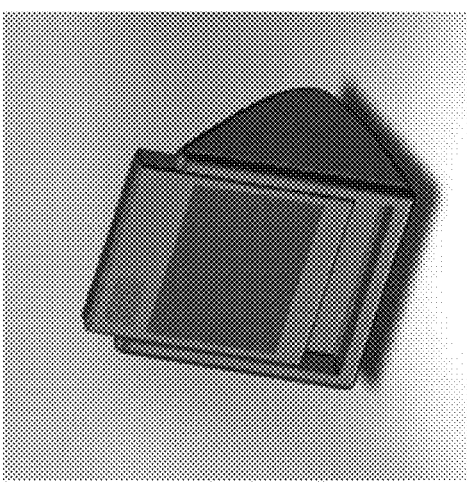
FIG. 31C another view of a docking device into which a ChumbyFrame™ has been inserted.

Turning now to FIG. 30, there is shown a front view of a CHUMBY™ enabled device in the form of a digital photo frame (hereinafter, a "ChumbyFrame™") configured for insertion within a companion docking device. FIG. 31A provides an additional views of such a docking device, FIG. 31B provides a rear view of a radio docking device, and FIG. 31C another view of a docking device into which a ChumbyFrame™ has been inserted.

In an exemplary embodiment, a ChumbyFrame™ includes internal media storage capacity and hardware and software capable of enabling a variety of features and functionality, including:

Viewing photos/videos from different consumer media sources: memory cards, USB devices, iPOD, Internet sharing sites and LAN connected computers.

Versatile range of transition effects and display formats for photo display.

Sharing of photos on photo sharing sites and social networking sites. Users may show their photos to chums and notify them when new photos are available.

Creation of slideshows that can be played to cycle through a collection of photos with a wide range of user configurable effects.

Playing of collections of photos as a slideshow or adding such collections to a channel as a slideshow widget.

Automatically displaying photos when a memory or USB storage device containing photos is inserted.

Easy transferring of photos from sources to internal memory or partner photo sharing sites Sending of slideshow widgets to chums.

Posting collections of photos on partner photo sharing sites and emailing corresponding links.

Simplifying the emailing of photos to other Chumby-Frame™ devices for display.

Additional details of example hardware and associated software and processes for implementing the above, as well as other, functionality are further described below.

Figure 94A:
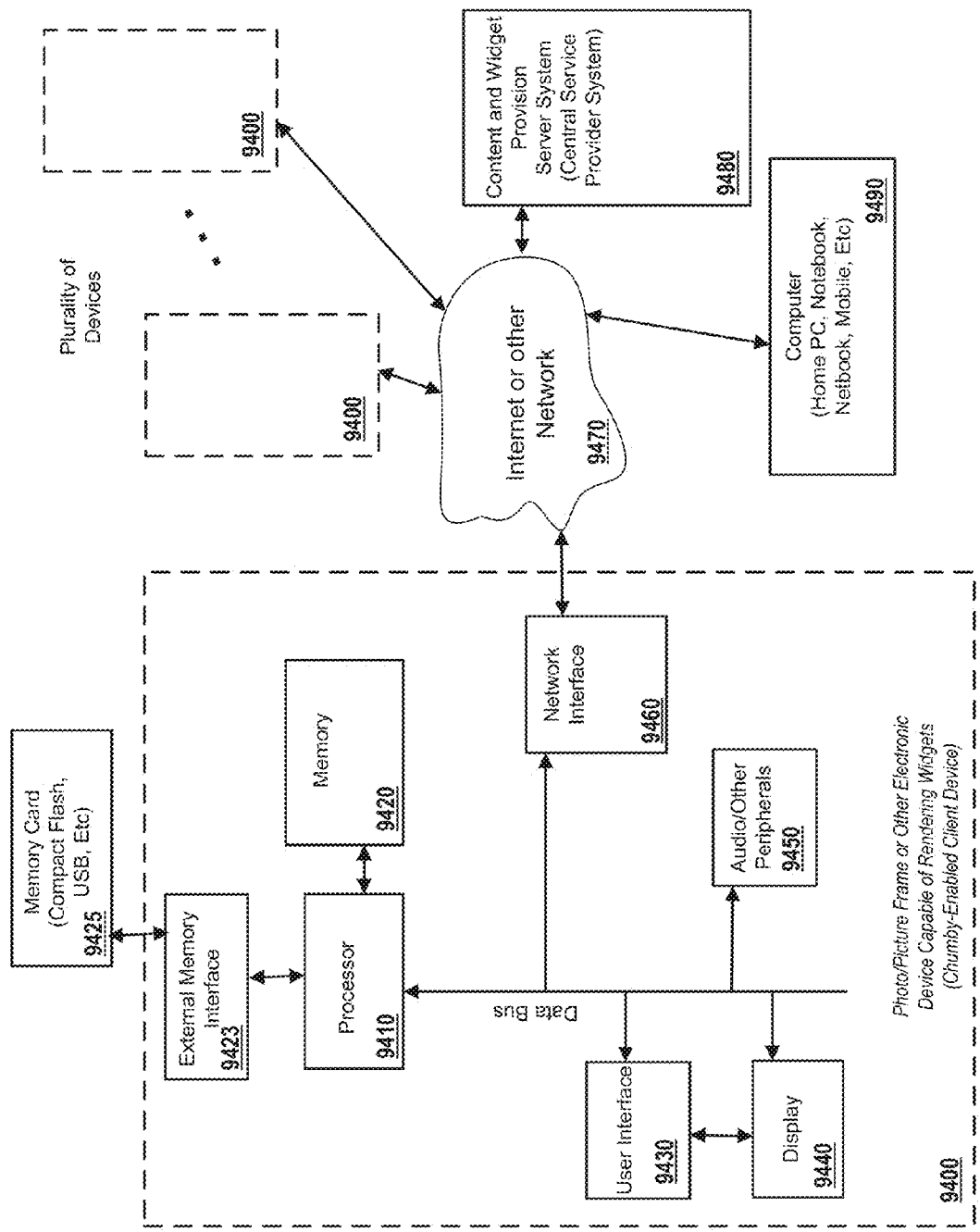
FIG. 94A illustrates details of one embodiment of a digital photo frame, such as a ChumbyFrame™, along with components of a content provision system in accordance with the present invention.

Attention is now directed to FIG. 94A, which illustrates details of a system including an exemplary embodiment of the present invention as a digital photo frame device 9400 (which may, for example, be a CHUMBY™ personal audiovisual device). It is noted that device 9400 is shown as a digital picture or photo frame, such as may be implemented as shown in FIG. 30; however, other implementations, such as in cellular phones, PDAs or other mobile devices, televisions, set-top boxes, and/or other similar or equivalent electronic devices configured to render media content.

As shown in FIG. 94A, device 9400 is typically configured with one or more processors 9410, which are coupled to a memory, which may comprise one or more physical memory devices. Memory 9400 may include memory devices such as DRAM, FLASH, SRAM, EEPROM or other memory devices as are known or developed in the art. In some embodiments memory 9400 may include physical memory stored in the device, as well as the capability of the device 9400 to incorporate external or portable memory 9425 via an external memory interface 9423, such as by using Compact Flash, Secure Digital, Memory Stick, USB or other portable memory devices. This may be done via a plug-in slot or port on device 9400 such as is shown in FIG. 30 and/or via a USB port or other memory-compatible connector.

Device 9400 also includes a display 9440, which may be an LCD display element or other visual display (such as, for example, is shown in FIG. 30). The display 9440 may be coupled to and/or incorporated with user interface 9430, which may be configured to allow a user to input information to the device 9400 via keys, pads, touchscreen, buttons, mice or via other input elements. The user interface 9430 may be used in conjunction with display 9440 to allow the device to receive input as well as display visual output.

In addition, device 9400 may include an audio element 9450, which may allow for rendering of audible output such as voice, music, text-to-speech, and/or other audio content. Additional peripherals 9450 may include a microphone for receiving input, and/or other peripherals as are know or developed in the art.

In addition, device 9400 may include a network interface 9460. Interface 9460 may be used to couple device 9400 to one or more networks 9470 via wired or wireless connections. Interface 9460 typically facilitates Internet connectivity to communicate with server system 9480 to receive and send widgets and content. This may be done via Ethernet, USB, Firewire, WiFi, WiMax, Cellular, LTE, or other networking technologies and interfaces.

In a typical system, a plurality of devices 9400 are coupled to network 9470, which further provides connectivity to a Content and Widget Server System 9480. This system may be part of a Chumby system as described previously herein. Widget system 9480 may be configured to store and widgets as described previously herein, and may be further configured to provide the widgets to devices 9400 associated with a plurality of users. Widget provision may be based on requests received from a user of a first of the plurality of devices 9400 and/or may be provided to a second user or additional users via associated devices at the request of the first user. In typical embodiments of a system consistent with the present invention, users of device 9400 may be enabled to share content such as media files (audio, video, etc) as well as photos, audio clips and/or other media content.

Content and widget provisioning and sharing may be facilitated by system 9480, which may be Chumby system as described previously herein. In addition, system 9480 may be configured to interface with users via a standard web interface, such as a web browser provided on a computer 9490. This may be used to support user selection and provision of widgets and/or other content.

Figure 94B:
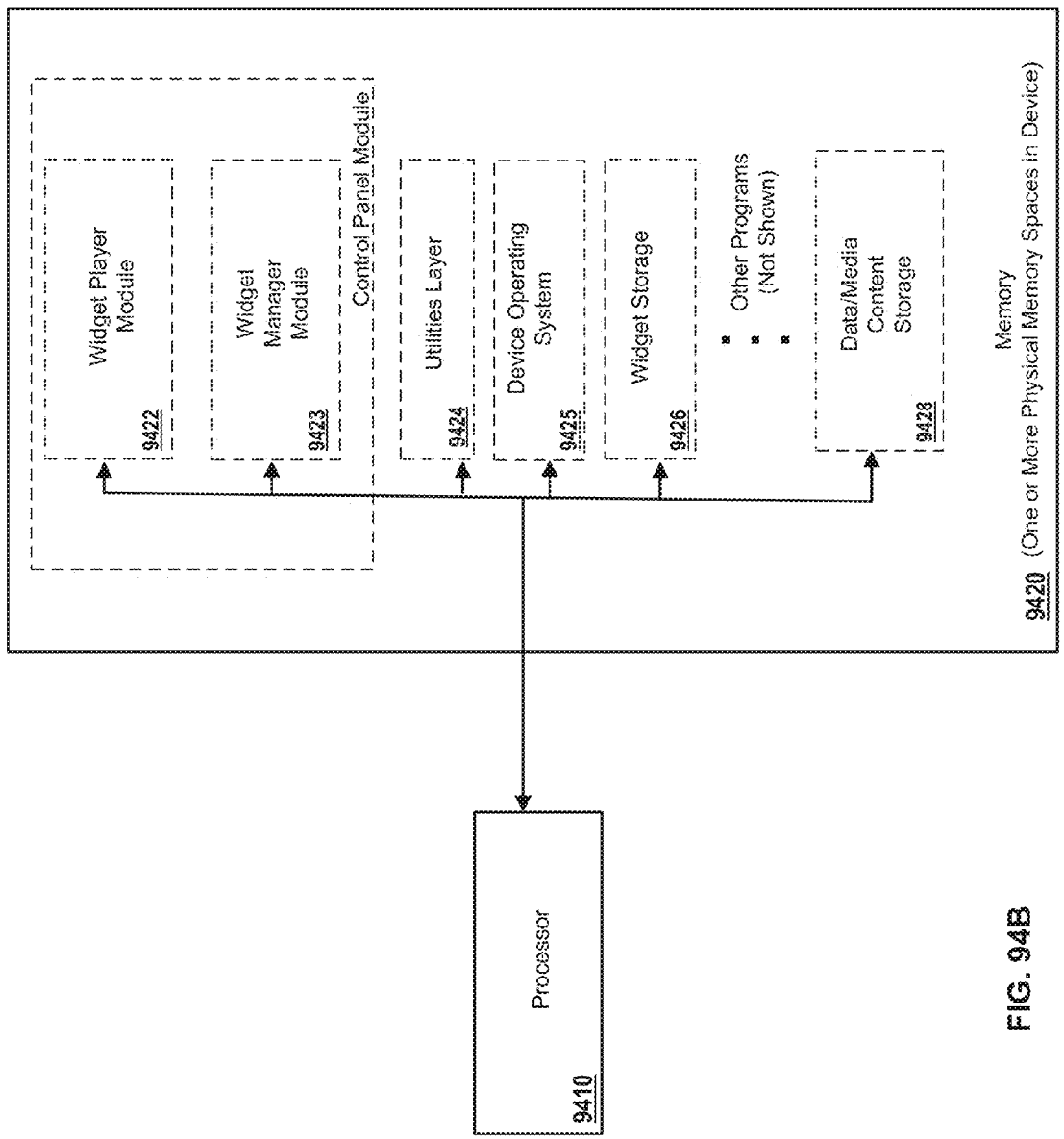
FIG. 94B illustrates use of a memory space within a photo frame in accordance with aspects of the present invention.

In a typical implementation of device 9400, memory 9420 may be configured with computer code for execution on the processor to implement control as well as other functionality. This functionality may be provided in the form of modules as shown in FIG. 94B. In this example, memory 9420, which may comprise one or more physical memory spaces. These modules may include a widget player module 9422 configured to play or render widgets and associated content, such as audio files, photos, video and/or other content. In one example, the widgets and/or associated content may be in form of Adobe Flash code modules, however, other formats may also be used.

In addition, a widget manager module 9423 may be included in a control panel module. Additional modules may include a utilities layer 9424, a device operating system 9425, which may, in one example, be based on Linux. Memory 9420 may also include spaces 9426 for storage of widgets and may also include other functional modules for implementing utility programs or other applications. A data/media storage space 9428 may also be included in memory 9420 for storage of content to be rendered on device 9400, such as digital photos, audio files (MP3, AAC, WAV, etc.), video files, text files and/or other content.

Utilities layer 9424 may be configured to receive, store and provide a plurality of client software modules accessible to the widget player module 9422. The client software modules may include one or more modules to provide a client runtime environment facilitating operation of the widget player.

Processor 9410 is coupled to memory 9420. This may be a direct connection to memory 9420 and/or may also include coupling via other electronic components in device 9400.

In typical implementations, widgets are received at device 9400 via network interface 9460 from the Internet and stored in the memory 9420. Upon receipt, a subset of the instances of the plurality of widget programs may be temporarily stored within the memory with additional widget programs subsequently received from over the network and also temporarily stored within the memory.

In a typical implementation, one or more of the widgets programs are configured so as to manage media content stored in the device's memory. This may be used to allow for the same widget program to execute different content on different user's devices and/or on different devices associated with a single user.

The widget player 9422 of device 9400 may be configured to provide services furnished by one or more of a plurality of client software modules during execution of the widget programs, and the client software modules may be configured to provide a client runtime environment facilitating operation of the widget player.

As noted previously, the widget programs may be in the form of Adobe Flash code. In a typical embodiment, the widgets may be provided in the form of Flash Lite movies and one or more of the client software modules may be a Flash Lite player.

In typical implementations, one of the widget programs is an Internet radio application, with an associated client software module configured as an audio streaming utility, disposed to stream audio content to device 9400.

In addition to digital picture or photo frame embodiments, other embodiments may be in the form of a television or television plug-in module or set-top box, a game console, a cell phone, a PDA, a network, or a portable computing device.

Memory 9420 may include or comprise, in part, a computer program product which may be a computer readable medium. An example of this is shown as medium 9420B of FIG. 94C. Medium 9420B include multiple modules to perform functionality as previously described.

Figure 95:
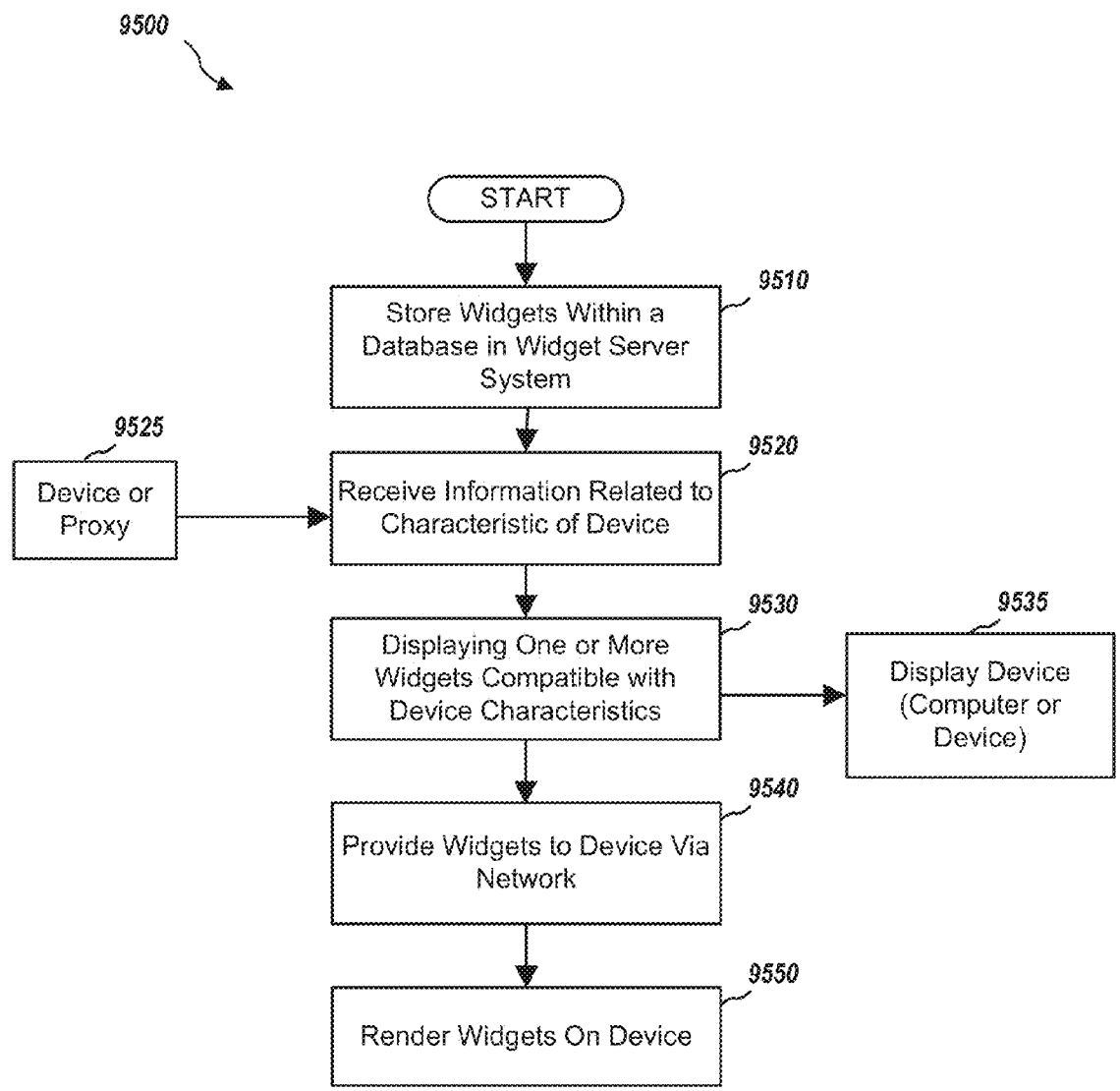
FIG. 95 illustrates an embodiment of a process for providing widgets in accordance with aspects of the present invention.

Attention is now directed to FIG. 95, which illustrates an example process 9500 for providing widgets to a device 9400 from a server such as in server system 9480. Process 9500 may begin at stage 9510, where a plurality of widgets may be stored in a database in server system 9480. In addition, information may be received at system 9480 from one or more devices 9400 at stage 9525. This information may come directly from the device 9400 and/or may be provided by a proxy or other device, such as a computer associated with the device 9400 user.

At stage 9530 a display may be provided to a user showing a selection of widgets compatible with the device 9400 characteristics. These device characteristics may vary in different forms of devices 9400, and therefore server system 9480 may evaluate the particular device's activated characteristics and provide a list or display of appropriate widgets. Device characteristics typically include information about the device's hardware capabilities, such as processor speed, network connectivity, memory capacity, peripherals, audio and/or video rendering capability, display sizes, as well as other device hardware characteristics. The device characteristics may also include device software characteristics such as operating systems used, available application programs, networking, and/or other software characteristics. The device characteristics may also include connectivity characteristics, such as information regarding the available bandwidth of the device's network connectivity.

The widget compatibility may then be provided to a user via a different interface, such as via a web interface provided on a web browser of a user's computer 9535. This may be done in the form of a display or list of compatible widgets. A typical example of widget selections are shown on the web page of Chumby Industries at www.chumby.com which can be accessed from any computer web browser.

The user may then make a selection of one or more widgets to be provided to the user's device, and the selected widgets may then be provided to the device at stage 9540. The user's device 9400 may then render the one or more widgets at stage 9550. Widget rendering may be done as described previously herein.

Figure 96A:
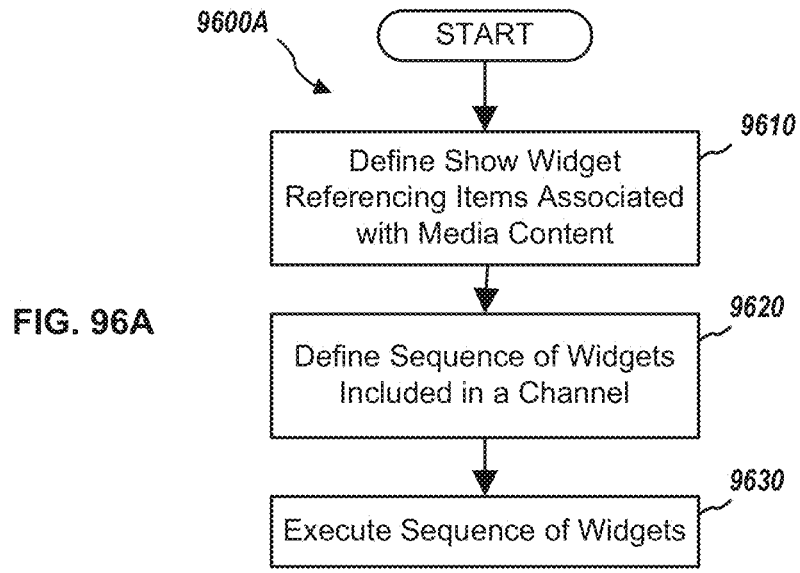
FIG. 96A illustrates an embodiment of a process for rendering images in conjunction with a show widget in accordance with aspects of the present invention.

Attention is now directed to FIG. 96A, which illustrates a process 9600A that may be used to render a set of widgets on a device such as device 9400. At stage 9610, a show widget, which references a plurality of items associated with media content, may be defined. A sequence of widgets comprising a channel may then be defined, with the show widget being included in sequence of widgets comprising the channel. The sequence of widgets may then be executed in conjunction with the user interface, with the media content being rendered upon execution of the show widget. In one implementation, one or more of the plurality of items is a digital photo album, with the photos stored in a memory of the device, such as memory 9420.

In one implementation, a first photo album of digital photos may be stored in the memory 9420 of the device, and a second album may be stored remotely, such as on server system 9480 or on another site, such as online photo sites Photobucket or Flicker.

Alternately and/or in addition, media content items may be video content in the form of video files, audio content, or other types of content. These may be stored locally or remotely. Remotely stored content may be Internet-accessible photo, audio and/or video content, such as may be available on web sites such as Facebook, YouTube, MySpace or other online sites configured to store media content.

Figure 94C:
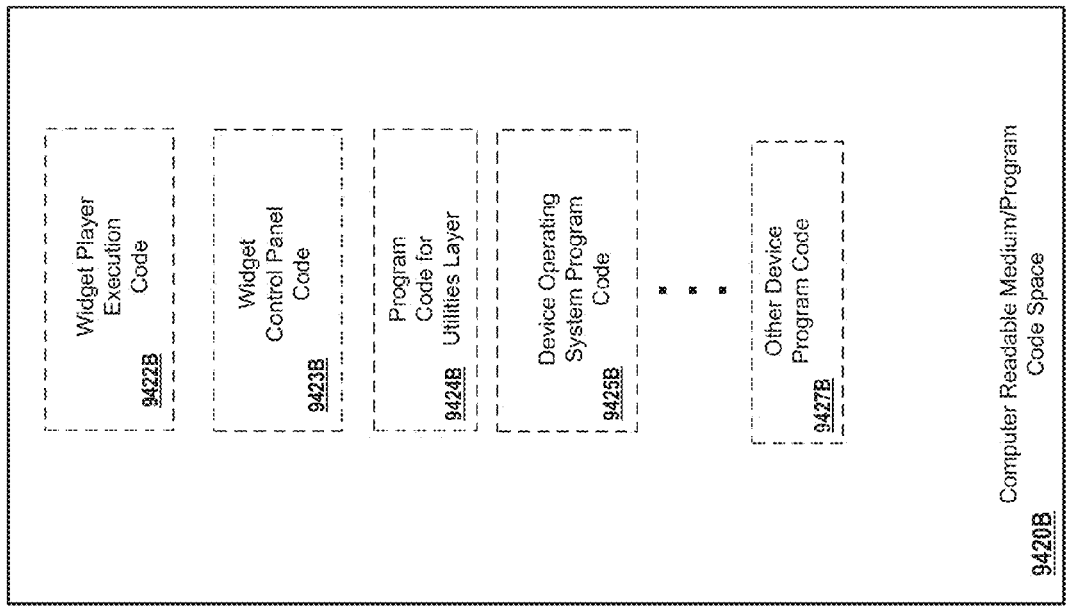
FIG. 94C illustrates a computer readable medium on which may be stored program modules in accordance with aspects of the present invention.

Modules for implementing various versions of process 9600A may be stored on a medium, such as medium 9420B as shown in FIG. 94C.

Figure 96B:
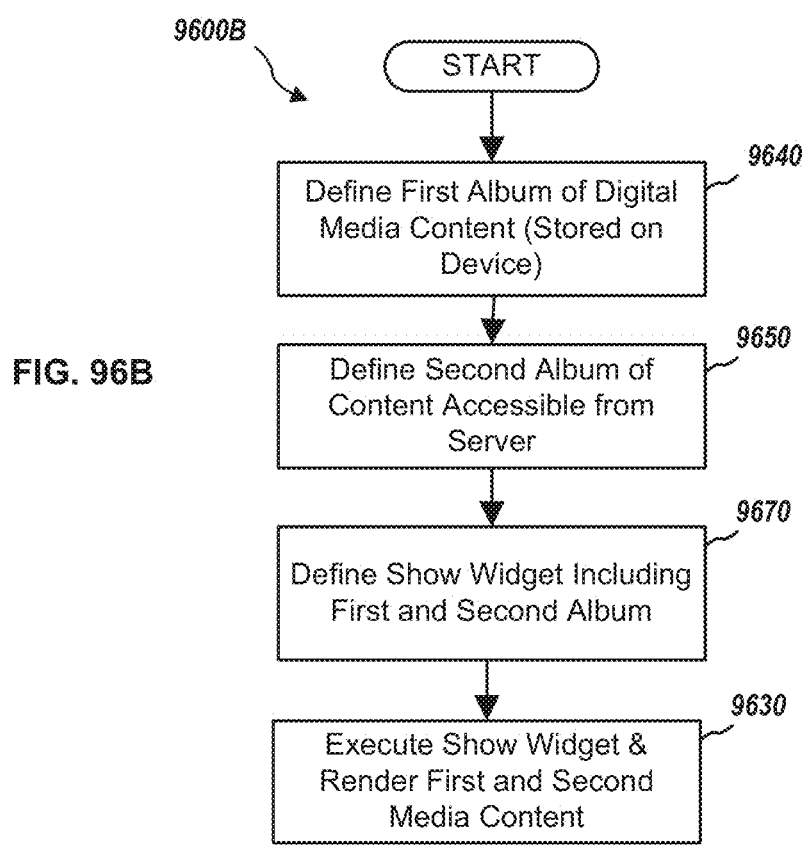
FIG. 96B illustrates an embodiment of a process for providing content from multiple content albums in accordance with aspects of the present invention.

Attention is now directed to FIG. 96B, which illustrates one method of user operation of an electronic device, such as a picture frame device 9400, to provide local and remotely stored content, such as photos stored in a plurality of digital photo albums. At stage 9640, a user may define a first album of first digital media content that is stored within a local memory of device 9400. At stage 9650 a user may define a second album of content that is accessible from a remote server system, such as from system 9480 (or another remote server system). At stage 9670, a show widget may be defined or selected, with the show widget including or referencing the first album and said second album and/or the associated content. The show widget may then be executed, with the user interface of device 9400 rendering the first digital media content and the second digital media content. As noted previously, memory 9420 may include memory stored in device 9400 as well as memory in the form of an external memory card or other plug-in memory device. In some implementations, the local memory stored media content may be stored on the memory card or other memory device. Alternately or in addition, other locally accessible memory, such as memory accessible via a local area network (LAN) or other local network may store the digital media content.

In various implementations, multiple sets of widgets may be provided to device 9400 in the form of different channels, such as is described previously herein. In one implementation, a user may device an album widget including media content stored in the local memory 9400, and an additional album widget associated with remotely accessible content. These widgets may be included in a plurality of channels provided to the device 9400.

Figure 97:
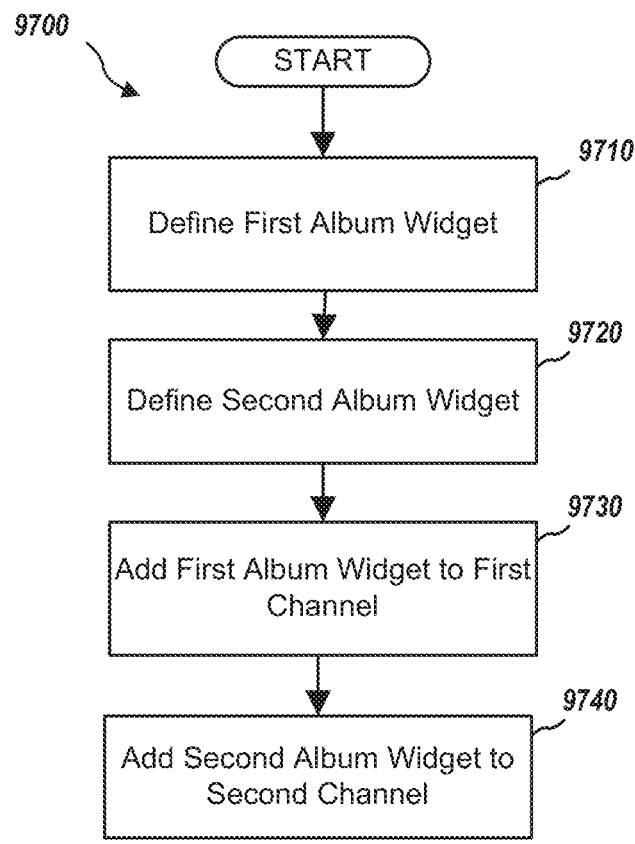
FIG. 97 illustrates an embodiment of a process for providing multiple channels in accordance with aspects of the present invention.

Attention is now directed to FIG. 97, which illustrates a process 9700 for associating widgets with albums. At stage 9710, a first album widget may be defined in response to a user input, where the user input may be received through a user interface of the portable electronic device. The first album widget may include and/or may be associated with a first set of digital media content stored within a local memory of the device. The local memory may be internal to the device and/or may be in a removable device such as a compact flash or other type of memory card. At stage 9720, a second album widget may be defined and associated with a second set of digital media content located remotely from the device. The content may be accessible from a remote server. At stage 9730, the first album widget may be added to a first channel, where the first channel includes a sequence of widgets executable by the device. At stage 9740, the second album widget may be added to a second channel, with the second channel including a second sequence of widgets. Widgets included in one or both of these channels may then be executed on the device.

In rendering the widgets on the device, widgets included in one or both of the channels may reference for playback audio files, images or photos, video files or combinations of these.

This content may be stored either on the device or referenced to an external storage, such as an external website server or database.

In another embodiment, a service provider and associated system may be used to provide widget and/or content sharing functionality. This may be done by a first user sending a request to the service provider to send media and/or widgets to a second user, such as a chum.

Figure 98A:
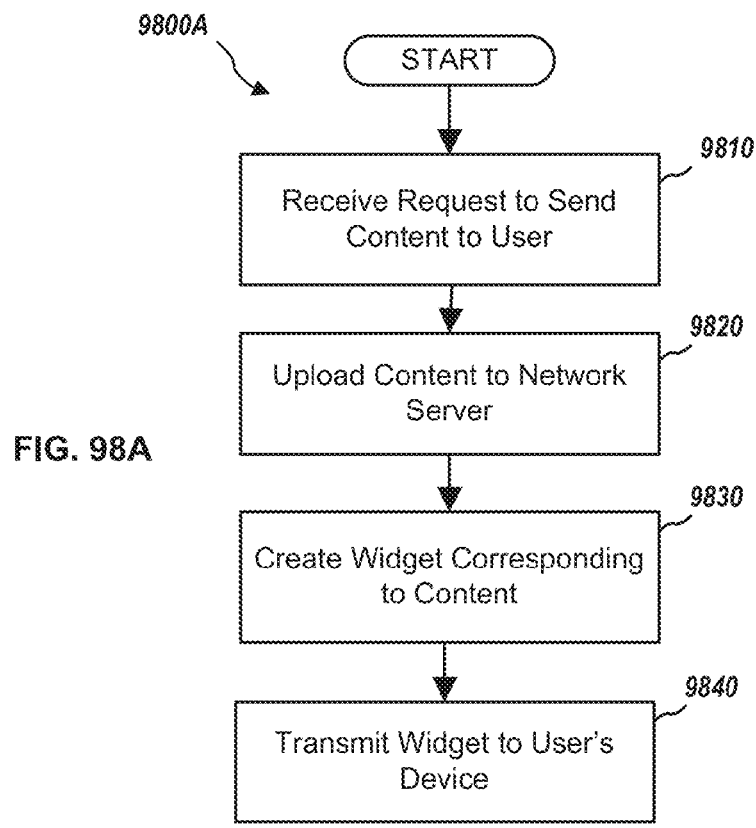
FIG. 98A illustrates an embodiment of a process for sharing widgets in accordance with aspects of the present invention.

FIG. 98A illustrates an embodiment of a process to facilitate sharing widgets. At stage 9810 a service provider receives a request to send content to another user. The service provider then receives the content at stage 9820 and uploads the content to a server, such as a server in system 9480 as shown in FIG. 94A. At stage 9830, a widget may be created so as to correspond or be associated with the content. The widget may include information referencing the network server so as to facilitate later content download by the second user's device. At stage 9840, the created widget may be sent to the second user. Upon receipt, the widget and associated content may be played/rendered on the second user's device and/or a request or control may be provided to verify the second user's authorization to play the widget and/or render the content. In addition, widgets may be used to control playback or rendering of content based on configuration information, such as hardware information associated with the second user's device.

In one example, the content may be in the form of a slideshow, with the photos stored on the server and the slideshow rendered on the second user's device in response the first user's transmission of a request to send the content. One or more digital photos may be selected for playback, and these may be selected from a digital photo library on the second user's device and/or on the server. A user interface may be provided on the service provider's site to allow the first user and/or the second user to select photos for rendering. This may use a drag-and-drop interface to facilitate fast selection of photos for rendering.

Figure 98B:
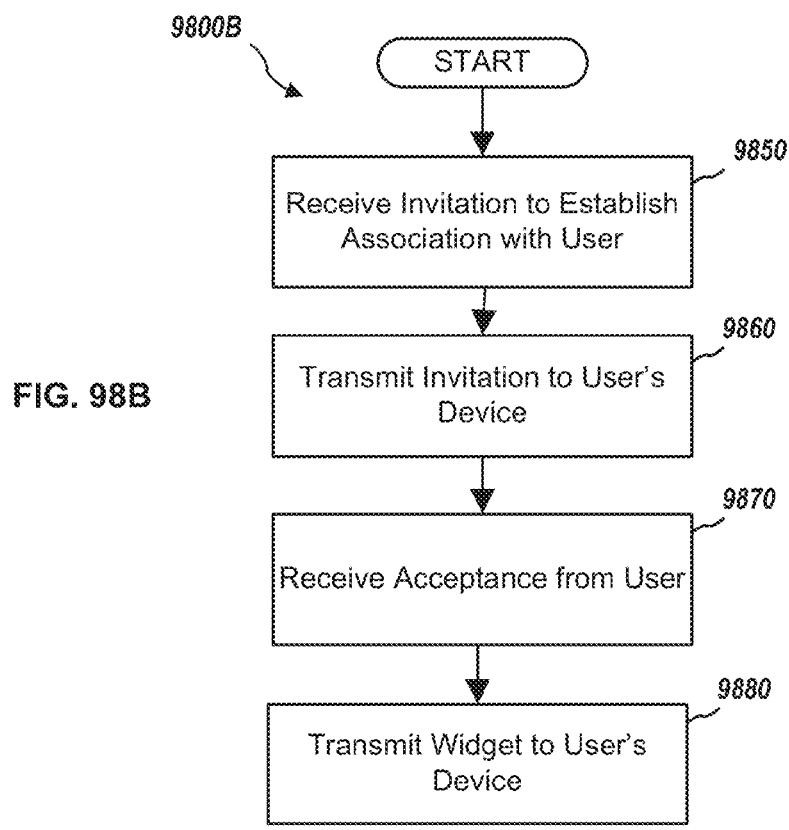
FIG. 98B illustrates an embodiment of a process for inviting use and transmitting widgets to another user in accordance with aspects of the present invention.

In another embodiment, a first user may be allowed to send an invitation to a second user, such as a chum, to receive content. An example embodiment of a process 9800B to implement this is shown in FIG. 98B. At stage 9850, the service provider receives an invitation from a first user to establish an association with a second user, such as a chum. At stage 9860, an invitation is sent to a device associated with the second user. If the second user chooses to accept, he may send an acceptance, which is received at stage 9870. After receipt, the service provider may then send a widget to facilitate connection to the second user. The widget may be generated in response to information provided by the first system user to the one of the plurality of personal electronic devices where the device is capable of executing the instance of the widget.

The first user may also be provided with an interface to facilitate sending digital media content to the second user, and the digital media content may be uploaded to the service provider, such as at a web site of the service provider. This may be done as was described previously with respect to FIG. 98A.

The service provider will typically allow invitations to be provided to multiple other user's associated with the first user, and in some cases, transmission of invitations may be automated based on, for example, contact information, address books, or other information provided from the first user. The service provider may also provide an interface to allow display of a profile or other information associated with the first user as well as other users. The profile may include information associated with widgets that are available from different users. This may be based on an associative relationship established between multiple users. Profile information may also facilitate a display of widgets and/or associated content that are capable of being rendered on particular user's device or devices.

Various examples and additional details of embodiments of an electronic device, such as a CHUMBY™ device are further described below in conjunction with associated drawing figures.

Figure 32:
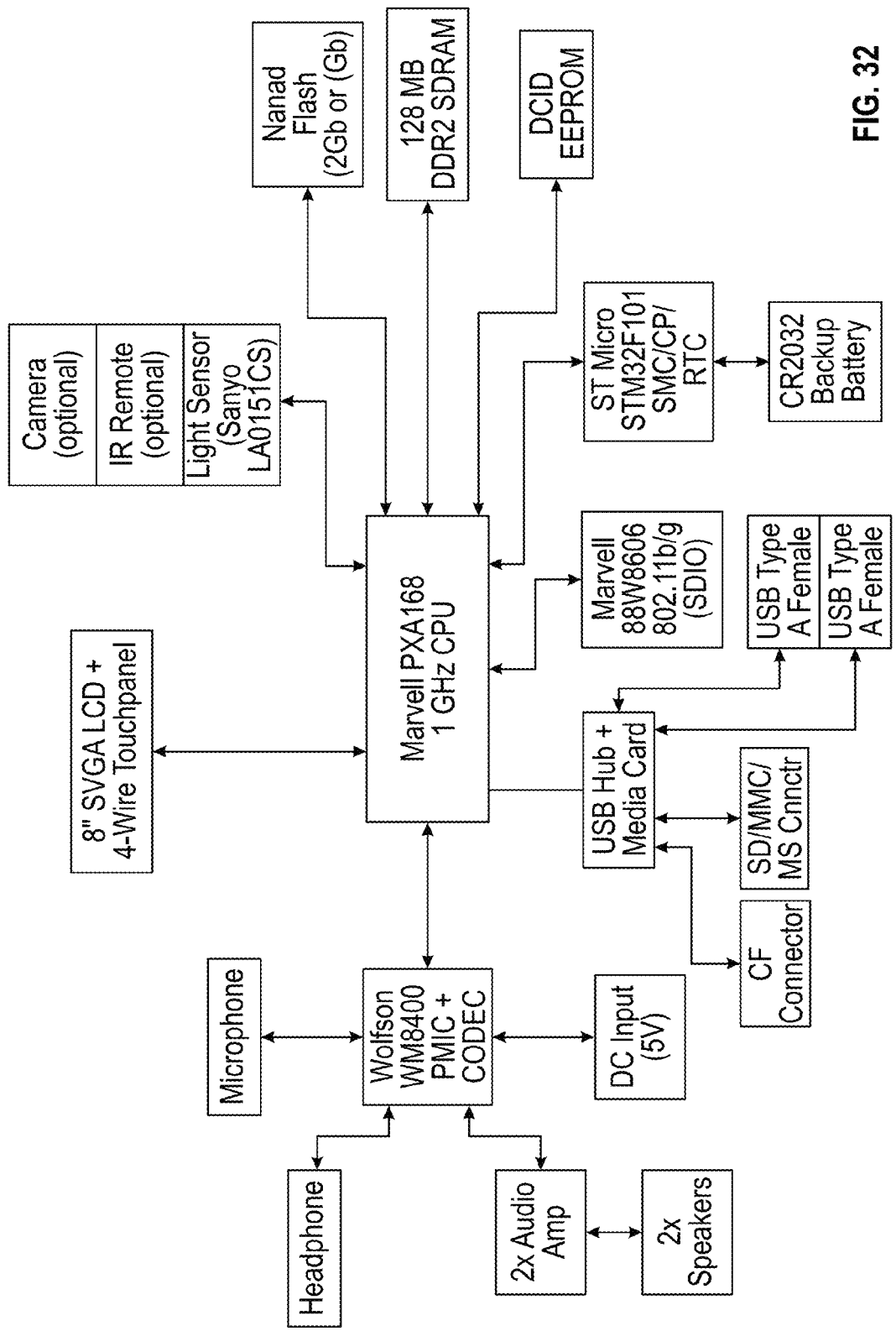
FIG. 32 provides a block diagrammatic representation of the principal components of an embodiment of a ChumbyFrame™ device of the present invention.

Attention is now directed to FIG. 32, which provides a block diagrammatic representation of the principal electronic hardware components of an embodiment of a Chumby-Frame™ device of the present invention. As shown, the device includes a central processing unit (e.g., an ARM9 processor), memory including volatile (e.g., SDRAM) and non-volatile memory (e.g., Flash memory), 802.11b/g network connectivity, 8" LCD touch screen, USB hub and media card, interface ports, stereo speakers, headphone out, and microphone.

Figure 33:
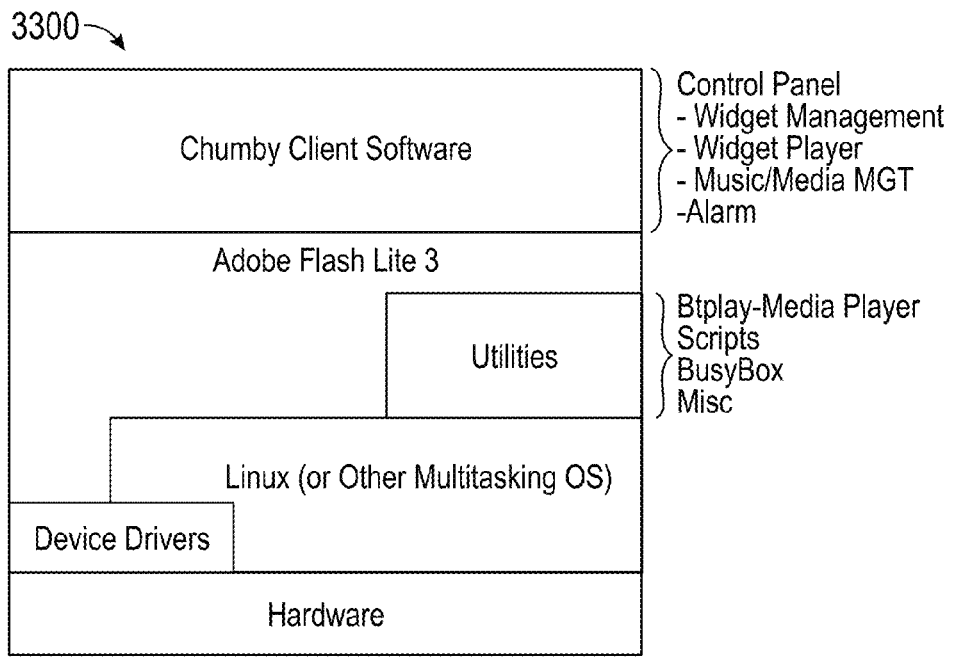
FIG. 33 illustratively represents the layered software architecture (i.e., software stack) of an exemplary ChumbyFrame™ device.

FIG. 33 illustratively represents the layered software architecture (i.e., software stack) 3300 of an exemplary Chumby-Frame™ device using a multitasking operating environment. As shown, the CHUMBY™ client software is comprised of a control panel including a widget management module, a widget player, a music/media management module, and an alarm module. In one embodiment Adobe Flash Lite 3.x is used as the presentation and content/media rendering layer. As shown, the software stack is built on a Linux or other multitasking operating system. Services and utilities such as btplay, httpd, zeroconf and DLNA plug into the Linux core.

Figure 34:
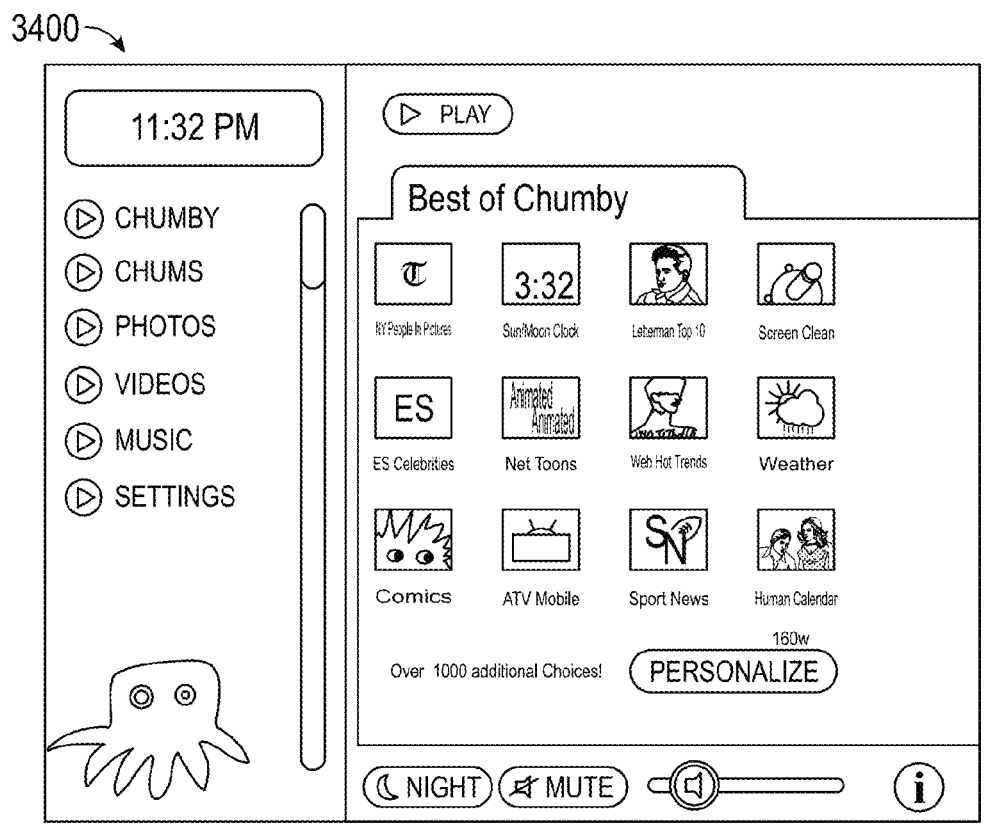
FIG. 34 illustrates an exemplary welcome screen rendered by a ChumbyFrame™ device following the completion of a boot sequence of the device.

Turning now to FIG. 34, there is illustrated an exemplary welcome screen 3400 rendered by a ChumbyFrame™ device following the completion of a boot sequence of the device. Screen 3400 illustrates example widgets, shown by icons, that a user may select.

Figure 35:
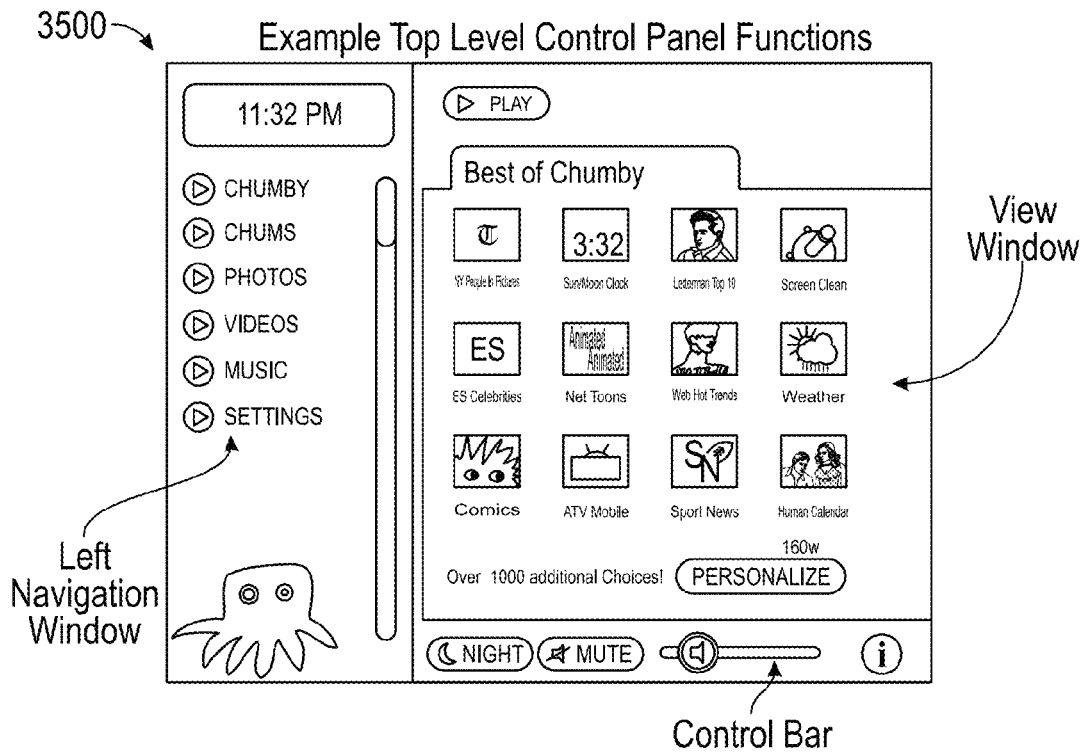
FIGS. 35-37 provide illustrative representations of various control panel functions capable of being effected through the touch-sensitive user interface screen of a ChumbyFrame™ device.
Figure 36:
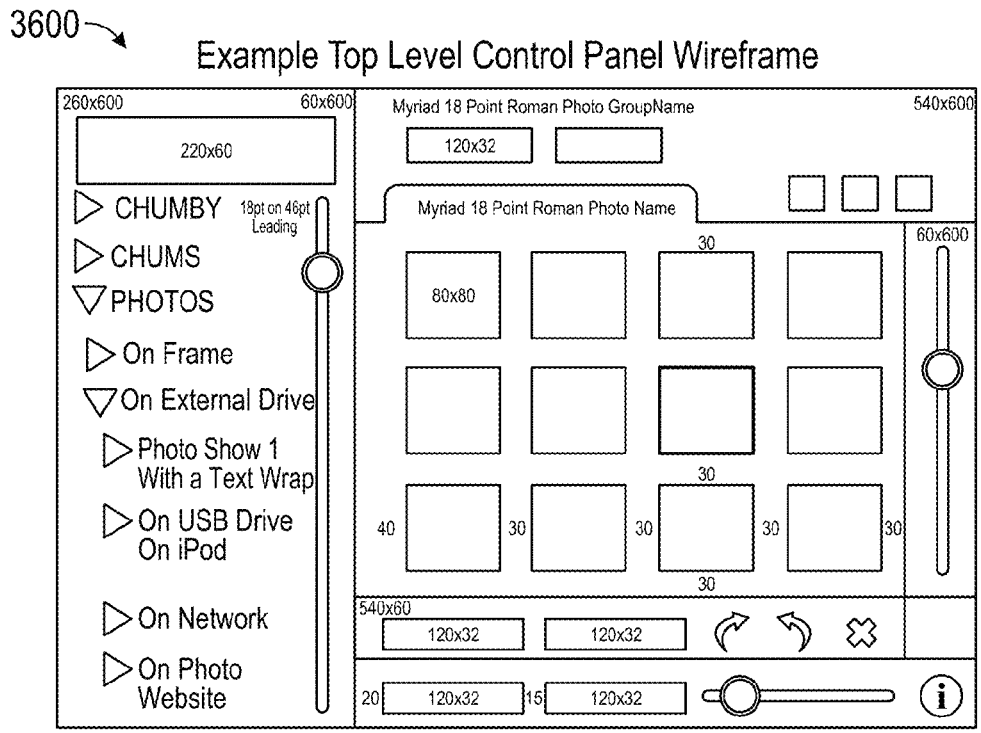
Figure 37:
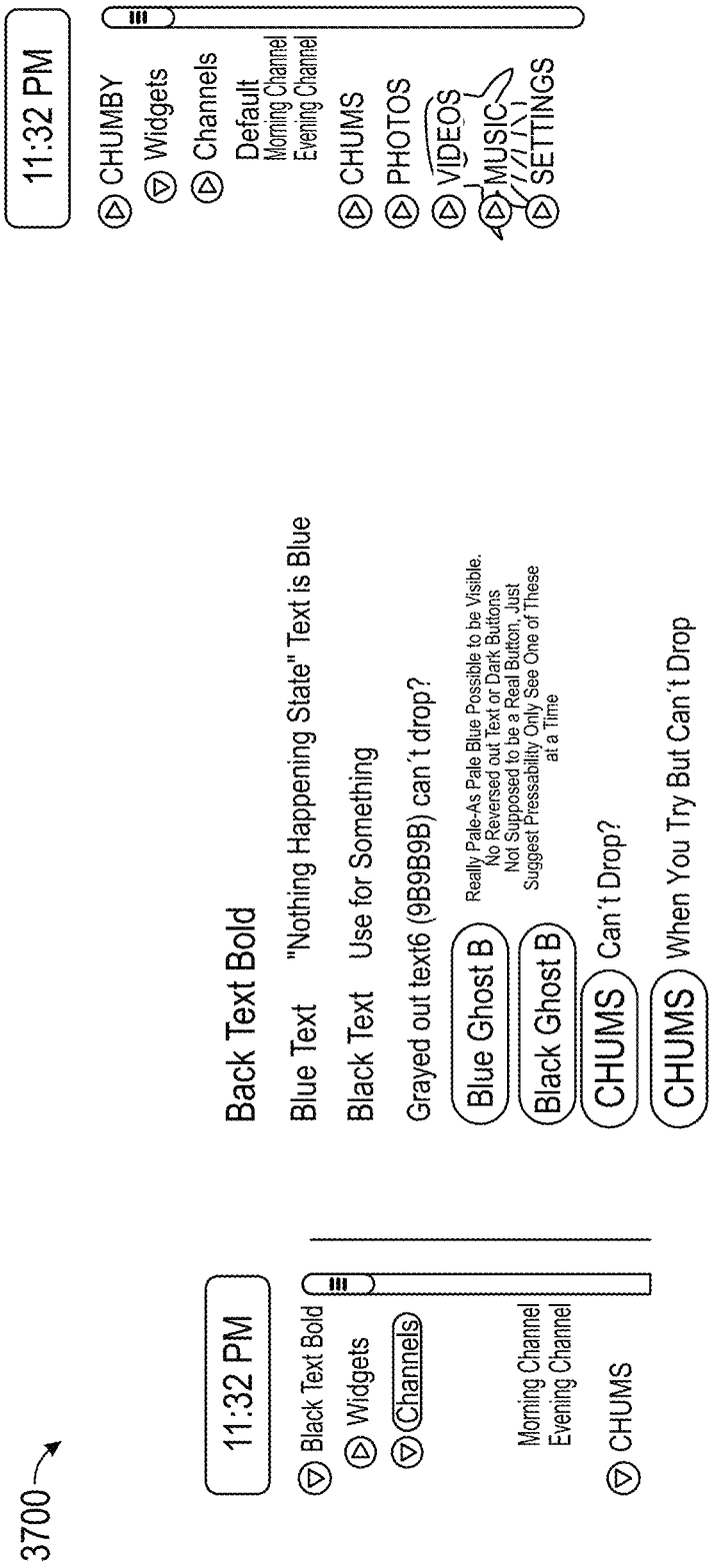

FIGS. 35-37 provide illustrative representations of various control panel functions capable of being effected through the touch-sensitive user interface screen of a ChumbyFrame™ device. FIG. 35 illustrates a screen 3500 showing elements of a user interface to the device including a status window, left navigation window including navigation settings, a view window, including widgets available for selection, and a control bar. FIG. 36 illustrates a top level control panel wireframe 3600 as may be used in an exemplary embodiment. FIG. 37 illustrates additional details of a screen display 3700 for use in configuring various embodiments.

Figure 38:
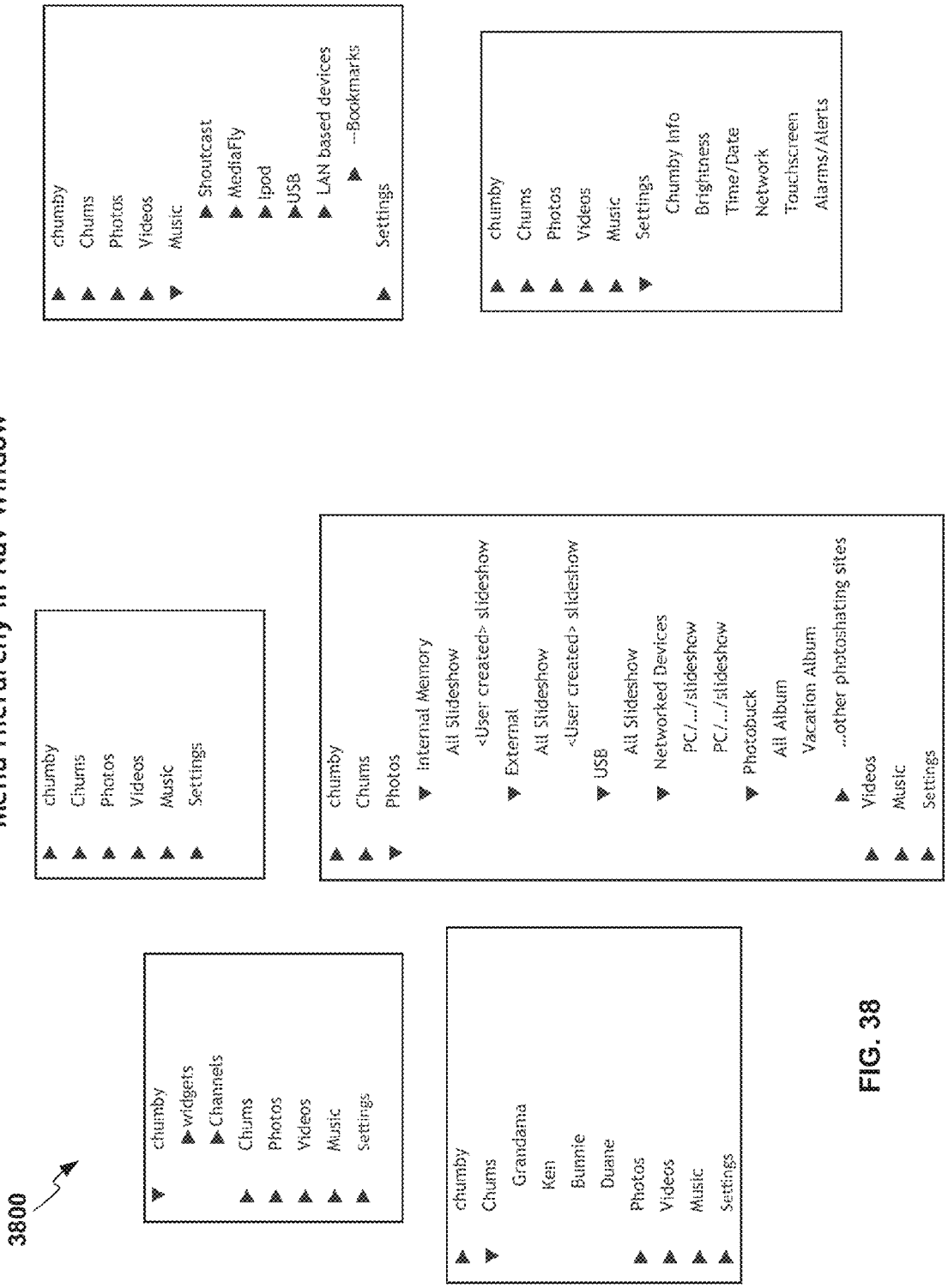
FIG. 38 illustrates an exemplary menu hierarchy existing in a navigation window of the control panel depicted in FIGS. 35-37.

FIG. 38 illustrates an exemplary menu hierarchy 3800 existing in a navigation window of the control panel depicted in FIGS. 35-37.

FIG. 39 illustrates and describes the functionality of an exemplary control bar 3900 displayed through a touch-sensitive user interface screen of a ChumbyFrame™ device.

Figure 40:
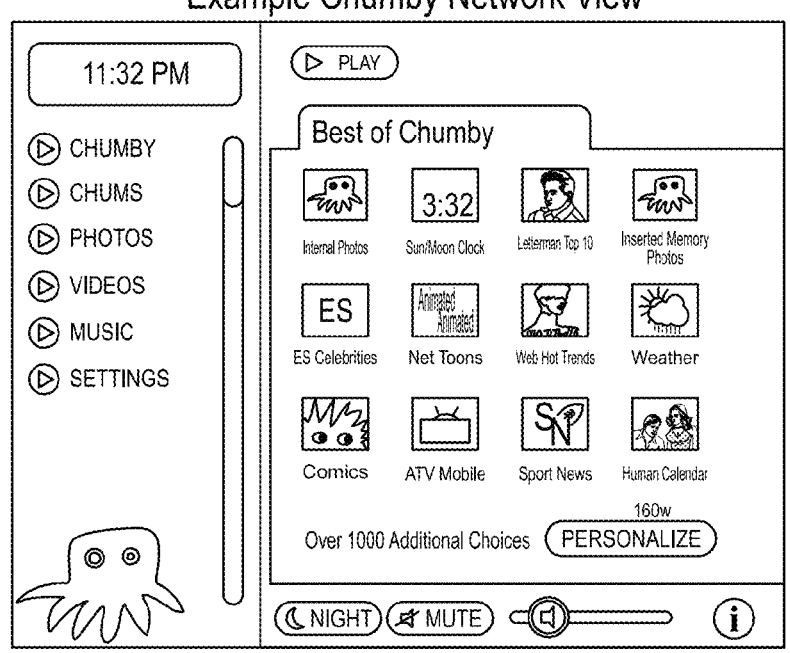
FIGS. 40-42 depict various exemplary screen shots and accompanying descriptions of CHUMBY™ network and CHUMBY™ widget catalog views capable of being rendered through the touch-sensitive user interface screen of a ChumbyFrame™ device.
Figure 41:
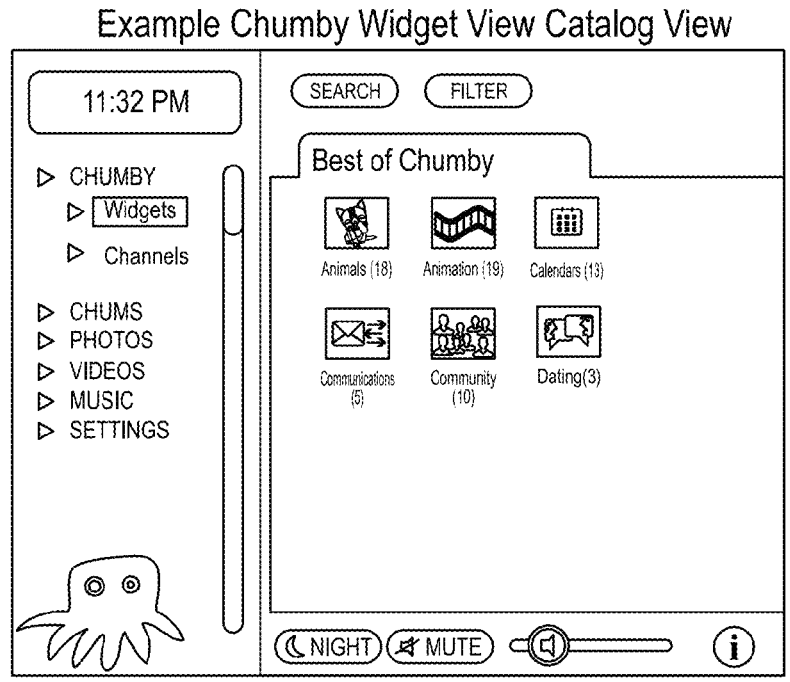
Figure 42:
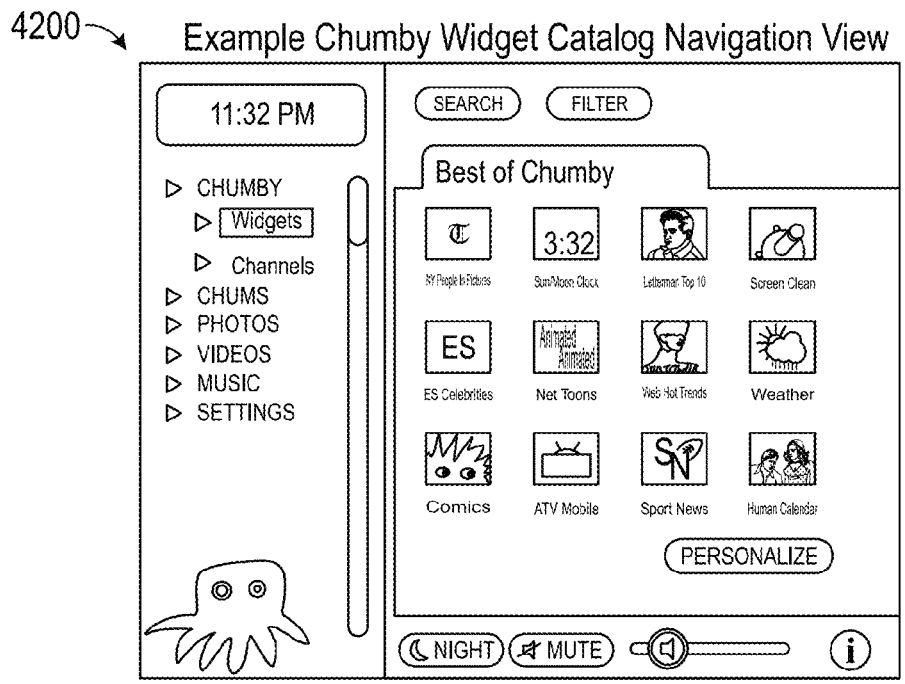
Figure 43:
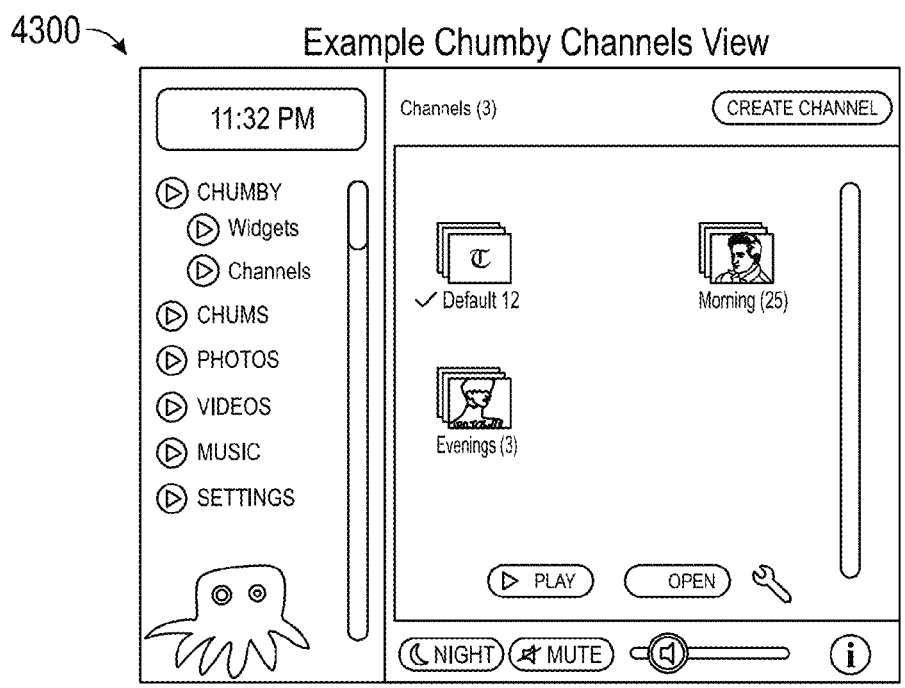
FIGS. 43-46 depict screen shots and accompanying descriptions of various exemplary user interface views relating to CHUMBY™ channels which are capable of being rendered through the touch-sensitive screen of a ChumbyFrame™ device.
Figure 44:
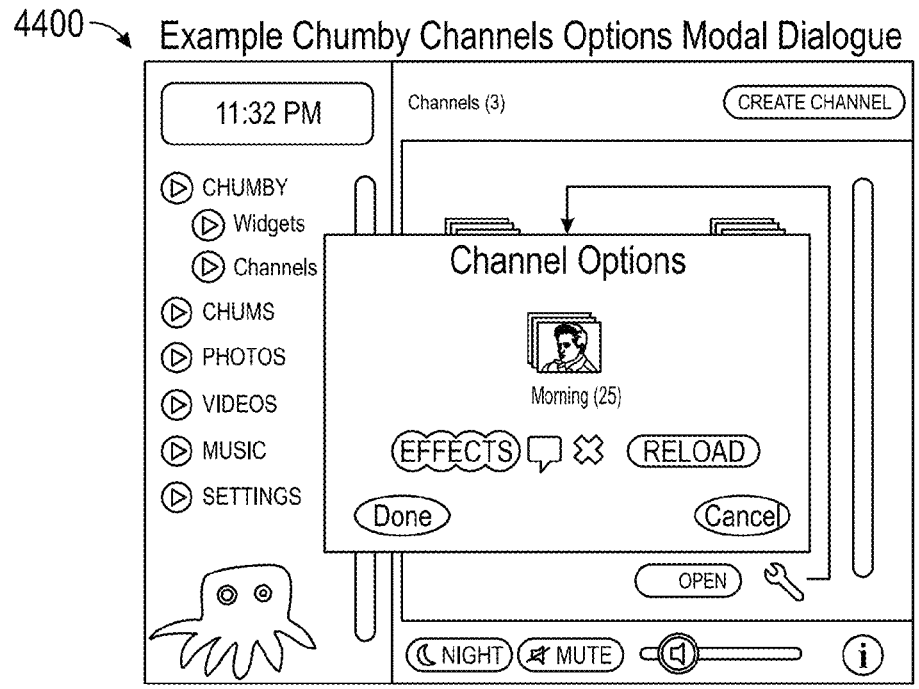
Figure 45:
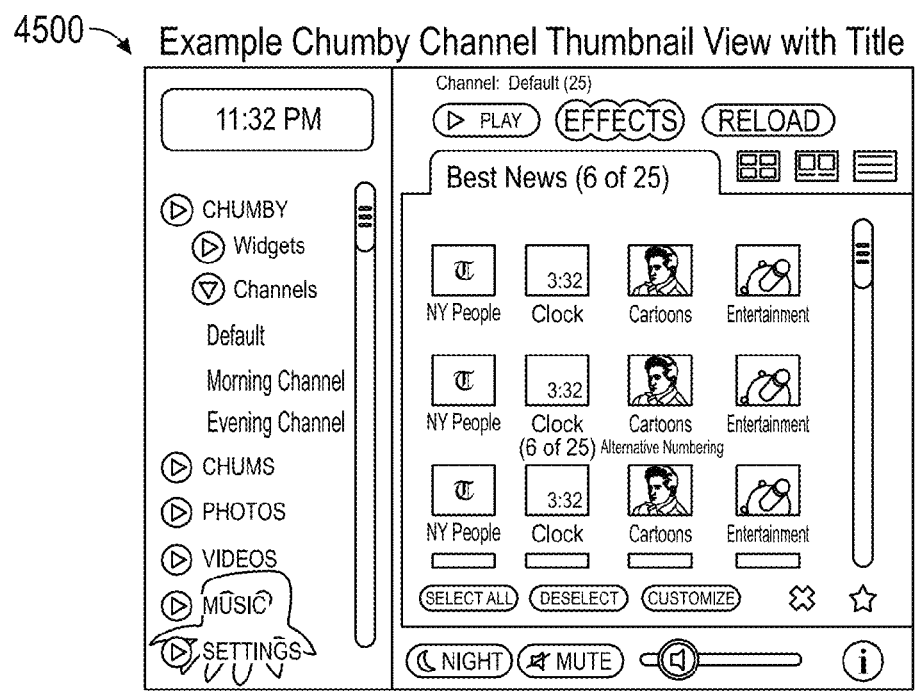
Figure 46:
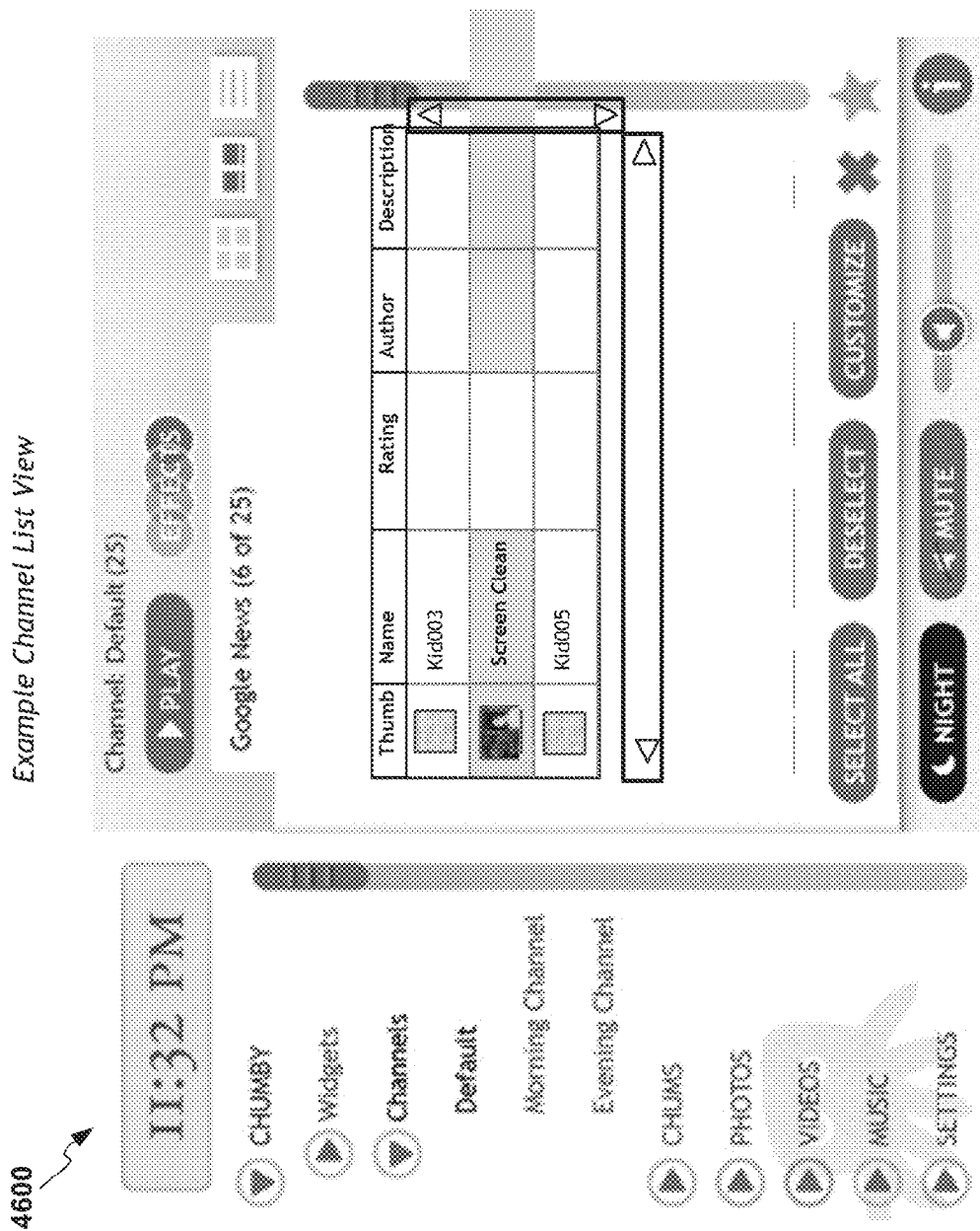

FIGS. 40-42 depict various exemplary screen shots and accompanying descriptions of CHUMBY™ network and CHUMBY™ widget catalog views capable of being rendered through the touch-sensitive user interface screen of a ChumbyFrame™ device. These views may be provided so as to allow a user to select appropriate widgets for rendering on the device. Widgets may be displayed based on particular capabilities of the user's device, such as hardware or software capabilities.

FIGS. 43-46 depict screen shots and accompanying descriptions of various exemplary user interface views relating to CHUMBY™ channels which are capable of being rendered through the touch-sensitive screen of a Chumby-Frame™ device. Channels may be selected by a first user for rendering on the first user's device and/or may be selected by another user for rendering on the first user's device.

Figure 47:
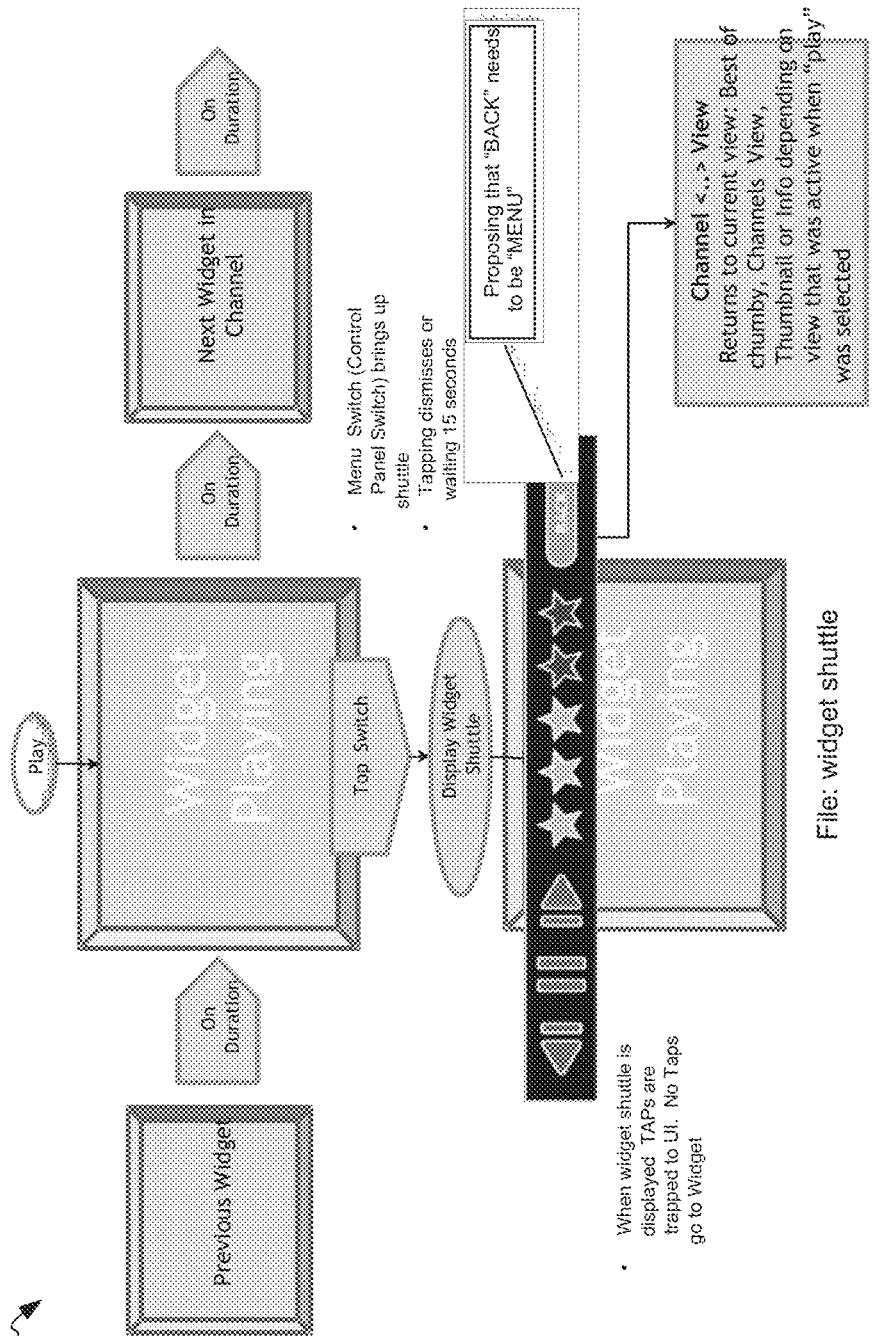
FIG. 47 illustratively represents and describes a widget shuttle process through which the playing of widgets is controlled via user interaction with the touch-sensitive screen of a ChumbyFrame™ device.

FIG. 47 illustratively represents and describes a widget shuttle process 4700 through which the playing of widgets is controlled via user interaction with the touch-sensitive screen of a ChumbyFrame™ device.

Figure 48:
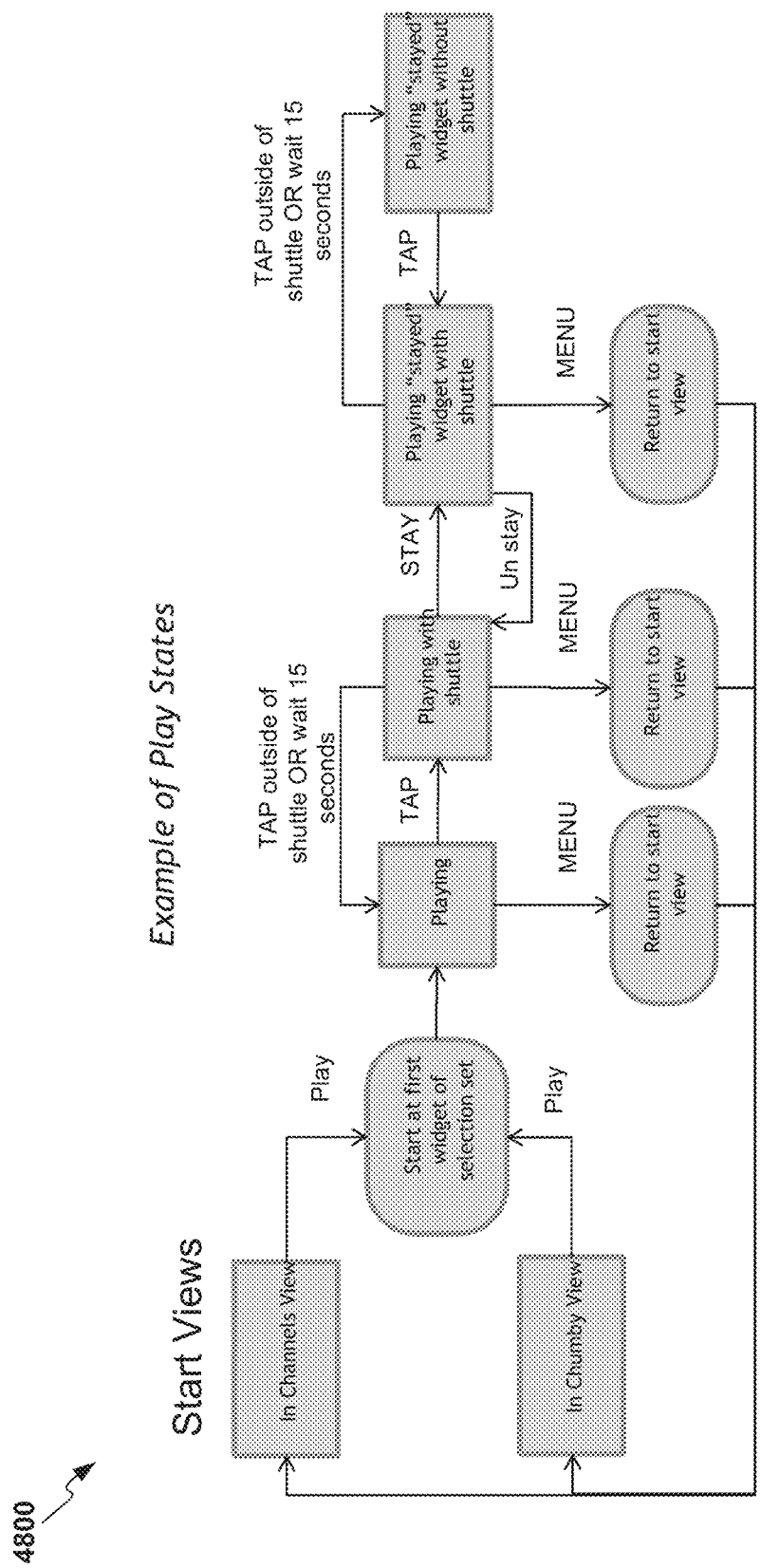
FIG. 48 is a flow chart relating to the widget shuttle process of FIG. 47.

FIG. 48 is a flow chart 4800 relating to play states of the widget shuttle process of FIG. 47.

Examples of Interaction with Chums Via a ChumbyFrame™ Device

Figure 49:
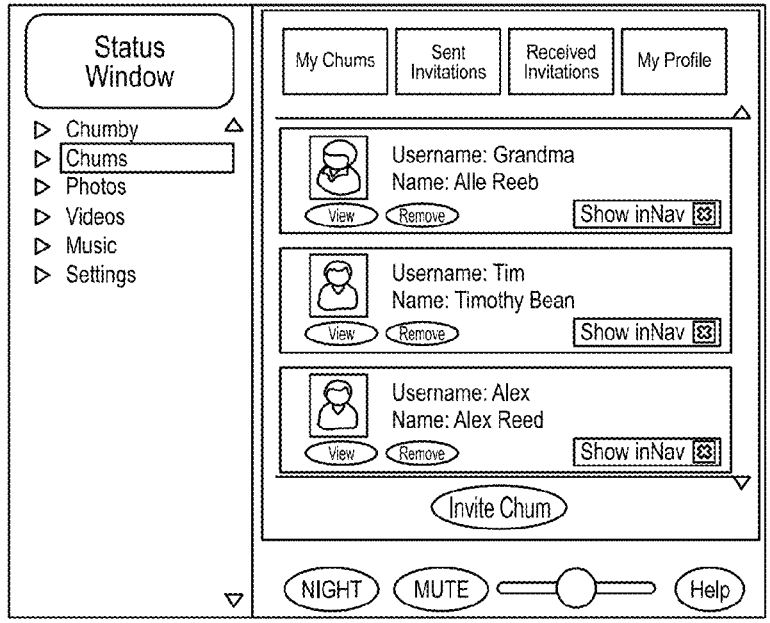
FIG. 49 depicts a screen shot and accompanying description of an exemplary top-level user interface view relating to interaction with the "chums" of a user via the CHUMBY™ network which is capable of being rendered through the touch-sensitive screen of a ChumbyFrame™ device.
Figure 50:
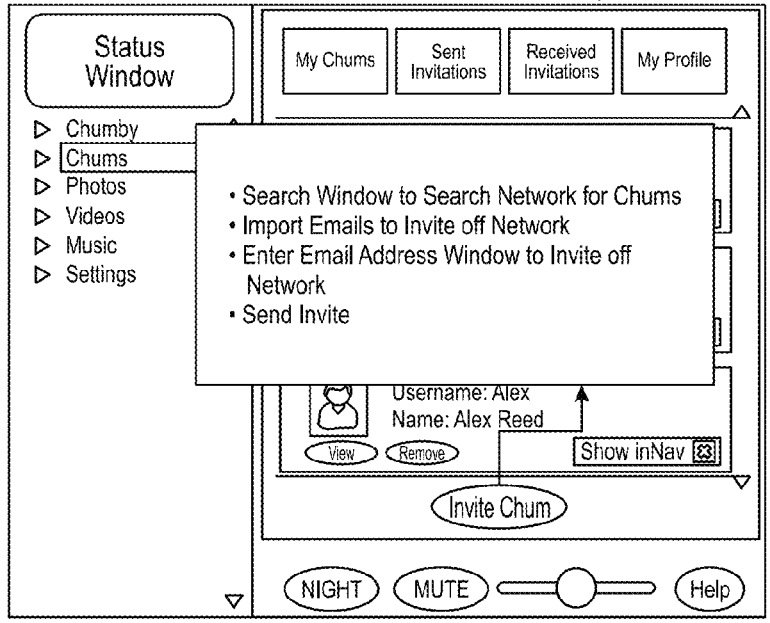
FIGS. 50-54 depict screen shots and accompanying descriptions of various exemplary user interface views relating to user interaction with chums via the CHUMBY™ network which are capable of being rendered through the touch-sensitive screen of a ChumbyFrame™ device.
Figure 51:
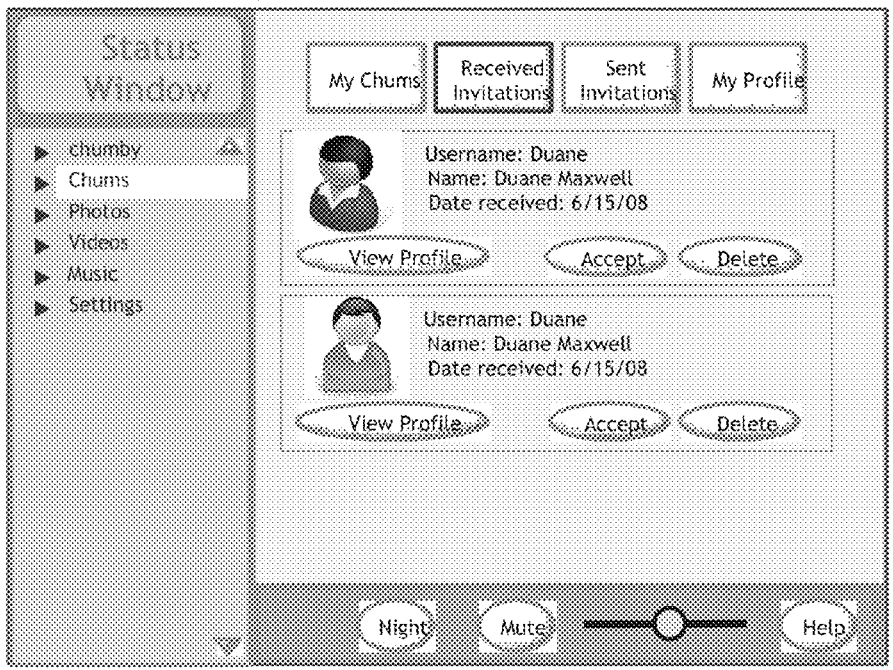
Figure 52:
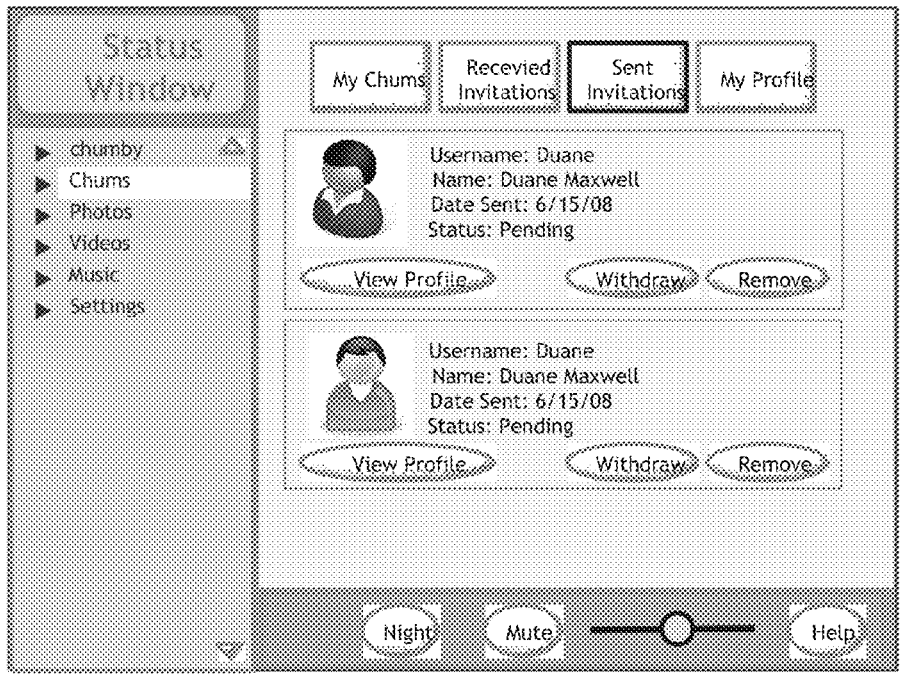
Figure 53:
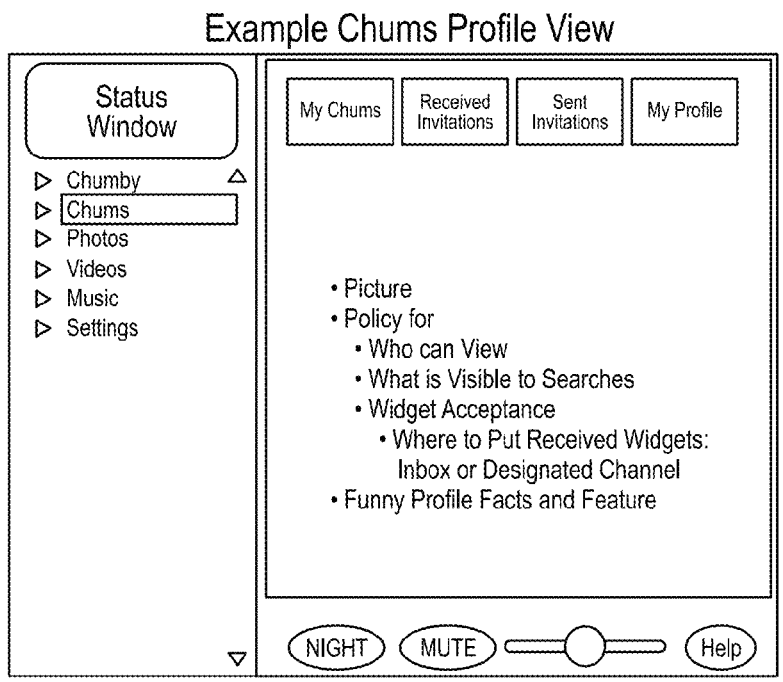
Figure 54:
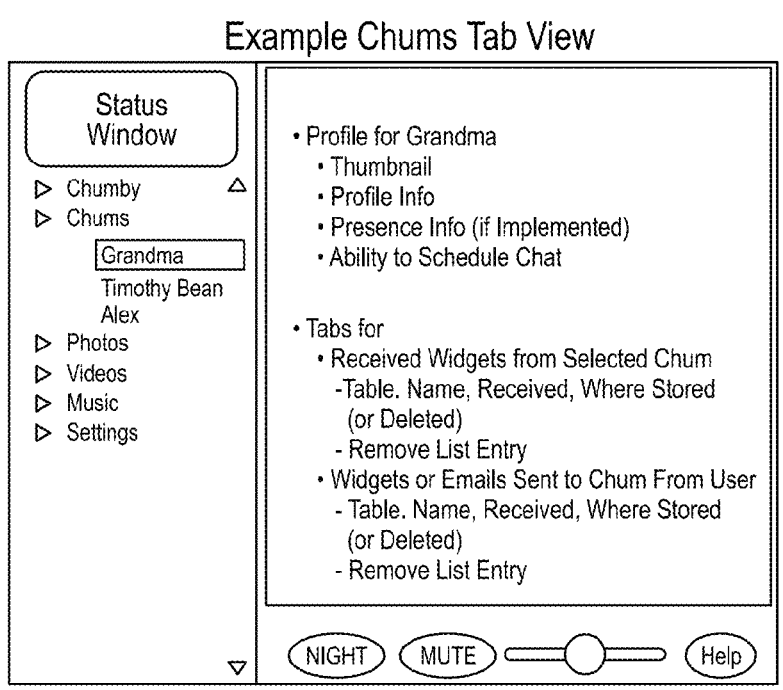

FIG. 49 depicts a screen shot 4900 and accompanying description of an exemplary top-level user interface view relating to interaction with the "chums" of a user via the CHUMBY™ network which is capable of being rendered through the touch-sensitive screen of a ChumbyFrame™ device. Chums are typically other user's associated with a first user, such as friends, relatives or other acquaintances.

FIGS. 50-54 depict screen shots and accompanying descriptions of various exemplary user interface views relating to user interaction with chums via the CHUMBY™ network which are capable of being rendered through the touch-sensitive screen of a ChumbyFrame™ device. Additional details are provided further below regarding various social networking and other processes which may be effected between and among chums through the CHUMBY™ network.

Examples of Photo Viewing and Sharing Via a ChumbyFrame™ Device

Figure 55:
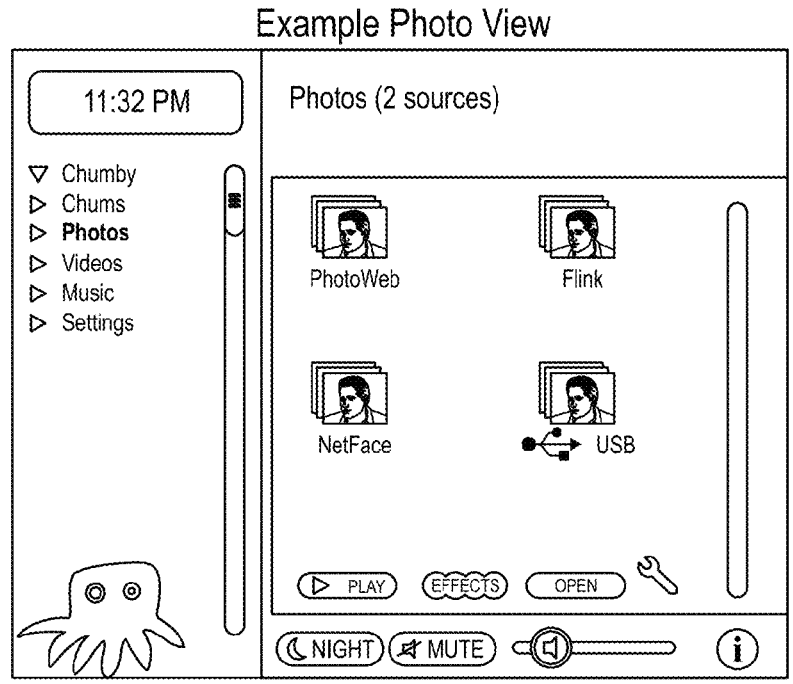
FIG. 55 depicts a screen shot and accompanying description of an exemplary top-level user interface view relating to photo viewing and sharing which is capable of being rendered through the touch-sensitive screen of a ChumbyFrame™ device. Appendix C provides a description of various photo viewing and sharing processes which may be performed using a ChumbyFrame™ device.

FIG. 55 depicts a screen shot 5500 and accompanying description of an exemplary top-level user interface view relating to photo viewing and sharing which is capable of being rendered through the touch-sensitive screen of a ChumbyFrame™ device. Appendix D provides a description of various photo viewing and sharing processes which may be performed using a ChumbyFrame™ device.

Figure 56:
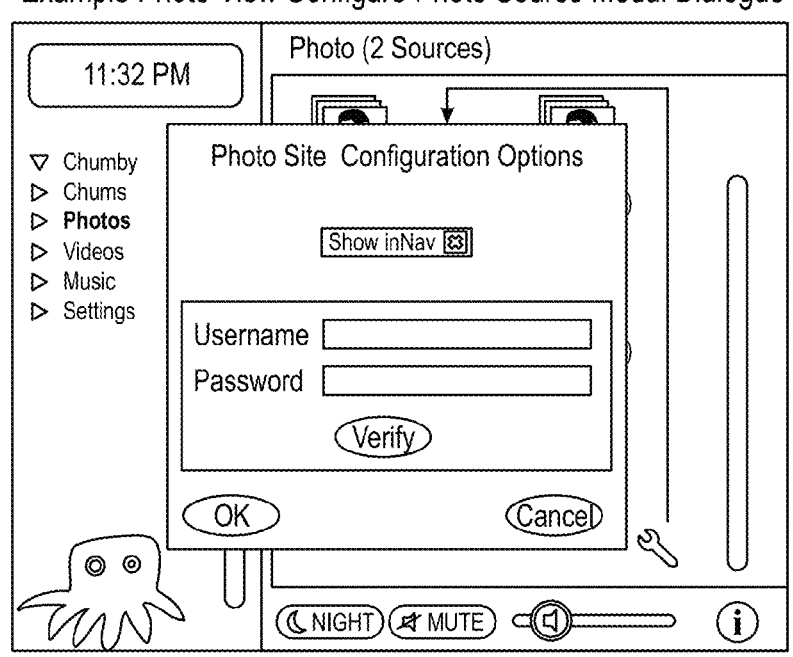
FIG. 56 depicts a screen shot and accompanying description of an exemplary configure photo source dialog box which is capable of being rendered through the touch-sensitive screen of a ChumbyFrame™ device.
Figure 57:
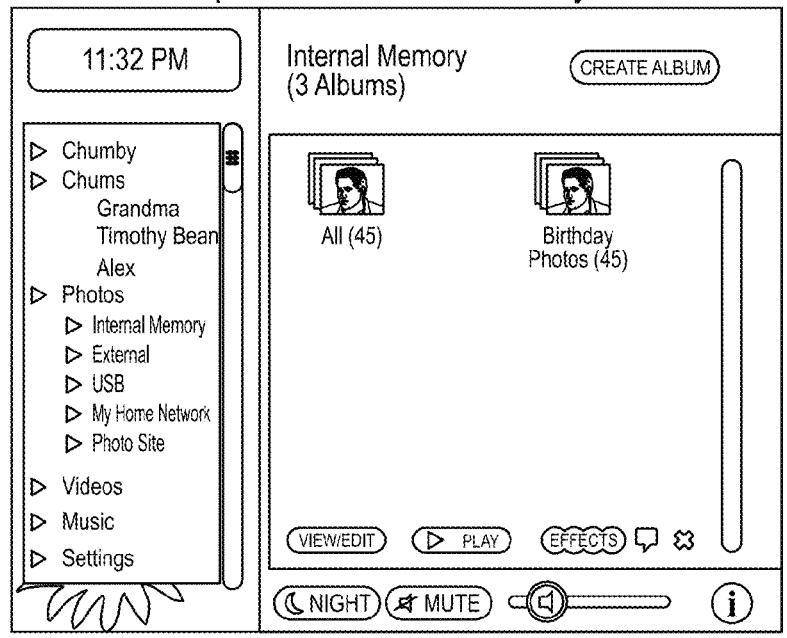
FIGS. 57-62 depict screen shots and accompanying descriptions of various exemplary dialog boxes and user interface views relating to the viewing of photos stored within internal memory of a ChumbyFrame™ device.
Figure 58:
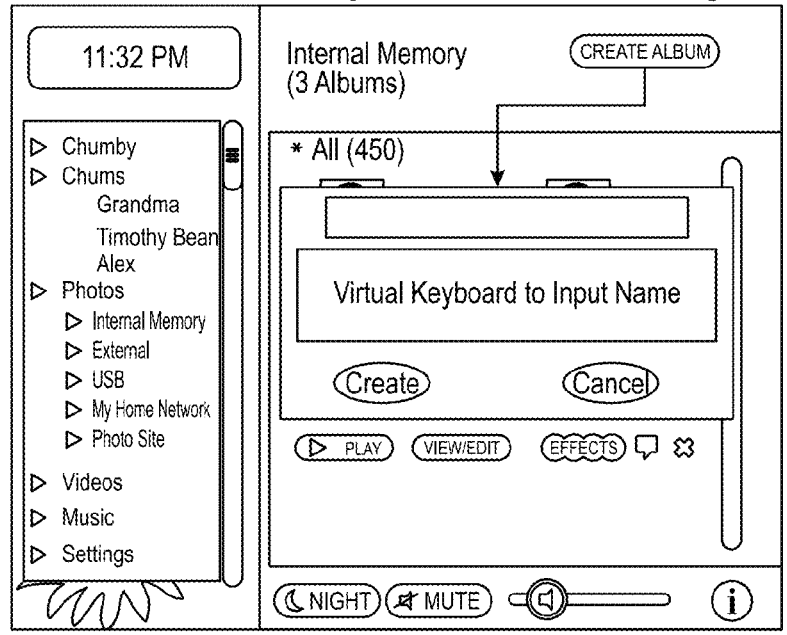
Figure 59:
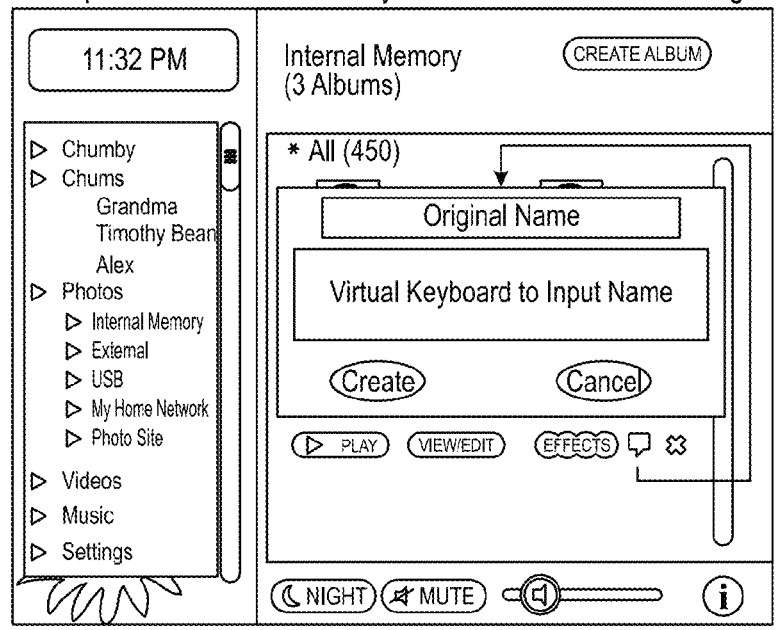
Figure 60:
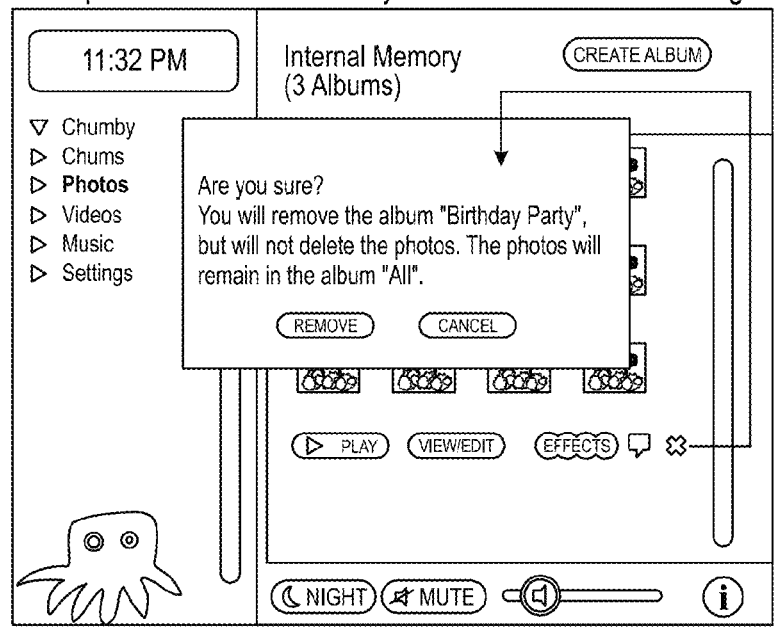
Figure 61:
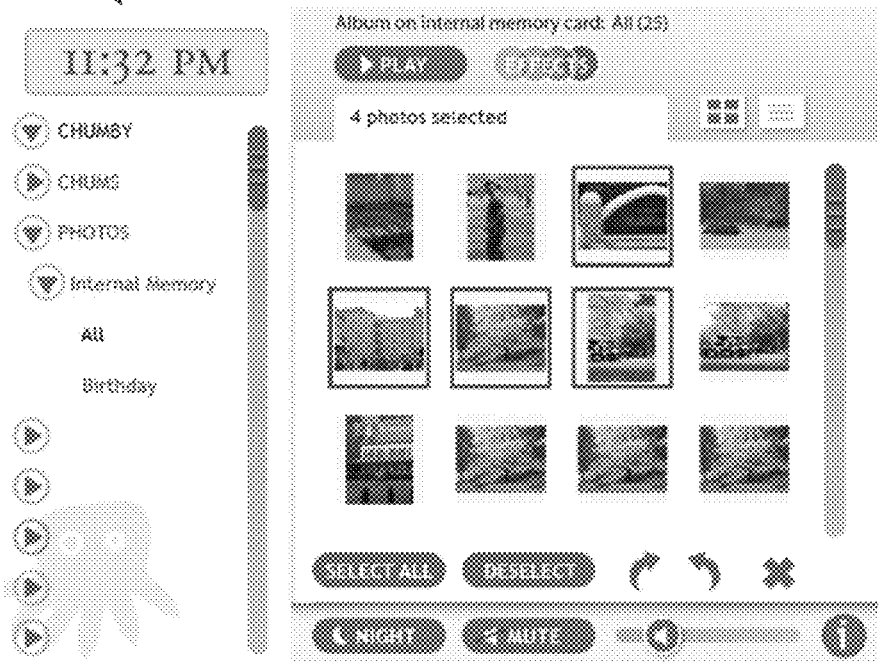
Figure 62:
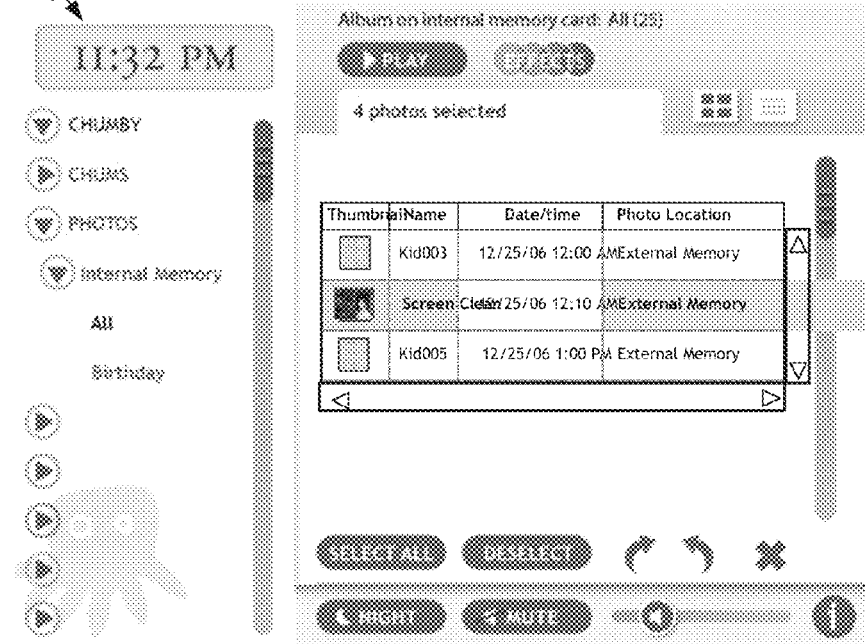

FIG. 56 depicts a screen shot 5600 and accompanying description of an exemplary configure photo source dialog box which is capable of being rendered through the touch-sensitive screen of a ChumbyFrame™ device.

FIGS. 57-62 depict screen shots and accompanying descriptions of various exemplary dialog boxes and user interface views relating to the viewing of photos stored within internal memory of a ChumbyFrame™ device.

FIG. 63 depicts a screen shot 6300 and accompanying description of an exemplary photo slide show effects dialog box which is capable of being rendered through the touch-sensitive screen of a ChumbyFrame™ device.

Figure 64:
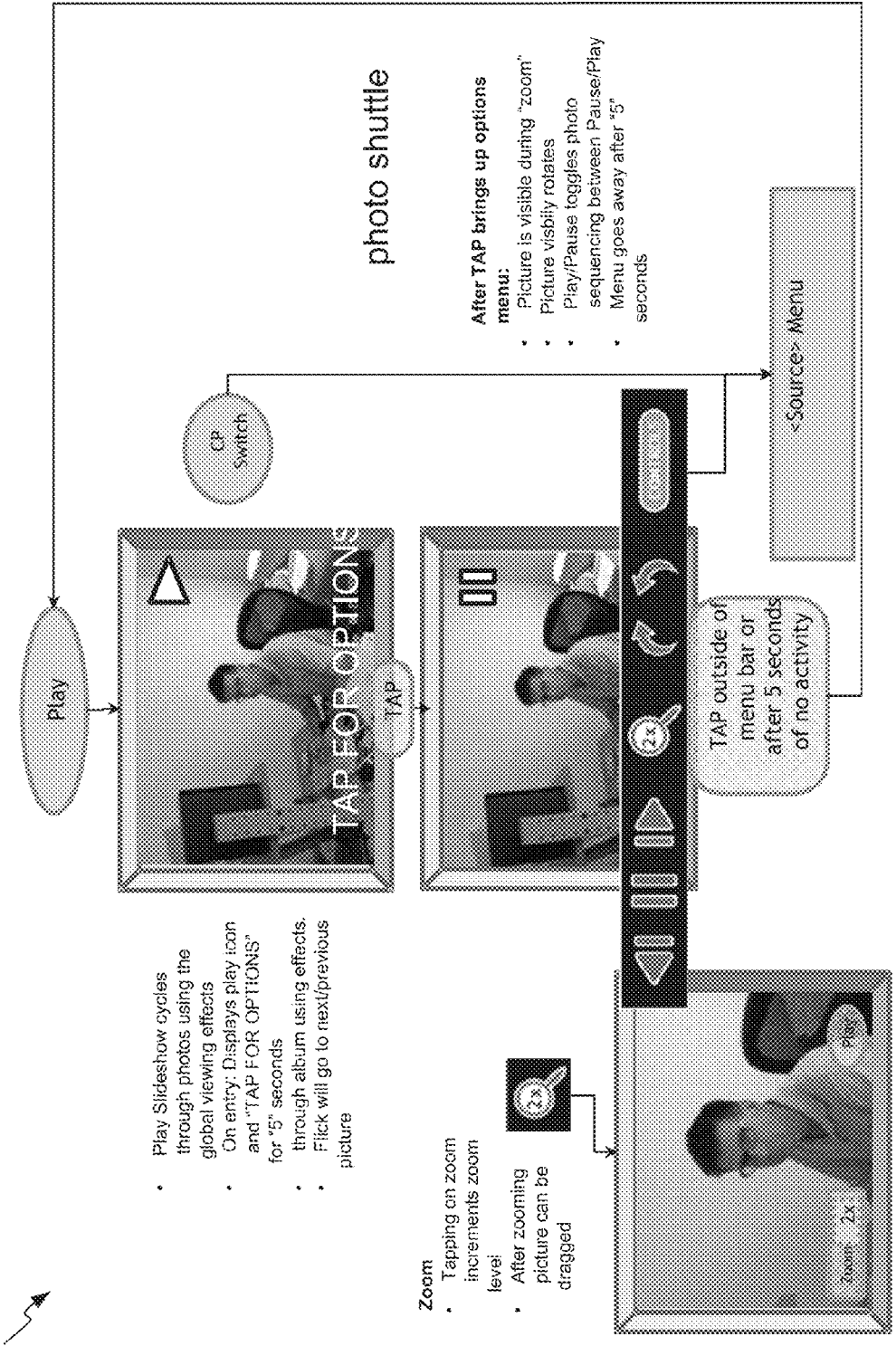
FIG. 64 illustratively represents and describes a photo shuttle process through which the display of photos through the touch-sensitive screen of a ChumbyFrame™ device is controlled via user interaction with such screen.

FIG. 64 illustratively represents and describes a photo shuttle process 6400 through which the display of photos through the touch-sensitive screen of a ChumbyFrame™ device is controlled via user interaction with such screen.

Figure 65:
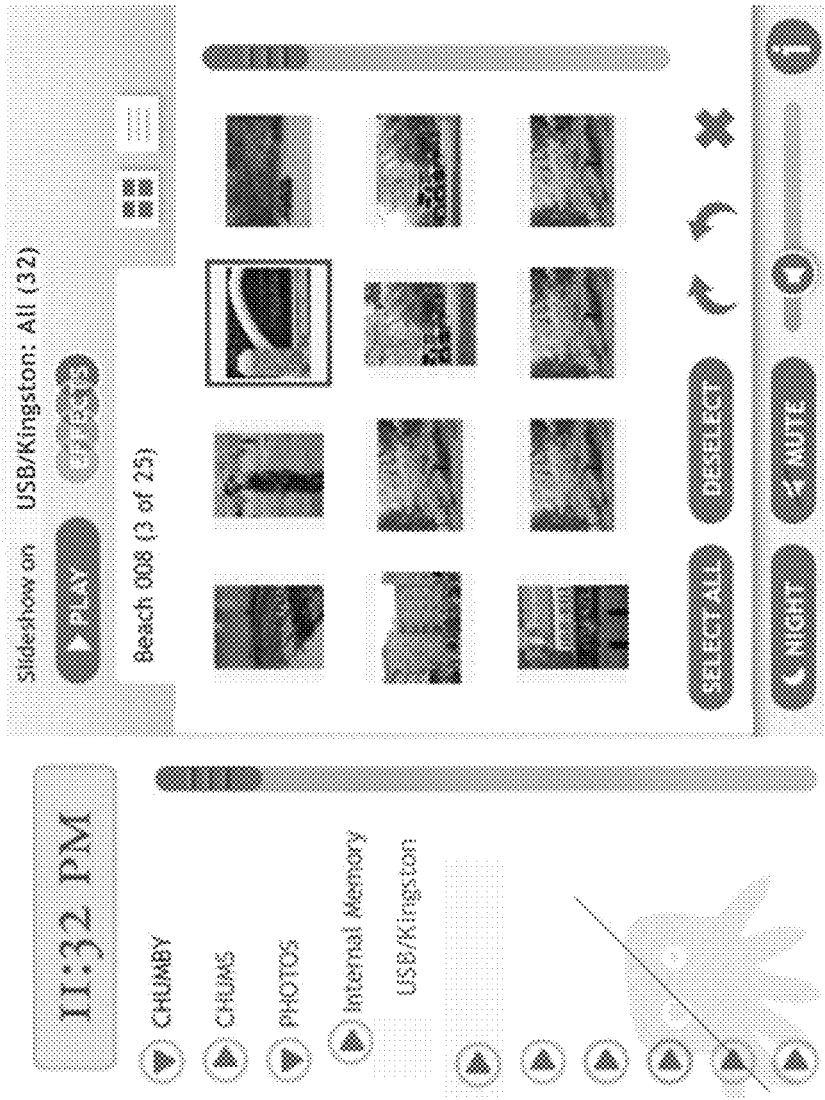
FIG. 65 depicts a screen shot and accompanying description of an exemplary discovered inserted device thumbnail view which is capable of being rendered through the touch-sensitive screen of a ChumbyFrame™ device.

FIG. 65 depicts a screen shot 6500 and accompanying description of an exemplary discovered inserted device thumbnail view which is capable of being rendered through the touch-sensitive screen of a ChumbyFrame™ device.

Figure 66:
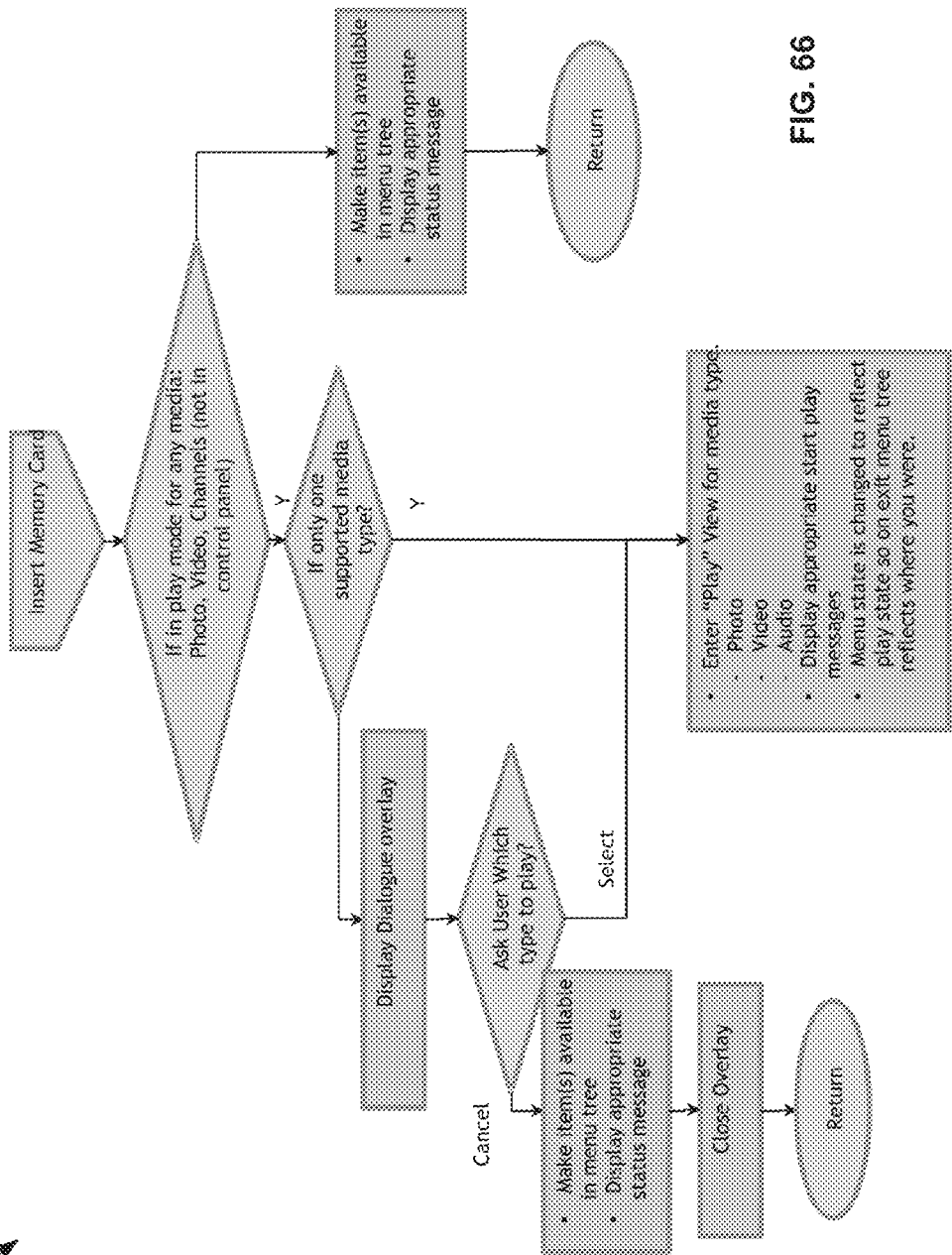
FIG. 66 is a flow chart relating to the process of generating various user interface views through the touch-sensitive screen of a ChumbyFrame™ device in response to the insertion of a memory card into such device.
Figure 67:
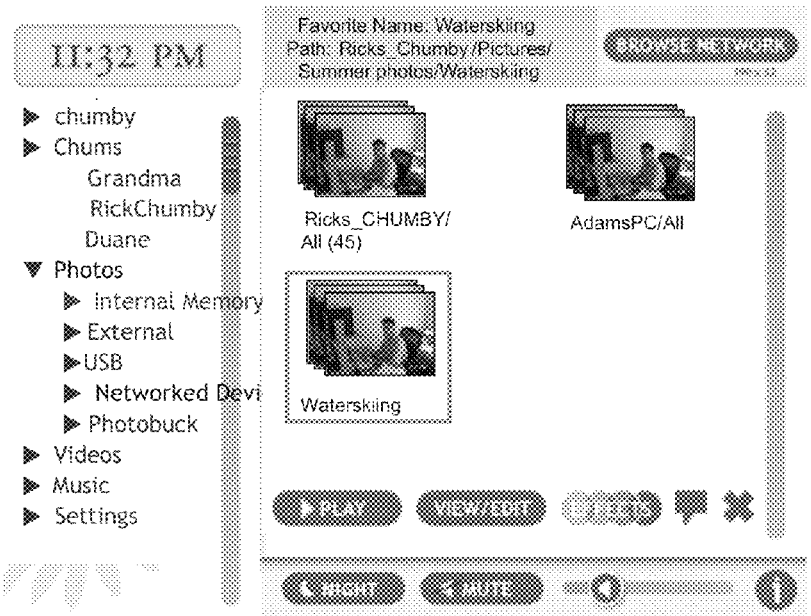
FIGS. 67-75 depict screen shots and accompanying descriptions of various exemplary dialog boxes and user interface views relating to the viewing of photos stored on a networked device accessible through a network to which a ChumbyFrame™ device is connected.
Figure 68:
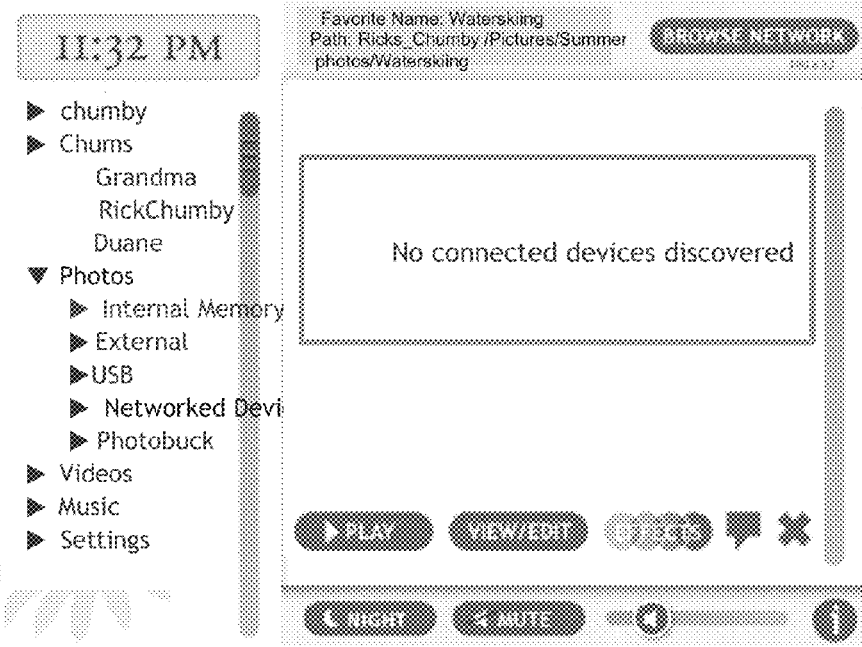
Figure 69:
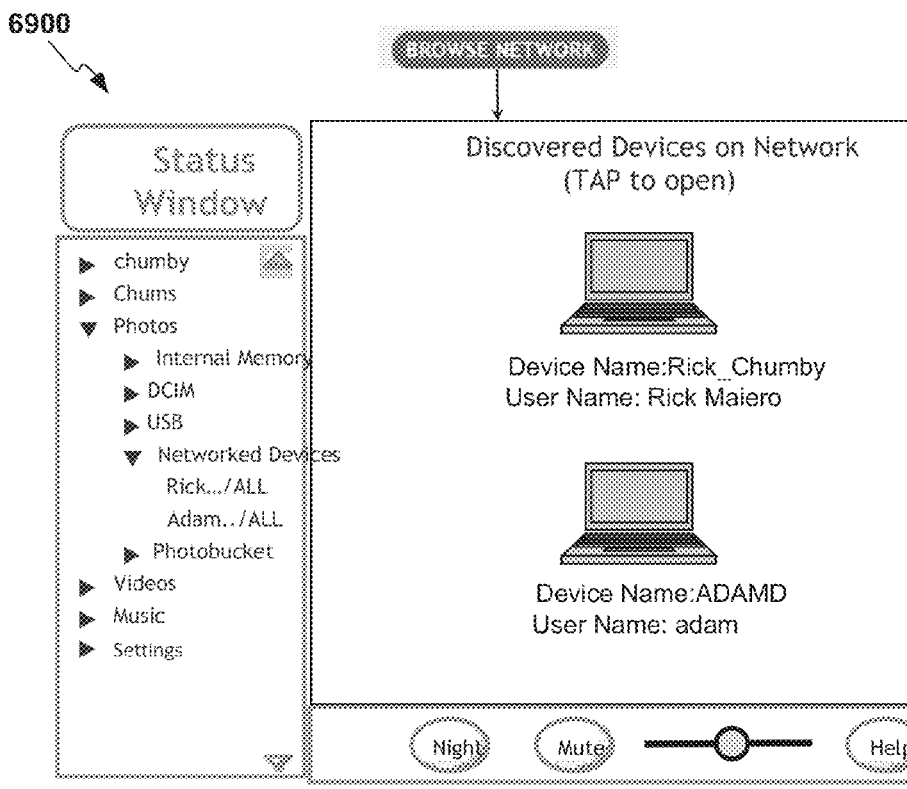
Figure 70:
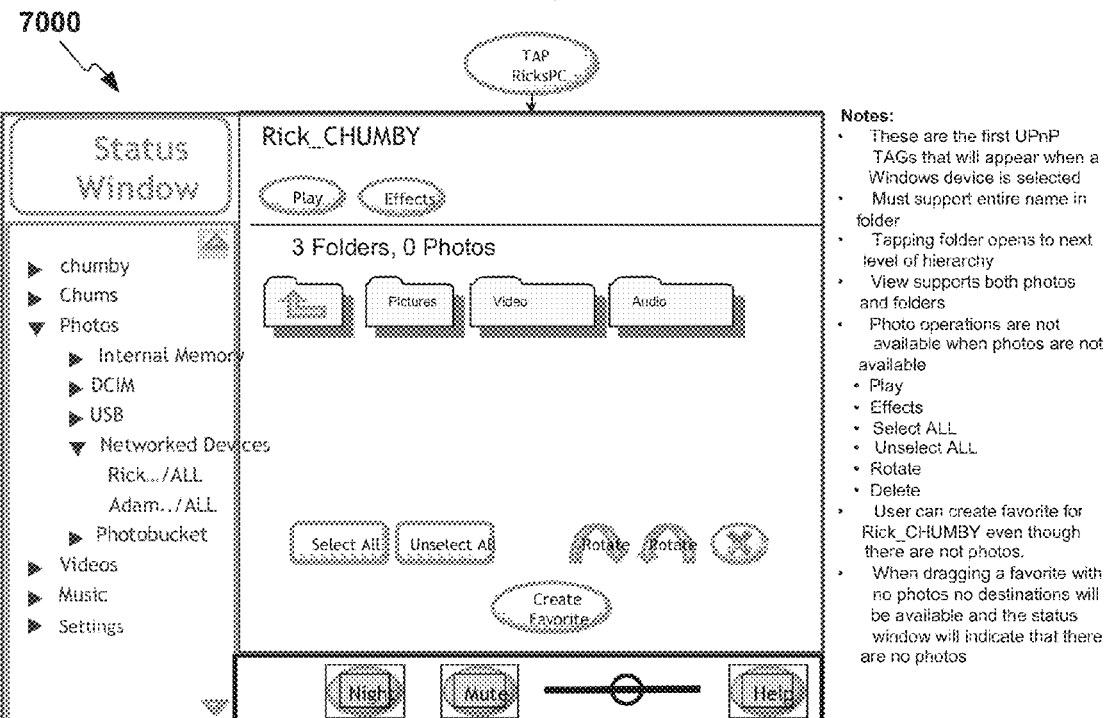
Figure 71:
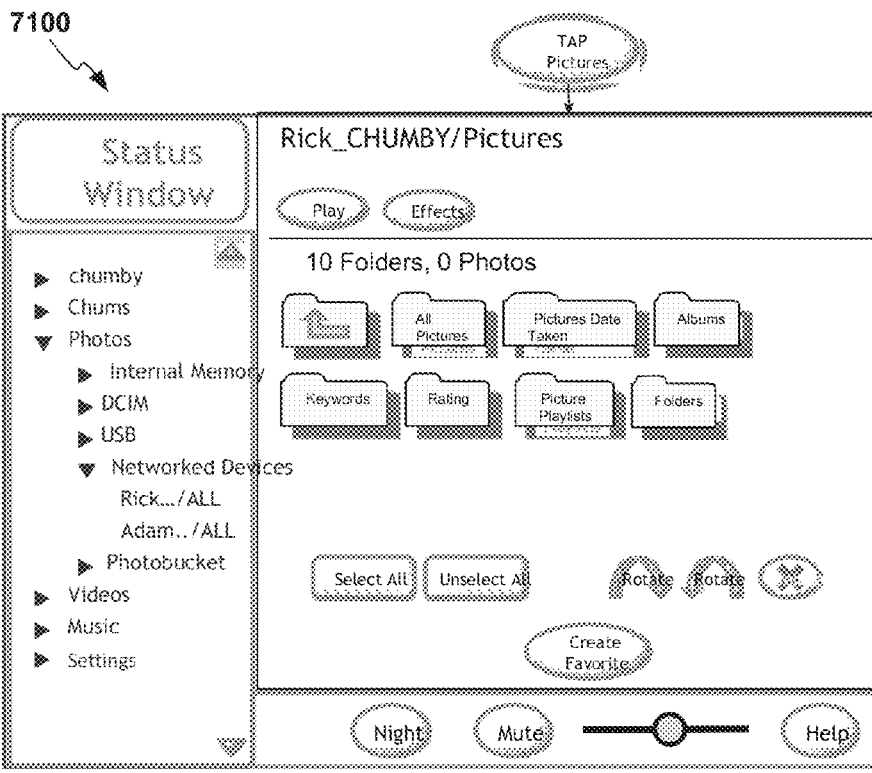
Figure 72:
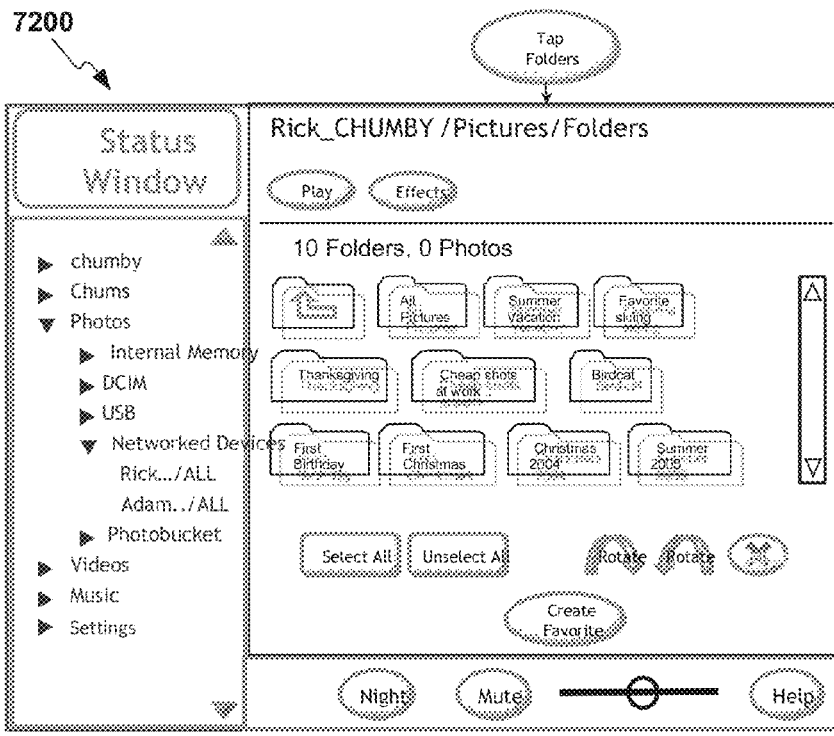
Figure 73:
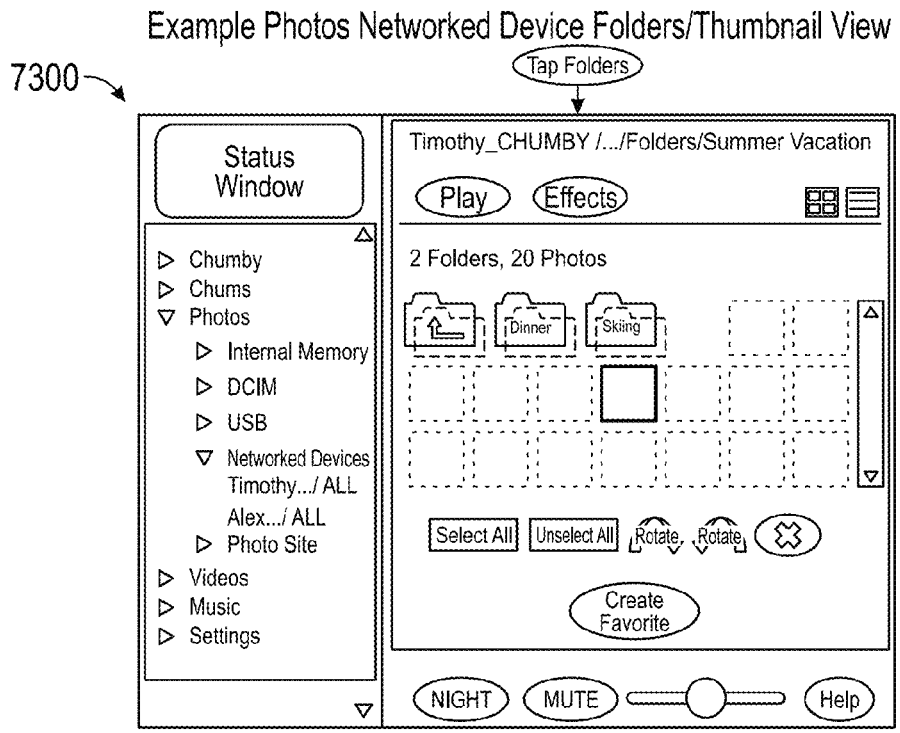
Figure 74:
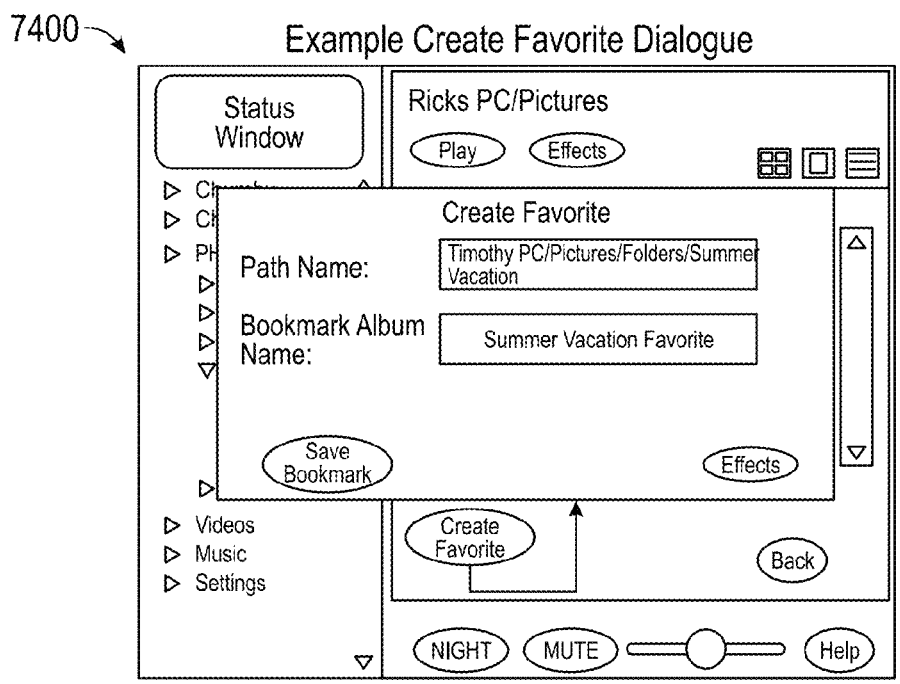
Figure 75:
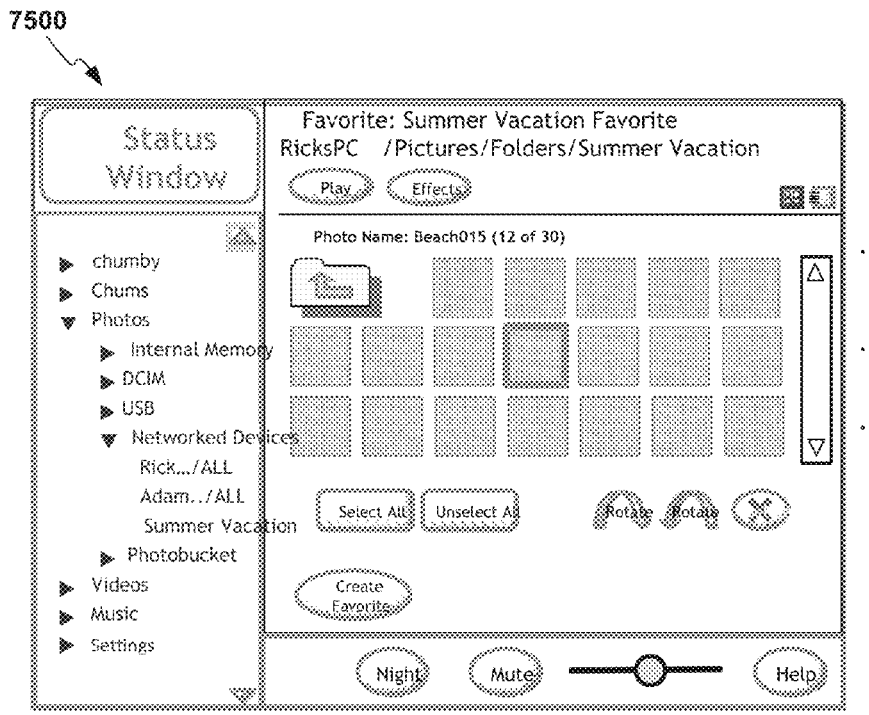
Figure 76:
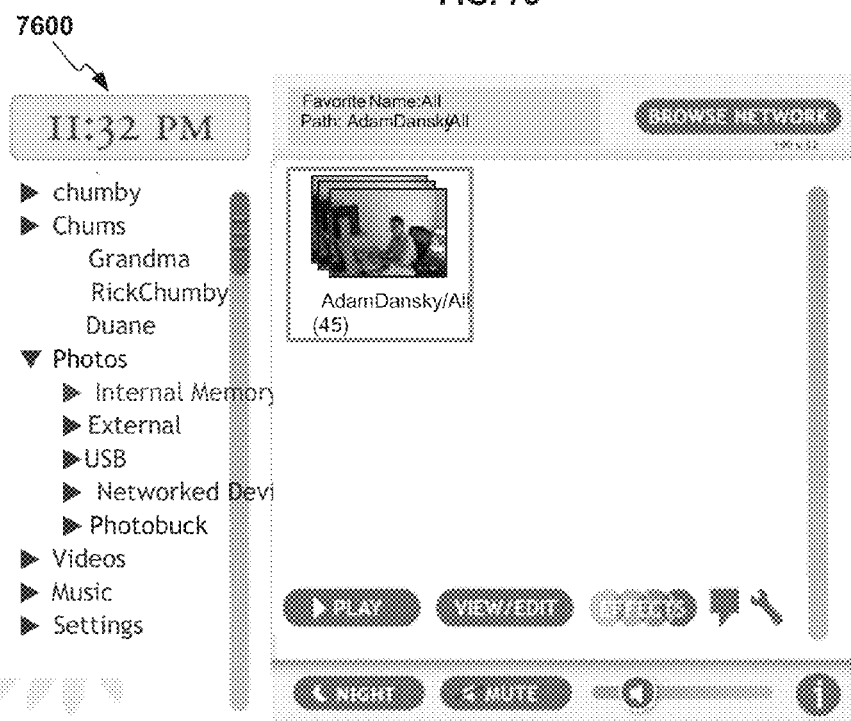
FIGS. 76-83 depict screen shots and accompanying descriptions of various exemplary dialog boxes and user interface views presented via a ChumbyFrame™ device which relate to the viewing and managing of photos stored by an Internet-based service provider such as Photobucket, Flickr or Picasa.
Figure 77:
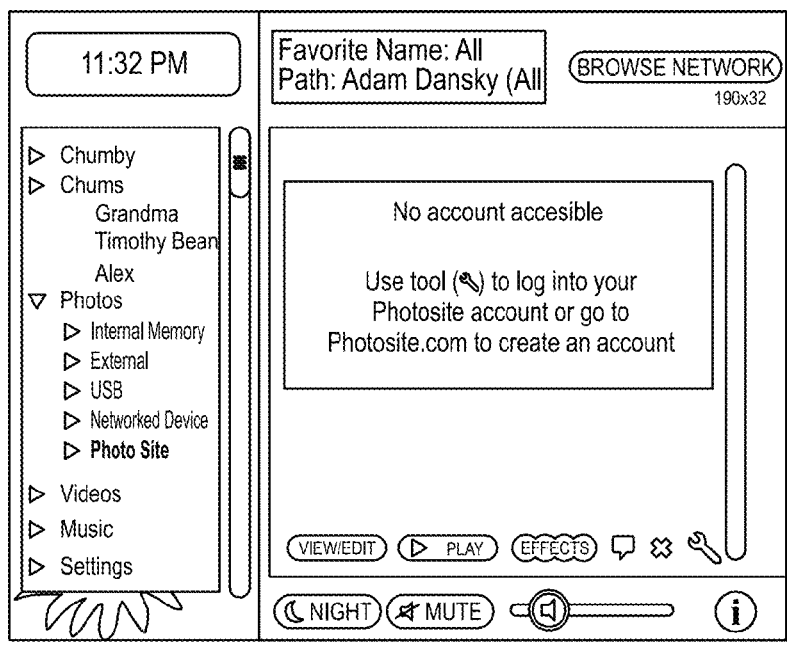
Figure 78:
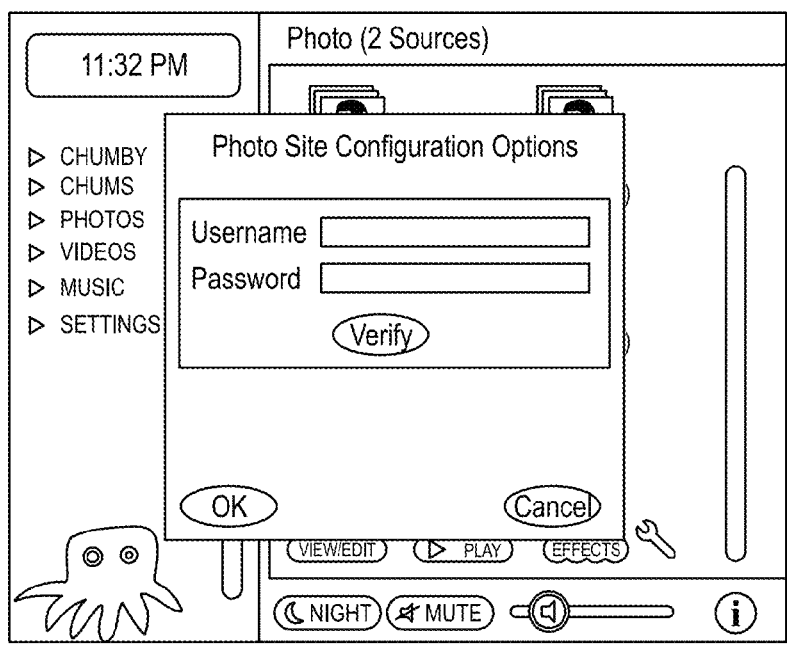
Figure 79:
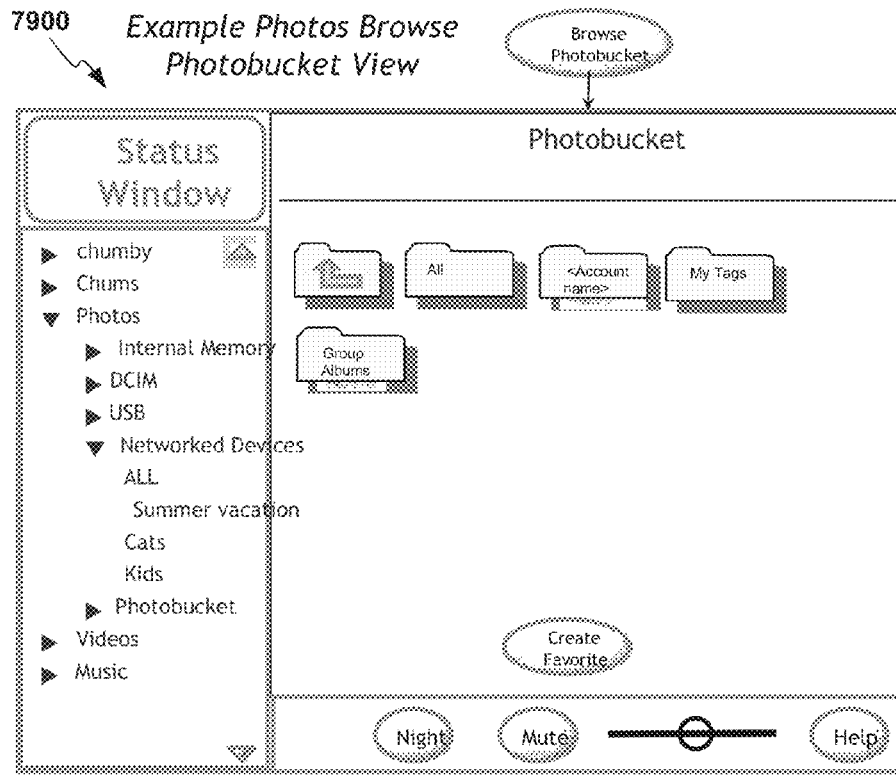
Figure 80:
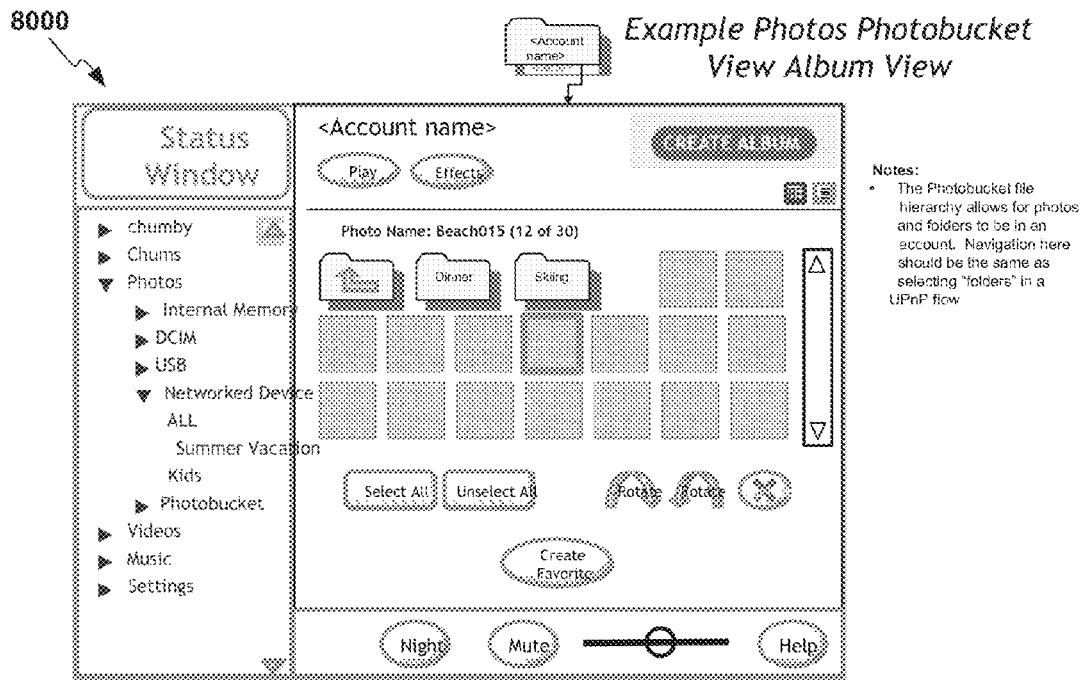
Figure 81:
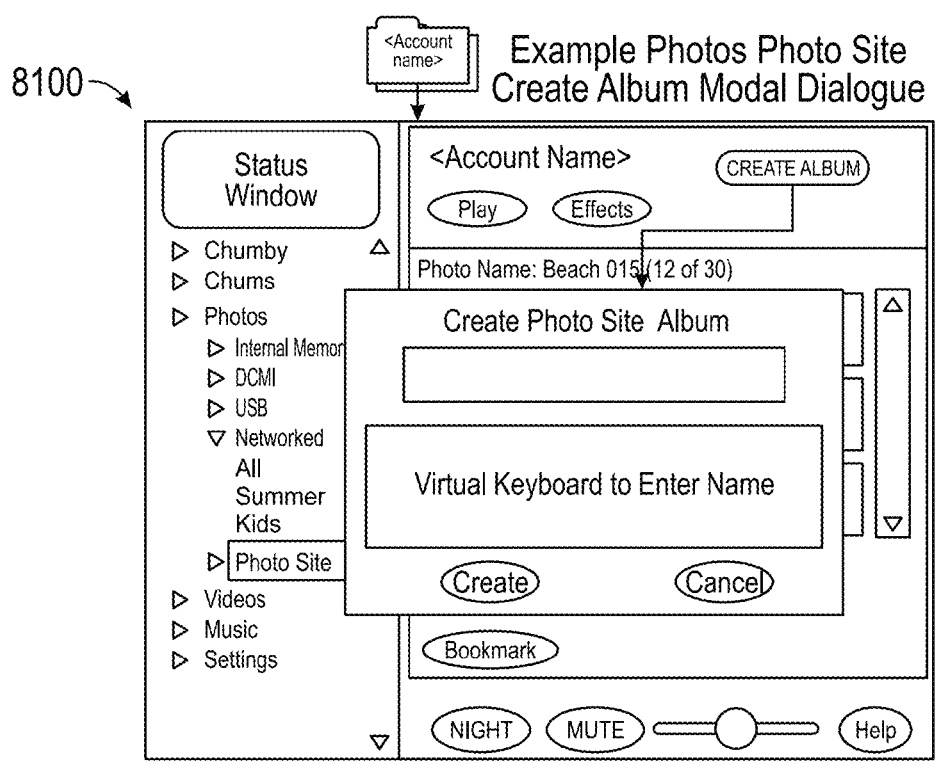
Figure 82:
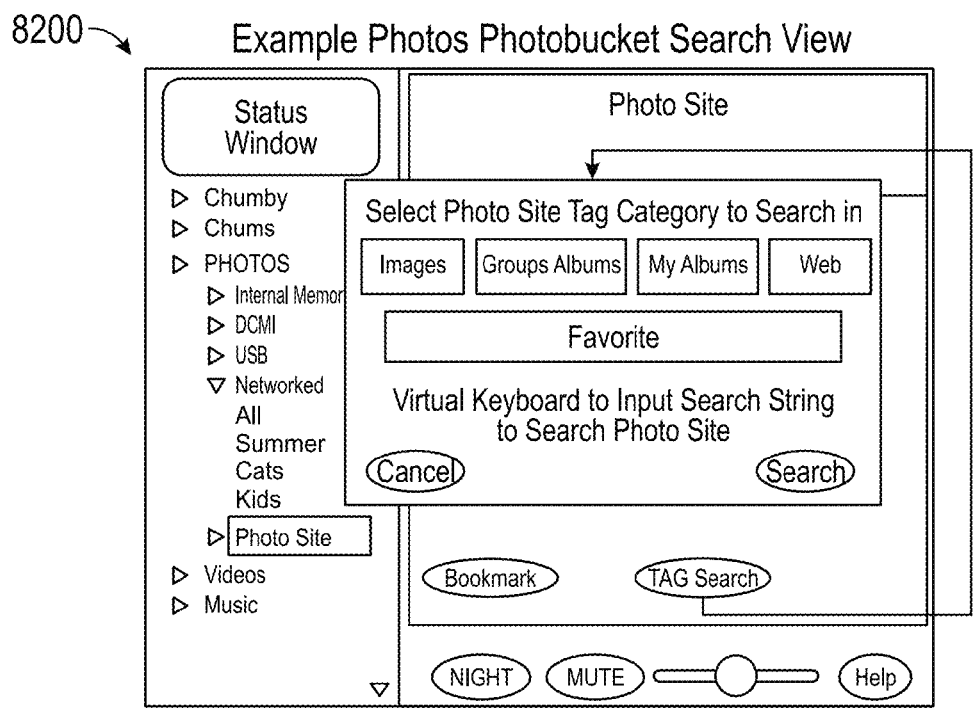
Figure 83:
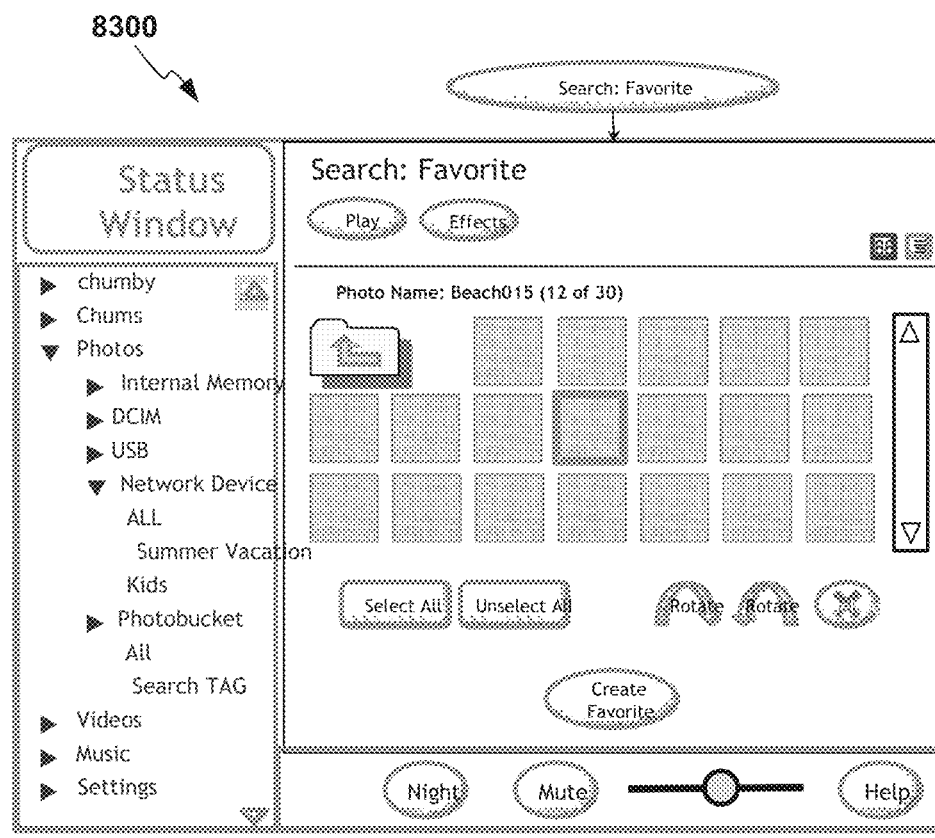

FIG. 66 illustrates a flow chart 6600 relating to the process of generating various user interface views through the touch-sensitive screen of a ChumbyFrame™ device in response to the insertion of a memory card into such device.

FIGS. 67-75 depict screen shots and accompanying descriptions of various exemplary dialog boxes and user interface views relating to the viewing of photos stored on a networked device accessible through a network to which a ChumbyFrame™ device is connected.

FIGS. 76-83 depict screen shots and accompanying descriptions of various exemplary dialog boxes and user interface views presented via a ChumbyFrame™ device which relate to the viewing and managing of photos stored by an Internet-based service provider such as Photobucket, Flickr or Picasa.

Figure 84:
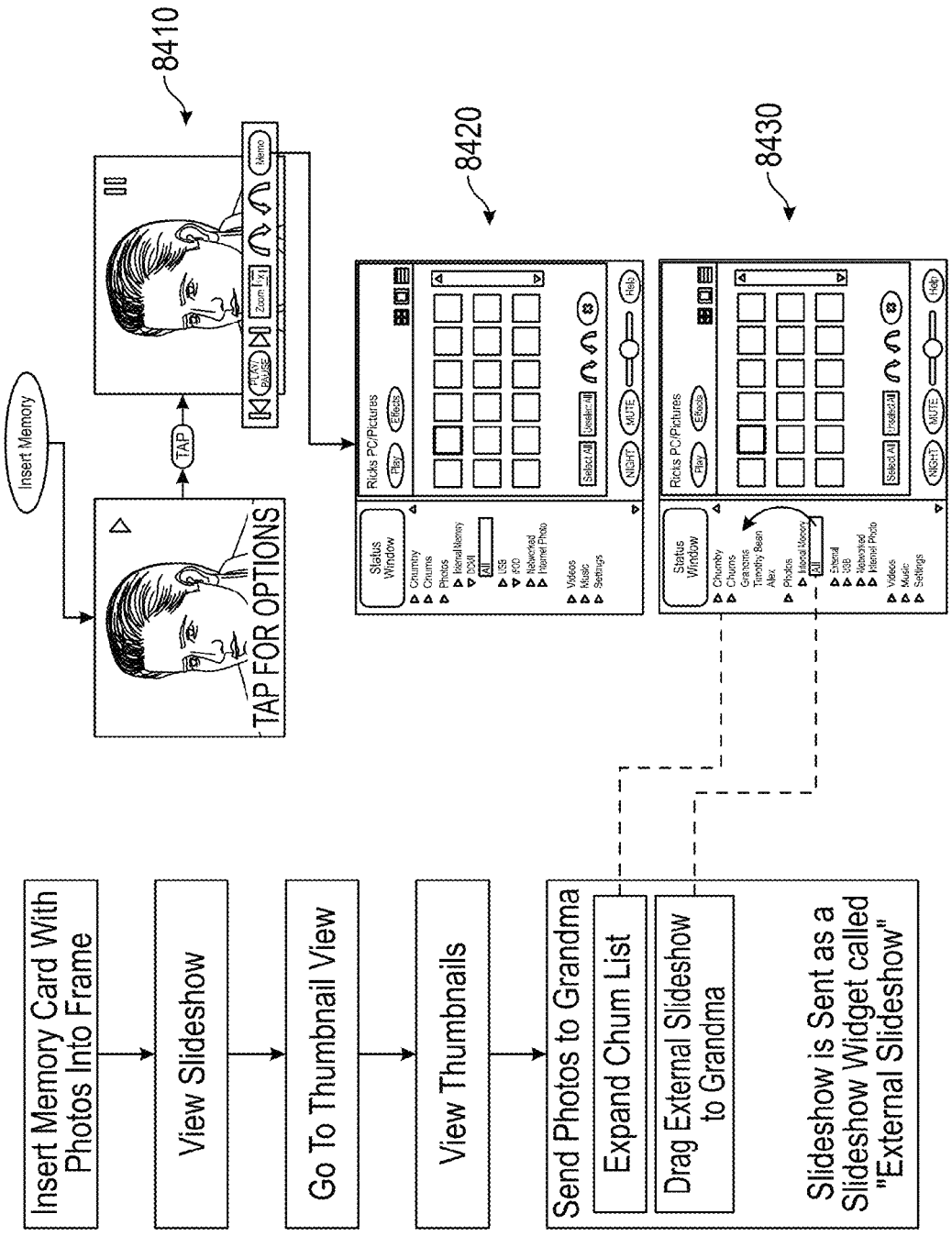
FIG. 84 is a flow chart relating to the process of sending photos from a memory card inserted into a ChumbyFrame™ device to a chum of the user of the device.

FIG. 84 illustrates a flow chart 8400 relating to the process of sending photos from a memory card inserted into a ChumbyFrame™ device to a chum of the user of the device.

Figure 85:
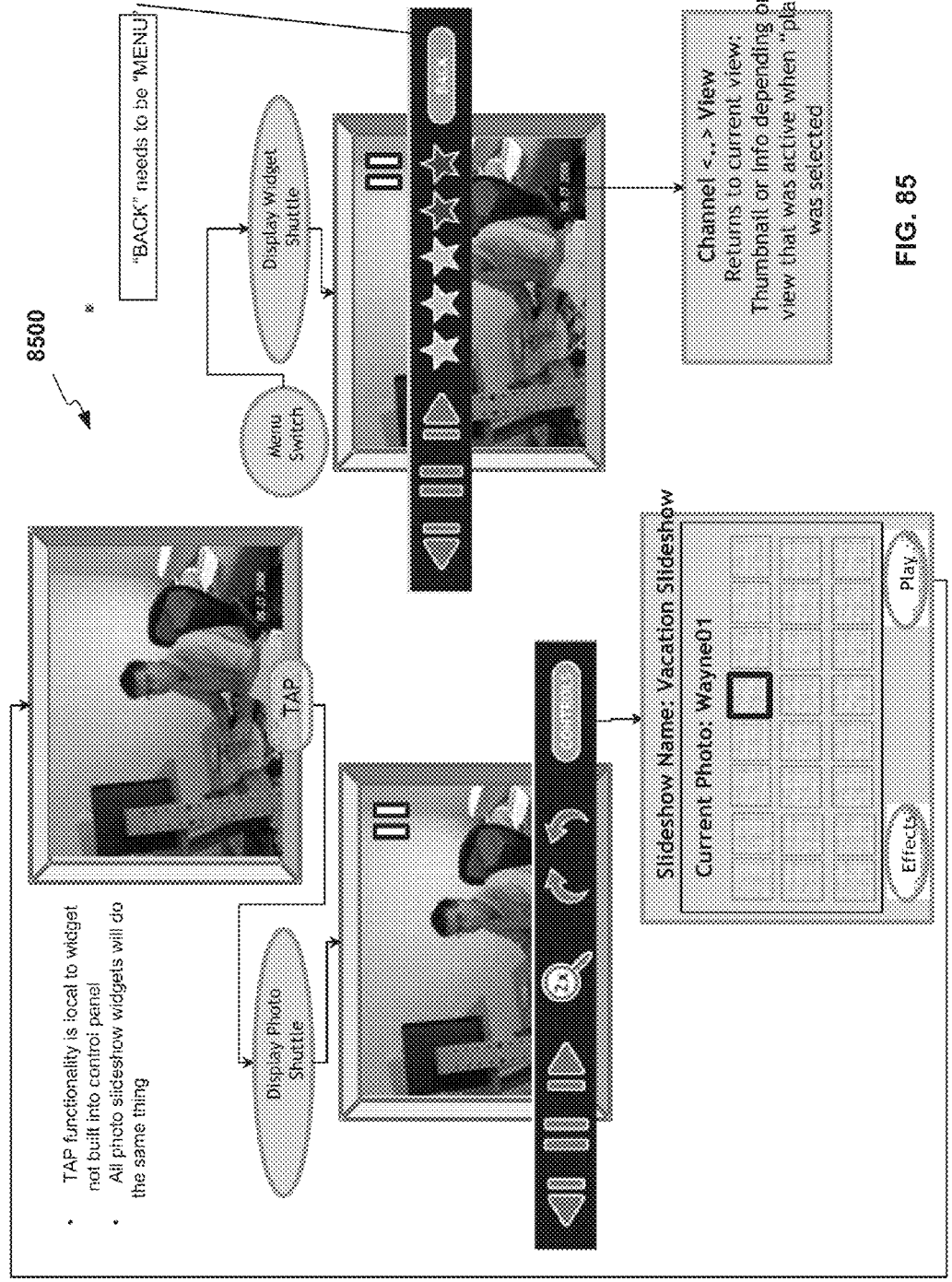
FIG. 85 illustrates the functionality of a widget configured to render a slideshow on a ChumbyFrame™ device.
Figure 86:
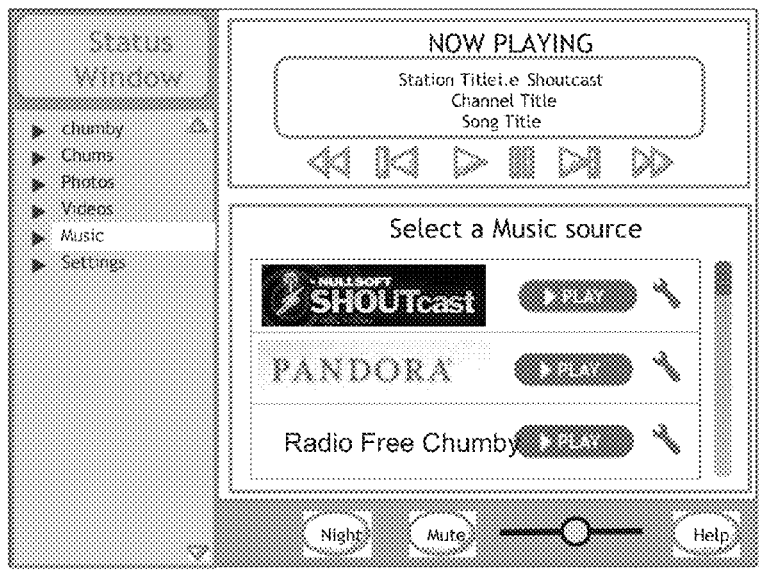
FIGS. 86-93 depict screen shots and accompanying descriptions of various exemplary user interface views presented via a ChumbyFrame™ device relating to accessing and playing music retrieved from local storage, a networked device, or from an Internet-based service provider such as SHOUTcast, Pandora or Radio Free Chumby™.
Figure 87:
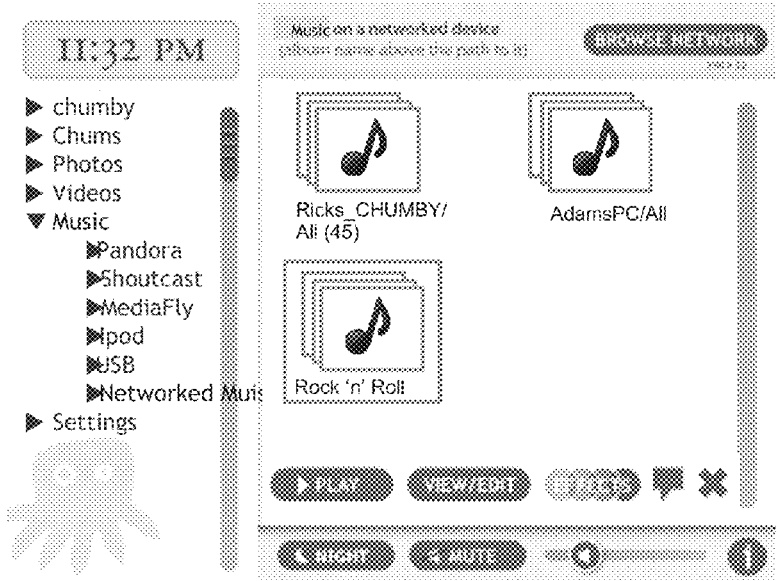
Figure 88:
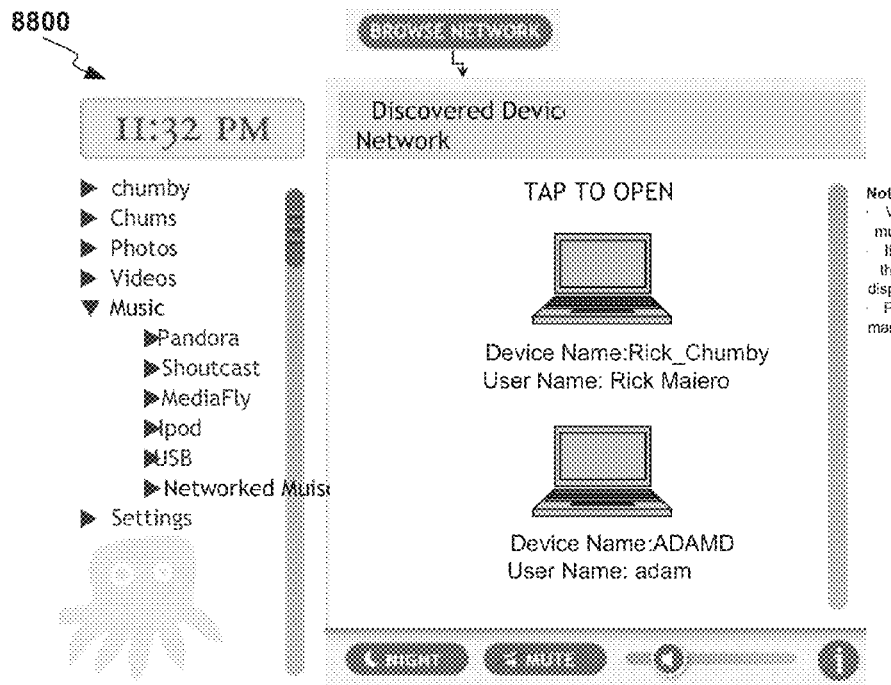
Figure 89:
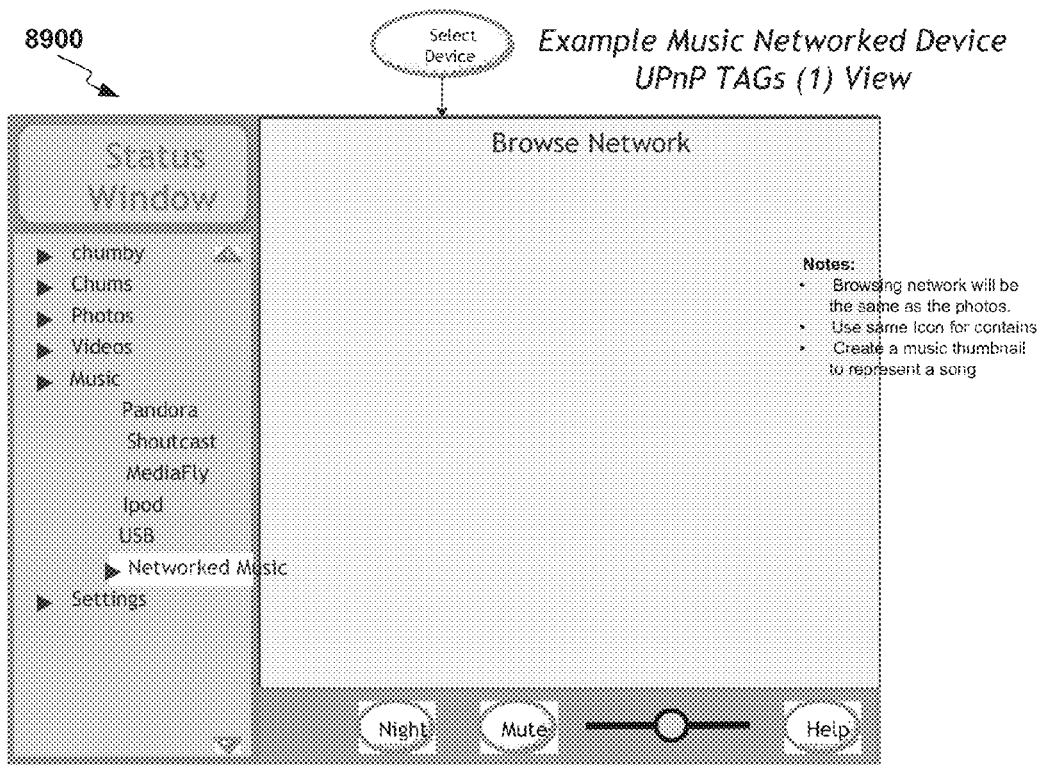
Figure 90:
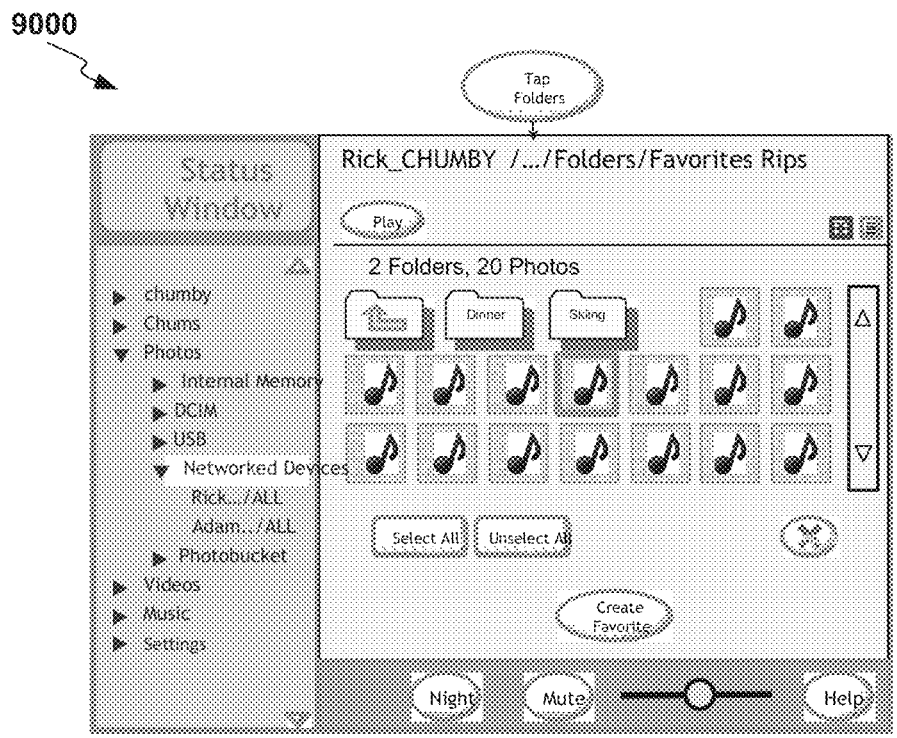
Figure 91:
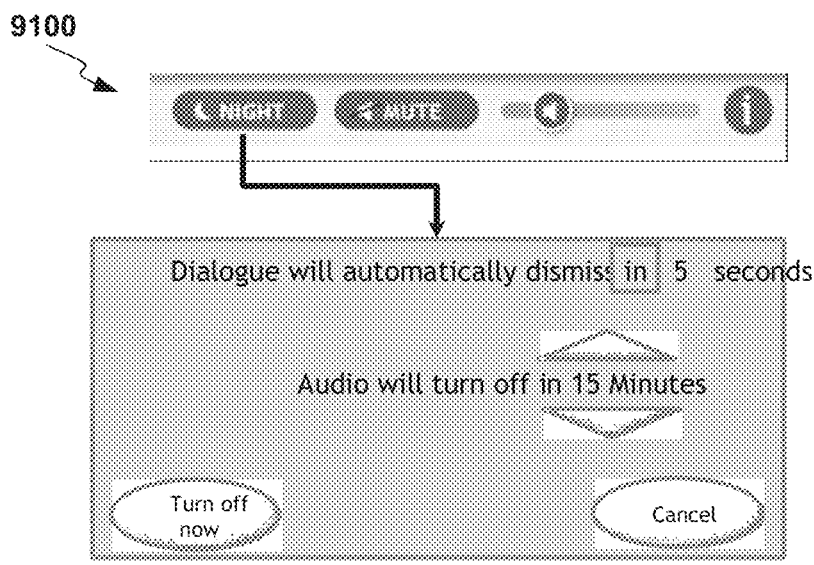
Figure 92:
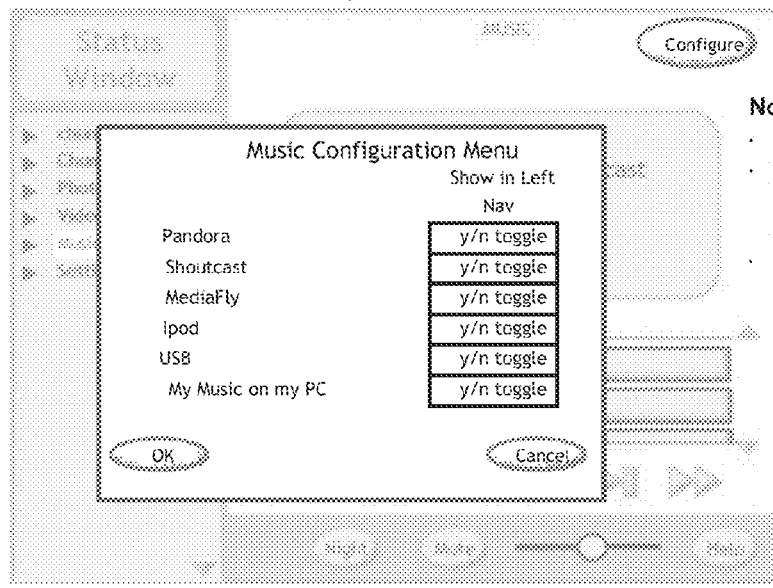
Figure 93:
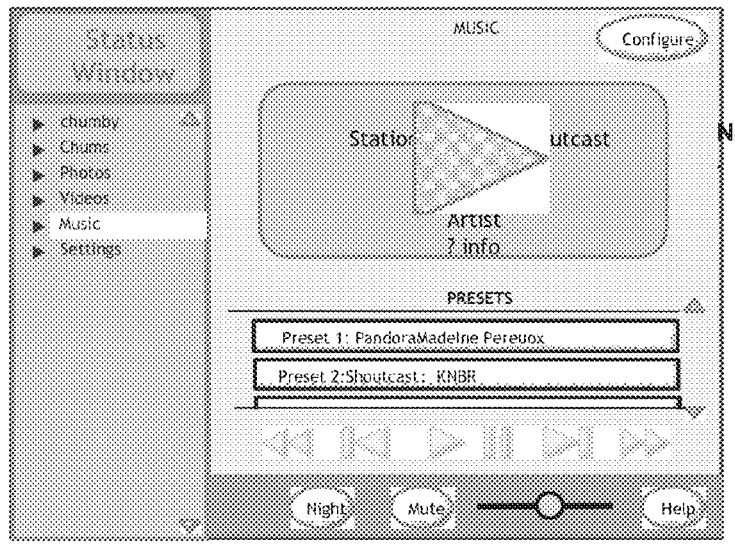

FIG. 85 illustrates an example of functionality of a widget configured to render a slideshow on a ChumbyFrame™ device.

Playing Music and Video Content Via a ChumbyFrame™ Device

FIGS. 86-93 depict screen shots and accompanying descriptions of various exemplary user interface views presented via a ChumbyFrame™ device relating to accessing and playing music or other audio retrieved from local storage, a networked device, or provided by an Internet-based service provider such as SHOUTcast, Pandora, Slacker, Radio Free Chumby™ or other Internet-based services. In exemplary embodiments the ChumbyFrame™ device is also configured to enable browsing and playing of video content of various formats (e.g., MOV, H.264, AVI, MJPEG, MPEG-4, and MP4) directly from the hosting website.

Additional Details of Embodiments

Chums Network—"Chums" forms the foundation for sharing via a ChumbyFrame™ device and provides the following: the destination for drag 'n' drop sharing of personal photos, personal video and widgets; the interface for a user to invite others to be their chum; The interface to accept invites; the interface to configure a user's personal chum profile.

My Chums Options—List of user's chums: Name; Invitations; Invite someone to be a Chum; Invite people who have accounts in network; Search profiles; Username; Last name; Invite by username, last name, email.

What is shown as part of search results?

Requester must have account and be logged in. Invite with email address (might be out of network). Import email addresses from Webmail accounts. Enter email address. Email will contain link to take them to site where they can log in or create an account. When they log in they will be taken to an "accept invite" area. What about reminders? Been deleted; Not been deleted.

What about withdrawing invites? Been deleted; Not been deleted

View and respond to received invitations; View all pending invitations

Possible responses—Accept; Accepting an invitation makes relationship bidirectional, Ignore; Deny, with or without notification, deny always deletes from receivers list.

View status of sent invitations—Accepted status; Option to Delete from history; There should be the ability to cancel a chum relationship My Configuration: Set Policy for my profile. Who can view; What is visible to searches; What they can view as a result of a search; parental settings.

Where to put received widgets: inbox or designated channel—By sender; Setting presence;

Availability for interactive sessions: chat, voice, videoOptions for a Selected chum; View selected chums profile; View names of received widgets from selected chum View names of sent widgets; Request session: IM; Voice chat Camera; View Presence: Available, not available Sending Widgets—Sending process to a chum. Widgets from a channel or catalog, slideshows and collections of photos can be sent. Photos and videos are uploaded to designated upload site when the widget is sent. The widget points to the media on the photo sharing site. A collection of photos are automatically made into a slideshow widget when sending. (So you can drag 'n' drop a collection of photos on a chum). Users will be requested to input a name or provided the option to rename. Messages can be created and attached when sending a widget that will be displayed when the widget is played Sending process to an email address—Slideshows and collections of photos can be sent to an email address. Widgets can only be sent to chums. Photos and videos are uploaded to designated upload site. An email is sent with the link to the photos embedded in the email. Email will contain some chumby promotional content and a link to chumby.com to register but the recipient will not be required to be a registered on the network to view. Over time the promotional material can get more dynamic and targeted. The created message will be embedded in the email.

Drag 'n' Drop rules—Dropping on "Chums" menu; System prompts for target: Email address or chum(s) name; For collection of photos: Prompt for widget name. For widgets or slideshows: provide rename option.

Option to attach a message—drop on specific chum; For collection of photos: Prompt for widget name; for widgets or slideshows: provide rename option; Option to attach a message. User should be required to have a chumby account to view photos. When a widget is created to be sent it will be listed in the sent area for a chum but the widget will not be accessible by the sender. It must be clear to sender that it will not be. Messages attached to a sent widget are embedded in widget and displayed by widget Sharing and Chum Event Notification—Key events; Receipt of invitation request; Receipt of widget when it automatically appears in channel; Receipt of widget when it is waiting acceptance; New photos are waiting from photosharing site.

Notification process—Icon is displayed in play window to indicate that there are pending events requiring a response. On entering control panel the status window will contain the status information and the appropriate navigation to process the events will be highlighted (like channels is highlighted today indicating that there are widgets awaiting acceptance).

Examples of Creating Widgets from local Photos and Videos—A collection of local photos and videos can be sent to a chum as a slideshow widget. The Photos/Video may be sent by dragging and dropping a collection of photos/videos onto the chum category or a specific chum. When dropped, the collection is made into a slideshow widget and sent to the destination chum(s). A CHUMBY frame may provide the capability to have a widget that views local photos as part of a user channel. For example, when a collection of local photos and/or videos are drag 'n' dropped onto a channel a local slideshow widget is put in the channel that will point to the collection. The photos are typically not moved for local slideshow widgets, and local slideshow widgets are typically only usable on the device where the photos are resident. When sent the local slideshow widgets may follow the same rules as sending a collection of local photos.

User of Local Slideshow Widgets—Local slideshow widgets ("show widgets") may be created when a user drags 'n' drops a local collection of media onto a channel. The widget will reference local content. User will have access to the following local slideshow widgets from the chumby catalog.

Use of Internal Memory/ALL photos—when played, the "Internal Memory/ALL photos" widget may displays photos from the ALL internal album using the default playing effects. If there are no photos in the internal memory the widget will display a quick message saying "No Photos in internal memory."

Inserted Memory Card/ALL photos—when played, the "Inserted Memory Card/ALL photos" widget will play any photos that are contained on an inserted memory card using the default playing effects. The widget may be configured to be tolerant of changing cards, removing cards in the middle, no card being inserted. If there are no photos in the inserted memory card the widget will display a quick message saying "No Photos in internal memory" If multiple devices are inserted the user will be asked to define which device to use.

Use of PC on a LAN/ALL photos—When played, the "PC on a LAN/ALL photos" widget may play any photos that are contained on a discovered networked PC using the default playing effects. If multiple connected PCs are detected the widget will ask for the name of the PC to use. The widget will ask the user to go to a PC and approve the connection if PCs are not enabled. The widget may be configured to be fault tolerant of connection problems and display, for example, "No photos available". A Best of chumby section may be provided to contain the Internal Memory/ALL photos and the Inserted Memory Card/ALL photos widget out of the box. If users plays "Best of Chumby" they will get their photos intermixed with chumby content.

Sending Photos/Video as a Slideshow Widget—Photos/Video may be sent to a chum as a slideshow widget by dragging and dropping a collection of photos/videos onto the chum category or a specific chum. When dropped on the chum category the user will be presented a modal dialogue that asks to select the destination chum(s). When dropped on a specific chum the collection will be sent to the specific chum. When the collection of photos and/or video is located on the client the sent slideshow widget will reference the specific photos. If a selected group of photos is sent the widget will reference the specific photos that are selected. If an album or a favorite is sent the widget will reference the specific contents of the album when the widget was sent. The photos may be uploaded to the designated upload site and the sent widget references the photos and contains the appropriate credentials to access the photos. When a selection of photos is sent from a photosharing site the sent widget references the photos on the photosharing site. The photos are typically not moved and the sent widget references the photos on the appropriate photosharing site and contains the appropriate credentials to access the photos.

When an album or favorite is sent from a photosharing site the sent widget references the container and when the widget is played it will show the current contents of the container, e.g. All my Flickr photos. The photos are typically not moved and the sent widget references the container on the appropriate photosharing site and contains the appropriate credentials to access the photos.

Designated Upload Site—A Designated Upload Site may be used as a repository for shared photos and videos. By using an intermediary store in the cloud the receiver does not need to have access to the senders frame and the photos do not have to be downloaded to the destination frame. The user may be requested to activate the upload site during account activation on the Web Site. The activation wizard should be extendable to add multiple possible upload sites. If the designated upload site is not set the first time a user attempts to send they will be requested to create and enter their credentials. The user must be able to enter their user name and password from the client. the client, users will be informed that if they don't have a Photo bucket account that they need to go to Photo bucket and create an account before they can send to chums. From the web, the account creation process can be more guided like Flickr and Face book are. An option to set the Designated Upload Site may be made available from the photosharing site configuration screens.

Adding Local Photos and Video to a Channel—Photos/Videos may be added to a channel by dragging and dropping onto a channel. When dropped on the chumby category the user will be ask for the destination channel. If the user only has one channel it will be added to that channel. If dropped on a specific channel the resulting widget will be added to the target channel. When a local album or is added to a channel the resulting widget contains a reference to the photos and when the widget is played it will show the current contents. The photos are typically not moved and the widget references the container on the appropriate photosharing site and contains the appropriate credentials to access the photos.

When an album or favorite from a photosharing is added to a channel the resulting widget contains a reference to the photos and when the widget is played it will show the current contents. The photos are typically not moved and the widget references the container on the appropriate photosharing site and contains the appropriate credentials to access the photos.

When a selection of photos from a photosharing site is added to a channel the resulting widget points to the specific photos. The photos are typically not moved and the sent widget references the photos on the appropriate photosharing site and contains the appropriate credentials to access the photos.

When a selection of internal photos is added to a channel the resulting widget only points to the specific photos. The photos are typically not moved and the sent widget references the photos on the appropriate photosharing site and contains the appropriate credentials to access the photos.

Drag 'n' Drop—When "dragging" destinations in left sidebar will designate if they are legal drop points and dragged icon will indicate when areas are not available for dropping On "drop"—Drop modal dialogue will be displayed. The system will acknowledge that the operation has been started. The status bar will reflect status. Operations that are not allowed while the operation is being performed will be blocked. When sending, a "Send Modal Dialogue" is displayed when the collection is dropped onto a legitimate send target. Display type of reference: specific photos are being sent or a reference to the container is being sent.

Name/Rename—If sending a collection of photos there may be a system supplied name that the user can edit. If sending an album or favorite the name of the album or an Option to Parameterize but can send with defaults.

Widget play time; Option to attach a message; When adding to a channel, an "Add to channel" dialogue is displayed when the collection is dropped onto a legitimate add to channel target. Display type of reference: specific photos are being sent or a reference to the container is being sent. Name/Rename. If sending a collection of photos there will be a system supplied name that the user can edit. If sending an album or favorite the name of the album or option to Parameterize but can send with defaults. Widget play time—Option to attach a message—References Descriptions. A message will appear when the photos are 'dropped' that will inform the user of the type of reference that is being sent or placed in a channel. One of the following messages may be displayed When a selected collection of photos is sent: "The 'x' selected photos will be sent as a slideshow widget to <chum>". When a selected collection of photos (static content) is added to a channel: "The 'x' selected photos will be added as a slideshow widget to <channel name> channel. When a local album or an Internet photosharing album (dynamic content) is added to a channel: "Adding album <name> to channel as a slideshow widget. The widget will display the most current contents of the album when played." When an Internet photosharing album (dynamic content) is sent to a chum: "Sending album <name> to chum as a slideshow widget. The widget will display the most current contents of the album when played." When sending a local album to a chum (static content): "photos from album name "zz" will be copied from the album. The slideshow widget will not reflect any new additions or changes to the album".

[Sending Photos via Email—An additional feature may be to allow sending photos via email. Selecting an email address instead of a chum can be accomplished by adding the option to send to an email address when dropping on the general chums category. The same references will apply for sending by email except that instead of sending a widget an email is sent with a reference embedded in the email.

The following are product specification details of an exemplary embodiment of a CHUMBY frame consistent with the present invention.

Example of an Exemplary ChumbyFrame™ Product Specification and DescRiptionSoftware Features Overview r

---

User can create and view photo albums
A "Photo Album" is a selection of photos from a selected source. A photo album can also
designate other media including audio selection to "play" when album is displayed.
Albums can be created from all popular media sources.
Internal memory photo album; Inserted memory cards photo album; IPod photo album
PCs on a LAN via UPnP photo album; Photo albums for favorite internet sites: Flickr, Picasa,
Intermix photo albums in a photo show
With ChumbyFrame users will no longer be constrained to only viewing photos from one
source at a time as they are with other frames.
Play videos from multiple sources
Internal memory; Inserted memory cards; PCs on LAN via UPnP; Favorite internet sites
Intermix videos with photo albums in a show.
Select audio to play with photo albums and shows. Configure what audio to play when an
album is displayed.
Access to all chumby internet and local audio sources.
From internet sites such as SHOUTcast, radio free chumby, Pandora, . . .
This will include capability to access audio from files on a dongle connected to the frame or
from audio on a network connected PC via UPnP.
Versatile photo show effects
Transition effects including a wide range of wipes and transitions.
Viewing effects such as Ken Burns effect
Ability to show multiple photos at the same time (Mosaic)

Zoom
Date/Time stamp display
. . .
Photo sharing
Upload photos from frame to photo sharing sites
Send photo albums to other Chumby powered frames
Send albums from internet photo sharing sites to other Chumby-powered frames.
Display photos sent to an email address
. . . And full access to the chumby network
~700 Widgets today growing to over a thousand by Q3
Sports
Entertainment
News
Watchlists
Social networking/dating
Casual gaming: single player/multiple
Internet audio: SHOUTcast, Pandora, MediaFly, . . .
Alarms
Share/send widgets
Intermix photo albums with all content from chumby network because the albums are widgets themselves
ChumbyFrame Functionality Summary
ChumbyFrame will support viewing local photos and videos. Supported sources:
Photo sources
Internal memory
Inserted memory cards
Inserted USB dongle
IPod
PCs on a LAN via UPnP
Video sources
Internal memory
Inserted memory cards
Inserted USB dongle
PCs on a LAN via UPnP photo album
Local photos and videos will be displayed in single album viewing mode or they can be made into widgets that are played in a channel standalone or with other widgets.
Each photo source will be represented as a unique album that can be viewed.
Albums can be added to channels as album widgets and played by the widget player.
There will always be a local "photo channel" that does not require connecting to the internet to be played.
Local media widgets will be accessible without connecting and activating.
The local photo channel can be played in both disconnected and connected mode.
Photo album widgets can be added to any channel when connected.
Named groups of internal photos can be created.
Internal Album widgets can be a named group. The name of the widget will be the named group
Mulitple named groups can be added to a channel as different widgets.
The local photo album (implemented as widgets) will be configured locally with wizards which will guide the user through configuration processes and via menus.
In a simple photo viewing usage model a user will turn on the device, plug in their memory card, and ChumbyFrame will start displaying photos from the inserted memory card.
The local photo widgets can be added to other channels and intermixed with other chumby widgets.
Any chumby widgets can be added to the photo channel and played with the local photo widgets.
Inserting a memory with photo's will cause the corresponding album (internal widget) to start displaying the photos
On insertion, the frame will switch to the local photo channel and switch to the appropriate photo widget.
Internet photo viewing will be enabled by adding photo sharing widgets to the photo channel.
Web based wizards will facilitate configuring widgets as albums and adding to the user photo channel.
ChumbyFrame must be connected to the internet view internet photos
Internet photo widgets can be intermixed with local photo widgets so photo shows can contain photos from both local and internet sources.
Chumbyframe must be connected and activated to send/receive photos, access internet audio or access any other chumby network content.
When the frame is connected contents of photo channel and local widget configurations are reflected on user's account on the web.
Remote control is usable for TBD control panel operations and photo album control.
Chumbyframe will support video chat as an option. This will be defined in a separate document that will also include all messaging capabilities.
All other chumbysquishy and chumbynetwork capabilities will be supported except for the following
Chumbyframe does not support an accelerometer
High Level Flows
The first time the frame is powered on the intro movie is played and a setup wizard provides configuration options
Connect to network Activate and configure chumby network
Select and configure internet photo albums
Select and configure chumby network content
Configure local photo album viewing.
After first time, when ChumbyFrame is powered on, the default operation is to resume playing the channel that was active when the device was powered off.
If the device was playing local photos from the local photo channel when powered off, when turned back on, the device will continue playing the local photos.
chumbyFrame can be configured to loop on demo to show off frame features.
Activated/deactivated by an easter egg on remote control
Operations during play: Simple case is while frame is cycling through local photo widgets in photo channel but this applies to normal operation when ChumbyFrame is playing a channel with widgets.
Touching screen: Widget specific.
All photo album widgets will display options including thumbnail displays, photo management and configuration options.
Press CP switch: invokes control panel
Displays current channel
User can select photo/wizard to run wizards to change photo options
User can select video/wizard to run frame wizards to change video options
User can use as a chumby
Insert memory card: Display photos from memory card album.
ChumbyFrame will automatically switch to "Photos" channel and play "memory card album" widget.
On insertion user will be given options:
Play as part of show (cycle through widgets in channel)
Loop on photos (stay in widget)
Run memory card album configurator
Can configure so it starts playing without asking any options.
Insert iPod: Display photos from iPod album.
(basically same as Insert memory card)
Boot and Wizard Flows
First time boot scenario
If demo enabled loop on demo
If not in Demo mode:
Play walkthrough video
Asks if user want to connect and activate: y/n
If yes
Run connection wizard to connect
If not registered ask if user wants to register: y/n
If yes:
Run activation wizard on frame
Guides user to go to site and create account, activate and configure photo widgets.
If No
Inform user how to activate later
Exit
Run photo configuration wizard
Provide option to select from any the following
Manage (copy et. al) and configure internal memory album
Configure memory card album
Configure networked device album
Configure iPod album
Select internet albums
Start album play
Cycles through all selected photo albums: internal memory, inserted memory, PC, iPod, internet . . .
If no album enabled default is internal demo photos
Photo Album Configuration Wizard (on frame)
Display source status and provide option to select from any the following
Manage (copy et. al) and configure internal memory album
Configure memory card album
Configure networked device album
Configure iPod album
Select internet albums
Exit configurator
Manage/Configure internal memory photo album
Copy Photos: y/n
If yes
Select source
Inserted memory card
IPod
Media on LAN
Guide user through connection and navigation as appropriate
Display thumbnails
Provide selection option
Provide ability to copy "all" or "selected"
Manage Photo in Internal Memory: y/n
If yes
Display Thumbnails Provide selection options
Provide ability to delete "selected" or "All"
Include internal photo album in show: y/n
If yes:
Display: Frame will display album if any selected photos are stored in internal memory
If no: Exit to top level configurator menu
Display thumbnails of photo in internal memory and display selection options
"Play All" is default
Provide ability to select thumbnails and play selected
Guide through settings
Transitions
Display intervals
Order
date/time stamp display setting
Single/multiple display
image format
Do you want to play audio when displaying photos from internal memory: y/n
If yes
Select audio source (use same interface as alarms)
Exit to top level configurator menu: y/n
Configure inserted memory card photo album
Include inserted photo album in show: y/n
If yes:
Display: Frame will display album if memory card with photos is inserted in frame
If no: Exit to top level configurator menu
Display thumbnails and display selection options
Play all is default
Provide ability to select for play selected
Guide through settings
Transitions
Display intervals
Order
date/time stamp display setting
Single/multiple display
image format
Do you want to play audio when displaying photos form inserted memory: y/n
If yes
Select audio source (use same interface as alarms)
Exit to top level configurator menu
Configure iPod photo album
Include iPod photo album in show: y/n
If yes:
Display: Frame will display album if iPod with selected photos is connected to frame
If no: Exit to top level configurator menu
Discover if iPod is connected
If iPod not connected request for user to connect iPod and wait for connection
If exit: Exit to top level configurator menu
Display thumbnails and display selection options
play all is default
Provide ability to select for play selected
Guide through settings
Transitions
Display intervals
Order
date/time stamp display setting
Single/multiple display
Do you want to play audio when displaying photos from iPod: y/n
If yes
Select audio source (use same interface as alarms)
Exit to top level configurator menu
Configure networked device photo album
Include Networked device photo album in show: y/n
If yes:
Display: Frame will display album if selected network device is available with selected photos
If no: Exit to top level configurator menu
Guide user through navigation and selection process
Discover and display available networked devices
Display status during discovery process
Provide appropriate navigator: folders, Tags, dates, etc.
Ask user to select desired device
Display thumbnails and display selection options
play all is default
Provide ability to select for play selected
Guide through settings
Transitions
Display intervals
Order
date/time stamp display setting
Single/multiple display image format
Do you want to play audio when displaying photos from networked device: y/n
If yes
Select audio source (use same interface as alarms)
Exit to top level configurator menu
Configure internet albums
If not connected user is asked to connect using connection wizard
If not activated user is asked to activate using activation wizard
User is provided list of available internet albums to select and make available in photo channel
Provide option to perform local configuration as available on each internet source.
Video Configuration Wizard (on frame)
Substantially the same as Photo configuration
Network Connection Wizard (on frame)
See existing connection wizard
Activation Wizard (on frame)
Runs existing activation wizard
Guides user to go to site and create an account, activate and configure photo widgets.
Web Site Configuration Flows
User selects "Create Account" on Website
Account creation process
Activate frame y/n
If yes:
Activation flow
Configure favorite internet photo albums y/n
If yes:
Internet Photo Album configuration wizard
If No:
Home
If no:
Home
Existing user selects "Activate Frame"
Activation flow
Configure favorite internet photo albums y/n
If yes:
Internet Photo Album configuration wizard
If No:
Home
User selects "configure photo albums"
Ask user to select active device
Execute Photo Album configuration wizard
User is provided option to add other chumby network content to local photo album
Manage channel
Subscribe to widget groups
Internet Photo Album configuration wizard
Provide options to select photo widgets to configure
Facebook photos
Flickr
Picassa
. . .
Photo wizard configurator
Execute selected widget specific configuration movie
Add widget as albums in local "photo" channel
Contents of local photo channel are reflected on site
Configuration of local photo albums are reflected on site
Remote control
The remote control will be usable for all Control Panel operations
The remote control will be usable to control viewing local photo widget albums.
The remote control will be usable to control viewing all chumby created photo sharing widgets
We will define an open API for Widgets to get remote control events
Media Sharing
User's will be able to share photo's from chumbyframe
The following photo sharing capaabilites wil exist
Uploaded to your favorite photosharing site
From inserted memory card
Album from internal memory
Users can send a photo album to a chum and the chumby will manage picture transfer details. For an internal album where photos are stored on the frame we need to upload the photos to a photo sharing site.
Send individual photo with a message.
Chumby will establish relationships with photo sharing sites to allow for chumbynetwork members to use these sites for photo sharing
Exemplary Hardware Feature Summary
Two-piece design, featuring a core unit and
two dock options.
Core Unit 3.5" 320 × 240 touchscreen LCD
400 MHZ ARM9 CPU -continued 128 MB DDR SDRAM
2 Gb NAND FLASH
3-axis accelerometer
Integrated 1 W mono speaker
Microphone input
Dimmable backlight
802.11 b/g wifi
RTC with battery backup
Service authentication via cryptoprocessor and
unique branding electronic ID
Top button for control panel access
1.5 hour rechargeable Li-ion battery
Connector to dock unit for peripheral breakout
Size: 83 mm (w) × 90 mm (h) × 13 mm (d)
"Mini Dock" Unit Headphone/line output
1x USB Type A female for expansion
Dock status LED
+5 V Wall-adapter for charging voltage
"Radio Dock" Unit High fidelity 4 W mono speaker
Headphone/line output
1x USB Type A female for expansion
Dock status LED
+5 V Wall-adapter for charging voltage It is noted that in various embodiments the present invention relates to one or more processes such as are described and/or illustrated herein. These processes are typically implemented in one or more modules as are described herein, and such modules may include computer software stored on a computer readable medium and/or in a computer memory or other instruction storage device, including instructions configured to be executed by one or more microprocessors or other digital instructions execution mechanisms to perform the described process steps or stages.

It is further noted that, while the processes described and illustrated herein may include particular steps or stages, it is apparent that other processes including fewer, more, or different stages than those described and shown are also within the spirit and scope of the present invention. Accordingly, as noted previously, the processes and associated modules shown herein are provided for purposes of illustration, not limitation.

Some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as described herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM memory devices. Examples of computer code may include machine code, such as produced by a compiler or other machine code generation mechanisms, scripting programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, some embodiments of the invention may be implemented using assembly language, Java, C, C#, C++, scripting languages, and/or other programming languages and software development tools as are known or developed in the art. Other embodiments of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. It is intended that the following claims and their equivalents define the scope of the invention.

We claim:

1. An electronic device, comprising:
a processor;
an output system; and
a memory coupled to the processor, the memory providing electronic program code that is executable by the processor, the electronic program code configured to provide output from the electronic device via the output system, by performing operations that:
  download a plurality of content items from a network content service, the content items designated for presentation by a user-interactive software application, and the content items being loaded into volatile memory of the electronic device for the presentation by the user-interactive software application;
  download a content sequence for an ordered display of the plurality of content items in the user-interactive software application, the content sequence provided by the network content service, wherein the content sequence is customized to a profile for the electronic device maintained by the network content service, the profile being identified at the network content service with use of a device identifier communicated from the electronic device to the network content service; and
  execute the user-interactive software application to output the content items from the user-interactive software application via the output system, wherein the content items that are output from the user-interactive software application are output according to the content sequence, wherein the output of the content items from the user-interactive software application is automatically changed according to a schedule specified by the content sequence.

2. The electronic device of claim 1, wherein the user-interactive software application includes a widget that is adapted for execution on the electronic device, wherein the operations further include operations that render the widget and the output of the content items to provide visual output from the electronic device via the output system.

3. The electronic device of claim 2, wherein the user-interactive software application is further adapted for execution on the electronic device without permanent storage to a storage memory of the electronic device, the user-interactive software application being downloaded from a remote service for execution on the electronic device.

4. The electronic device of claim 1, wherein the content items are provided from a grouping of respective software applications in a channel, the channel provided from a plurality of available channels defined by the network content service, wherein the channel specifies the output of the content items according to the content sequence based at least in part on execution of the respective software applications defined in the channel.

5. The electronic device of claim 4, wherein the content sequence is provided by sequential transitions among the respective software applications defined in the channel, wherein the content items provided from the respective software applications and a sequential order of the content sequence are customizable by a user at a remote service.

6. The electronic device of claim 1, wherein the output system includes a speaker and a display screen, and wherein the content items include one or more of: games, photos, video content, or audio content.

7. The electronic device of claim 1, further comprising:
  a wireless network interface;
  wherein the wireless network interface is configured for communications with a wireless network, wherein the operations that download the plurality of content items from the network content service download the content items using the communications with the wireless network.

8. The electronic device of claim 1, wherein the electronic device is: a television, television plug-in module, a set-top box, a game console, a smartphone, a personal digital assistant, a media player, a photo frame, or a portable computing device.

9. A non-transitory machine-readable storage medium, including instructions that, when executed by hardware of an electronic device, configure the electronic device to perform operations that:
  obtain a plurality of content items from a network content service, the plurality of content items being temporarily cached for output on the electronic device by an instance of a user-interactive application executing on the hardware of the electronic device;
  obtain a content sequence from the network content service for an ordered display of the plurality of content items, the content sequence specified by the network content service, wherein the content sequence is defined within a profile for the electronic device maintained by the network content service, the profile being associated by a device identifier communicated from the electronic device to the network content service; and
  generate output on the electronic device from the user-interactive application, wherein the plurality of content items are output from the user-interactive application according to a schedule defined by the content sequence.

10. The machine-readable storage medium of claim 9, wherein the user-interactive application provides a widget that is adapted for execution on the electronic device without permanent storage to a storage memory of the electronic device, wherein the instructions further configure the electronic device to perform operations that render the widget and audiovisual content from the plurality of content items to generate audiovisual output from the electronic device.

11. The machine-readable storage medium of claim 9, the instructions further configuring the electronic device to perform operations that:
  obtain a channel definition for a particular channel from the network content service, the particular channel provided from a plurality of available channels defined by the network content service, wherein the particular channel is configured to output the plurality of content items in the content sequence based at least in part on execution of respective software applications of a plurality of software applications defined in the channel definition.

12. The machine-readable storage medium of claim 11, wherein the content sequence is provided by output from the respective software applications in the particular channel, wherein the content sequence provided in respective channels of the plurality of available channels and the execution of the respective software applications are customizable by a user at a remote service.

13. The machine-readable storage medium of claim 9, the instructions further configuring the electronic device to perform operations that:
  download the plurality of content items and download the content sequence from the network content service using a wireless network interface, wherein the wireless network interface is configured for communications with a wireless network, wherein the operations that obtain the plurality of content items and obtain the content sequence from the network content service download the plurality of content items and download the content sequence via the wireless network.

14. The machine-readable storage medium of claim 9, the instructions further configuring the electronic device to perform operations that:

generate the output on the electronic device from the user-interactive application by rendering audiovisual content of the plurality of content items on a display screen of the electronic device; and generate output on the electronic device for a control interface to modify the schedule defined by the content sequence by rendering a graphical user interface for control on the display screen of the electronic device.

15. The machine-readable storage medium of claim 9, the instructions further configuring the electronic device to perform operations that:

download, from a remote server, the user-interactive application, wherein the user-interactive application provides display content of the plurality of content items for output in a graphical user interface rendered by the electronic device;

configure the user-interactive application to reference the plurality of content items;

define an ordered sequence of a plurality of displayable applications in response to instructions received via the graphical user interface, the ordered sequence of the displayable applications providing a channel output via the graphical user interface, the user-interactive application being included within the ordered sequence of the displayable applications, wherein the ordered sequence of the displayable applications is defined at the remote server; and executing the displayable applications to generate output of the ordered sequence of displayable applications, wherein a display interface of the electronic device provides a rendering of the plurality of content items upon execution of the user-interactive application.

16. A method, comprising operations performed with use of a processor and memory of an electronic device, the operations including:

requesting, from a remote content service, a plurality of content items for audiovisual output by a user-interactive software application that is configured for execution on the electronic device, the plurality of content items being cached in a volatile random access memory (RAM) of the electronic device for output on the electronic device by the user-interactive software application;

processing a content sequence for an ordered display of the plurality of content items in the user-interactive software application, the content sequence provided by the remote content service, wherein the content sequence is defined by a profile for the electronic device maintained by the remote content service, the profile being associated by a device identifier communicated from the electronic device to the remote content service; and outputting the plurality of content items from the user-interactive software application, wherein the plurality of content items are controlled from the user-interactive software application and are output according to the content sequence.

17. The method of claim 16, the operations further including:

executing the user-interactive software application, the user-interactive software application in the form of a user interface widget that is adapted for execution on the electronic device without permanent storage to a storage memory of the electronic device; and rendering the user interface widget and the plurality of content items from the user interface widget to provide the audiovisual output from the electronic device;

wherein the user interface widget is provided at least in part from a firmware package distributed with the electronic device.

18. The method of claim 16, the operations further including:

requesting and processing a channel definition stored at the remote content service for an ordered display of the plurality of content items, the channel definition provided for a channel from a plurality of channels defined by the remote content service, wherein the channel is configured to output the plurality of content items in the content sequence based at least in part from execution of respective software applications of a plurality of software applications defined in the channel.

19. The method of claim 18, the operations further including:

defining the content sequence and a priority of execution for programs in the plurality of software applications, the content sequence and the priority of execution defined in response to instructions received via a user interface of the electronic device.

20. The method of claim 18, the operations further including:

executing the plurality of software applications in the respective channels, the plurality of software applications including the user-interactive software application, wherein content provided in the respective channels and ordering of the content provided in the respective channels is customizable by a user at the remote content service.

21. The method of claim 16, the operations further including:

downloading the plurality of content items and the content sequence using a wireless network interface of the electronic device, wherein the wireless network interface is configured for communications with a wireless network, wherein the operations that request the plurality of content items for the user-interactive software application also download content via the wireless network.

* * * * *